US010951315B2

(12) United States Patent
Nazarathy et al.

(10) Patent No.: US 10,951,315 B2
(45) Date of Patent: Mar. 16, 2021

(54) TRANSPARENT LINEAR OPTICAL TRANSMISSION OF PASSBAND AND BASEBAND ELECTRICAL SIGNALS

(71) Applicant: Technion Research and Development Foundation LTD., Haifa (IL)

(72) Inventors: Moshe Nazarathy, Haifa (IL); Amos Agmon, Sdeh Yaakov (IL); Alexander Tolmachev, Karmiel (IL)

(73) Assignee: Technion Research and Development Foundation LTD., Haifa (IL)

( * ) Notice: Subject to any disclaimer, the term of this patent is extended or adjusted under 35 U.S.C. 154(b) by 0 days.

(21) Appl. No.: 16/326,227

(22) PCT Filed: Aug. 28, 2017

(86) PCT No.: PCT/IL2017/050952
§ 371 (c)(1),
(2) Date: Feb. 18, 2019

(87) PCT Pub. No.: WO2018/042422
PCT Pub. Date: Mar. 8, 2018

(65) Prior Publication Data
US 2019/0280774 A1 Sep. 12, 2019

Related U.S. Application Data

(60) Provisional application No. 62/380,503, filed on Aug. 29, 2016.

(51) Int. Cl.
*H04B 10/532* (2013.01)
*H04B 10/2575* (2013.01)
(Continued)

(52) U.S. Cl.
CPC ......... *H04B 10/25752* (2013.01); *G02B 6/28* (2013.01); *G02B 6/29302* (2013.01);
(Continued)

(58) Field of Classification Search
CPC .......... H04B 10/2575; H04B 10/25752; H04B 10/532
See application file for complete search history.

(56) References Cited

U.S. PATENT DOCUMENTS

| 5,003,625 A | 3/1991 | Khoe |
| 5,321,543 A | 6/1994 | Huber |

(Continued)

FOREIGN PATENT DOCUMENTS

| CN | 103312645 | 9/2013 |
| GB | 2406010 | 8/2007 |

OTHER PUBLICATIONS

Nazarathy et al., "Doubling direct-detection data rate by polarization multiplexing of 16-QAM without active polarization control," Optics Express 31998, vol. 21, No. 261, Dec. 17, 2013.
(Continued)

*Primary Examiner* — Dzung D Tran
(74) *Attorney, Agent, or Firm* — Reches Patent

(57) ABSTRACT

An electro-optic system, the electro-optic system that may include an input port that is configured to receive a bandpass signal that conveys information; wherein the bandpass signal is a radio frequency (RF) signal; an optical carrier source that is configured to generate an optical carrier signal having an optical carrier frequency; at least one electrical bias circuit that is configured to generate at least one electrical bias signal; an electro-optic modulation circuit that is linear at the optical field; a manipulator that is configured to (a) receive the at least one electrical bias signal and the bandpass signal, (b) generate, based on the at least one electrical bias signal and the bandpass signal, at least one modulating signal; wherein the electro-optic modulation circuit is configured to modulate the optical carrier by the at least one modulating signal to provide an output optical signal that (Continued)

comprises at least one optical pilot tone and at least one optical sideband that conveys the information.

21 Claims, 33 Drawing Sheets

(51) Int. Cl.
  *G02B 6/293* (2006.01)
  *G02B 6/28* (2006.01)
  *G02B 6/42* (2006.01)
(52) U.S. Cl.
  CPC ..... *G02B 6/29362* (2013.01); *G02B 6/29383* (2013.01); *G02B 6/4246* (2013.01); *H04B 10/532* (2013.01)

(56) References Cited

U.S. PATENT DOCUMENTS

| | | | |
|---|---|---|---|
| 5,812,297 | A | 9/1998 | Mussino et al. |
| 5,880,870 | A | 3/1999 | Sieben |
| 2005/0031342 | A1 | 2/2005 | Wu |
| 2007/0019968 | A1* | 1/2007 | Hashimoto ........... G02F 1/0327 398/198 |
| 2010/0034542 | A1* | 2/2010 | Armstrong ......... H04B 10/5053 398/158 |
| 2011/0216810 | A1* | 9/2011 | Kumar ................. H04B 1/0483 375/146 |
| 2015/0050030 | A1* | 2/2015 | Le Taillandier De Gabory .......... H04B 10/50595 398/183 |
| 2018/0074348 | A1* | 3/2018 | Fujita ................... H04B 10/516 |
| 2019/0342682 | A1* | 11/2019 | Quan ..................... H03G 11/08 |

OTHER PUBLICATIONS

Agmon et al., "OFDM/WDM PON With Laserless Colorless 1 Gb/s ONUs Based on Si-PIC and Slow IC," J. Opt. Commun. Netw, vol. 6, No. 3, Mar. 2014, pp. 225-237.

Xiao et al., "A 240 Gb/s Self Coherent CO-OFDM Transmission Applying Real-Time Reception Over 48 KM SSMF," State Key Laboratory of Optical Communication Technologies and Networks, Wuhan, Hubei, China.

Adhikari at el., "Enhanced Self-Coherent OFDM by the Use of Injection Locked Laser," National Fiber Optic Engineers Conference, 2012, No. 1, p. JW2A.64.

Hussin et al, "Performance Analysis of Optical OFDM Systems," 2011 3rd Int. Congr, Ultra Mod. Telecommun. Control Syst. Work., pp. 1-5, 2011.

Adhikari et al., "Self-Coherent Optical OFDM, an Interesting Alternative to Direct or Coherent Detection," International Conference on Transparent Optical Networks, 2011, pp. 1-4.

X. Fernando, *Radio over fiber for wireless communications*. Wiley, 2014.

Z. He, Q. Yang, X. Zhang, T. Gui, R. Hu, Z. Li, X. Xiao, M. Luo, X. Yi, D. Xue, C. Yang, C. Li, and S. Yu, "4×2 Tbit/s superchannel self coherent transmission based on carrier tracking and expanding," Electron. Lett., vol. 50, No. 3, pp. 195-197, 2014.

S. Abrate, S. Straullu, A. Nespola, P. Savio, J. Chang, V. Ferrero, B. Charbonnier, and R. Gaudino, "Overview of the Fabulous Eu Project: Final System Performance Assessment with Discrete Components," J. Light. Technol., vol. 34, No. 2, pp. 798-804, 2016.

D. Che, Q. Hu, and W. Shieh, "Linearization of Direct Detection Optical Channels Using Self-Coherent Subsystems," J. Light. Technol., vol. 34, No. 2, pp. 516-524, 2016.

Q. Jin and Y. Hong, "Self-Coherent OFDM with Undersampling Down-conversion for Wireless Communications," IEEE Trans. Wirel. Commun., vol. 1276, No. c, pp. 1-1, 2016.

M. Y. S. Sowailem, M. Morsy-osman, O. Liboiron-ladouceur, and D. V Plant, "A Self-Coherent System for Short Reach Applications," in Photonics North (PN), 2016, 2016.

S. Adhikari, S. L. Jansen, M. Alfiad, B. Iran, V. A. J. M. Sleiffer, A. Lobato, P. Leoni, and W. Rosenkranz, "Self-Coherent Optical OFDM: An Interesting Alternative to Direct or Coherent Detection," in Transparent Optical Networks (ICTON), 2011 13th International Conference on, 2011, pp. 1-4.

\* cited by examiner

TRANSPARENT LINEAR OPTICAL TRANSMISSION OF PASSBAND AND BASEBAND ELECTRICAL SIGNALS

CROSS REFERENCE TO RELATED APPLICATION

This application claims priority from US provisional patent application filing date Aug. 29, 2016, Ser. No. 62/380,503, which is incorporated herein by its entirety.

FIELD OF THE INVENTION

This invention pertains to analog photonic transport of electrical signals with application to cellular and wireless LAN systems or to Radio-over-Fiber (RoF) systems at large.

BACKGROUND

In particular, in the wireless networks context it is useful to remote analog signals from one point of the network to another over some extended distance, for either back-haul or front-haul purposes, e.g. interconnect cellular base-stations and central offices or hubs (back-haul) or feed a large number of remote radio heads (antenna sites) from a single base station or from the so-call "Cellular Cloud". In the wireless context we distinguish between the downstream (DS) and upstream (US) directions to account for structural asymmetries of such links. Thus, one end of the link would typically be the "hub-end", e.g. a central office or a Cloud Radio Area Network (CRAN) interface whereat the DS signals to be converted to analog format for the purpose of analog-optical linear transport (the signals would be initially available in digital form), thus at the hub-end it is possible to perform some digital pre-processing in the digital domain prior to Analog to Digital (A/D) conversion prior to applying the electrical signal to the electro-optic modulator to be converted to optical form. At other end of the link we would typically have a remote radio head (RRH), alternatively referred to as Remote Antenna Unit (RAU) or Remote Access Point (RAP).

The DS signals that have been optically transported to the RRH are first photo-detected, i.e. converted to analog electrical form then applied to the analog DS wireless transmission system of the RRH (ending up in an antenna used for DS transmission), either directly as bandpass signals, either preserving their RF spectral structure as has been input into the optical transport link, with no frequency conversion, alternatively further frequency-converted from their current intermediate frequency band to a (typically) higher frequency band to be input into the wireless DS transmission system.

As for the US link, typically the RRH or remote node is its transmission end the optical transmitter (Tx) is located there). The RRH receives RF signals from the wireless medium via a receive antenna followed by some analog processing which could be some amplification and filtering in the simplest case, augmented by down-conversion to an intermediate frequency band in another case, in either case the RRH generates an electrical RF or IF electrical analog signal to be optically transported in analog form in our invention.

Typically the DS and US links would operate concurrently, either over separate optical fibers or free-space propagation paths, or over the same fiber or free-space propagation path but full-duplex multiplexed over different wavelengths. It is also possible to aggregate multiple DS (US) links together over different wavelengths in order to enhance the capacity of the optical transport system, e.g. to serve multiple antennas covering different sectors or used for Multiple Input Multiple Output (MIMO) processing.

The "bare-bone" element in all these various application systems is an optical transport link taking an analog electrical signal, modulating it onto an optical carrier at the transmitter (Tx) side while at the receiver (Rx) side the optical signal is converted back to the electrical analog domain. It is desirable to have the received electrical signal be as faithful as possible a replica (up to a constant) of the transmitted electrical signal this is what is meant by "transparent linear" optical transport, namely minimizing distortion and noise and/or other disturbances in the process of optical transport including in the optical to electrical and electrical to optical conversions in the Tx and the Rx.

The "barebone" analog optical transport link may be operated in either the DS or US directions of transmission in a wireless network. Such barebone analog optical transport link may be converted to a digital-to-analog optical transport link by providing at the transmit side digital to analog (D/A) conversion means (with possible digital pre-processing prior to the D/A in order to improve the characteristics of the optical transport). Conversely, the barebone analog optical transport link may be converted to a analog-to-digital optical transport link by providing at the receive side analog to digital (A/D) conversion means (with possible digital pre-processing prior to the A/D in order to improve the characteristics of the optical transport). Finally, by providing both D/A at the Tx side and A/D at the Rx side, we obtain an optical transport link for digital signals end-to-end. If the linear transparency characteristics are high-quality (low noise and distortion) then the digital transmission over such system may be conducted with a high-order modulation format, thus improving the spectral efficiency of transmission (transmitting a large number of bits per second per given bandwidth).

The following references provide an indication about the state of the art:

[1] X. Fernando, *Radio over fiber for wireless communications*. Wiley, 2014.

[2] S. Adhikari, S. L. Jansen, M. Alfiad, B. Ivan, V. A. J. M. Sleiffer, A. Lobato, P. Leoni, and W. Rosenkranz, "Self-coherent optical OFDM: An interesting alternative to direct or coherent detection," in *International Conference on Transparent Optical Networks*, 2011, pp. 1-4.

[3] S. Hussin, K. Puntsri, and R. Noe, "Performance analysis of optical OFDM systems," 2011 *3rd Int. Congr. Ultra Mod. Telecommun. Control Syst. Work.*, pp. 1-5, 2011.

[4] S. Adhikari, S. Sygletos, A. D. Ellis, B. Ivan, S. L. Jansen, W. Rosenkranz, Sander L. Jansen, and W. Rosenkranz, "Enhanced Self-Coherent OFDM by the Use of Injection Locked Laser," in *National Fiber Optic Engineers Conference*, 2012, no. 1, p. JW2A.64.

[5] X. Xiao, T. Zeng, Q. Yang, J. Li, Y. Pan, M. Luo, D. Xue, and S. Yu, "A 240 Gb/s Self-coherent CO-OFDM Transmission Applying Real-Time Receiption over 48 KM SSMF," in *Photonics Global Conference (PGC)*, 2012, 2012.

[6] M. Nazarathy and A. Agmon, "Doubling Direct-detection Data Rate by Polarization Multiplexing of 16-QAM without a Polarization Controller," in *ECOC* 2013, 2013, pp. 1-3.

[7] A. Agmon, M. Nazarathy, D. M. Marom, S. Ben-Ezra, A. Tolmachev, R. Killey, P. Bayvel, L. Meder, M. Hubner, W. Meredith, G. Vickers, P. C. Schindler, R. Schmogrow, D. Hillerkuss, W. Freude, C. Koos, and J. Leuthold, "OFDM/

WDM PON With Laserless, Colorless 1 Gb/s ONUs Based on Si—PIC and Slow IC," *J. Opt. Commun. Netw.*, vol. 6, no. 3, pp. 225-237, February 2014.

[8] Z. He, Q. Yang, X. Zhang, T. Gui, R. Hu, Z. Li, X. Xiao, M. Luo, X. Yi, D. Xue, C. Yang, C. Li, and S. Yu, "4×2 Tbit/s superchannel self-coherent transmission based on carrier tracking and expanding," *Electron. Lett.*, vol. 50, no. 3, pp. 195-197, 2014.

[9] S. Abrate, S. Straullu, A. Nespola, P. Savio, J. Chang, V. Ferrero, B. Charbonnier, and R. Gaudino, "Overview of the FABULOUS EU Project: Final System Performance Assessment with Discrete Components," *J. Light. Technol.*, vol. 34, no. 2, pp. 798-804, 2016.

[10] D. Che, Q. Hu, and W. Shieh, "Linearization of Direct Detection Optical Channels Using Self-Coherent Subsystems," *J. Light. Technol.*, vol. 34, no. 2, pp. 516-524, 2016.

[11] Q. Jin and Y. Hong, "Self-Coherent OFDM with Undersampling Down-conversion for Wireless Communications," *IEEE Trans. Wirel. Commun.*, vol. 1276, no. c, pp. 1-1, 2016.

[12] M. Y. S. Sowailem, M. Morsy-osman, O. Liboironladouceur, and D. V Plant, "A Self-Coherent System for Short Reach Applications," in *Photonics North (PN)*, 2016, 2016.

[13] S. Adhikari, S. L. Jansen, M. Alfiad, B. Ivan, V. A. J. M. Sleiffer, A. Lobato, P. Leoni, and W. Rosenkranz, "Self-Coherent Optical OFDM: An Interesting Alternative to Direct or Coherent Detection," in *Transparent Optical Networks (ICTON), 2011 13th International Conference on*, 2011, pp. 1-4.

SUMMARY

There may be provided an electro-optical system and methods.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
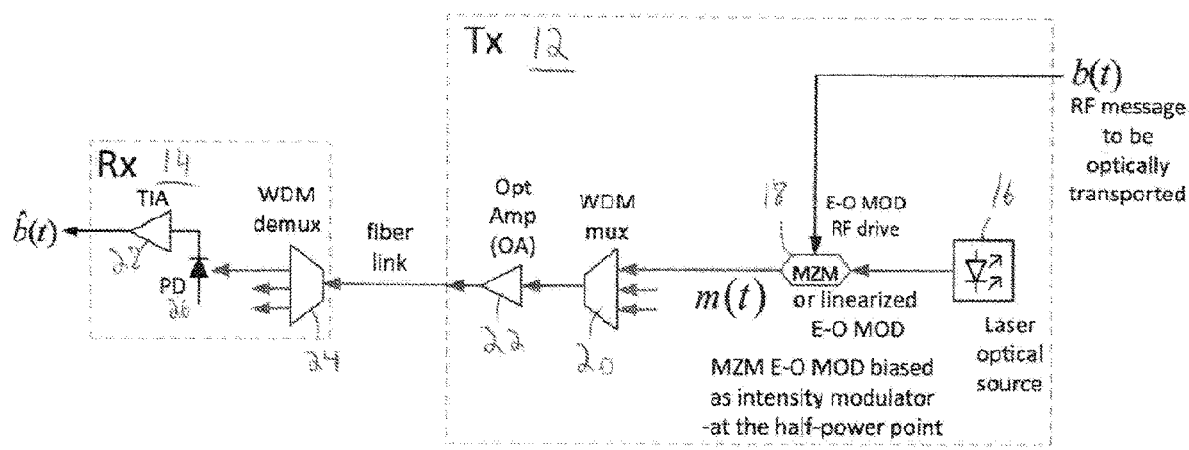
FIG. 1 illustrates a prior art system.

There are provided systems and methods for self-coherent linear transparent systems for linear transmission of RF signals over optical media including a relatively simple optical transmitter and receiver sub-systems designs which enable transport of baseband IQ and passband electrical signals with high analog fidelity (low noise and low distortion).

There are provided six alternative main embodiments (denoted E1-E6) of an end-to-end radio-over-fiber (or radio-over-free-space-optical) optical link for linearly transporting an electrical analog signal, typically a radio-frequency or microwave signal.

There are provided methods and systems for highly transparent analog-to-analog optical transport links for bandpass electrical signals, exhibiting low distortion and noise.

Systems using external electro-optical modulators are disclosed in the mentioned above references especially reference W. In many of these analog optical transport methods, various optical modulation sources such as directly-modulated lasers are used.

The methods and systems may be restricted to the usage of Electro-Optic (E-O) Modulators (MOD), since typically higher fidelity may be obtained by an external E-O MOD (driven by a Continuous Wave (CW) optical source), e.g. avoiding the chirping and distortion typically appearing in directly modulated lasers.

E-O MODs, e.g. Mach-Zehnder Modulators (MZM) also exhibit distortion but their distortion is more controlled and deterministic than that of directly modulated lasers, and it is possible to pre-distortion linearize the E-O MOD non-linear characteristic. Another simple means to get a more linear response from the E-O MOD is to simply reduce the amplitude of the electrical drive signal, though this means is evidently accompanied by a loss of Signal to Noise Ratio (SNR).

At the Rx side, we should account for distortion in the photo-detection (optical to electrical conversion) process, which is inherently nonlinear, exhibiting a quadratic non-linearity in its mapping of optical field to electrical photo-current (the photo-current is proportional to the optical power or intensity, which in turn is proportional to the average of the square of the optical field).

Thus, optical phase is lost in a simplistic photo-detection process, as just the amplitude-squares is detected, this incoherent photo-detection process being referred to as direct-detection (DD).

Most analog optical transport prior art embodiments are based on DD, the idea then being that since DD is linear in the optical intensity, then the E-O MOD should be designed to be as linear as possible in terms of its generated optical intensity modulation (as opposed to an alternative strategy, whereby the E-O MOD could be designed to be as linear as possible in its optical field, e.g. as used in coherent optical detection). E.g. DD-based optical transport links are often based at the Tx side on an MZM type of E-O mod operated as an intensity modulator by biasing the MZM along its sinusoidal transfer characteristic at the so-called quadrature operating point, half-way between its maximal (fully on) and minimal (fully off) operating point.

FIG. 1 depicts a prior art DD-based RoF analog optical transport link. At the receive side, essentially a photo-diode is used in the DD mode, with its linear-in-power characteristic sufficient to generate relatively linear end-to-end electrical-to-electrical mapping, provided the E-O MOD is driven by a weak signal and/or is electronically linearized by nonlinear pre-distortion. However, one deficiency of this method is that it does not exhibit good tolerance to linear optical distortion of the optical field over the fiber link, in particular chromatic dispersion (CD) and asymmetric optical filtering distortion. This degradation of DD analog optical links occurs since excess distortion may be generated by the interaction of the memory of the linear optical field propagation and the quadratic field to optical intensity mapping. Thus, the transmission distance and/or the transmission bandwidth of DD-based optical transport links is limited due to chromatic dispersion (this may be mitigated by using optical links over low-dispersion fibers and/or at wavelengths where the fiber dispersion is low, e.g. around 1.3 micrometer wavelength but this is not always a convenient solution as optical loss is higher at 1.3 micrometer and optical components such as Silicon Photonics may be more readily available at 1.5 micrometer wavelengths.

Coherent Optical Transmission and Detection

In principle an alternative to DD-based optical transport would be to use coherent detection for analog linear transparent transport. We briefly survey coherent optical transmission here as a stepping stone to our preferred "self-coherent" method of optical transport. In coherent detection, the idea is to have the modulated optical source perform as linear as possible a mapping between input electrical voltage and output optical field (e.g. bias an MZM modulator around its "off" operating point (zero-voltage yields zero output optical field) rather than around its quadrature operating point). At the Rx side, an optical local oscillator (a CW optical source included in the Rx) is optically superposed onto the photo-diode along with the optical received signal (that was modulated at the Tx side and propagated to the Rx). The beating or mixing between the incident received optical signal and the optical local oscillator generates, via the quadratic DD process, a photocurrent component linear in the optical field. If the incident optical field is split to two photo-diodes and two optical local oscillators in quadrature (with phases 90 degrees apart) are used, then the detected photo-currents in the two photo-diodes comprise components linear in the in-phase and quadrature components of the incident optical field in the Rx. Using coherent detection it is further possible to separate detect polarization components of the incident optical field.

In a nutshell, this is the well-known idea of coherent optical detection, which is in wide use nowadays in long-haul and in some metro optical systems. Superficially, the usage of optical detection for linear optical transport of analog signals would seem like a good idea, as the mapping from transmitted optical field to received optical field is highly linear, a necessary quality for high transparency of optical transport of analog signals in particular, the tolerance to optical chromatic dispersion (CD) is improved over a coherent optical link transporting analog signals, relative to a link using direct-detection (since the interaction of CD and the quadratic nonlinearity of the DD system is eliminated the received electrical signal being proportional to the received optical field rather than to its square).

However, coherent optical transport systems, be they digital or analog, are almost never used in short-reach optical networks, such as data centers and inter data centers interconnects and in wireless cellular networks due to excessive complexity and cost, nor are coherent system used in particular in ROF analog optical transport. The cost and complexity pertains to the requirements on the optical source are of high spectral purity (very low optical phase noise) and there is a need to lock the frequency of the optical local oscillator in the Rx to that of the optical Tx, operating the two optical sources at fixed offset (heterodyne mode) or preferably at zero-offset (homodyne mode). Moreover, the digital signal processing required to take advantage of the coherent detection ability to detect vector optical fields may turn out to be costly and power-hungry.

Self-Coherent Optical Transmission and Detection

The systems and methods use self-coherent optical transport links for analog signals. By self-coherent we mean optical transmission and detection techniques injecting optical pilot tones at the optical Tx side, which optical pilots propagate along the optical medium (say fiber) alongside the optical signals to be transmitted (albeit typically somewhat separated, spectrally).

When the information-bearing optical signals to be transported are photo-detected along with the optical pilot(s), effectively it is as if the optical pilots have been directly injected at the Rx side as local oscillators (although the optical pilot(s) have actually propagated all the way from the Tx to the Rx). Thus, self-coherent optical transmission systems are variants of coherent detection wherein the optical local oscillator at the Rx is eliminated, its functionality being replaced by that of the transmitted pilots injected at the transmitter. Moreover, the receiver circuitry required to lock the conventional local oscillator (now absent) to the received optical signal is eliminated or substantially simplified, the system complexity and cost are reduced for self-coherent transmission and detection links. The robustness of self-coherent links stems from both the pilots and the information-bearing signals injected at the Tx, propagating through common, nearly identical impairments, thus in the process of mixing the pilots and the information-bearing signals in the photo-detection process, impairment phases are subtracted, thus being nearly identical the impairment phases essentially get cancelled. These advantages have motivated the usage of self-coherent systems in optical access networks such as Passive Optical Networks (PON).

The quadratic photo-detection involving the superposition the pilot(s) and the received information-bearing optical signals generates mixing products which are linear in the information-bearing optical fields, thus yielding end-to-end linearity between the transmitted and detected optical fields, enabling transparent analog transport. This is the main underlying approach of this invention which bases optical transport of RF bandpass signals on self-coherent detection.

We shall see that proper crafting of the spectral structure of the information bearing signals vs the pilot(s), along with appropriate selection of E-O modulation structures and their electrical drives, yield improved CD tolerance and overall high linearity of optical analog transmission generally based on the self-coherent transmission and detection paradigm. In particular, the tolerance to the phase-noise of the optical source used at the Rx is much improved in self-coherent systems, since the same phase noise is imparted to both the information-bearing signal as well as to the optical pilots, thus in the optical mixing process in the course of self-coherent detection the two-phase noise components of the signal and the pilot, largely cancel out.

E1-E6 include various inventive elements. We present a uniform mathematical analysis for all six embodiments (and sub-embodiments thereof). The analytical models are developed here initially for E1, then extended to our novel embodiments, providing an understanding of some of the distinctions between prior art and the suggested systems and method. In fact, our thorough mathematical modelling presented below provides the insight required in order to comprehend the principles of operation of the inventive embodiments or elements thereof.

This patent application generally pertains to a subset of self-coherent optical transmission links for bandpass electrical signals (a bandpass signal being defined as one that has no spectral content at DC).

Throughout this patent application, the optical links include a Tx and a Rx, interconnected by an optical medium (optical fiber or free-space). We assume that the optical transport link is fed at its Tx side by a bandpass information-bearing electrical message signal b(t) (to be further DSB modulated onto an optical carrier) represented as follows:

$$b(t) = \sqrt{2}\, Re\{\underline{b}(t)e^{j\omega_{sc}t}\} = \frac{1}{\sqrt{2}}\underline{b}(t)e^{6j\omega_{sc}t} + \frac{1}{\sqrt{2}}\underline{b}^*(t)e^{-j\omega_{sc}t}.$$

Here $\underline{b}(t)$ is the complex-envelope (CE) of the bandpass (BP) RF message signal b(t) to be optically transported.

Alternatively, as a second option to structure the Tx, we shall also consider the case that the electrical signals to be transported are specified a pair of I and Q (in phase and quadrature) components, denoted $b_I(t), b_Q(t)$ available in either analog or digital form, then we may include in the Tx some electronic analog or digital pre-processing, taking $b_I(t), b_Q(t)$ as inputs to the Tx and generating out of these two I and Q components a single bandpass signal as in לא נמצא מקור ההפניה! שגיאה, with complex envelope (CE) (denoted by undertilde), $$\underline{b}(t) = b_I(t) + jb_Q(t), \quad (1)$$

or equivalently, directly generate the real-valued bandpass signal b(t) by quadrature modulation of I and Q components:

$$b(t) = \sqrt{2}Re\{(b_I(t)+jb_Q(t)e^{j\omega_{sc}t}\} = b_I(t)\sqrt{2}\cos\omega_{sc}t - b_Q(t)\sqrt{2}\sin\omega_{sc}t$$

In all our embodiments E1-E6 we make use of (nearly) linear electro-optic modulators (E-O MOD). (e.g. a Mach-Zehnder Modulator (MZM) used in "backoff" mode, i.e. with a sufficiently attenuated electrical input).

It is the bandpass real-valued electrical signal that is applied to a relatively linear amplitude E-O MOD along with appropriate auxiliary pilot tone signals to be inventively specified in the embodiments below.

A third option for the Tx structure is to use an optical In-phase and Quadrature (IQ) E-O MOD and apply the signals $s_I(t), s_Q(t)$ directly to the I and Q input electrical ports of the optical IQ E-O MOD (along with appropriate auxiliary pilot tone signals to be inventively specified in the embodiments below).

Electro-Optic Modulators and their Modelling

In all our embodiments E1-E6 we make use of (nearly) linear electro-optic modulators (E-O MOD). The (nearly)-linear E-O MOD is assumed to be linear or approximately linear in the optical field, i.e., have a nearly linear drive voltage to optical field mapping (in particular, zero drive voltage yields zero optical output).

We reiterate that this is in contrast to modulators which are nearly linear in optical power (a linear drive voltage to optical power mapping, as usually used in radio-over-fiber analog links, wherein MZM modulators are typically used for external modulation, biased at the half-power point such as they act as intensity modulators).

Thus, our approach to RoF transport is to use optical field modulators rather than intensity modulators.

We shall consider such (nearly) linear-in-the-optical field E-O MODs of two types:

1. E-O MOD with a single electrical input (and an optical input and one or two optical outputs), typically a Mach-Zehnder Modulator (MZM) either linearized (optically or electronically) or operated in backoff mode (i.e. with reduced drive signal such that its linearity is enhanced). The linearization electronic or optical circuitry is assumed to be part of the E-O MOD structure. For a non-linearized MZM, the modulator is inherently biased such that its operating point when the drive voltage is d=0, is a point where no optical field is produced. However, on top of the inherent bias (which is always assumed) we may apply extra DC biases to the MZMs (e.g. in embodiment E1 and E3) or RF pilots (in the other embodiments), as will be detailed in the embodiment description.

2. An In-Phase and Quadrature (IQ) E-O MOD, e g implemented by nesting two MZMs in parallel (each biased to have nearly linear drive voltage to optical field mapping) with 90-degree optical phase shift applied to one of the two arms prior to optical combining.

Our embodiments E1,E2 feature the E-O MOD type #1 above (e.g., an MZM with proper bias) whereas the rest of the embodiments feature an I-Q modulator (type #2 above). The difference between the two types of (nearly) linear E-O MODs is that type #1 modulates just one optical quadrature, whereas type #2 modulates both quadratures.

Mathematical Model of Linear Single Quadrature and IQ Modulation

The (nearly) linear E-O mod is fed by an electrical drive signal, d(t) in its electrical input as well as by a CW optical carrier with field c(t) fed into its optical input. The input optical carrier is modelled as a nearly continuous-wave (CW) optical field:

$$c(t) = \sqrt{2}a_c \cos[\omega_c t + \phi(t)] \propto e^{j\phi(t)}e^{j\omega_c t} + e^{j\phi(t)}e^{-j\omega_c t} \quad (2)$$

where $\phi(t)$ represents the phase noise of the laser source (its minute amplitude fluctuations may be initially ignored assuming $\phi(t) = \phi$ is constant).

The linear E-O mod may be ideally modelled as a mixer (multiplier) of the optical carrier c(t) by the optical drive d(t) (where $\propto$ denotes equality up to a multiplicative constant, i.e., proportionality). The output of the linear E-O mod is given by:

$$m(t) \propto d(t)c(t) = d(t)\sqrt{2}a_c \cos[\omega_c t + \phi(t)] \quad (3)$$

Note: An MZM E-O MOD is actually a nonlinear device, modeled as generating an optical field $$m(t) \propto \sin\left[\frac{\pi}{V_\pi}d(t)\right]c(t) \cong \frac{\pi}{V_\pi}d(t)c(t) \quad (4)$$

where $$\frac{\pi}{V_\pi}\left[\frac{\text{rad}}{\text{volt}}\right]$$

is a proportionality constant between voltage and induced E-O phase and the last approximate equality stems from $\sin[\theta] \cong \theta$ for relatively small $\theta$ stemming from the backoff mode of operation of the MZM. It is the last approximate equality that indicates that the MZM E-O MOD behaves as a mixer, a multiplier of $d(t),c(t)$.

The analytic signal $m^a(t)$ of the optical field signal $m(t) \propto d(t)\sqrt{2}a_c \cos[\omega_c t + \phi(t)](3)$ at the modulator output (the relevant term at positive frequency) is given by $$m^a(t) \propto d(t) \cdot a_c e^{j\phi(t)} e^{j\omega_c t} \quad (5)$$

It follows that the analytic signal of the optical mixer output is proportional to that of the mixer optical input, $a_c e^{j\phi(t)} e^{j\omega_c t}$ times the modulating real-signal, $d(t)$:

$$m^a(t) \propto a_c e^{j\omega_c t} e^{j\phi(t)} d(t) \quad (6)$$

Input and output analytic signals are multiplicatively related via the real-valued drive signal.

This relation between the analytic signals at the input and output of the E-O modulator can be verified by taking the NE times the real parts of both sides of the last equation:

$$\sqrt{2}\text{Re}\{m^a(t)\} \propto \sqrt{2}\text{Re}\{a_c e^{j\omega_c t} e^{j\phi(t)} d(t)\} \Leftrightarrow m(t) \propto$$
$$\sqrt{2}d(t)\text{Re}\{a_c e^{j\phi(t)} e^{j\omega_c t}\} \Leftrightarrow m(t) \propto d(t)\sqrt{2a_c}\cos[\omega_c t + \phi(t)] \quad (7)$$

The complex envelope (CE) of the modulated optical signal (6) satisfies $$\underline{m}(t) = m^a(t)e^{-j\omega_c t} \propto a_c e^{j\phi(t)} d(t)$$

The CE of the CW optical carrier, $a_c e^{j\phi(t)}$ is multiplied by the drive real signal. Thus, the relation between the input and output CEs of the E-O mod is also seen to be multiplicative: The output CE of a linear amplitude E-O MOD equals the input CE times the real-valued modulating signal, $d(t)$.

Input and output complex envelopes are multiplicatively related via the real-valued drive signal (just like the input and output analytic signals are).

We now describe and analyze each of the five embodiments E1 to E5 for the transparent linear optical transport link.

In the embodiments E1-E3, the drive voltage $d(t)$ into the linear E-O MOD is used to modulate the information signal onto an optical carrier plus some auxiliary signals (biases or pilot tones).

In the embodiments E4,E5 and IQ modulator is used.

Various Aspects of the Suggested Systems and Methods

General advantages of analog optical transport links (not limited to our invention but to RoF or microwave/RF photonics links at large) is transparency being agnostic to modulation format. Another general advantage is that analog transport inherently provides excellent synchronization between multiple parallel optical transport links. This advantage comes handy in the future generation of cooperative multi-point (massive MIMO) optical networks.

The disadvantage of RoF systems based on conventional Direct Detection (DD)+Double Sideband (DSB) MZM modulation is that the DD generates extra intersymbol interference (ISI) in the presence of chromatic dispersion (CD). Thus, it is very CD non-tolerant—already degraded over relatively short reach. This essentially stems from the quadratic (incoherent) detection nature of the DD photodetection scheme. The attempt to employ coherent detection would make the channel linear but would result in a very complex high cost system, suitable for long-haul optical transmission which may support the costs, but unsuitable for the low-cost environment of the small cell revolution.

Here we disclose robust and simple systems and methods, which may be characterized as "self-coherent" since the local oscillator is transmitted all the way from the transmitter to the receiver. Self-coherent detection per-se is not new, but the particular simple IQ structure based on a single IQ modulator is novel.

Some of the advantages of the suggested systems and methods stem from the self-coherent transmission and detection being linear in optical field (rather than quadratic). Thus, the excessive ISI of direct detection is eliminated.

The systems and methods are Chromatic Dispersion (CD) tolerant and attains RF in to RF out end-to-end overall good linearity and sensitivity. The systems and methods use simple low-cost optics (photonic Rx is inherently simple, the while Tx consists of a single IQ modulator or an MZM and is amendable to Silicon Photonic integration. Another advantage of our scheme is that it may be used to eliminate IR-RF frequency conversions in the Remote Radio Heads, as the systems and methods may be used to transport bandpass RF "as is" at its RF carrier frequency.

E1 Embodiment—MZM with DC Bias (Optical Carrier Pilot)+Optical DSB

This proposed scheme (see FIGS. 2,3 for the block diagram and the spectral plots) is based on a type #1 Electro-Optic amplitude modulator (E-O mod) which is nearly linear in the optical field and is optically fed by a continuous wave (CW) optical laser source as in all our other embodiments. The figure depicts for definiteness an MZM E-O MOD, inherently biased at its zero-light point. Note that this is different than using the MZM as intensity modulator, as customary in radio-over-fiber link prior art, in which case the inherent MZM bias is at the half intensity point—whereat the MZM output is at half of the peak intensity that the MZM may generate.

The E-O MOD (say MZM) is electrically driven by the bandpass subcarrier information-bearing message signal $b(t)$ to be transported, onto which there is additively superposed an extra DC bias $p_c$, added in such as to generate an intentional optical carrier pilot, i.e., an optical spectral line at the laser source center frequency. This is in contrast to prior art which operates in nearly linear in the optical intensity fashion, wherein the optical carrier is sought to be suppressed.

The RF bandpass message signal $b(t)$ to be transmitted may originate from various sources depending on application. Shown in FIG. 2, by way of example, are two alternative sources for this bandpass analog message:

(i) An analog electrical signal source such as a receiving RF antenna in a remote radio head (RRH) (alternatively called radio access unit (RAU) or radio access point (RAP)) in a cellular network or in a wireless LAN, which antenna picks up upstream transmissions to be optically transported to a central location, such as a central office or hub or a cloud radio area network center.

(ii) A digital source, the back-end of which is just a digital-to-analog converter (DAC) interface to convert the digitally originated signal to an analog bandpass signal $b(t)$. The digital processing generating the bandpass digital signal fed into the DAC is not shown in the figure, just the DAC is. Such interface could reside in a central office or cloud radio area network location whereat downstream transmission is in digital form originally, and is to be digital-to-analog converted and optically transported to RRH/RAU/RAP remote locations, where it is applied to transmitting antenna(s).

Such sources for the bandpass message signal b(t) to be optically transported (as presented by way of example in FIG. 2 pertaining to E1) are applicable to all our embodiments, beyond the current one.

The optical output of the E-O MOD is the signal to be transported for the particular "transport channel". One option is to just input it into the fiber link. At the far end, the fiber is terminated in an optical receiver (Rx) consisting just of a direct-detection one, here, and in all our embodiments. The front-end of our optical Rx consists of a photodiode (PD) followed by an electronic amplification means such as a trans-impedance amplifier (TIA). A second option (incorporated in FIG. 2) is to wavelength division multiplex (WDM) the particular transport channel adding in, separated in wavelengths, additional transport channels which are generated by Tx systems identical to the one shown for the particular transport channel (each comprising a E-O MOD and a DC bias means).

The optical link may also comprise optical amplifiers (OA). One such OA is shown at the Tx side, linearly boosting the optical signal amplitude prior to launching into the fiber, but it is also possible to use OAs at the Rx side or along the fiber link. It is also possible to have add-drop wavelength multiplexers along the fiber link, e.g. in order to drop or add transport channels at multiple sites along the way (not shown). When WDM is used to the Tx, the Rx side is to be equipped with a wavelength division demultiplexer (each output of which is terminated in a photodiode and electrical amplification means for each transport channel.

Mathematical Model of the E1 Embodiment

Figure 3:
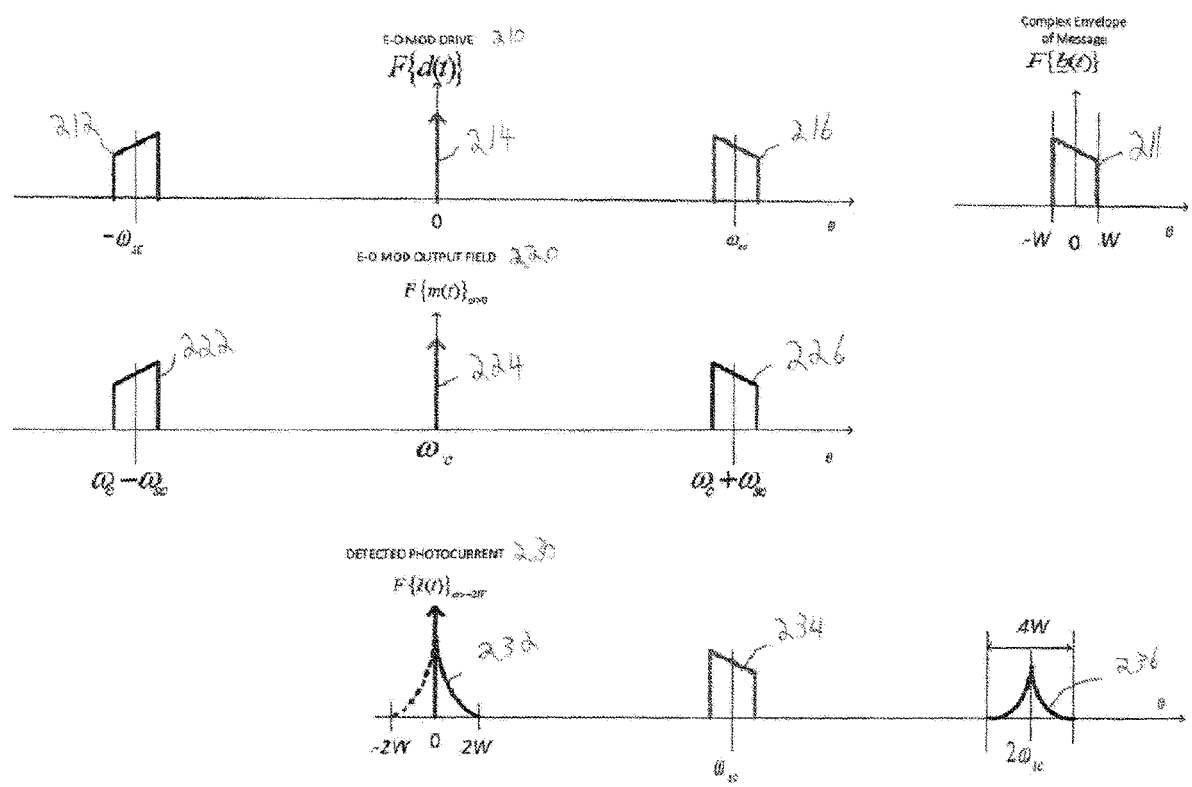
FIG. 3 illustrates examples of various signals.

We now develop a model for the E1 principle of operation, showing why the Rx electrical output is linear in the Tx electrical input (as long as the E-O MOD is linear), and evaluating the impairment due to Chromatic Dispersion (CD). The mathematical model of the other embodiments will be seen to share elements of this derivation, thus this derivation is a useful first step in understanding the principle of operation of all our embodiments. The relevant spectral plots are depicted in FIG. 3.

Modulation

In embodiment E1 (FIG. 2) the drive signal d(t) is specified as an RF bandpass signal b(t) mathematically represented as per plus an electrical DC bias level expressed as $$\frac{1}{\sqrt{2}} p_c,$$

which is added in to the bandpass message signal to form the total electrical drive d(t) fed into the E-O mod:

$$d(t) = b(t) + p_c + \underbrace{\frac{1}{\sqrt{2}} \underline{b}(t) e^{j\omega_{sc} t} + \frac{1}{\sqrt{2}} \underline{b}^*(t) e^{-j\omega_{sc} t}}_{b(t) = \sqrt{2}\, Re\{\underline{b}(t) e^{j\omega_{sc} t}\}} + p_c = \qquad (8)$$

$$\frac{1}{\sqrt{2}} \left[\underline{b}(t) e^{j\omega_{sc} t} + \underline{b}^*(t) e^{-j\omega_{sc} t} + \sqrt{2}\, p_c\right]$$

The complex envelope (CE) of the modulated optical DSB+carrier signal (6) is expressed as $$\underline{m}(t) \propto \underline{c}(t)\underline{d}(t) =$$

$$a_c e^{j\phi(t)} d(t) = a_c e^{j\phi(t)} \frac{1}{\sqrt{2}} \left[\underline{b}(t) e^{j\omega_{sc} t} + \underline{b}^*(t) e^{-j\omega_{sc} t} + \sqrt{2}\, p_c\right]$$

Back to the analytic signal representations, substituting the last expression of (8) into (6) yields:

$$m^a(t) = a_c e^{j\omega_c t} e^{j\phi(t)} d(t) = \qquad (9)$$

$$a_c e^{j\phi(t)} e^{j\omega_c t} \frac{1}{\sqrt{2}} \left[\underline{b}(t) e^{j\omega_{sc} t} + \underline{b}^*(t) e^{-j\omega_{sc} t} + \sqrt{2}\, p_c\right] =$$

$$\frac{1}{\sqrt{2}} a_c e^{j\phi(t)} \left[\underline{b}(t) e^{j(\omega_c + \omega_{sc})t} + \underline{b}^*(t) e^{-j(\omega_c - \omega_{sc})t} + \sqrt{2}\, p_c\right]$$

It is this signal (actually its real part, the real-valued E-O mod output, m(t)) that is passed through the fiber transfer function which is modeled as a dispersive all-pass filter $H^{CD}(\omega)$, essentially featuring a linear phase plus quadratic phase frequency response.

Dispersive Propagation

Now, let us propagate the modulator output signal m(t) (with analytic signal $m^a(t)$ and complex envelope $\underline{m}(t)$) through the CD filter with transfer function $H^{CD}(\omega)$. This yields an output r(t) (with analytic signal $r^a(t)$ and complex envelope $\underline{r}(t)$ respectively), described in the frequency domain (with F{ }, denoting Fourier Transform) by:

$$\underbrace{R(\omega)}_{F\{r(t)\}} = H^{CD}(\omega) \underbrace{M(\omega)}_{F\{m(t)\}} \Leftrightarrow \underbrace{R^a(\omega)}_{F\{r^a(t)\}} = \qquad (10)$$

$$H^{CD}(\omega) \underbrace{M^a(\omega)}_{F\{m^a(t)\}} \Leftrightarrow \underbrace{\underline{R}(\omega)}_{F\{\underline{r}(t)\}} = H^{CD}(\omega + \omega_c) \underbrace{\underline{M}(\omega)}_{F\{\underline{m}(t)\}}$$

The last equation indicates that the transfer function governing the propagation of complex envelope is given $H^{CD}(\omega + \omega_c)$, a left-shifted-by-$\omega_c$ version of the original transfer function $H^{CD}(\omega)$. This transfer function is designated below by the subscript bb, standing for baseband equivalent:

$$H_{bb}^{CD}(\omega) \equiv H^{CD}(\omega + \omega_c) \qquad (11)$$

Thus, $$\underline{R}(\omega) = H_{bb}^{CD}(\omega) \underline{M}(\omega) \qquad (12)$$

Neglecting the attenuation frequency response, which is assumed constant over the frequency band of interest, the fiber CD transfer function is an all-pass filter:

$$H^{CD}(\omega) = e^{-j\beta(\omega)L} \qquad (13)$$

where $\beta(\omega)$ is the propagation constant (phase-shift per unit length). Correspondingly, the baseband equivalent CD filter is $$H_{bb}^{CD}(\omega) = e^{-j\beta(\omega + \omega_c)L} \qquad (14)$$

Let us now develop $H_{bb}^{CD}(\omega)$ into a Taylor power series around $\omega = 0$ (which is equivalent to developing the standard transfer function $H^{CD}(\omega)$ in a Taylor series around $\omega=\omega_c$). To this end it suffices to develop the propagation constant in a Taylor series around $\omega=\omega_c$, writing $$\beta(\omega+\omega_c)=\beta(\omega_c+\omega)=\beta_0+\beta_1\omega+\tfrac{1}{2}\beta_2\omega^2+\ldots \quad (15)$$

where $\omega$ in the last formula now denotes deviation from the carrier frequency $\varphi_c$, and $\beta_0$, $\beta_1$, $\beta_2$ denote the successive derivatives of $\beta$ at $\omega=\omega_c$ (with $\partial_\omega$ denoting derivative or partial derivative):

$$\beta_0 \equiv \beta(\omega_c), \beta_1 \equiv \partial_\omega \beta(\omega)|_{\omega=\omega_c}, \beta_2 \equiv \partial_\omega^2 \beta(\omega)|_{\omega=\omega_c}. \quad (16)$$

The baseband equivalent transfer function describing CD is then approximated, to second-order, as:

$$H_{bb}^{CD}(\omega) \equiv H^{CD}(\omega + \omega_c) \quad (17)$$

$$= e^{-j\beta(\omega+\omega_c)L}$$

$$\cong e^{-j(\beta_0+\beta_1\omega+\tfrac{1}{2}\beta_2\omega^2)L}$$

$$= e^{-j\left(\overbrace{\beta_0 L}^{\theta_0}+\overbrace{\beta_1 L}^{\theta_1=\tau_g}\omega+\tfrac{1}{2}\overbrace{\beta_2 L}^{\theta_2}\omega^2\right)}$$

$$= e^{-j\theta_0} e^{-j\theta_1\omega} \underbrace{e^{-j\tfrac{1}{2}\theta_2\omega^2}}_{H_{bb}^{CD2}(\omega)}$$

where we introduced the end-to-end fiber phase shift and phase shift derivatives (all at the optical carrier frequency):

$$\theta_0(\omega_c) \equiv \beta_0 L \equiv \beta(\omega_c)L$$

$$\theta_1(\omega_c) \equiv \beta_1 L \equiv \partial_\omega \beta(\omega)|_{\omega=\omega_c} L = \tau_g(\omega_c)$$

$$\theta_2(\omega_c) \equiv \beta_2 L \equiv \partial_\omega^2 \beta(\omega)|_{\omega=\omega_c} L \quad (18)$$

Note the first phase shift derivative $\theta_1$ coincides with the group delay $\tau_g$, which contributes a multiplicative term $e^{-j\theta_1\omega}=e^{-j\omega\tau_g}$ in the bb transfer function. But this term is nothing but the transfer function of a pure delay by $\tau_g$. Thus, if we redefine the time reference frame for the CE at the fiber output according to the retarded time transformation $t_{ret} \equiv t-\tau_g$, then we may just ignore the delay transfer function multiplicative component, discarding it from the analysis. We shall also omit the subscript$_{ret}$, just writing t for the time variables of signals at the fiber output, though we must keep in mind that now t at the output refers to retarded time.

We shall also discard the constant phase shift $e^{-j\theta_0}$ at the fiber output (absorbing it into the proportionality constant implied when we write $\propto$). Later on we justify why we may discard this term, as it cancels upon self-coherent detection.

Thus, discarding the terms $e^{-j\theta_0}e^{-j\theta_1\omega}$ in the baseband equivalent transfer function, we shall just adopt $$H_{bb}^{CD2}(\omega) \equiv e^{-j1/2\theta_2\omega^2} = e^{-j1/2\beta_2 L\omega^2} \quad (19)$$

as our propagator of complex envelopes through the fiber, in particular to be applied to the complex envelope $$m(t) = e^{j\phi(t)} s_{mod}(t) = e^{j\phi(t)} \frac{1}{\sqrt{2}}\left[\underset{\sim}{s}(t)e^{j\omega_{sc}t} + \underset{\sim}{s}^*(t)e^{-j\omega_{sc}t} + p_c\right]$$

at the modulator output (fiber input). Notice the subscript designation CD2 to distinguish this transfer function $H_{bb}^{CD2}(\omega)$ from the transfer function $H_{bb}^{CD}(\omega)$ in (17).

We now make the (realistic for cellular systems in particular) assumption that the baseband bandwidth of the complex envelope (CE) $\underset{\sim}{s}(t)$ of the cellular sub-band signal s(t) is sufficiently narrowband (of the order of 100 MHz in the current cellular generation, up to 250 . . . 500 MHz in the next cellular generation) such that the transfer function $H_{bb}^{CD2}(\omega)$ may be taken as essentially constant over the respective spectral supports of the passband counter-rotating components. This is the so-called "frequency-flat regime" for passing a narrowband signal through a sufficiently smooth filter. In this regime, $H_{bb}^{CD}(\omega)$ may be respectively replaced by its sample $H_{bb}^{CD}(\pm\omega_{sc})$ at the center frequency of the transmission band, to a good approximation for the purpose of propagating the narrowband additive terms $\underset{\sim}{b}(t)e^{j\omega_{sc}t}, \underset{\sim}{b}^*(t)e^{j\omega_{sc}t}$ of the complex envelope via the dispersive filter. This yields for the fiber output the following CE:

$$\underset{\sim}{r}(t) \propto \underset{\sim}{m}(t) H_{bb}^{CD2}(\omega) = \quad (20)$$

$$\frac{1}{\sqrt{2}}\left[e^{j\phi(t)}\underset{\sim}{b}(t)e^{j\omega_{sc}t} + e^{j\phi(t)}\underset{\sim}{b}^*(t)e^{-j\omega_{sc}t}\right]H_{bb}^{CD2}(\omega) +$$

$$e^{j\phi(t)} p_c H_{bb}^{CD2}(0) = \left\{\frac{1}{\sqrt{2}} e^{j\phi(t)}\underset{\sim}{b}(t)e^{j\omega_{sc}t}\right\}H_{bb}^{CD2}(\omega) +$$

$$\left\{\frac{1}{\sqrt{2}} e^{j\phi(t)}\underset{\sim}{b}^*(t)e^{-j\omega_{sc}t}\right\}\underbrace{H_{bb}^{CD2}(-\omega_{sc})}_{=H_{bb}^{CD}(\omega_{sc})} + e^{j\phi(t)} p_c H_{bb}^{CD2}(0)$$

where we used the fact that $H_{bb}^{CD2}(\omega) \equiv e^{-j1/2\theta_2\omega^2}$ is an even function of frequency as its phase frequency response is quadratic, thus $H_{bb}^{CD2}(-\omega_{sc}) = H_{bb}^{CD2}(\omega_{sc})$ which may be factored out, combining the first two terms in the last line of the last equation, yielding:

$$\underset{\sim}{r}(t) \propto \frac{1}{\sqrt{2}} e^{j\phi(t)}\{\underset{\sim}{b}(t)e^{j\omega_{sc}t} + \underset{\sim}{b}^*(t)e^{-j\omega_{sc}t}\}H_{bb}^{CD2}(\omega_{sc}) + \quad (21)$$

$$\frac{1}{\sqrt{2}} e^{j\phi(t)} p_c H_{bb}^{CD2}(0) =$$

$$\frac{1}{\sqrt{2}} e^{j\phi(t)} b(t) \underbrace{H_{bb}^{CD2}(\omega_{sc})}_{e^{-j\phi_{CD}(\omega_{SC})}} + e^{j\phi(t)} p_c \underbrace{H_{bb}^{CD2}(0)}_{1}$$

where in the second line we substituted $$b(t) = \frac{1}{\sqrt{2}}\underset{\sim}{b}(t)e^{j\omega_{sc}t} + \frac{1}{\sqrt{2}}\underset{\sim}{b}^*(t)e^{-j\omega_{sc}t}$$

and denoted $\phi_{CD}(\omega) \equiv \tfrac{1}{2}\theta_2\omega^2$. Finally, $\underset{\sim}{r}(t) \propto b(t)e^{-j\phi_{CD}(\omega_{sc})}+\sqrt{2}p_c$ where we recall that, $H_{bb}^{CD2}(\omega) \equiv e^{-j1/2\theta_2\omega^2} = e^{-j\phi_{CD}(\omega)}|_{\phi_{CD}(\omega)=1/2\theta_2\omega^2}$, yielding $$H_{bb}^{CD2}(\omega_{sc})=e^{-j\phi_{CD}(\omega_{sc})}, \phi_{CD}(\omega_{sc})= \tfrac{1}{2}\theta_2\omega_{sc}^2 = \tfrac{1}{2}\beta_2 L\omega_{sc}^2$$

$$H_{bb}^{CD1}(0)=1 \quad (22)$$

What has been at work in getting the compact result שגיאה! מקור ההפניה לא נמצא, for dispersive propagation of an optical DSB signal is that both components $\underset{\sim}{b}(t)e^{j\omega_{sc}t}$, $\underset{\sim}{b}^*(t)e^{-j\omega_{sc}t}$ around frequencies $\pm\omega_{sc}$ of the real-valued bandpass RF signal s(t) experience a common phase shift, since the samples $H_{bb}^{CD2}(\pm\omega_{sc})$ of the quadratic phase transfer function are equal, thus $H_{bb}{}^{CD2}(\pm\omega_{sc})=e^{-j\phi_{CD}(\omega_{sc})}$ is a complex transfer factor multiplicatively acting onto the entire real-valued signal, b(t), causing a rotation of its oscillation line from the real axis to a tilted axis in the complex plane.

The net effect is that both sidebands of the optical DSB signal on either side of the carrier, $\underline{b}(t)e^{j\omega_{sc}t}, \underline{b}^*(t) e^{-j\omega_{sc}t}$ get rotated by the common phase factor $e^{-j\phi_{CD}(\omega_{sc})}$ (this stems from the CD phase frequency response being even, as it is quadratic) relative to the phase of the optical carrier (which acts as reference for self-coherent detection). This implies that the whole DSB signal (the superposition of the two sidebands), which was real-valued originally (at the fiber input), i.e., it had complex envelope consisting of a complex time-varying phasor oscillating along the real-axis, now gets rotated at the fiber output by an angle $\phi_{CD}(\omega_{sc})$, thus it consists of a time-varying phasor oscillating along a line making an angle $\phi_{CD}(\omega_{sc})$ with the real-axis in the complex plane.

Having propagated the transmitted signal to the far fiber end, we now consider its self-coherent detection in the Rx. We next show that the effect of the common phase rotation of the DSB sidebands with respect to the carrier is to have CD-induced fading—reduction of the signal amplitude—by a factor $\cos \phi_{CD}(\omega_{sc})$ Detection In our proposed self-coherent system E1, the optical receiver at the end of the fiber link is simply a photo-detector performing direct-detection (incoherent detection) onto the received optical field signal r(t) (associated with the complex envelope $\underline{r}(t) \propto \underline{b}(t) e^{-j\phi_{CD}(\omega_{sc})} + \sqrt{2}p_c$). The photocurrent is proportional to the square of the absolute value of the received complex envelope:

$$I(t) \propto |\underline{b}(t)e^{-j\phi_{CD}(\omega_{sc})}+\sqrt{2}p_c|^2 = |\underline{b}(t)e^{-j\phi_{CD}(\omega_{sc})}|^2+p_c^2+2\text{Re}\{\sqrt{2}p_c\underline{b}(t)e^{-j\phi_{CD}(\omega_{sc})}\} = \underline{b}^2(t)+p_c^2+2\sqrt{2}p_c\underline{b}(t)\cos\phi_{CD}(\omega_{sc})$$

The term $\underline{b}^2(t)$ in the intensity corresponds in the frequency domain to $\underline{B}(\omega)\otimes\underline{B}(\omega)$, where $$\underline{B}(\omega)=F\{\underline{b}(t)\}=F\{\tfrac{1}{2}\underline{b}(t)e^{j\omega_{sc}t}+\tfrac{1}{2}\underline{b}^*(t)e^{-j\omega_{sc}t}\}=\tfrac{1}{2}\underline{B}(\omega-\omega_{sc})+\tfrac{1}{2}\underline{B}(\omega+\omega_{sc}) \quad (23)$$

where we substituted $$\underline{b}(t) = \frac{1}{\sqrt{2}}\underline{\tilde{b}}(t)e^{j\omega_{sc}t}+\frac{1}{\sqrt{2}}\underline{\tilde{b}}^*(t)e^{-j\omega_{sc}t}$$

and defined $\underline{B}(\omega)=F\{\underline{b}(t)\}$.

The deterministic autoconvolution $\underline{B}(\omega)\otimes\underline{B}(\omega)$ of $\underline{B}(\omega)$, yields terms around DC and around $\pm 2\omega_{sc}$:

$$\underline{B}(\omega)\otimes\underline{B}(\omega)=\tfrac{1}{2}[\underline{B}(\omega+\omega_{sc})+\underline{B}(\omega+\omega_{sc})]\otimes\tfrac{1}{2}+[\underline{B}(\omega+\omega_{sc})+\underline{B}(\omega+\omega_{sc})]=\tfrac{1}{4}+(\underline{B}\otimes\underline{B})(\omega)+\tfrac{1}{4}(\underline{B}\otimes\underline{B})(\omega-2\omega_{sc})+\tfrac{1}{4}(\underline{B}\otimes\underline{B})(\omega-2\omega_{sc})$$

The two terms around $\pm 2\omega_{sc}$ are shifted versions of the term $(\underline{B}\otimes\underline{B})(\omega)=\underline{B}(\omega)\otimes\underline{B}(\omega)$ which appears around DC, with two-sided spectral support 4W (2W along the positive ray of the frequency axis, where W is the one-sided bandwidth of the baseband signal (in [rad/sec] units) (FIG. 3). With proper selection of the ratio of $\omega_{sc}$ and W, namely $\omega_{sc}>2W$ these terms do not mutually overlap. E.g., for $\omega_{sc}=2\pi\cdot 2.5$ GHz we must have $W<2\pi\cdot 1.25$ GHz The term $p_c^2$ in the intensity contributes in the photocurrent an impulse at DC (The DC is essentially due to photo-detecting the CW carrier pilot). The useful information-bearing term in the intensity is the cross-term $2\sqrt{2}p_c \cos \phi_{CD}(\omega_{sc})\underline{b}(t)$. It is apparent that this term is statically attenuated (constant fade) due to CD, monotonically decreasing in $\phi_{CD}(\omega_{sc})$, according to the $\cos \phi_{CD}(\omega_{sc})$, completely fading for $$\phi_{CD}(\omega_{sc})=\tfrac{1}{2}\beta_2 L\omega_c^2=\tfrac{1}{2}\pi \Leftrightarrow Lv_{sc}^2=1/\beta_2. \quad (24)$$

Significantly, the output photocurrent $2\sqrt{2}p_c \cos \phi_{CD}(\omega_{sc})$ s(t) is an undistorted (albeit possibly attenuated) version of the useful bandpass signal b(t) to be optically transported. Had we not had the pilot bias applied at DC, there would be no output in the photodiode current that would linearly reproduce b(t).

The reduction in amplitude is negligible as long as the following condition holds:

$$\phi_{CD}(\omega_{sc})=\tfrac{1}{2}\beta_2 L\omega_{sc}^2 \ll \tfrac{1}{2}\pi \Leftrightarrow \beta_2 L 4\pi^2 v_{sc}^2 \ll \pi \Leftrightarrow Lv_{sc}^2 \ll (4\pi\beta_2)^{-1} \quad (25)$$

As long as $Lv_{sc}^2<(4\pi\beta_2)^{-1}$ we have some fading but not complete fading due to CD.

The analysis above assumed the E-O amplitude modulator is linear. Some nonlinear distortion may accompany the useful linear signal due to the third-order (or more generally odd-order nonlinearity of the E-O modulator). This impairment may be mitigated, at least partially, by backing off the amplitude of the RF signal driving the E-O modulator, or by linearizing the nonlinear characteristic of the E-O modulator (non-linear predistortion). It is also possible to get even-order (mainly second-order) nonlinear distortion from the E-O modulator, which may be mitigated by suitable control of the operating point of the modulator.

Notwithstanding such modulator-related nonlinear impairments, it is seen that this self-coherent scheme is suitable for linear optical transport of bandpass RF signals, in a way which is resilient to CD, as long as $Lv_{sc}^2<(4\pi\beta_2)^{-1}$ and such that the quadratic nonlinearity of the photodetector does not manifest as impairing the end-to-end RF transport linearity over the optical channel, except for some reduction in signal amplitude (partial CD induced fading).

E2 Embodiment—MZM with RF Pilot Tone+Optical DSB

In this scheme as in all our other embodiments, the (nearly) linear E-O mod is driven by the bandpass signal b(t) to be transported, riding on an RF subcarrier at radian frequency $\omega_{sc}$. The spectral plots motivating the scheme are presented in FIG. 4 and the block diagram of the E2 Tx and Rx in FIG. 5.

According to the invention, to the RF bandpass message signal b(t), there is added a sinusoidal pilot tone at radian frequency $\omega_p$, $$p(t) = \sqrt{2}\, p_o \cos(\omega_p t + \phi_p) = \frac{1}{\sqrt{2}} p_o e^{j\phi_p} e^{j\omega_p t} + \frac{1}{\sqrt{2}} p_o e^{-j\phi_p} e^{-j\omega_p t}.$$

where $\phi_p$ is the phase of the RF pilot tone relative to the time reference of the bandpass signal, b(t) (in fact, the phase $\phi_p$ of the pilot is arbitrary the pilot is not necessarily synchronized with either of the quadratures of the BP DSB signal, the clock of which is assumed unknown to the optical transport system). Thus—the systems and methods intentionally generate of optical tones. The optical pilot is spectrally located right at the optical carrier in E1, whereas there are two optical lines offset from the optical carrier generated in E2, as we shall presently see.

The E2 scheme may function relatively well also in case a residual optical tone is present right at the optical carrier, but for optimal operation it is preferable that such tone be nearly suppressed, e.g., by using inherent bias of the MZM such that it produces no light when the drive voltage d(t) is zero.

The sum of the bandpass message and the pilot tone forms the drive signal d(t) into the E-O MOD:

$$d(t) = b(t) + p(t) \quad (26)$$

Now that the drive voltage d(t) of the (nearly) linear E-O MOD has been specified, the rest of the E-2 system is just identical to that of E1, starting from the modulator optical output all the way to the optical Rx. However, the output of the direct-detection optical Rx (photo-diode+trans-impedance amplifier (TIA)) now does not directly contain a (noisy and somewhat distorted) version of the actual bandpass signal b(t) that was injected at the Tx, but rather the signal at the Rx output has the same complex envelope as b(t) but is shifted to a different subcarrier frequency, referred to as the intermediate frequency (IF) $\omega_{IF}$. In fact there are two such IF frequencies whereat we find spectral contributions in the electrical output of the Rx, namely at $\omega_{IF}^- = |\omega_{sc} - \omega_p|$ and $\omega_{IF}^+ = \omega_{sc} + \omega_p$. By design we may select to electrically filter and retain just one of these two bands. Accordingly, we select $\omega_p$ such that $\omega_{IF}$ comes out at a prescribed value (note that the subcarrier frequency $\omega_{sc}$ of the bandpass signal to be transported is set to begin with by the bandpass message spectrum, but we may select $\omega_p$ in the design process). Typically we shall prefer to work with $\omega_{IF}^- = |\omega_{sc} - \omega_p|$, as lower frequencies may be more convenient to handle. In this case, the pilot frequency $\omega_p$ is selected such that, at the Rx, the difference frequency between $\omega_p$, $\omega_{sc}$. fall onto the intended IF frequency $\omega_{IF} = |\omega_{sc} - \omega_p|$ whereat the desired modulation is to be received.

There are two options for spectrally positioning the pilot tone relative to the message passband to be transmitted. In one option we have $\omega_p > \omega_{sc}$, i.e., the pilot is respectively selected as $\omega_p = \omega_{sc} + \omega_{IF}$ referred to as "outer pilot") or $\omega_p < \omega_{sc}$, i.e., $\omega_p = \omega_{sc} - \omega_{IF}$ referred to as "inner pilot". The terms inner/outer pilot options correspond to whether or not the pair of pilot spectral lines being positioned either in between the message passband and its image.

In most applications it may be better to have a lower the IF frequency, thus the inner pilot option is preferable.

The mathematical analysis to follow in the next section will indicate that the recovery of the useful information of the CE of the bandpass signal to be transported is performed with improved tolerance to CD in embodiment E2, relative to the embodiment E1.

Finally, at the Rx, beyond the opto-electronic front-end (photodiode+TIA), we have an electrical filter to filter through either of the bands centered around $\omega_{IF}^- = |\omega_{sc} - \omega_p|$, $\omega_{IF}^- = \omega_{sc} + \omega_p$ (for example, let's take $\omega_{sc} > \omega_p$ and elect to filter through the band around $\omega_{IF} \equiv \omega_{IF}^- = \omega_{sc} - \omega_p$). The filtered-through band then contains a version of the original message b(t) albeit spectrally shifted around off. This transported and frequency shifted bandpass signal may contains the original information of b(t)). In most applications we may wish to extract its complex envelope (which is identical to that of the original signal b(t)) by means of a conventional IQ demodulator (multiplications by cos $\omega_{IF}t$ and −sin $\omega_{IF}t$ followed by low-pass filtering), in order to recover estimates of the respective IQ components $b_I(t), b_Q(t)$, which together form the complex envelope $\underline{b}(t) = b_I(t) + jb_Q(t)$ of the original bandpass signal b(t) which was optically transported.

Why this E2 scheme above performs its intended function of faithful optical transport of the complex envelope $\underline{b}(t)$ of b(t) and why its tolerance to CD is improved, is worked out in the model to follow.

Mathematical Model of the E2 Embodiment

We have seen that the total drive signal $d(t) = b(t) + \sqrt{2}p_o \cos(\omega_p t + \phi_p)$ is applied to the electro-optic modulator, the optical output of which feeds the fiber link. Below we show that after fiber propagation and DD photo-detection, a signal reproducing b(t) is generated, relatively resilient to CD impairment (the CD-induced fading is less than that of E1).

Modulation

The total electrical drive into the E-O mod is now:

$$d(t) = b(t) + p(t) \quad (27)$$

$$= \underbrace{\frac{1}{\sqrt{2}}\underline{b}(t)e^{j\omega_{sc}t} + \frac{1}{\sqrt{2}}\underline{b}^*(t)e^{-j\omega_{sc}t}}_{b(t) = \sqrt{2}\,\text{Re}\{\underline{b}(t)e^{j\omega_{sc}t}\}} +$$

$$= \underbrace{\frac{1}{\sqrt{2}}p_o e^{j\phi_p}e^{j\omega_p t} + \frac{1}{\sqrt{2}}p_o e^{-j\phi_p}e^{-j\omega_p t}}_{\sqrt{2}\,p_o \cos(\omega_p t + \phi_p)}$$

$$= \frac{1}{\sqrt{2}}\begin{bmatrix} \underline{b}(t)e^{j\omega_{sc}t} + \underline{b}^*(t)e^{j\omega_{sc}t} + \\ p_o e^{j\phi_p}e^{j\omega_p t} + p_o e^{-j\phi_p}e^{-j\omega_p t} \end{bmatrix}$$

It is this electrical signal (RF subcarrier modulated signal plus sinusoidal pilot tone) that is applied to the electro-optic modulator (say an MZM). The complex envelope of the modulated optical signal at the E-O MOD output is given by $$\underline{m}(t) \propto a_c e^{j\phi(t)}d(t) \propto e^{j\phi(t)}[\underline{b}(t)e^{j\omega_{sc}t} + \underline{b}^*(t)e^{j\omega_{sc}t} + p_o e^{j\phi_p}e^{j\omega_p t} + p_o e^{-j\phi_p}e^{-j\omega_p t}] \propto e^{j\phi(t)}$$

$$\underline{b}(t)e^{j\omega_{sc}t} + e^{j\phi(t)}$$

$$\underline{b}^*(t)e^{j\omega_{sc}t} + p_o e^{j\phi(t)} + p_o e^{j\phi(t)}e^{j\phi_p}e^{j\omega_p t} + p_o e^{j\phi(t)}e^{-j\phi_p}e^{-j\omega_p t}$$

The optical Tx may further comprise a Wavelength Division Multiplexer (WDM) such that the signal $\underline{m}(t)$ above represents just one optical channel of the WDM multiplex. The output of the WDM module may be optionally followed by an optical amplifier. It is also possible to engage in Subcarrier This completes the description and analysis of the Tx, which feeds the fiber link. The Rx at the fiber link output has a very simple Direct-Detection front-end, essentially a photodiode followed by a trans-impedance amplifier or equivalent electrical amplification means.

Dispersive Propagation

Let us now model the propagation of the E-O MOD output field (28) through the fiber. Again we assume the "frequency-flat regime" suitable for modelling the passage of a sufficiently narrowband signal through a sufficiently smooth filter. In this regime, $H_{bb}^{CD}(\omega)$ may be respectively replaced to a good approximation by $H_{bb}^{CD}(\pm\omega_{sc})$ and $H_{bb}^{CD}(\omega_p)$ for the purpose of propagating the narrowband additive terms $\underline{b}(t)e^{j\omega_{sc}t}, \underline{b}^*(t)e^{j\omega_{sc}t}$ and $p_o e^{j\Phi(t)}e^{\pm j\phi_p}e^{\pm j\omega_p t}$ of the complex envelope via the dispersive filter:

$$\underline{r}(t) \propto \underline{m}(t)H_{bb}^{CD2}(\omega) = [e^{j\phi(t)}\underline{b}(t)e^{j\omega_{sc}t} + e^{j\phi(t)}\underline{b}^*(t)e^{j\omega_{sc}t} + \quad (29)$$

$$p_o e^{j\phi(t)}e^{j\phi_p}e^{j\omega_p t} + p_o e^{j\phi(t)}e^{-j\phi_p}e^{-j\omega_p t}]H_{bb}^{CD}(\omega) =$$

$$\{e^{j\phi(t)}\underline{b}(t)e^{j\omega_{sc}t}\}H_{bb}^{CD2}(\omega_{sc}) + \{e^{j\phi(t)}\underline{b}^*(t)e^{-j\omega_{sc}t}\}\underbrace{H_{bb}^{CD2}(-\omega_{sc})}_{=H_{bb}^{CD2}(\omega_{sc})} + p_o$$

$$e^{j\phi(t)}e^{j\phi_p}e^{j\omega_p t}H_{bb}^{CD2}(\omega_p) + p_o e^{j\phi(t)}e^{-j\phi_p}e^{-j\omega_p t}\underbrace{H_{bb}^{CD2}(-\omega_{sc})}_{=H_{bb}^{CD2}(\omega_p)} =$$

$$\{e^{j\phi(t)}\underline{b}(t)e^{j\omega_{sc}t} + e^{j\phi(t)}\underline{b}^*(t)e^{-j\omega_{sc}t}\}H_{bb}^{CD2}(\omega_{sc}) +$$

$$\{p_o e^{j\phi(t)}e^{j\phi_p}e^{j\omega_p t} + p_o e^{j\phi(t)}e^{-j\phi_p}e^{-j\omega_p t}\}H_{bb}^{CD2}(\omega_p) =$$

$$e^{j\phi(t)}\{\underline{b}(t)e^{j\omega_{sc}t} + \underline{b}^*(t)e^{-j\omega_{sc}t}\}e^{-j\phi_{CD}(\omega_{sc})} +$$

$$e^{j\phi(t)}\{p_o e^{j\phi_p}e^{j\omega_p t} + p_o e^{-j\phi_p}e^{-j\omega_p t}\}e^{-j\phi_{CD}(\omega_p)}$$

or finally, using $$b(t) = \frac{1}{\sqrt{2}}\underline{b}(t)e^{j\omega_{sc}t} + \frac{1}{\sqrt{2}}\underline{b}^*(t)e^{-j\omega_{sc}t}$$

and the Euler formula for the cosine, yields:

$$\underline{r}(t) \propto e^{j\phi(t)}\{\sqrt{2}b(t)e^{-j\phi_{CD}(\omega_{sc})} + p_o 2$$

$$\cos(\omega_p t + \phi_p)e^{-j\phi_{CD}(\omega_p)}\} \propto e^{j\phi(t)}\{\sqrt{b(t)}e^{-j\phi_{CD}(\omega_{sc})} + p_o$$
$$\sqrt{2}\cos(\omega_p t + \phi_p)e^{-j\phi_{CD}(\omega_p)}\} \quad (30)$$

The salient points in the derivation above are the usage of the frequency flat approximation for the signals $e^{j\Phi(t)}$ $\underline{b}(t)e^{j\omega_{sc}t}, e^{j\Phi(t)}\underline{b}^*(t)e^{-j\omega_{sc}t}, p_o e^{j\Phi(t)}e^{j\phi_p}e^{j\omega_p t}, p_o e^{j\Phi(t)}e^{-j\phi_p}e^{-j\omega_p t}$ which are all narrowband, along with the even symmetry of the complex transfer factors $H_{bb}^{CD2}(\pm\omega_{sc}), H_{bb}^{CD2}(\pm\omega_p)$.

It is apparent that the original real-valued DSB oscillations of the bandpass message signal and the sinusoidal pilot at the fiber input, which were pointing along the real axis of the complex plane at the fiber input (E-O linear mod output) get rotated at the fiber output, after dispersive propagation, to point along two tilted lines making angles $\phi_{CD}(\omega_{sc}), \phi_{CD}(\omega_p)$ with the real axis, respectively. To the extent that $\omega_{sc}$ is selected relatively close to $\omega_{sc}$, then the relative angle between the two tilted lines may be much smaller than the angle $\phi_{CD}(\omega_{sc})$ which determined the CD fading in E1. It is the cosine $\cos[\phi_{CD}(\omega_{sc}) - \phi_{CD}(\omega_p)]$ of the relative angle between the two tilted lines that is shown in the next section to be the fading factor for the amplitude of the CD impaired detected signal in the E2 scheme.

Thus, the fading factor may be smaller in the E2 embodiment relative to the E1 one.

Detection

In this E2 scheme, just as in E1, the optical receiver front-end at the far end of the optical link (fiber or free-space) is essentially a direct-detection one a photodiode followed by amplification (e.g., a trans-impedance amplifier). The output of the receiver front-end is the transported analog signal (in the upstream direction in a cellular system application, this analog receiver front-end output may be either input into another analog link (e.g. an antenna) or be further digitized and/or IQ demodulated).

The optical field r(t) at the fiber output, having complex envelope (30), is photodetected, yielding the photocurrent $$I(t) \propto |\underline{r}(t)|^2 \propto \quad (31)$$

$$\left|e^{j\phi(t)}\{b(t)e^{-j\phi_{CD}(\omega_{sc})} + p_o\sqrt{2}\cos(\omega_p t + \phi_p)e^{-j\phi_{CD}(\omega_p)}\}\right|^2 =$$

$$\left|b(t)e^{-j\phi_{CD}(\omega_{sc})} + p_o\sqrt{2}\cos(\omega_p t + \phi_p)e^{-j\omega_{CD}(\omega_p)}\right|^2 =$$

$$|b(t)e^{-j\phi_{CD}(\omega_{sc})}|^2 + |p_o\sqrt{2}\cos(\omega_p t + \phi_p)e^{-j\phi_{CD}(\omega_p)}|^2 +$$

$$2Re\{[b(t)e^{-j\phi_{CD}(\omega_{sc})}][p_o\sqrt{2}\cos(\omega_p t + \phi_p)e^{-j\phi_{CD}(\omega_p)}]^*\} =$$

$$b^2(t) + 2p_o^2\cos^2(\omega_p t + \phi_p) +$$

$$2\sqrt{2}\, p_o b(t)\cos(\omega_p t + \phi_p)\cos[\phi_{CD}(\omega_{sc}) - \phi_{CD}(\omega_p)]$$

We note that in the second line the phase factor $e^{j\Phi(t)}$ which was common to both additive terms in the first line, cancels out under the absolute value operation. The same would occur with any other phase factor that is common to the message signal and the pilot, e.g., the constant phase factor $e^{-\Theta_0}$ (the zeroth term in the Taylor series of the phase, in the CD transfer function) representing the end-to-end optical path, which also cancels out (this justifies why we were entitled to discard the $e^{-\Theta_0}$ phase factor from the baseband CD transfer function).

Finally, expanding the cosine squared yields a DC term and a double frequency cosine in the detected photocurrent:

$$I(t) = b^2(t) + p_o^2 + p_o^2\cos(2\omega_p t + 2\phi_p) +$$

$$\underbrace{2p_o\cos[\phi_{CD}(\omega_{sc}) - \phi_{CD}(\omega_p)]\sqrt{2}\cos(\omega_p t + \phi_p) \cdot b(t)}_{I_x}$$

The message squared term $b^2(t)$, with FT $B(\omega)\otimes B(\omega)$, yields terms around DC and around $\pm 2\omega_{sc}$. Indeed:

$$B(\omega) = F\{b(t)\} = F\{\frac{1}{2}\underline{b}(t)e^{j\omega_{sc}t} + \frac{1}{2}\underline{b}^*(t)e^{-j\omega_{sc}t}\} = \frac{1}{2}$$

$$\underline{B}(\omega - \omega_{sc}) + \frac{1}{2}\underline{B}(\omega + \omega_{sc}) \quad (32)$$

and in we have seen that (with $\underline{B}(\omega) = F\{\underline{b}(t)\}$):

$$B(\omega)\otimes B(\omega) = \frac{1}{4}(\underline{B}\otimes\underline{B})(\omega) + \frac{1}{4}(\underline{B}\otimes\underline{B})(\omega - 2\omega_{sc}) + \frac{1}{4}(\underline{B}\otimes$$
$$\underline{B})(\omega - 2\omega_{sc}) \quad (33)$$

Figure 4:
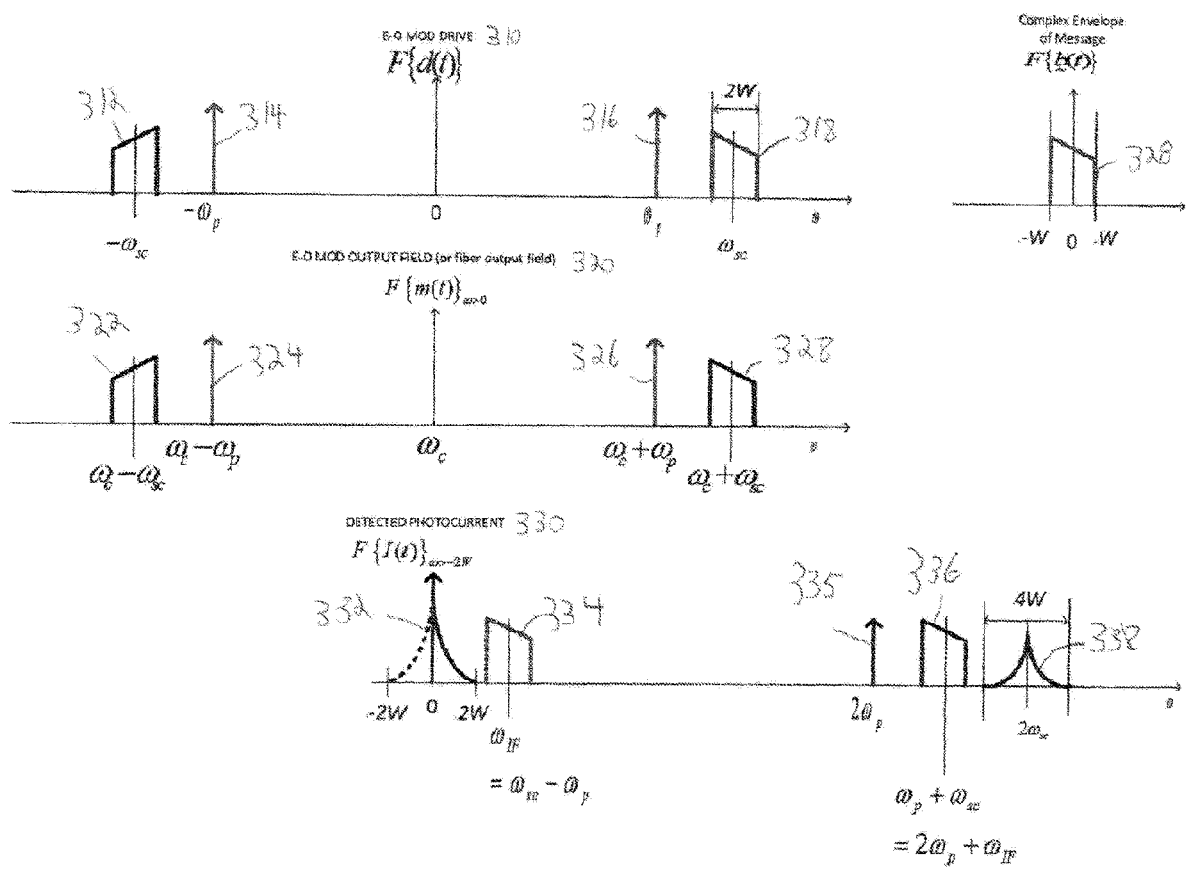
FIG. 4 illustrates examples of various signals.

The prototype function $(\underline{B}\otimes\underline{B})(\omega)$ is a baseband term around DC with two-sided spectral support 4W (2W along the positive ray of the frequency axis), where W is the one-sided bandwidth of the baseband signal (in [rad/sec] units) (FIG. 4). This prototype function appears in the spectrum of $b^2(t)$ at baseband as well as in $\pm 2\omega_{sc}$ frequency-shifted versions.

The next two terms, $p_o^2, p_o^2\cos(2\omega_p t + 2\phi_p)$ in the detected intensity, correspond in the frequency domain to impulses (spectral lines) at DC and at $2\omega_p$, respectively.

The useful message term in is the last one, namely the cross-term $$I_x \equiv 2p_o\cos[\phi_{CD}(\omega_{sc}) - \phi_{CD}(\omega_p)]\underbrace{\sqrt{2}\cos(\omega_p t + \phi_p) \cdot b(t)}_{I_x}.$$

It is apparent that the bandpass message signal b(t), with center frequency $\omega_{sc}$ is mixed with a sinusoidal pilot at the frequency $\omega_p$, yielding the product $\sqrt{2}\cos(\omega_p t + \omega_p) \cdot b(t)$.

Thus, the passband of b(t), originally centered at $\omega_{sc}$, is shifted to two new frequencies $|\omega_{sc} \pm \omega p|$.

Alternatively, this may be viewed as follows: the bandpass message spectrum $$b(t) = \frac{1}{\sqrt{2}} \underset{\sim}{b}(t) e^{j\omega_{sc}t} + \frac{1}{\sqrt{2}} \underset{\sim}{b}^*(t) e^{-j\omega_{sc}t}$$

is frequency shifted (heterodyned), from its original subcarrier frequency images at $\pm\omega_{sc}$ around DC, to two image bands at $\omega_{IF} = |\omega_p \pm \omega_{sc}|$ (the pilot frequency $\omega_p$ becomes the spectral center of gravity of the bandpass signal, which has sidebands $\pm\omega_{sc}$, now shifted with respect to from $\omega_p$ by amounts $\pm\omega_{sc}$).

Spectral Structure of the Photocurrent in the E2 Embodiment

The various spectra are shown in FIG. 4. All figure may be construed to depict the absolute value squared of the spectra (although the absolute squaring operation is not explicitly mentioned in the figure). In particular we consider the spectrum $B(\nu) = F\{b(t)\}$ of the bandpass signal to be transmitted and its complex envelope, $\underset{\sim}{B}(\nu) = F\{\underset{\sim}{b}(t)\}$. As the bandpass signal is assumed relatively narrowband, under the frequency flat approximation the main impact of the fiber propagation will be seen to induce a constant CD induced phase-shift to the sidebands. Therefore, whenever we plot the absolute value squared of the optical field at the modulator output (fiber input) in effect we also plot the absolute valued squared of the spectrum $\underset{\sim}{R}(\nu) = F\{\underset{\sim}{r}(t)\}$ of the CE r(t) of the optical field at the fiber output (photo-diode input), since the constant CD induced phase factor multiplying the whole sideband is cancelled out under the absolute value squared operation.

The useful band to be extracted out of the received spectrum is $[\omega_{IF} - W, \omega_{IF} + W]$. As, mentioned above as the vertical scale is not specified and the effect of dispersion is small over the passband of the useful signal (apart from a fixed phase shift under the frequency flat approximation), the same graph also describes the absolute valued squared of the spectrum $M(\nu) = F\{m(t)\}$ of the E-O mod output (fiber input) as it does the fiber input. The support of this spectrum, over the positive frequencies ray, consists of $[\omega p] \cup [\omega_{sc} - W, 2\omega_{sc} + 2W]$ (over all frequencies we also have the minor image of these two subbands).

We also show in FIG. 4 the absolute valued squared of the positive part (analytic signal) of the spectrum $F\{I(t)\}$ of the photo-current, I(t) (for clarity we rather start the frequency axis at −W also showing a small portion of the negative frequencies). The support of this spectrum, over the positive frequencies ray, is given by the union of the following six subbands (over all frequencies we also have the minor image relative to the origin of these two subbands, e.g. at baseband we have [−2W,2W]).

$$[0, 2W] \cup [2\omega_{sc} - 2W, 2\omega_{sc} + 2W] \cup \{2\omega_p\} \cup \underbrace{[\omega_{sc} + \omega_p - W,}_{\omega_{IF}^-} \quad (34)$$

$$\underbrace{\omega_{sc} + \omega_p + W]}_{\omega_{IF}^-} \cup \underbrace{[\omega_{sc} + \omega_p - W, \omega_{sc} + \omega_p + W]}_{\omega_{IF}^+}.$$

Here we assumed $\omega_p < \omega_{sc}$, i.e., inner pilot frequencies allocation. The potentially useful spectral bands in the photocurrent (further processed by electrical IQ demodulation in the Rx) appear in the second line. The first of these spectral segments may be typically easier to handle than the other, as it is at lower frequencies, but in principle we could spectrally filter either of these two spectral bands, and then extract the CE of the message signal (it is also possible to average both terms). Let us denote $\omega_{IF} \equiv \omega_{IF}^- = \omega_{sc} - \omega_p$ and select $[\omega_{IF} - W, \omega_{IF} + W]$ as our useful band in a preferred sub-embodiment of E2, (as this band has lower frequencies than the other band, $[\omega_{IF}^+ - W, \omega_{IF}^+ + W]$).

A simple graphical way to obtain the photocurrent spectrum from the optical field spectrum is by evaluating the deterministic autocorrelation of the spectrum of r(t) (Thus the bottom plot in FIG. 4 is the deterministic autocorrelation of the mid plot). Indeed, denoting $\underset{\sim}{R}(\nu) = F\{\underset{\sim}{r}(t)\}$, we have:

$$F\{I(t)\} \propto F\{|\underset{\sim}{r}(t)|^2\} = F\{\underset{\sim}{r}(t)\underset{\sim}{r}^*(t)\} = \underset{\sim}{R}(\nu) \otimes \underset{\sim}{R}^*(-\nu) \quad (35)$$

Yet another way to wield insight into the formation of the spectral support of the bottom plot of FIG. 4 is to consider all possible differences of pairs of points in the spectral support of $\underset{\sim}{R}(\nu) = F\{\underset{\sim}{r}(t)\}$.

The message-induced terms in the photocurrent may be spectrally separated, for the purpose of electrical filtering, under reasonable conditions on the subcarrier frequency and spectral band bandwidth. Let us now work out spectral constraints such that the useful band $[\omega_{IF} - W, \omega_{IF} + W]$ be spectrally separated from all other bands. To have $[0, 2W] \cap [\omega_{IF} - W, \omega_{IF} + W] = \emptyset$ requires $2W \leq \omega_{IF} - W \Leftrightarrow 3W \leq \omega_{IF}$. Actually, as the band $[\omega_{IF} - W, \omega_{IF} + W]$ must be extracted by means of an electrical filter, we must account for the finite transition bandwidth of the filter, $W_{filter-trans}$, thus the constraint must be modified to have $[0, 2W] \cap [\omega_{IF} - (W + W_{filter-trans}), \omega_{IF} + W + W_{filter-trans}] = \emptyset$, yielding the constraint $\omega_{IF} \equiv \omega_{sc} - \omega_p \geq 3W + W_{filter-trans}$.

A second constraint is to have $[\omega_{IF} - (W + W_{filter-trans}), \omega_{IF} + W + W_{filter-trans}] \cap \{2\omega_p\} = \emptyset$ is $\omega_{IF} + W + W_{filter-trans} \leq 2\omega_p \Leftrightarrow \omega_{sc} - \omega_p + W + W_{filter-trans} \leq 2\omega_p \Leftrightarrow \omega_{sc} + W + W_{filter-trans} \leq 3\omega_p$.

To recap, we be able to extract the useful band by bandpass filtering, we must satisfy two constraints on the two frequencies, $\omega_{sc}, \omega_p$:

$$3W + W_{filter-trans} < \omega_{sc} - \omega_p, \omega_{sc} + W + W_{filter-trans} \leq 3\omega_p \quad (36)$$

Additional considerations in selecting $\omega_{sc}, \omega_p$ are application system dependent. An important application for the E2 embodiment is optical transport in cellular networks. In this case, the subcarrier and pilot tone frequency allocation considerations in cellular radio-over-fiber transport differ for the respective downstream and upstream direction. For definiteness let us continue to assume the inner pilot option.

Downstream:

the digitally generated message passband modulated onto the optical carrier need not have a center frequency $\omega_{sc}$ coinciding with that of the air-interface subcarrier frequency $\omega_{sc-air}$ at the remote radio head. Rather, the selection of the bandpass center frequency $\omega_{sc}$ of the digitally originated bandpass RF signal applied to the E-O MOD is subject to other system design considerations, e.g. the bandwidth of the DAC and the E-O MOD in the Tx, while the pilot frequency $\omega_p$ is selected (subject to $\omega_p < \omega_{sc}$) such that the IF frequency $\omega_{IF} = \omega_{sc} - \omega p$ equal precisely the intended subcarrier frequency $\omega_{sc-air}$ air of the downstream wireless transmission at the remote radio head:

Downstream: $\omega_{IF} = \omega_{sc-air} \Leftrightarrow \omega_p = \omega_{sc} - \omega_{sc-air}$. (37)

It is also possible to not have the optical Rx directly generate its transported bandpass RF signal directly around $\omega_{sc\text{-}air}$, but rather around a lower "IF-air" frequency $\omega_{IF\text{-}air}$, thus replacing $\omega_{sc\text{-}air}$ by $\omega_{IF\text{-}air}$ in the last formula. Thus, in this case we select $\omega_{sc}, \omega_p$, for the bandpass message and pilot digitally generated at the optical Tx, such as satisfy $\omega_{IF\text{-}air} = \omega_{sc} - \omega_p$ in the process of optical beating at the Rx photo-diode. The remote antenna head must then contain, besides the optical Rx generating the bandpass RF signal around the selected beat frequency, $\omega_{IF\text{-}air}$, an electrical modulation means to up-convert this transported bandpass RF signal from $\omega_{IF\text{-}air}$ to the desired target sub-carrier frequency, $\omega_{sc\text{-}air}$. E.g., a mixer with a tone at frequency $\omega_{sc\text{-}air} - \omega_{IF\text{-}air}$ may be used to effect the electrical up-conversion.

Upstream:

The subcarrier frequency is set by the air-interface RF center frequency, $\omega_{sc} = \omega_{sc\text{-}air}$. The IF frequency $\omega_{IF} = \omega_{sc} - \omega_p = \omega_{sc\text{-}air} - \omega_p$ to be generated in the Rx photo-current is selected subject to design considerations at the optical-digital Rx (e.g. the bandwidth of the optical analog receiver photodiode and trans-impedance amplifier and the bandwidth of the ADC). Thus, the pilot frequency is selected to satisfy the constraint $$\text{Upstream: } \omega_p = \omega_{sc\text{-}air} - \omega_{IF}. \tag{38}$$

The IQ demodulation in the optical receiver is then conveniently performed at the IF frequency $\omega_{IF}$.

In addition to the above constraints on the frequency allocations, the requirement that various spectral terms be spectrally separated in the direct-detection receiver (in the spectrum of the photodiode current), such that a useful band may be filtered out, containing the useful information that was transported, poses the constraint (36).

IQ demodulation gain of the message complex envelope and tolerance to the CD impairment We have already specified the receiver side electronic processing required to extract the useful information out of the photo-current cross-term, which was seen above to be spectrally separated from the other terms, under conditions derived in the last subsection.

Formally, in complex notation, the normalized photocurrent (the normalization excludes the pilot induced gain $2p_o$ and the CD fading factor, $\cos[\phi_{CD}(\omega_{sc}) - \phi_{CD}(\omega_p)]$, which linear scaling factors will be dealt with at the end), is:

$$\hat{I}_x(t) = \sqrt{2}\cos(\omega_p t + \phi_p) \cdot b(t)\sqrt{2}\left[\frac{1}{\sqrt{2}}\underset{\sim}{b}(t)e^{j\omega_{sc}t} + \frac{1}{\sqrt{2}}\underset{\sim}{b}^*(t)e^{-j\omega_{sc}t}\right] \tag{39}$$

$$\left[\frac{1}{\sqrt{2}}p_o e^{j\phi_p}e^{j\omega_p t} + \frac{1}{\sqrt{2}}p_o e^{-j\phi_p}e^{-j\omega_p t}\right] =$$

$$\underbrace{\sqrt{2}\left[\frac{1}{2}p_o e^{j\phi_p}\underset{\sim}{b}(t)e^{j(\omega_{sc}+\omega_p)t} + \frac{1}{2}p_o e^{-j\phi_p}\underset{\sim}{b}^*(t)e^{-j(\omega_{sc}+\omega_p)t}\right]}_{\hat{I}^{x+}(t) \equiv \sqrt{2}\,Re\{e^{-j\phi_p}\underset{\sim}{b}(t)e^{j(\omega_{sc}+\omega_p)t}\}} +$$

$$\underbrace{\sqrt{2}\left[\frac{1}{2}p_o e^{-j\phi_p}\underset{\sim}{b}(t)e^{j(\omega_{sc}-\omega_p)t} + \frac{1}{2}p_o e^{j\phi_p}\underset{\sim}{b}^*(t)e^{-j(\omega_{sc}-\omega_p)t}\right]}_{\hat{I}^{x-}(t) \equiv \sqrt{2}\,Re\{e^{-j\phi_p}\underset{\sim}{b}(t)e^{j(\omega_{sc}-\omega_p)t}\}}$$

All the information contained in b(t) is also present in $\hat{I}_x(t) = \sqrt{2}\cos(\omega_p t + \phi_p) \cdot p(t)$ as it is in either one of the terms $\hat{I}^{x\pm}(t)$ and vice-versa. Upon filtering through either the lower (at $\omega_{sc} - \omega_p$) or the upper (at $\omega_{sc} + \omega_p$) heterodyne image by means of a bandpass filter (BPF) with center frequency $\omega_{IF}^{\pm} \equiv |\omega_{sc} \pm \omega_p|$ and a passband at least 2W (but not to large so that not to include other spurious terms in the spectrum), we are able extract a useful signal consisting of one of these sideband images:

(40)

$$\hat{I}^{x\pm}(t) \equiv \sqrt{2}\,Re\{e^{\mp j\phi_p}\underset{\sim}{b}(t)e^{j(\omega_{sc}\mp\omega_p)t}\} = \sqrt{2}\,Re\{e^{\mp j\phi_p}\underset{\sim}{b}(t)e^{j\omega_{IF}^{\pm}t}\} = \tag{40}$$

$$\frac{1}{\sqrt{2}}\underset{\sim}{b}(t)e^{\mp j\phi_p}e^{j\omega_{IF}^{\pm}t} + \frac{1}{\sqrt{2}}e^{\pm j\phi_p}\underset{\sim}{b}^*(t)e^{-j\omega_{IF}^{\pm}t} =$$

$$\underset{\sim}{b}'(t)e^{j\omega_{IF}^{\pm}t} + \frac{1}{\sqrt{2}}\underset{\sim}{b}'^*(t)e^{-j\omega_{IF}^{\pm}t},$$

where $\omega_{IF}^{\pm} = |\omega_{sc} \pm \omega_p|$ and we defined a rotated (by the pilot phase angle) complex envelope $\underset{\sim}{b}'(t) = \underset{\sim}{b}(t)e^{\pm j\phi_p}$ of the baseband message.

Either of these two images at $\omega_{IF}^{\pm} = |\omega_{sc} \pm \omega^p|$ has the same complex envelope as b(t) does, up to a fixed phase rotation. Filtering and IQ detecting either of the two heterodyne images (by analog and/or digital means) we may extract the rotated complex envelope $\underset{\sim}{b}'(t) = \underset{\sim}{b}(t)e^{\pm j\phi_p}$.

$$\hat{\underset{\sim}{b}}'(t) \propto \{I^x(t)\cos\omega_{IF}t\}_{LPF} + j\{I^x(t)[-\sin\omega_{IF}t]\}_{LPF} = \{I^x(t)(\cos\omega_{IF}t - j\sin\omega_{IF}t)\}_{LPF} \tag{41}$$

or finally, in complex notation, our prior-to-phase-recovery estimate $\hat{\underset{\sim}{b}}'(t)$ of the phase-rotated message CE is:

$$\hat{\underset{\sim}{b}}'(t) \propto \{I^x(t) < e^{-j\omega_{IF}t}\}_{LPF} \tag{42}$$

Further performing carrier phase recovery, typically in the digital domain, it is possible to offset the complex rotation $e^{\pm j\phi_p}$, reconstructing an estimate of $\underset{\sim}{b}(t)$.

Such analog and/or digital IQ processing may be used at the Rx end to extract the complex envelope $\underset{\sim}{b}(t)$ of the bandpass message signal that was to be optically transported.

It is also possible to employ two filters in parallel, centered on $\omega_{IF}^{\pm} = |\omega_{sc} \pm \omega_p|$ with passbands 2W, and IQ detect their respective outputs, then jointly perform phase recovery. However the simplest embodiment would electrically filter and IQ demodulate just one of the two terms $I^{x\pm}(t)$ in the photocurrent.

Considering now factor $2p_o \cos[\phi_{CD}(\omega_{sc}) - \phi_{CD}(\omega_p)]$ scaling the useful cross-product term ההפניה לא נמצא שגיאה! מקור., $I_x(t) = 2p_o \cos[\phi_{CD}(\omega_{sc}) - \phi_{CD}(\omega_p)]\hat{I}_x(t)$, the prior-to-phase-recovery CE estimate may be expressed as $$\hat{\underset{\sim}{b}}'(t) \propto \{I^x(t)e^{-j\omega_{IF}t}\}_{LPF} = 2p_o \cos[\phi_{CD}(\omega_{sc}) - \phi_{CD}(\omega_{sc})]$$
$$\{\hat{I}^{x\pm}(t)e^{-j\omega_{IF}t}\}_{LPF}$$

whereas per (40)

$$\hat{I}^{x\pm}(t) \propto \underset{\sim}{b}'(t)e^{j\omega_{IF}^{\pm}t} + \frac{1}{\sqrt{2}}\underset{\sim}{b}'^*(t)e^{-j\omega_{IF}^{\pm}t}.$$

Taking for definiteness $$\hat{I}^{x-}(t) \propto \underset{\sim}{b}'(t)e^{j\omega_{IF}t} + \frac{1}{\sqrt{2}}\underset{\sim}{b}'^*(t)e^{-j\omega_{IF}t}$$

we have $$\hat{\underline{b}}'(t) \propto \{I^x(t)e^{-j\omega_{IF}t}\}_{LPF} = 2p_o\cos[\phi_{CD}(\omega_{sc}) - \phi_{CD}(\omega_p)]\{\tilde{I}^{x-}(t)e^{-j\omega_{IF}t}\}_{LPF} \propto$$

$$2p_o\cos[\phi_{CD}(\omega_{sc}) - \phi_{CD}(\omega_p)]$$

$$\left\{\left[\underline{b}'(t)e^{j\omega_{IF}t} + \frac{1}{\sqrt{2}}\underline{b}'^*(t)e^{-j\omega_{IF}t}\right]e^{-j\omega_{IF}t}\right\}_{LPF} =$$

$$2p_o\cos[\phi_{CD}(\omega_{sc}) - \phi_{CD}(\omega_p)]\underline{b}'(t) \quad (10)$$

or finally dropping a factor of 2 as proportionality constants are just loosely kept track of in our analysis, $$\hat{\underline{b}}'(t) \propto \{I^x(t)e^{-j\omega_{IF}t}\}_{LPF} \propto p_o \cos[\phi_{CD}(\omega_{sc})-\phi_{CD}(\omega_p)]$$
$$\underline{b}'(t) \quad (43)$$

It is apparent that using a stronger pilot tone will evidently enhance the detected photocurrent and its IQ demodulation (improve its SNR). The effect of CD is to statically attenuate (induce constant fading) by the fading factor cos $[\phi_{CD}(\omega_{sc})-\phi_{CD}(\omega_p)]$ which degrades the detection SNR:

(44)

$$CDfadingFactorE2 = \cos[\phi_{CD}(\omega_{sc}) - \phi_{CD}(\omega)_p] \quad (44)$$

$$= \cos\left[\frac{1}{2}\beta_2 L\omega_{sc}^2 - \frac{1}{2}\beta_2 L\omega_p^2\right]$$

$$= \cos\left[\frac{1}{2}\theta_2(\omega_{sc}^2 - \omega_p^2)\right]$$

$$= \cos\left[\frac{1}{2}\theta_2(\omega_{sc} + \omega_p)(\omega_{sc} - \omega_p)\right]$$

$$= \cos\left[\frac{1}{2}\theta_2(\omega_{sc} + \omega_p)|\omega_{sc} - \omega_p|\right]$$

$$= \cos\left[\frac{1}{2}\theta_2(\omega_{sc} + \omega_p)\omega_{IF}\right]$$

$$= \cos\left[\frac{1}{2}\theta_2(\omega_{sc} + \omega_{sc} \pm \omega_{IF})\omega_{IF}\right]$$

$$= \cos\left[\frac{1}{2}\theta_2(2\omega_{sc} \pm \omega_{IF})\omega_{IF}\right]$$

$$= \cos\left[\frac{1}{2}\beta_2 L\omega_{sc}^2\left(2 \pm \frac{\omega_{IF}}{\omega_{sc}}\right)\frac{\omega_{IF}}{\omega_{sc}}\right]$$

where we used $\phi_{CD}(\omega)=\frac{1}{2}\theta_2\omega^2=\frac{1}{2}\beta_2 L\omega^2$, $\theta_2=\eta_2 L$ and $\omega_{IF} \equiv |\omega_{sc}-\omega_p| \Leftrightarrow \omega_p=\omega_{sc}\pm\omega_{IF}$.

Comparing the E2 system static-CD-fading factor just derived above $\cos[\phi_{CD}(\omega_{sc})-\phi_{CD}(\omega_p)]=\cos(\beta_2 L\frac{1}{2}(\omega_{sc}+\omega_p)\omega_{IF}]$ with the corresponding fading factor of the E1 system, CDfadingFactorE1=cos $\phi_{CD}(\omega_{sc})$=cos $[\frac{1}{2}\beta_2 L\omega_{sc}^2]$ the ratio of the two fading factors is $$\frac{CDfadingFactorE1}{CDfadingFactorE2} = \frac{\cos\phi_{CD}(\omega_{sc})}{\cos[\phi_{CD}(\omega_{sc}) - \phi_{CD}(\omega_p)]}$$

$$= \frac{\cos\left[\frac{1}{2}\beta_2 L\omega_{sc}^2\right]}{\cos\left[\frac{1}{2}\beta_2 L\omega_{sc}^2 \cdot \left(2 \pm \frac{\omega_{IF}}{\omega_{sc}}\right)\frac{\omega_{IF}}{\omega_{sc}}\right]}$$

Taking the minus sign (corresponding to $\omega_p=\omega_{sc}-\omega_{IF}<\omega_{sc}$, rather than $\omega_p=\omega_{sc}+\omega_{sc}>\omega_{sc}$, i.e. adopting the "inner placement" of the pilot, i.e. having it lower than the subcarrier) we have $$CDfadingFactorTx2 = \cos\left[\frac{1}{2}\beta_2 L\omega_{sc}^2 \cdot \left(2 - \frac{\omega_{IF}}{\omega_{sc}}\right)\frac{\omega_{IF}}{\omega_{sc}}\right]$$

(having selected the plus sign, corresponding to $\omega_p=\omega_{sc}+\omega_{IF}>\omega_{sc}$ would lead to somewhat larger CD-induced fading, as the argument of the cosine would be larger)

Thus, $$\frac{CDfadingFactorE1}{CDfadingFactorE2} = \frac{\cos\left[\frac{1}{2}\beta_2 L\omega_{sc}^2\right]}{\cos\left[\frac{1}{2}\beta_2 L\omega_{sc}^2 \cdot \left(2 - \frac{\omega_{IF}}{\omega_{sc}}\right)\frac{\omega_{IF}}{\omega_{sc}}\right]}$$

Generally, the CD fading factor of the current E2 system is seen to be smaller (more favorable) than that of the E1 system, but it may be that both systems have CD fading factors close to unity such that the advantage of E2 over E1 may not be significant.

Nevertheless, consider the case wherein the carrier frequency is sufficiently high and/or the transmission distance is large such that CDfadingFactorE1<<1 i.e., the E1 scheme is in deep fading, it is possible to get CDfadingFactorE2 quite close to unity by taking by having $\omega_{IF}/\omega_{sc}<<1$, i.e. using an IF frequency which relatively small with respect to the subcarrier frequency of the bandpass message to be transported. In this case the advantage of E2 over E1 would be large. The discrepancy between the two factors is more pronounced the higher $\omega_{sc}$ is, and the closer $\omega_p$ is to $\omega_{sc}$. E.g., an optical transport system over L=40 km wherein the message signal consists of a 10 GHz band around the center frequency $\omega_{sc}$=60 GHz and we select $\omega_p$=45 GHz ($\omega_{IF}$=15 GHz).

We conclude that E2 is generally a more CD-tolerant method for optical transport of a bandpass RF signal than E1 is. In both methods the signal just gets attenuated but is undistorted due to CD (under the relatively accurate approximations adopted in the course of the derivation) but the CD induced attenuation in the E1 method is typically higher. In addition E2 may operate the RF part of receiver at an IF frequency of choice (flexibly selected within certain limitations), with the IF frequency being optically generated, by optically mixing (onto the photodiode) the optical pilot tone with the subcarrier RF signal riding onto the optical carrier, whereas in E1 the RF frequency generated in the receiver is fixed, equal to the subcarrier RF frequency $\omega_{sc}$. E.g. to transport a 60 GHz signal by E1 method, we shall need 60 GHz electronics in the optical receiver by E1 method, whereas by the E2 methods we may design the system such that the RF processing (including mixed signal processing, e.g. ADC) may be carried out at, say 2 . . . 10 GHz IF frequency, which is more advantageous.

Asymmetric (Non-Hermitian) Optical Filtering of an Optical DSB Signal

We now overview common electro-optic elements and techniques for the embodiments E3-E6, as taught in this invention for optical transport of bandpass signals. These embodiments will be seen to feature asymmetric spectra around the optical carrier. The motivation for these embodiments is presented in this section, which develops a mathematical model for the effects of asymmetric optical filtering, indirectly applicable also to asymmetric optical modulation (generation of SSB/VSB by means other than optical filtering using an IQ MOD).

In the embodiments E3-E6 to follow we break up the Hermitian symmetry of the modulated RF signals around the optical carrier and/or of the RF pilot tones modulated around the optical carrier. This evidently requires complex-valued rather than real-valued modulation (as the Fourier transform spectrum of a real signal always has Hermitian symmetry); Operationally, this is going to be achieved by usage of an E-O IQ MOD in those embodiments. However, equivalently, the spectral asymmetry may be effectively attained by means of asymmetric optical filtering (though in practice that may be less convenient).

Generally, we shall consider having either the modulated bandpass signal and/or the pilot tone with unequal amplitude sub-bands to the right and left of the optical carrier, a generic situation that may be referred to as "Vestigial Sideband Modulation (VSB). The case of Single-Side-Band (SSB) is also included as an extreme special case of VSB, namely when one of the upper or lower sidebands completely vanishes. Note that VSB (or SSB) may refer to either the optically modulated RF bandpass signal or to the optically modulated pilot tone. The case of DSB may be viewed as the other extreme special case of generic VSB, namely when the upper and lower sidebands attain equal amplitudes (and display Hermitian symmetry).

Let us then work out a detailed analysis of the effect of asymmetric (non-Hermitian) filtering around the optical carrier or equivalently asymmetric shaping of the signal and pilot sidebands around the optical carrier by means of IQ optical modulation.

The starting point is to recall that the real-valued bandpass message signal $$b(t) = \sqrt{2}\, Re\{\underset{\sim}{b}(t)e^{j\omega_{sc}t}\} = \frac{1}{\sqrt{2}}\underset{\sim}{b}(t)e^{j\omega_{sc}t} + \frac{1}{\sqrt{2}}\underset{\sim}{b}^*(t)e^{-j\omega_{sc}t},$$

is superposed onto a pilot signal p(t) (respectively given by DC in E1 and by an RF sinusoid in E2) yielding, $$d(t)=b(t)+p(t)$$

which is the total drive signal into the E-O MOD in embodiments E1,E2, which is applied to the linear E-O MOD to get it modulated onto the optical carrier. The modulator output is propagated via the optical link, then photo-detected. In the next subsection we carry out a generic analysis, pertaining to all embodiments, of the propagation all the way to the received photocurrent, accounting in principle for asymmetric optical filtering.

Derivation of Received Photocurrent in the Wake of Asymmetric Optical Spectrum

We have already shown that, for a linear E-O MOD, optical input and output complex envelopes are multiplicatively related via the real-valued drive signal (just like the input and output analytic signals are). As the input complex envelope of the quasi-CW optical carrier is $\underset{\sim}{c}(t)=a_c e^{j\Phi_c(t)}$, (a relatively narrowband signal (narrow linewidth)), we have:

$$\underset{\sim}{m}(t) = d(t)\underset{\sim}{c}(t) = \tag{45}$$

$$d(t)a_c e^{j\phi_c(t)} = [b(t)+p(t)]a_c e^{j\phi_c(t)} = \underbrace{b(t)a_c e^{j\phi_c(t)}}_{\underset{\sim}{m}_b(t)} + \underbrace{p(t)a_c e^{j\phi_c(t)}}_{\underset{\sim}{m}_p(t)}$$

Thus, the E-O MOD output is compactly expressed in terms of two contributions associated with the bandpass signal and the pilot, respectively:

$$\underset{\sim}{m}(t)=\underset{\sim}{m}_b(t)+\underset{\sim}{m}_p(t) \tag{46}$$

The contribution $\underset{\sim}{m}_b(t)$ of the bandpass message b(t) to the optical field at the E-O MOD output is:

$$\underset{\sim}{m}_b(t) = b(t)a_c e^{j\phi_c(t)} \propto [\underset{\sim}{b}(t)e^{j\omega_{sc}t}\underset{\sim}{b}^*(t)e^{-j\omega_{sc}t}]e^{j\phi_c(t)} =$$
$$\underset{\sim}{b}(t)e^{j\phi_c(t)}e^{j\omega_{sc}t}+\underset{\sim}{b}^*(t)e^{j\phi_c(t)}e^{-j\omega_{sc}t} \tag{47}$$

The E-O MOD optical output is fed into an optical system including the fiber medium and possibly also there are optical filtering effects, e.g., due to WDM multiplexers and de-multiplexers. By linearity, the total received optical field, after optical transport link (fiber+WDM or other optical filters) propagation, may be obtained by separately propagating the two components. finally superposing them (where $h_{bb}(t) \equiv F^{-1}\{H_{bb}(\omega)\}$ is the impulse response corresponding to propagating via $H_{bb}(\omega)$):

$$\underset{\sim}{r}(t) = h_{bb}(t) \otimes \underset{\sim}{m}(t) = \tag{48}$$

$$h_{bb}(t) \otimes \left[\underset{\sim}{m}_b(t) + \underset{\sim}{m}_p(t)\right] = \underbrace{h_{bb}(t) \otimes \underset{\sim}{m}_b(t)}_{\underset{\sim}{r}_b(t)} + \underbrace{h_{bb}(t) \otimes \underset{\sim}{m}_p(t)}_{\underset{\sim}{r}_p(t)}$$

Thus, the received optical field at the photodiode input is the sum of two contributions, respectively associated with the bandpass message and with the pilot:

$$\underset{\sim}{r}(t)=\underset{\sim}{r}_b(t)+\underset{\sim}{r}_p(t) \tag{59}$$

As the optical carrier CE $\underset{\sim}{c}(t)=a_c e^{j\Phi_c(t)}$ is a relatively narrowband signal (narrow linewidth)), it follows that the two message-dependent additive terms in (47) are narrowband, respectively centered on $\pm\omega_{sc}$.

To propagate the CE term $\underset{\sim}{m}_b(t)$ (47) at the fiber input through the baseband-equivalent end-to-end transfer function flat approximation-frequency we apply the, of the optical transport link $H_{bb}(\omega)$ for the narrowband passband signals, yielding:

$$\underset{\sim}{r}_b(t)=\underset{\sim}{b}(t)e^{j\phi_c(t)}e^{j\omega_{sc}t}H_{bb}(\omega_{sc})+$$
$$\underset{\sim}{b}^*(t)e^{j\phi_c(t)}e^{-j\omega_{sc}t}H_{bb}(-\omega_{sc}) \tag{60}$$

The last two equations then provide a full description of the received optical field. The total detected photocurrent is proportional to the square of the absolute value of the received complex envelope, which is expanded into two squared self-terms and a cross-term:

$$I(t) \propto |\underset{\sim}{r}(t)|^2 = |\underset{\sim}{r}_b(t) + \underset{\sim}{r}_p(t)|^2 = |\underset{\sim}{r}_b(t)|^2 + |\underset{\sim}{r}_p(t)|^2 + \underbrace{2Re\{\underset{\sim}{r}_b(t) + \underset{\sim}{r}_p^*(t)\}}_{I^x(t)} \tag{61}$$

The first squared self-term $|\underset{\sim}{r}_b(t)|^2$, is common to all embodiments, thus will be derived here, for the most general case of asymmetric optical filtering:

$$|\underset{\sim}{r}_b(t)|^2 = |\underset{\sim}{b}(t)e^{j\phi_c(t)}e^{j\omega_{sc}t}H_{bb}(\omega_{sc}) + \underset{\sim}{b}^*(t)e^{j\phi_c(t)}e^{-j\omega_{sc}t}H_{bb}(-\omega_{sc})|^2 \tag{62}$$

$$= |\underset{\sim}{b}(t)e^{j\omega_{sc}t}H_{bb}(\omega_{sc}) + \underset{\sim}{b}^*(t)e^{-j\omega_{sc}t}H_{bb}(-\omega_{sc})|^2$$

-continued $$= |\underline{b}(t)H_{bb}(\omega_{sc})|^2 + |\underline{b}^*(t)H_{bb}(-\omega_{sc})|^2 +$$

$$2Re\{[\underline{b}(t)e^{j\omega_{sc}t}H_{bb}(\omega_{sc})][\underline{b}^*(t)e^{-j\omega_{sc}t}H_{bb}(-\omega_{sc})]^*\}$$

$$= |\underline{b}(t)|^2[|H_{bb}(\omega_{sc})|^2 + |H_{bb}(-\omega_{sc})|^2] +$$

$$2|\underline{b}(t)|^2 Re\{e^{j2\omega_{sc}t}H_{bb}(\omega)H_{bb}^*(-\omega_{sc})\}$$

Finally yielding $$|\underline{r}_b(t)|^2 = |\underline{b}(t)|^2[|H_{bb}(\omega_{sc})|^2 + |H_{bb}(-\omega_{sc})|^2] + \quad (63)$$

$$|\underline{b}(t)|^2 e^{j2\omega_{sc}t} H_{bb}(\omega_{sc})H_{bb}^*(-\omega_s) +$$

$$|\underline{b}(t)|^2 e^{-j2\omega_{sc}t} H_{bb}^*(\omega_{sc})H_{bb}(-\omega_{sc}).$$

In the spectral domain (with $\underline{B}(\omega)=F\{\underline{b}(t)\}$), we have three terms: around DC and around $\pm 2\omega_{sc}$.
Indeed:

$$F\{|\underline{r}_b(t)^2\} = [|H_{bb}(\omega_{sc})|^2 + |H_{bb}(-\omega_{sc})|^2](\underline{B}\otimes$$
$$\underline{B})(\omega) + H_{bb}(\omega_{sc})H_{bb}^*(-\omega_{sc})(\underline{B}\otimes$$
$$\underline{B})(\omega-2\omega_{sc}) + H_{bb}^*(\omega_{sc})H_{bb}(-\omega_{sc})(\underline{B}\otimes\underline{B})(\omega-2\omega_{sc}) \quad (64)$$

The prototype function $(\underline{B}\otimes\underline{B})(\omega)$ is a baseband term around DC with two-sided spectral support 4W (2W along the positive ray of the frequency axis), where W is the one-sided bandwidth of the baseband signal (in [rad/sec] units). It is this prototype function that appears in the spectrum of $|\underline{r}_b(t)|^2$ at baseband as well as shifted around $\pm 2\omega_{sc}$.

The spectral support of $|\underline{r}_b(t)|^2$ over the positive frequencies ray is $[0,2W]\cup[2\omega_{sc}-2W, 2\omega_{sc}+2W]$ (over the negative frequencies we have the mirror images).

As for the photocurrent terms involving the pilot, $|\underline{r}_p(t)|^2$ and $I^x(t)\equiv 2 \text{ Re} \{\underline{r}_b(t)\underline{r}_p^*(t)\}$, these are embodiment-dependent, in particular, differing between E1 and E2, as treated in the next two subsections. The selection of pilot frequency (DC in E1, $\omega_p$ in E2)), such that that all spectral terms be disjoint, must account for the subcarrier frequency, $\omega_{sc}$, and the spectral width W, of the complex envelope of the passband message.

Once the various spectral terms are made disjoint by a suitable frequency allocation, we may filter through the useful term $I^x(t)\equiv 2 \text{ Re} \{\underline{r}_b(t)\underline{r}_p^*(t)\}$, by means of an electrical band-pass-filter. Once $I^x(t)$ is filtered through, we may perform some useful signal processing to extract the CE b(t) of the bandpass signal to be optically transported. The center frequency of the bandpass signal $I^x(t)\equiv 2 \text{ Re} \{\underline{r}_b(t)\underline{r}_p^*(t)\}$ may be generically denoted $\omega_{IF}$. Depending on the nature of the pilot tone (DC in E1 embodiment, an RF tone at frequency $\omega_p$ in the E2 embodiment)) we have coif. $\omega^{IF}=\omega_{sc}$ in E1 whereas in E2 we have $\omega_{IF}=|\omega_{sc}\pm\omega_p|$. In a preferred sub-embodiment of E2 we would take $\omega_p<\omega_{sc}$ (the inner rather than outer pilot option), and we would select $\omega_{IF}=\omega_{sc}-\omega_p$. We note that the E1 case may be viewed as a special case of the E2 case with $\omega_p=0$.

Our estimate $\hat{\underline{b}}'(t)$ (prior to phase recovery) of the message CE is obtained by IQ electronic (analog, digital or mixed-signal) demodulation against the RF subcarrier, as follows:

$$\hat{\underline{b}}'(t)\propto\{I^x(t)\cos \omega_{IF}t\}_{LPF}+j\{I^x(t)[-\sin \omega_{IF}t]\}_{LPF}=\{I^x(t)(\cos \omega_{IF}t-j \sin \omega_{IF}t)\}_{LPF} \quad (65)$$

or finally, in complex notation, our prior-to-phase-recovery estimate $\hat{\underline{b}}'(t)$ of the message CE is:

$$\hat{\underline{b}}'(t)\propto\{I^x(t)e^{-j\omega_{IF}t}\}_{LPF} \quad (66)$$

Finally, phase recovery is performed $\hat{\underline{b}}'(t)=\hat{\underline{b}}'(t)e^{-j\hat{\phi}}$. The derotation phase estimate $\hat{\phi}$ comprises the pilot phase contribution (in the E2 case) as well as other phase contributions.

We next specialize these results to the E1 embodiment.

Analysis of Performance of E1+Asymmetric (Non-Hermitian) Optical Filtering

The generic results, apply here. It remains to specifically evaluate $|\underline{r}_p(t)|^2$ and $I^x(t)\equiv 2 \text{ Re}\{\underline{r}_b(t)\underline{r}_p^*(t)\}$ in this E1 case.

The E1 RF pilot is $$p(t) = \frac{1}{\sqrt{2}}p_o,$$

thus optical pilot CE at the E-O MOD output, is given by, $$\underline{m}_p(t) = p(t)a_ce^{j\phi_c(t)}|_{p(t)=p_0} = \frac{1}{\sqrt{2}}p_o a_c e^{j\phi_c(t)} \propto p_o e^{j\phi_c(t)} \quad (67)$$

As the CE of the optical pilot at the E-O MOD is a baseband narrowband signal, the optical signal is propagated via the optical link using the frequency-flat approximation, which amounts here to just scaling it via the DC gain of $H_{bb}(\omega)$:

$$\underline{r}_p(t)\propto p_0 e^{-j\phi_c(t)}H_{bb}(0) \quad (68)$$

Its absolute square is just a DC term, which appears in the photocurrent:

$$|\underline{r}_p(t)|^2\propto p_0^2|H_{bb}(0)|^2, F\{|\underline{r}_p(t)|^2\}\propto p_0^2|H_{bb}(0)|^2\delta(\omega). \quad (69)$$

It remains to evaluate the E1 photocurrent cross-term, which carries the useful message information, $$I^x(t)=2 \text{ Re}\{\underline{r}_b(t)\underline{r}_p^*(t)\}\propto 2 \text{ Re}\{[$$
$$\underline{b}(t)e^{j\phi_c(t)}e^{j\omega_{sc}t}H_{bb}(\omega_{sc})+$$
$$\underline{b}^*(t)e^{j\phi_c(t)}e^{-j\omega_{sc}t}H_{bb}(-\omega_{sc})][e^{j\phi_c(t)}p_0 H_{bb}(0)]^*\}\propto 2$$
$$\text{Re}\{[\underline{b}(t)e^{j\omega_{sc}t}H_{bb}(\omega_{sc})+$$
$$\underline{b}^*(t)e^{-j\omega_{sc}t}H_{bb}(-\omega_{sc})][p_0 H_{bb}(0)]^*\} \quad (70)$$

where the laser phase noise is seen to have cancelled out in the conjugate product (which subtracts the common laser phase noise of the message induced term and the pilot term). Further algebraic manipulation (using 2 $\text{Re}\{\tilde{z}\}=\tilde{z}+\tilde{z}^*$) yields, $$I^x(t)\propto p_0 2 \text{ Re}\{\underline{b}(t)e^{j\omega_{sc}t}H_{bb}(\omega_{sc})H_{bb}^*(0)+$$
$$\underline{b}^*(t)e^{-j\omega_{sc}t}H_{bb}(-\omega_{sc})H_{bb}^*(0)\}\propto p_0$$
$$\underline{b}(t)e^{j\omega_{sc}t}H_{bb}(\omega_{sc})H_{bb}^*(0)+p_0$$

$\underline{b}^*(t)e^{-j\omega_{sc}t}H_{bb}(\omega_{sc})H_{bb}(0)+p_0$ $\underline{b}^*(t)e^{-j\omega_{sc}t}H_{bb}(-\omega_{sc})H_{bb}^*(0)+p_0$ $\underline{b}^*(t)e^{-j\omega_{sc}t}H_{bb}^*(-\omega_{sc})H_{bb}(0)$ (71)

or $I^x(t) \propto$
$\underline{b}(t)e^{j\omega_{sc}t}p_0[H_{bb}(\omega_{sc})H_{bb}^*(0)+H_{bb}^*(-\omega_{sc})H_{bb}(0)]+$
$\underline{b}^*(t)e^{-j\omega_{sc}t}p_0[H_{bb}(-\omega_{sc})H_{bb}^*(0)H_{bb}^*(\omega_{sc})H_{bb}(0)]$ (72)

Defining, Hermitian and anti-Hermitian components of a complex-valued function of a real variable (such that $G(\omega)=$ He$\{G(\omega)\}+a$He$\{G(\omega)\}$ where), $He\{G(\omega)\} \equiv G^{He}(\omega) = \frac{1}{2}\{G(\omega)+G^*(-\omega)\}, aHe\{G(\omega)\} \equiv G^{aHe}(\omega) = \frac{1}{2}\{G(\omega)G^*(-\omega)\}G^{He*}(-\omega) = G^{He}(\omega),$
$G^{aHe*}(-\omega) = G^{aHe}(\omega)$ (73)

The cross-term photocurrent is finally compactly expressed as $I^x(t) \propto 2He\{H_{bb}(\omega_{sc})H_{bb}^*(0)\}p_0$
$\underline{b}(t)e^{j\omega_{sc}t}+2He\{H_{bb}(\omega_{sc})H_{bb}^*(0)\}p_0\underline{b}^*(t)e^{-j\omega_{sc}t}$ (74)

corresponding the spectral domain to, $F\{I^x(t)\} \propto 2He\{H_{bb}(\omega_{sc})H_{bb}^*(0)\}p_0$
$\underline{B}(\omega-\omega_{sc})+2He\{H_{bb}(-\omega_{sc})H_{bb}^*(0)\}p_0\underline{B}(\omega+\omega_{sc})$ (75)

The spectral support of the photocurrent cross-term over the positive frequencies ray is given by $[\omega_{sc}-W, \omega_{sc}+W]$. The spectral support of $|\underline{r}b(t)|^2$ and $|\underline{r}_p(t)|^2$ over the positive frequencies ray was already derived in the last section to be $[0,2W] \cup [2\omega_{sc}-2W, 2\omega_{sc}+2W]$ ($|\underline{r}_p(t)|^2$ just corresponds to a spectral delta at DC).

To have all three spectral segments $[0,2W]$, $[\omega_{sc}-W, \omega_{sc}+W]$, $[\omega_{sc}-2W, \omega_{sc}+2W]$ forming the support of the detected photocurrent be mutually disjoint requires satisfying the condition $\omega_{sc} \geq 3W$.

E.g. if $$\frac{1}{2\pi}\omega_{sc} = 2.5 \text{ GHz}$$

we may support optical transport any electrical bandpass message spectrum contained in the [2.5−0.83, 2.5−0.83] GHz spectral window (at the positive frequencies). Once the condition $\omega_{sc} \geq 3W$ is satisfied we may in principle extract, by bandpass filtering, the useful band $[\omega_{sc}-W, \omega_{sc}+W]$ containing $I^x(t)$. In practice, to accommodate the transition $W_{transition-BPF}$ of the bandpass filter we shall have to satisfy the condition $3W+W_{transition-BPF} \leq \omega_{sc}$. Once $I^x(t)$ is filtered through, we may perform electrical signal processing to extract the CE $\underline{b}(t)$ of the bandpass signal to be optically transported. Our estimate $\hat{\underline{b}}(t)$ of the message CE is obtained as per, by means of IQ electronic (analog, digital or mixed-signal) demodulation against the RF subcarrier:

$\hat{\underline{b}}(t) \propto \{I^x(t)e^{-j\omega_{sc}t}\}_{LPF} = \{[2He\{H_{bb}(\omega_{sc})H_{bb}^*(0)\}p_0$
$\underline{b}(t)e^{j\omega_{sc}t}+2He\{H_{bb}(\omega_{sc})H_{bb}^*(0)\}p_0$ $\underline{b}^*(t)e^{-j\omega_{sc}t}]e^{-j\omega_{sc}t}\}_{LPF} \propto \{2p_0He\{H_{bb}(\omega_{sc})H_{bb}^*(0)\}$
$\underline{b}(t)\}_{LPF} + \{e^{-j2\omega_{sc}t}2p_0He\{H_{bb}(-\omega)H_{bb}^*(0)\}$ $\underline{b}^*(t)\}_{LPF} \propto 2He\{H_{bb}(\omega_{sc})H_{bb}^*(0)\}p_0$ $\{\underline{b}(t)\}_{LPF} = 2He\{H_{bb}(\omega_{sc})H_{bb}^*(0)\}p_0\underline{b}(t)$ (76)

Our key result for the detected message CE estimate for the E1 embodiment is then:

$$\hat{\underline{b}}(t) \propto \underbrace{p_0 He\{H_{bb}(\omega_{sc})H_{bb}^*(0)\}}_{\tilde{g}(\omega_{sc})}\underline{b}(t) \quad (77)$$

with detection gain coefficient $\tilde{g}(\omega_{sc}) = 2He\{H_{bb}(\omega_{sc})H_{bb}^*(0)\}p_0 = [H_{bb}(\omega_{sc})H_{bb}^*(0) + H_{bb}^*(-\omega_{sc})H_{bb}(0)]p_0$ (78)

Let us evaluate this gain coefficient in order to determine whether it fades due to CD for certain configurations and/or parameters and how to maximize it. To this end, let us represent the end-to-end baseband equivalent transfer function $H_{bb}(0)$ as the cascade of the fiber dispersion (17) $H_{bb}^{CD}(\omega)=e^{-j\theta_0}e^{-j\theta_1\omega}e^{-j1/2\theta_2\omega^2}$ and a generally asymmetric optical filter (OF), $H_{bb}^{OF}(\omega)$:

$H_{bb}(\omega) = H_{bb}^{CD}(\omega)H_{bb}^{OF}(\omega) = e^{-j\theta_0}e^{-j1/2\theta_2\omega^2}H_{bb}^{OF}(\omega) =$
$e^{-j\theta_0}e^{-j\theta_1\omega}e^{-j1/2\theta_2\omega^2}[H_{bb}^{OFHe}(\omega)+H_{bb}^{OFaHe}(\omega)]$ (79)

where we introduced (anti-)Hermitian components of the optical filter frequency response, $H_{bb}^{OF}(\omega) = H_{bb}^{OFHe}(\omega)H_{bb}^{OFaHe}(\omega),$ (80)

satisfying $H_{bb}^{OFHe}(-\omega) = H_{bb}^{OFHe*}(\omega), H_{bb}^{OFaHe}(-\omega) =$
$-H_{bb}^{OFHe*}(\omega)$ (81)

The asymmetry of the OF, if present, manifests itself as having two different gains (and non-antipodal phases) at $\pm\omega_{sc}$, i.e. the $H_{bb}^{OF}(\omega)$ filter be generally non-Hermitian, thus having a non-zero anti-Hermitian component ($H_{bb}^{OFHe}(\omega) \neq 0$). In particular, at the frequencies $\pm\omega_{sc}$ and 0 (DC) (which are the transfer factors for the frequency-flat approximation) we have:

$H_{bb}(\omega_{sc}) = e^{-j\theta_0}e^{\pm j\theta_1\omega_{sc}}e^{-j1/2\theta_2\omega_{sc}^2}H_{bb}^{OF}(\pm\omega_{sc}) =$
$e^{-j\theta_0}e^{\pm j\theta_1\omega_{sc}}e^{-j1/2\theta_2\omega_{sc}^2}[H_{bb}^{OFHe}(\omega_{sc}) \pm H_{bb}^{OFaHe}(\omega_{sc})]$ $H_{bb}(\omega_{sc}) = e^{-j\theta_0}e^{-j\theta_1\omega_{sc}}e^{-1/2\theta_2\omega_{sc}^2}[H_{bb}^{OFHe}(\omega_{sc})+H_{bb}^{OFaHe}(\omega_{sc})]$ $H_{bb}(-\omega_{sc}) = e^{-j\theta_0}e^{+j\theta_1\omega_{sc}}e^{-j1/2\theta_2\omega_{sc}^2}[H_{bb}^{OFHe*}(\omega_{sc})-H_{bb}^{OFaHe*}(\omega_{sc})]$ $H_{bb}(0) = e^{-j\theta_0}[H_{bb}^{OFHe}(0)+H_{bb}^{OFaHe}(0)] =$
$e^{-j\theta_0}[|H_{bb}^{OFHe}(0)|+j|H_{bb}^{OFaHe}(0)|]$ (82)

where the last equality amounts to having $H_{bb}^{OFHe}(0)$ always be real-valued while $H_{bb}^{OFaHe}(0)$ is always purely imaginary (unless it is zero), as may be verified by setting $\omega=0$ in שגיאה! מקור ההפניה לא נמצא.

Let us now express $H_{bb}^{OFHe}(\omega_{sc})$, $H_{bb}^{OFaHe}(\omega_{sc})$, $H_{bb}^{OF}(0)$ in polar form as follows:

$H_{bb}^{OFHe}(\omega_{sc}) \equiv$
$\overline{H}e^{j\chi}, H_{bb}^{OFaHe}(\omega_{sc}) = H_A e^{j\zeta}, H_{bb}^{OF}(0) = H_0 e^{j\xi_0}$ (83)

In particular, for an US-SSB filter suppressing the lower sideband (at least at frequency $-\omega_{sc}$ under the optical carrier), such that $H_{bb}^{OF}(-\omega_{sc})=0$, we have equal Hermitian and anti-Hermitian components $H_{bb}^{OFHe}(\omega_{sc}) = \frac{1}{2}H_{bb}^{OF}(\omega_{sc}) = \overline{H}e^{j\chi}$ $H_{bb}^{OFaHe}(\omega_{sc}) = \frac{1}{2}H_{bb}^{OF}(\omega_{sc}) = \overline{H}e^{j\chi}$ $H_{bb}^{OFaHe}(\omega_{sc}) = H_{bb}^{OFHe}(\omega_{sc})$ (84)

For a LS-SSB filter we have $H_{bb}^{OF}(\omega_{sc})=0$, we have antipodal Hermitian and anti-Hermitian components $$H_{bb}^{OFHe}(\omega_{sc}) = \frac{1}{2}H_{bb}^{OF}(-\omega_{sc}) = \overline{H}e^{j\chi}$$

$$H_{bb}^{OFaHe}(\omega_{sc}) = -\frac{1}{2}H_{bb}^{OF}(-\omega_{sc}) = -\overline{H}e^{j\chi}$$

$$H_{bb}^{OFaHe}(\omega_{sc}) = -H_{bb}^{OFHe}(\omega_{sc}) \tag{85}$$

In another special case, if the optical spectrum emerges out of the optical filter as a proper optical DSB signal, then this indicates that the optical filtering is Hermitian (complex symmetric) thus the anti-Hermitian component is zero: $H_{bb}^{OFaHe}(\pm\omega_{sc})=0 \Leftrightarrow H_\Delta=0$.

Back to the general asymmetric (non-Hermitian) case, the polar expressions (83) are substituted yielding:

$$H_{bb}(\omega_{sc}) = e^{-j\theta_0}e^{-j\theta_1\omega_{sc}}e^{-j1/2\theta_2\omega_{sc}^2}[\overline{H}e^{j\chi}+H_\Delta e^{j\varsigma}]$$

$$H_{bb}(-\omega_{sc}) = e^{-j\theta_0}e^{+j\theta_1\omega_{sc}}e^{-j1/2\theta_2\omega_{sc}^2}[\overline{H}e^{-j\chi}+H_\Delta e^{-j\varsigma}]$$

$$H_{bb}(0) = e^{-j\theta_0}[H_{bb}^{OFHe}(0)+H_{bb}^{OFaHe}(0)] = e^{-j\theta_0}H_0 e^{j\xi_0} \tag{87}$$

To evaluate the detection gain (78), we need to evaluate the conjugate product $H_{bb}(\omega_{sc})H_{bb}^*(0)$ of the last two expressions for $H_{bb}(\omega_{sc}), H_{bb}(0)$ as well as the Hermitian conjugate of their conjugate product, namely $H_{bb}^*(-\omega_{sc})H_{bb}(0)$:

$$H_{bb}(\omega_{sc})H_{bb}^*(0) = \{e^{-j\theta_0}e^{-j\theta_1\omega_{sc}}e^{-j1/2\theta_2\omega_{sc}^2} \\ [\overline{H}e^{j\chi}+H_\Delta e^{j\varsigma}]\}\{e^{-j\theta_0}H_0 e^{j\xi_0}\}^* = e^{-j\theta_1\omega_{sc}}e^{-j1/2\theta_2\omega_{sc}^2} \\ [\overline{H}e^{j\chi}+H_\Delta e^{j\varsigma}]H_0 e^{-j\xi_0} = e^{-j\theta_1\omega_{sc}}e^{-j(\xi_0+1/2\theta_2\omega_{sc}^2)} \\ [\overline{H}e^{j\chi}+H_\Delta e^{j\varsigma}]H_0 e^{-j\xi_0}$$

$$H_{bb}^*(-\omega_{sc})H_{bb}(0) = \{e^{-j\theta_0}e^{+j\theta_1\omega_{sc}}e^{-j1/2\theta_2\omega_{sc}^2} \\ [\overline{H}e^{j\chi}-H_\Delta e^{j\varsigma}]\}\{e^{-j\theta_0}H_0 e^{j\xi_0}\}^* = e^{-j\theta_1\omega_{sc}}e^{j1/2\theta_2\omega_{sc}^2} \\ [\overline{H}e^{j\chi}-H_\Delta e^{j\varsigma}]H_0 e^{j\xi_0} = e^{-j\theta_1\omega_{sc}}e^{j(\xi_0+1/2\theta_2\omega_{sc}^2)} \\ [\overline{H}e^{j\chi}-H_\Delta e^{j\varsigma}]H_0 \tag{88}$$

Note that the constant end-to-end phase terms $e^{\pm j\theta_0}$ associated with the optical path, have cancelled out in the conjugate products.

The complex detection gain factor for the complex envelope estimation is then expressed (in the most general asymmetric optical filtering case) in terms of the sum of the last two equations:

$$\tilde{g}(\omega_{sc}) = 2He\{H_{bb}(\omega_{sc})H_{bb}^*(0)\}p_0 \tag{89}$$

$$= p_0[H_{bb}(\omega_{sc})H_{bb}^*(0) + H_{bb}^*(-\omega_{sc})H_{bb}(0)]$$

$$= e^{-j\theta_1\omega_{sc}}e^{-j(\xi_0+\frac{1}{2}\theta_2\omega_{sc}^2)}p_0[\overline{H}e^{j\chi}+H_\Delta e^{j\varsigma}]$$

$$\overline{H}_0 + e^{-j\theta_1\omega_{sc}}e^{j(\xi_0+\frac{1}{2}\theta_2\omega_{sc}^2)}p_0[\overline{H}e^{j\chi}-H_\Delta e^{j\varsigma}]\overline{H}_0$$

$$= e^{-j\theta_1\omega_{sc}}p_0\overline{H}_0$$

$$\left\{\begin{array}{l} [\overline{H}e^{j\chi} + H_\Delta e^{j\varsigma}]e^{-j(\xi_0+\frac{1}{2}\theta_2\omega_{sc}^2)} + \\ [\overline{H}e^{j\chi} - H_\Delta e^{j\varsigma}]e^{j(\xi_0+\frac{1}{2}\theta_2\omega_{sc}^2)} \end{array}\right\}$$

$$= e^{-j\theta_1\omega_{sc}}p_0\overline{H}_0\{\overline{H}e^{0j\chi}e^{-j(\xi_0+\frac{1}{2}\theta_2\omega_{sc}^2)} + H_\Delta e^{j\varsigma}e^{-j(\xi_0+\frac{1}{2}\theta_2\omega_{sc}^2)} +$$

$$He^{j\chi}e^{j(\xi_0+\frac{1}{2}\theta_2\omega_{sc}^2)} - H_\Delta e^{j\varsigma}e^{j(\xi_0+\frac{1}{2}\theta_2\omega_{sc}^2)}\}$$

$$= e^{-j\theta_1\omega_{sc}}p_0\overline{H}_0\{\overline{H}e^{j\chi}\left[e^{j(\xi_0+\frac{1}{2}\theta_2\omega_{sc}^2)} + e^{-j(\xi_0+\frac{1}{2}\theta_2\omega_{sc}^2)}\right] -$$

$$H_\Delta e^{j\varsigma}\left[e^{j(\xi_0+\frac{1}{2}\theta_2\omega_{sc}^2)} - e^{-j(\xi_0+\frac{1}{2}\theta_2\omega_{sc}^2)}\right]\}$$

Thus, finally:

$$g(\omega_{sc}) = e^{-j\theta_1\omega_{sc}}2p_0\overline{H}_0\{\overline{H}e^{j\chi}\cos(\xi_0+\frac{1}{2}\theta_2\omega_{sc}^2) - jH_\Delta e^{j\varsigma}$$

$$\sin(\xi_0+\frac{1}{2}\theta_2\omega_{sc}^2)\} \tag{90}$$

The squared modulus of the gain coefficient is evaluated as follows (using $$|\tilde{A} - j\tilde{B}| = |\tilde{A}|^2 + |\tilde{B}|^2 - 2\text{Re}\{\tilde{A}(j\tilde{B})^*\} = |\tilde{A}|^2 + |\tilde{B}|^2 - 2\text{Im}\{\tilde{A}\tilde{B}^*\}): \tag{91}$$

$$|\tilde{g}(\omega_{sc})|^2 = 4p_0^2\overline{H}_0^2\{\overline{H}^2\cos^2(\xi_0 + \frac{1}{2}\theta_2\omega_{sc}^2) + H_\Delta^2\sin^2(\xi_0 + \frac{1}{2}\theta_2\omega_{sc}^2) -$$

$$2\text{Im}\left[\overline{H}e^{j\chi}\cos(\xi_0 + \frac{1}{2}\theta_2\omega_{sc}^2)H_\Delta e^{-j\varsigma}\sin(\xi_0 + \frac{1}{2}\theta_2\omega_{sc}^2)\right]\} =$$

$$4p_0^2\overline{H}_0^2\{\overline{H}^2\cos^2(\xi_0 + \frac{1}{2}\theta_2\omega_{sc}^2) + H_\Delta^2\sin^2(\xi_0 + \frac{1}{2}\theta_2\omega_{sc}^2) - \overline{H}H_\Delta 2$$

$$\cos(\xi_0 + \frac{1}{2}\theta_2\omega_{sc}^2)\sin(\xi_0 + \frac{1}{2}\theta_2\omega_{sc}^2)\sin(\chi - \varsigma)\} = 4p_0^2\overline{H}_0^2$$

$$\{\overline{H}^2\frac{1}{2}[1 + \cos(2\xi_0 + \theta_2\omega_{sc}^2)] + \frac{1}{2}H_\Delta^2[1 - \cos(2\xi_0 + \theta_2\omega_{sc}^2)] +$$

$$\overline{H}H_\Delta\sin(2\xi_0 + \theta_2\omega_{sc}^2)\sin(\chi - \varsigma)\} = 2p_0^2\overline{H}_0^2$$

$$\{\overline{H}^2[1 + \cos(2\xi_0 + \theta_2\omega_{sc}^2)] + H_\Delta^2[1 - \cos(2\xi_0 + \theta_2\omega_{sc}^2)] +$$

$$2\overline{H}H_\Delta\sin(2\xi_0 + \theta_2\omega_{sc}^2)\sin(\chi - \varsigma)\}$$

or finally $$|\tilde{g}(\omega_{sc})|^2 = 2p_0^2\overline{H}_0^2\{(\overline{H}^2 \pm H_\Delta^2) + (\overline{H}^2 - H_\Delta^2)\cos(2\xi_0+\theta_2\omega_{sc}^2) + 2\overline{H}H_\Delta \sin(2\xi_0 + \theta_2\omega_{sc}^2)\sin(\chi-\varsigma)\} \tag{92}$$

In the most general generic non-Hermitian (asymmetric) filtering case it is useful to parameterize the Hermitian and anti-Hermitian component moduli as $$\overline{H}=\cos\kappa, H_\Delta=\sin\kappa, \tag{93}$$

which amounts to assuming that $\overline{H}^2+H_\Delta^2=1$ (as the sum $\overline{H}^2+H_\Delta^2$ represents the total power at the OF output when an optical DSB signal with equal power spectral lines at $\pm\omega_{sc}$ is incident upon the OF, thus the condition $\overline{H}^2+H_\Delta^2=1$ normalizes the output power, were it not for dispersion). In the Hermitian filter (DSB-preserving) special case, we then have $\kappa_{DSB}=0 \Leftrightarrow \overline{H}=1, H_\Delta=0$.

In the special case of SSB-generating filter fed by DSB (blocking either the lower or upper sideband), we have $$H_{bb}^{OFaHe}(\omega_{sc}) = \pm H_{bb}^{OFHe}(\omega_{sc}). \tag{94}$$

Thus, $$\overline{H}=|H_{bb}^{OFaHe}(\omega_{sc})|\pm|H_{bb}^{OFHe}(\omega_{sc})|=H_\Delta \Leftrightarrow \kappa_{SSB}=\pm\pi/7 \tag{95}$$

As $|\kappa|$ monotonically increases from 0 to $\pi/4$, the optical filter output, upon being fed by DSB, evolves from DSB to SSB (going via asymmetric sideband states which we may call Vestigial Sideband Modulation (VSB)).

Back to the most general asymmetric filtering case (92), substituting the parameterization (93) $\overline{H}=\cos K, H_\Delta=\sin\kappa$ into it yields for the absolute square of the detection gain coefficient:

$$|\tilde{g}(\omega_{sc})|^2 = \tag{96}$$

$$2p_0^2\overline{H}_0^2\{(\cos^2\kappa + \sin^2\kappa) + (\cos^2\kappa - \sin^2\kappa)\cos(2\chi_0 + \theta_2\omega_{sc}^2)2\cos$$

$$\kappa\sin\kappa\sin(2\xi_0 + \theta_2\omega_{sc}^2)\sin(\chi - \varsigma)\} =$$

$$2p_0^2\overline{H}_0^2\{1 + \cos2\kappa\cos(2\xi_0 + \theta_2\omega_{sc}^2) +$$

$$\sin2\kappa\sin(2\xi_0 + \theta_2\omega_{sc}^2)\sin(\chi - \varsigma)\} =$$

$$2p_0^2\overline{H}_0^2\{1 + \cos2\kappa\cos(2\xi_0 + \theta_2\omega_{sc}^2) + \sin2\kappa\sin(2\xi_0 + \theta_2\omega_{sc}^2) +$$

-continued $$\sin 2\kappa \sin(2\xi_0 + \theta_2\omega_{sc}^2)[\sin(\chi - \varsigma) - 1]\} =$$

$$2p_0^2 \overline{H}_0^2\{1 + \cos(\theta_2\omega_{sc}^2 + 2\xi_0 - 2\kappa) +$$

$$\sin 2\kappa \sin(\theta_2\omega_{sc}^2 + 2\xi_0)[\sin(\chi - \varsigma) - 1]\}$$

or finally $$|\tilde{g}(\omega_{sc})|^2 = 2p_0^2\overline{H}_0^2\{1+\cos(\theta_2\omega_{sc}^2+2\xi_0-2\kappa)+\sin 2\kappa \sin(\theta_2\omega_{sc}^2+2\xi_0)[\sin(\chi-\varsigma)-1]\} \quad (97)$$

As special cases, we recall that $\kappa_{DSB}=0$, $\kappa_{SSB}\pm\pi/4$ (for $0<|\kappa|<\pi/4$ we have VSB).

It follows that $$|\tilde{g}^{DSB}(\omega_{sc})|^2 = 2p_0^2\overline{H}_0^2\{1+\cos(\theta_2\omega_{sc}^2+2\xi_0)\} \quad (98)$$

$$|\tilde{g}^{SSA}(\omega_{sc})|^2 = 2p_0^2\overline{H}_0^2\{1+\cos(\theta_2\omega_{sc}^2+2\xi_0\pm\pi/2)\pm\sin \pi/2 \sin(\theta_2\omega_{sc}^2+2\xi_0)[\sin(\chi-\varsigma)-1]\} = 2p_0^2$$
$$\overline{H}_0^2\{1\pm\sin(\theta_2\omega_{sc}^2+2\xi_0)\pm\sin(\theta_2\omega_{sc}^2+2\xi_0)[\sin(\chi-\varsigma)-1]\}$$

Real-Valued (or Linear Phase) Optical Filter

In the particular case that $\chi=\zeta=\chi_o$, i.e., if the OF is real-valued (or it has linear phase), then $\sin(\chi-\zeta)=0$, yielding $$|\tilde{g}^{SSB}(\omega_{sc})|^2 = 2p_0^2$$
$$\overline{H}_0^2\{1\pm\sin(\theta_2\omega_{sc}^2)\pm\sin(\theta_2\omega_{sc}^2)[-1]\} = 2\overline{H}_0^2 \quad (99)$$

Note: More generally $\sin(\chi-\zeta)=0$ whenever $\chi=\zeta$, but this is not a typical case.

Thus, the gain is independent of frequency in this case—there is no chromatic dispersion frequency dependent impairment in this SSB case!

Still considering the particular real-valued (or linear phase) OF $\chi=\zeta=\xi_0=0$, but for general $0<|\kappa|<\pi/4$, namely the VSB case, then we obtain $$|\tilde{g}^{VSB}(\omega_{sc})|^2 = 2p_0^2\overline{H}_0^2\{1+\cos(\theta_2\omega_{sc}^2-2\kappa)-\sin 2\kappa \sin(\theta_2\omega_{sc}^2)\} = 2p_0^2\overline{H}_0^2\{1+\cos 2\kappa \cos(\theta_2\omega_{sc}^2)+\sin 2\kappa \sin(\theta_2\omega_{sc}^2)-\sin 2\kappa \sin(\theta_2\omega_{sc}^2)\} \quad (100)$$

or finally, $$|\tilde{g}^{VSB}(\omega_{sc})|^2 = 2p_0^2\overline{H}_0^2\{1+\cos 2\kappa \cos(\theta_2\omega_{sc}^2)\} \quad (101)$$

It is possible to verify the last result by directly substituting the zero-phase or linear phase frequency response filter condition $x=S=0$ into the conjugate product expressions (88):

$$H_{bb}(\omega_{sc})H_{bb}^*(0) = e^{-j\theta_1\omega_{sc}}e^{-j1/2\theta_2\omega_{sc}^2}$$
$$[\overline{H}e^{j\chi}+H_\Delta e^{j\zeta}]H_0 e^{-j\xi_0}|_{\chi=\zeta=\xi_0=0} = e^{-j\theta_1\omega_{sc}}e^{-j1/2\theta_2\omega_{sc}^2}$$
$$[\overline{H}+H_\Delta]H_0$$

$$H_{bb}^*(-\omega_{sc})H_{bb}(0) = e^{-j\theta_1\omega_{sc}}e^{j1/2\theta_2\omega_{sc}^2}$$
$$[\overline{H}e^{j\chi}-H_\Delta e^{j\zeta}]H_0 e^{-j\xi_0}|_{\chi=\zeta=\xi_0=0} = e^{-j\theta_1\omega_{sc}}e^{j1/2\theta_2\omega_{sc}^2}$$
$$[\overline{H}-H_\Delta]H_0 \quad (102)$$

Summing up the two terms yields twice the Hermitian part of $[\overline{H}+H_\Delta]H_0$:

$$2\text{He}\{H_{bb}(\omega_{sc})H_{bb}^*(0)\} = H_{bb}(\omega_{sc})H_{bb}^*(0)+H_{bb}^*(-\omega_{sc})H_{bb}(0)e^{-j\theta_1\omega_{sc}}e^{-1/2\theta_2\omega_{sc}^2}$$
$$[\overline{H}+H_\Delta]H_0+e^{-j\theta_1\omega_{sc}}e^{j1/2\theta_2\omega_{sc}^2}$$
$$[\overline{H}-H_\Delta]H_0 = e^{-j\theta_1\omega_{sc}}H_0\{e^{-j1/2\theta_2\omega_{sc}^2}$$
$$[\overline{H}+H_\Delta]+e^{j1/2\theta_2\omega_{sc}^2}[\overline{H}-H_\Delta]\} \quad (49)$$

The detection gain coefficient is then $$\tilde{g}=(\omega_{sc})=2\text{He}\{H_{bb}(\omega_{sc})H_{bb}^*(0)\}p_0 = e^{-j\theta_1\omega_{sc}}p_0 H_0$$
$$\{e^{-j1/2\theta_2\omega_{sc}^2}[\overline{H}+H_\Delta]+e^{j1/2\theta_2\omega_{sc}^2}[\overline{H}-H_\Delta]\} \quad (103)$$

and its absolute square is $$|\tilde{g}(\omega_{sc})|^2 = p_0^2\overline{H}_0^2\{(\overline{H}+H_\Delta)^2+$$
$$(\overline{H}-H_\Delta)^2+2\text{Re}\{[e^{j1/2\theta_2\omega_{sc}^2}(\overline{H}-H_\Delta)][e^{-j1/2\theta_2\omega_{sc}^2}$$
$$(\overline{H}+H_\Delta)]^*\}\} = 2p_0^2\overline{H}_0^2\{(\overline{H}^2+H_\Delta^2)+$$
$$(\overline{H}^2-H_\Delta^2)\text{Re}\{e^{j\theta_2\omega_{sc}^2}\}\} = p_0^2\overline{H}_0^2\{\cos \kappa \sin \kappa+(\cos^2\kappa-\sin^2\kappa)\cos(\theta_2\omega_{sc}^2)\} = 2p_0^2$$

$$\overline{H}_0^2\{\cos^2\kappa+\sin^2\kappa+\cos 2\kappa \cos(\theta_2\omega_{sc}^2)\} = 2p_0^2$$
$$\overline{H}_0^2\{1+\cos 2\kappa \cos(\theta_2\omega_{sc}^2)\} \quad (104)$$

Now that we have verified שגיאה! מקור ההפניה לא נמצא, repeated here $|\tilde{g}(\omega_{SC})|^2=2p_0^2\overline{H}_0^2\{1+\cos 2\kappa \cos(\theta_2\omega_{sc}^2)\}$ let's explore its implications. For $0<|\kappa|<\pi/4$, as we have $|\cos 2\kappa|<1$, it is apparent that the gain never fades (it remains positive over all frequencies, even when $\cos 2\kappa$), though there is still frequency dependence. It is apparent that some degree of asymmetric filtering may suffice to make sure that the chromatic effect dispersion is mitigated even when the subcarrier frequency $\omega_{sc}$ is very high, and/or the fiber link length L, is very large (large $\theta_2\omega_{sc}^2=\beta_2 L\omega_{sc}^2$, approaching $\pi$, such that $\cos(\theta_2\omega_{sc}^1)\to -1$ thus the DSB signal (98) would vanish $$|\tilde{g}^{DSB}(\omega_{sc})|^2 \propto 2p_0^2\overline{H}_0^2\{1+\cos(\theta_2\omega_{sc}^2+2\xi_0)\}|_{\xi_0=0}=2p_0^2$$
$$\overline{H}_0^2\{1+\cos(\theta_2\omega_{sc}^2)\}\to 2p_0^2\overline{H}_0^2\{1+(-1)\}=0 \quad (105)$$

The higher the degree of asymmetric filtering the higher the gain is going to be, at the worst subcarrier frequency value, $\beta_2 L\omega_{sc}^2=\pi$, where $\cos(\theta_2\omega_{sc}^2)=-1$, as at that point שגיאה! מקור ההפניה לא נמצא. reduces to $$|\tilde{g}^{VSB}(\omega_{sc})|^2 \propto 2p_0^2\overline{H}_0^2\{1+\cos 2\kappa \cos(\theta_2\omega_{sc}^2)\}|_{\theta_2\omega_{sc}^2=\pi} = \quad (106)$$
$$2p_0^2\overline{H}_0^2\{1+\cos 2\kappa \cos(-1)\} = \frac{1}{2}\overline{H}_0^2\{1-\cos 2\kappa\} = 2p_0^2\overline{H}_0^2\sin^2\kappa$$

and evidently the worst-case detection gain improves with raising $\kappa$ (i.e. going to more pronounced asymmetric filtering).

An interesting point that the asymmetric filtering (the generation of VSB or SSB) need not be performed with an actual optical filter. Even in the absence of optical filtering, we may still generate VSB or SSB with an IQ modulator, as explained further below. In this case the generally asymmetric filter denoted $H_{bb}^{OF}(\omega)$ is a virtual filter, representing a fictitious DSB input optical signal being filtered to generate a VSB or SSB optical signal, just like the one actually generated by the IQ modulator.

To recap, the embodiment E1 analyzed above, was shown to be robust even in the wake of asymmetric optical filtering or imperfect DSB generation. Moreover, in certain cases when the amount of chromatic dispersion at the subcarrier frequency is large, we may elect to intentionally apply asymmetric filtering. The literature indicated that SSB format is robust to chromatic dispersion, but this analysis shows that in the case of bandpass RF optical transport, even in the case that the SSB is not perfect (it is rather VSB with some residual unsuppressed upper or lower sideband) then the system still functions quite well. Moreover, even a modest amount of suppression of one of the sidebands (i.e. a VSB configuration) suffices to make the system robust to CD at all subcarrier frequency values, even large ones whereat a DSB system would be in complete or deep fading.

Actually, intentional SSB or VSB modulation along with an optical pilot just at the optical carrier (i.e. adding DC as RF pilot, as practiced in the E1 embodiment) should no longer be qualified as the E1 embodiment but should rather be called embodiment E3.

E2: Analysis of Performance of E2+Asymmetric (Non-Hermitian) Optical Filtering

We now analyze the robustness of the E2 embodiment to asymmetric optical filtering, carrying out an analytical derivation paralleling the one carried out for E1 above. In the current E2 case, the pilot consists of a sinusoidal RF tone at angular frequency $\omega_p$ applied to the linear E-O MOD (33), repeated here:

$$p(t) = \sqrt{2}\, p_o \cos(\omega_p t + \phi_p) = \frac{1}{\sqrt{2}} p_o e^{j\phi_p} e^{j\omega_p t} + \frac{1}{\sqrt{2}} p_o e^{-j\phi_p} e^{-j\omega_p t} \propto p_o e^{j\phi_p} e^{j\omega_p t} + p_o e^{-j\phi_p} e^{-j\omega_p t}. \quad (107)$$

Propagating the message induced E-O MOD output (47), repeated here, $$m_b(t) \equiv b(t) a_c e^{j\phi_c(t)} \propto \underline{b}(t) e^{j\phi_c(t)} e^{j\omega_{sc} t} + \underline{b}^*(t) e^{j\phi_c(t)} e^{-j\omega_{sc} t} \quad (108)$$

through the end-to-end transfer function for the, under the frequency flat approximat $H_{bb}(\omega)$ narrowband passband signals, yields at the optical system output, $$\underline{r}_b(t) = \underline{b}(t) e^{j\phi_c(t)} e^{j\omega_{sc} t} H_{bb}(\omega_{sc}) + \underline{b}^*(t) e^{j\phi_c(t)} e^{-j\omega_{sc} t} H_{bb}(-\omega_{sc}) \quad (109)$$

The pilot RF tone (107) at E-O MOD output propagates via the transfer function $H_{bb}(\omega)$ to the optical link output according to the frequency-flat approximation, yielding the following pilot-induced component:

$$\underline{r}_p(t) = e^{j\phi_c(t)} p_o e^{j\phi_p} e^{j\omega_p t} H_{bb}(\omega_p) + e^{j\phi_c(t)} p_o e^{-j\phi_p} e^{-j\omega_p t} H_{bb}(-\omega_p) \quad (110)$$

The total optical field at the far end of the optical link is given by the sum $\underline{r}(t) = \underline{r}_b(t) + \underline{r}_p(t)$ of these two components, respectively associated with the bandpass message and with the pilot tone. The optical receiver is essentially a direct-detection one—a photodiode followed by amplification (e.g., a trans-impedance amplifier).

The generic results (61), (63), (64) repeated here, apply:

$$I(t) \propto |\underline{r}(t)|^2 = |\underline{r}_b(t) + \underline{r}_p(t)|^2 = |\underline{r}_b(t)|^2 + |\underline{r}_p(t)|^2 + \underbrace{2\mathrm{Re}\{\underline{r}_b(t)\underline{r}_p^*(t)\}}_{I^\times(t)} \quad (111)$$

where the message-induced additive term in the photocurrent and its Fourier Transform were seen to be given by:

$$|\underline{r}_b(t)|^2 = |\underline{b}(t)|^2 [|H_{bb}(\omega_{sc})|^2 + |H_{bb}(-\omega_{sc})|^2] +$$
$$|\underline{b}(t)|^2 e^{j2\omega_{sc}t} H_{bb}(\omega_{sc}) H_{bb}^*(-\omega_{sc}) +$$
$$|\underline{b}(t)|^2 e^{-j2\omega_{sc}t} H_{bb}^*(\omega_{sc}) H_{bb}(-\omega_{sc}) \quad (112)$$

$$F\{|\underline{r}_b(t)|^2\} = [|H_{bb}(\omega_{sc})|^2 + |H_{bb}(-\omega_{sc})|^2](\underline{B} \otimes \underline{B})(\omega) + H_{bb}(\omega_{sc}) H_{bb}^*(-\omega_{sc})(\underline{B} \otimes \underline{B})(\omega - 2\omega_{sc}) + H_{bb}^*(\omega_{sc}) H_{bb}(-\omega_{sc})(\underline{B} \otimes \underline{B})(\omega - 2\omega_{sc}) \quad (113)$$

It remains to specifically evaluate the last two terms $|\underline{r}_p(t)|^2$ and $I^\times(t) = 2\,\mathrm{Re}\{\underline{r}_b(t)\underline{r}_p^*(t)\}$ in this E2 case, using (109) and (110) for $\underline{r}_b(t)$, $\underline{r}_p(t)$ respectively. The squared pilot photocurrent term is evaluated as follows:

$$|\underline{r}_p(t)|^2 = \quad (114)$$
$$|e^{j\phi_c(t)} p_o e^{j\phi_p} e^{j\omega_p t} H_{bb}(\omega_p) + e^{j\phi_c(t)} p_o e^{-j\phi_p} e^{-j\omega_p t} H_{bb}(-\omega_p)|^2 =$$

-continued
$$p_o^2 |e^{j\phi_p} e^{j\omega_p t} H_{bb}(\omega_p) + e^{-j\phi_p} e^{-j\omega_p t} H_{bb}(-\omega_p)|^2 =$$
$$p_o^2 \{|e^{j\phi_p} e^{j\omega_p t} H_{bb}(\omega_p)|^2 + |e^{-j\phi_p} e^{-j\omega_p t} H_{bb}(-\omega_p)|^2 +$$
$$2\mathrm{Re}\{[e^{j\phi_p} e^{j\omega_p t} H_{bb}(\omega_p)][e^{-j\phi_p} e^{-j\omega_p t} H_{bb}(-\omega_p)]^*\}\} =$$
$$p_o^2 \{|H_{bb}(\omega_p)|^2 + |H_{bb}(-\omega_p)|^2 + 2\mathrm{Re}$$
$$\{[e^{j\phi_p} e^{j\omega_p t} H_{bb}(\omega_p)][e^{-j\phi_p} e^{-j\omega_p t} H_{bb}(-\omega_p)]^*\}\} =$$
$$p_o^2 \{|H_{bb}(\omega_p)|^2 + |H_{bb}(-\omega_p)|^2 +$$
$$2\mathrm{Re}\{e^{-j(2\omega_p t + 2\phi_p)} H_{bb}(\omega_p) H_{bb}^*(-\omega_p)\}\}$$

Its spectrum consists of impulses (spectral lines) at DC and at $\pm 2\omega_p$. Next, we evaluate the cross-term in the photocurrent (it is this term that carries the useful bandpass info):

$$I^\times(t) = 2\mathrm{Re}\{\underline{r}_b(t)\underline{r}_p^*(t)\} = 2\mathrm{Re} \quad (115)$$
$$\left\{ \begin{array}{l} [\underline{b}(t) e^{j\phi_c(t)} e^{j\omega_{sc}t} H_{bb}(\omega_{sc}) + \underline{b}^*(t) e^{j\phi_c(t)} e^{-j\omega_{sc}t} H_{bb}(-\omega_{sc})] \\ {[e^{j\phi_c(t)} p_o e^{j\phi_p} e^{j\omega_p t} H_{bb}(\omega_p) + e^{j\phi_c(t)} p_o e^{-j\phi_p} e^{-j\omega_p t} H_{bb}(-\omega_p)]^*} \end{array} \right\} =$$
$$2p_o \mathrm{Re}\left\{ \begin{array}{l} [\underline{b}(t) e^{j\omega_{sc}t} H_{bb}(\omega_{sc}) + \underline{b}^*(t) e^{-j\omega_{sc}t} H_{bb}(-\omega_{sc})] \\ {[e^{-j\phi_p} e^{-j\omega_p t} H_{bb}^*(\omega_p) + e^{j\phi_p} e^{j\omega_p t} H_{bb}^*(-\omega_p)]} \end{array} \right\} =$$
$$2p_o \mathrm{Re}\{[\underline{b}(t) e^{j\omega_{sc}t} H_{bb}(\omega_{sc})][e^{-j\phi_p} e^{-j\omega_p t} H_{bb}^*(\omega_p)]\} +$$
$$2p_o^2 \mathrm{Re}\{[\underline{b}(t) e^{j\omega_{sc}t} H_{bb}(\omega_{sc})][e^{j\phi_p} e^{j\omega_p t} H_{bb}^*(-\omega_p)]\} +$$
$$2p_o^2 \mathrm{Re}\{[\underline{b}^*(t) e^{-j\omega_{sc}t} H_{bb}(-\omega_{sc})][e^{-j\phi_p} e^{-j\omega_p t} H_{bb}^*(\omega_p)]\} +$$
$$2p_o^2 \mathrm{Re}\{[\underline{b}^*(t) e^{-j\omega_{sc}t} H_{bb}(-\omega_{sc})][e^{j\phi_p} e^{j\omega_p t} H_{bb}^*(-\omega_p)]\} =$$
$$2p_o \mathrm{Re}\{\underline{b}(t) e^{j(\omega_{sc}-\omega_p)t} e^{-j\phi_p} H_{bb}(\omega_{sc}) H_{bb}^*(\omega_p)\} +$$
$$2p_o^2 \mathrm{Re}\{\underline{b}(t) e^{j(\omega_{sc}+\omega_p)t} e^{j\phi_p} H_{bb}(\omega_{sc}) H_{bb}^*(-\omega_p)\} +$$
$$2p_o \mathrm{Re}\{\underline{b}^*(t) e^{-j(\omega_{sc}+\omega_p)t} e^{-j\phi_p} H_{bb}(-\omega_{sc}) H_{bb}^*(\omega_p)\} +$$
$$2p_o^2 \mathrm{Re}\{\underline{b}^*(t) e^{-j(\omega_{sc}-\omega_p)t} e^{j\phi_p} H_{bb}(-\omega_{sc}) H_{bb}^*(-\omega_p)\} =$$
$$2p_o \mathrm{Re}\{\underline{b}(t) e^{j(\omega_{sc}-\omega_p)t} e^{-j\phi_p} H_{bb}(\omega_{sc}) H_{bb}^*(\omega_p)\} +$$
$$2p_o^2 \mathrm{Re}\{\underline{b}(t) e^{j(\omega_{sc}+\omega_p)t} e^{j\phi_p} H_{bb}(\omega_{sc}) H_{bb}^*(-\omega_p)\} +$$
$$2p_o \mathrm{Re}\{\underline{b}(t) e^{j(\omega_{sc}+\omega_p)t} e^{j\phi_p} H_{bb}^*(-\omega_{sc}) H_{bb}(\omega_p)\} +$$
$$2p_o^2 \mathrm{Re}\{\underline{b}(t) e^{j(\omega_{sc}-\omega_p)t} e^{-j\phi_p} H_{bb}^*(-\omega_{sc}) H_{bb}(-\omega_p)\} =$$
$$2p_o \mathrm{Re}\{\underline{b}(t) e^{j(\omega_{sc}-\omega_p)t}$$
$$e^{-j\phi_p} [H_{bb}(\omega_{sc}) H_{bb}^*(\omega_p) + H_{bb}^*(-\omega_{sc}) H_{bb}(-\omega_p)]\}$$

or finally the cross-term photocurrent is given by
$$I^\times(t) = 4p_o \,\mathrm{Re}\{\underline{b}(t)$$
$$e^{j(\omega_{sc}+\omega_p)t} e^{j\phi_p} He[H_{bb}(\omega_{sc}) H_{bb}^*(-\omega_p)]\} +$$
$$4p_o \,\mathrm{Re}\{\underline{b}(t) e^{j(\omega_{sc}-\omega_p)t} e^{-j\phi_p} He[H_{bb}(\omega_{sc}) H_{bb}^*(\omega_p)]\} \quad (116)$$

with spectral support $[\omega_{sc}-\omega_p-W, \omega_{sc}-\omega_p+W] \cup [\omega_{sc}+\omega_p-W, \omega_{sc}+\omega_p+W]$, i.e., the baseband CE of the message, with support $[-W,W]$, is up-converted to $\omega_{sc}-\omega_p$ and to $\omega_{sc}+\omega_p$. The total photocurrent $$I(t) \propto |\underline{r}_b(t)|^2 + |\underline{r}_p(t)|^2 + \underbrace{2\mathrm{Re}\{\underline{r}_b(t)\underline{r}_p^*(t)\}}_{I^\times(t)}$$

is then explicitly given by:
$$I(t) \propto [|\underline{b}(t)|^2 + p_o^2][|H_{bb}(\omega_p)|^2 + |H_{bb}(-\omega_p)|^2] +$$
$$2|\underline{b}(t)|^2 \mathrm{Re}\{e^{j2\omega_{sc}t} H_{bb}(\omega_{sc}) H_{bb}^*(-\omega_{sc})\} +$$

$2p_o^2 \text{Re}\{e^{-j2\omega_p t}e^{-j2\phi_p}H_{bb}(\omega_p)H_{bb}^*(-\omega_p)\}+$
$4p_o\text{Re}\{\underline{b}(t)e^{j(2\omega_p+\omega_{IF})t}e^{j4\phi_p}He[H_{bb}(\omega_{sc})H_{bb}^*$
$(-\omega_p)]\}+4p_o\text{Re}\{\underline{b}(t)e^{j\omega_{IF}t}e^{-j\phi_p}He$
$[H_{bb}(\omega_{sc})H_{bb}^*(\omega_p)]\}$ (117)

with $\omega_{IF} \equiv \omega_{sc}-\omega_p \Leftrightarrow 2\omega_p \pm 2\omega_p + \omega_{IF} = \omega_{SC}+\omega_p$ $He[H_{bb}(\omega_{sc})H_{bb}^*(-\omega_p)] \equiv H_{bb}(\omega_{sc})H_{bb}^*(-\omega_p)+H_{bb}^*$
$(-\omega_{sc})H_{bb}(\omega_p)$ $2He[H_{bb}(\omega_{sc})H_{bb}^*(\omega_p)] \equiv H_{bb}(\omega_{sc})H_{bb}^*(\omega_p) \pm H_{bb}^*$
$(-\omega_{sc})H_{bb}(-\omega_p)$ (118)

The terms in the first two lines in ההפניה לא נמצא שגיאה! מקור. are $|\underline{r}_b(t)|^2+|\underline{r}_p(t)|^2$, which have spectral support $[-2W,2W]\cup[2\omega_{sc}-2W,2\omega_{sc}+2W]\cup\{2\omega_p\}$. (119)

The term in the last line in שגיאה! מקור ההפניה לא נמצא. is $I^x(t)$, with spectral support $[\omega_{sc}-\omega_p-W,\omega_{sc}-\omega_p+W]\cup[\omega_{sc}+\omega_p-W,\omega_{sc}+\omega_p+W]$ (120)

At this point please refer to subsection [Spectral structure of the photocurrent in the E2 embodiment]. The spectral supports developed there in FIG. 4 still apply to the current asymmetric filtering case, though the spectra are evidently now asymmetric around the optical carrier. Out of the four spectral bands comprised in the spectral support of $F\{I(t)\}$, the two potentially useful ones were seen to be $[\underbrace{\omega_{sc}-\omega_p}_{\omega_{IF}}-W, \underbrace{\omega_{sc}-\omega_p}_{\omega_{IF}}+W], [\omega_{sc}+\omega_p-W, \omega_{sc}+\omega_p+W]$.

The lowest frequency one of these two spectral segments, namely $[\omega_{IF}-W,\omega_{IF}+W]$, may be typically easier to handle than the other, as it comprises lower frequencies, but in principle we could spectrally filter either of these two spectral bands, and then extract the CE of the message signal (it is also possible to average over complex envelopes extracted by IQ demodulation out of both terms). Our estimate $\hat{\underline{b}}(t)$ at the receive side of the CE of the RF signal to be transported is generated by IQ electrical demodulation, described in the complex formalism as follows:

$\hat{\underline{b}}(t) \propto \{I^x(t)\cos\omega_{IF}t\}_{LPF} + j\{i^x(t)[-\sin\omega_{IF}t]\}_{LPF} =$ (121)
$\{I^x(t)(\cos\omega_{IF}t - j\sin\omega_{IF}t)\}_{LPF} \propto \{I^x(t)e^{-j\omega_{IF}t}\}_{LPF} =$
$\{p_o\underline{b}(t)e^{-j\phi_p}He[H_{bb}(\omega_{sc})H_{bb}^*(\omega_p)]\}_{LPF} +$
$\underbrace{\{p_o\underline{b}^*(t)e^{-j2\omega_{IF}t}e^{j\phi_p}He^*[H_{bb}(\omega_{sc})H_{bb}^*(\omega_p)]\}_{LPF}}_{0} \propto$ $He\{H_{bb}(\omega_{sc})H_{bb}^*(\omega_p)\}\{p_o\underline{b}(t)e^{-j\phi_p}\}_{LPF} =$
$p_o He\{H_{bb}(\omega_{sc})H_{bb}^*(\omega_p)\}\underline{b}(t)e^{-j\phi_p}$ where we assumed in the last two lines that we filtered through the $[\omega_{sc}-\omega_p-W, \omega_{sc}-\omega_p+W]$ band. Our key result is then $\hat{\underline{b}}(t) \propto \underbrace{p_o He\{H_{bb}(\omega_{sc})H_{bb}^*(\omega_p)\}}_{\tilde{g}(\omega_{sc},\omega_p)}\underline{b}(t)e^{-j\phi_p}$ (122)

with gain coefficient $\tilde{g}(\omega_{sc},\omega_p) = p_o He(H_{bb}(\omega_{sc})H_{bb}^*(\omega_p)) =$ (123)
$\frac{p_o}{2}[H_{bb}(\omega_{sc})H_{bb}^*(\omega_p) + H_{bb}^*(-\omega_{sc})H_{bb}(-\omega_p)]$ Let us evaluate the gain coefficient (in order to see how to maximize it, whether it fades for certain configurations and/or parameters, etc.). To this end, we represent the end-to-end baseband equivalent transfer function $H_{bb}(\omega)$ as the cascade of the fiber dispersion $H_{bb}^{CD}(\omega)=e^{-j\theta_0}e^{-j\theta_1\omega}e^{-j1/2\theta_2\omega^2}$ and a generally asymmetric optical filter (OF), $H_{bb}^{OF}(\omega)$:

$H_{bb}(\omega)=H_{bb}^{CD}(\omega)H_{bb}^{OF}(\omega)=e^{-j\theta_0}e^{-j\theta_1\omega}$
$e^{-j1/2\theta_2\omega^2}H_{bb}^{OF}(\omega)$ (124)

We may express the relevant transfer factors for the two DSB passbands as follows:

$H_{bb}(\omega_{sc})=H_{bb}^{CD}(\omega_{sc})H_{bb}^{OF}(\omega_{sc})=e^{-j\theta_0}e^{-j\theta_1\omega_{sc}}$
$e^{-j1/2\theta_2\omega_{sc}^2}[\overline{H}_{sc}e^{j\chi_{sc}}+H_{\Delta_{sc}}e^{j\varsigma_{sc}}]$ $H_{bb}(-\omega_{sc})=H_{bb}^{CD}(-\omega_{sc})H_{bb}^{OF}(\omega_{sc})=e^{-j\theta_0}e^{-j\theta_1\omega_{sc}}$
$e^{-j1/2\theta_2\omega_{sc}^2}[\overline{H}_{sc}e^{j\chi_{sc}}-H_{\Delta_{sc}}e^{j\varsigma_{sc}}]$ (125)

In addition the transfer factor for the pilot are $H_{bb}(\omega_p)=H_{bb}^{CD}(\omega_p)H_{bb}^{OF}(\omega_p)=e^{-j\theta_0}e^{-j\theta_1\omega_p}$
$e^{-j1/2\theta_2\omega_p^2}[\overline{H}_p e^{j\chi_p}+H_{\Delta_p}e^{j\varsigma_p}]$ $H_{bb}(-\omega_p)=H_{bb}^{CD}(-\omega_p)H_{bb}^{OF}(\omega_p)=e^{-j\theta_0}e^{-j\theta_1\omega_p}$
$e^{-j1/2\theta_2\omega_p^2}[\overline{H}_p e^{j\chi_p}-H_{\Delta_p}e^{j\varsigma_p}]$ (126)

At this point we might evaluate the key additive terms in the Hermitian part expression appearing in the detection gain:

$H_{bb}(\omega_{sc})H_{bb}^*(\omega_p) =$ (127,128)
$e^{-j\theta_0}e^{-j\theta_1\omega_{sc}}e^{-j\frac{1}{2}\theta_2\omega_{sc}^2}[\overline{H}_{sc}e^{j\chi_{sc}}+H_{\Delta_{sc}}e^{j\varsigma_{sc}}]$
$e^{j\theta_0}e^{j\theta_1\omega_p^2}e^{j\frac{1}{2}\theta_2\omega_p^2}[\overline{H}_p e^{-j\chi_p}+H_{\Delta_p}e^{-j\varsigma_p}] =$
$e^{-j\theta_1(\omega_{sc}-\omega_p)}e^{-j\frac{1}{2}\theta_2(\omega_{sc}^2-\omega_p^2)}$
$\underbrace{[\overline{H}_{sc}e^{j\chi_{sc}}+H_{\Delta_{sc}}e^{j\varsigma_{sc}}][\overline{H}_p e^{-j\chi_p}+H_{\Delta_p}e^{-j\varsigma_p}]}_{H_{bb}^{OF}(\omega_{sc})H_{bb}^{OF*}(\omega_p)}$ and
and $H_{bb}^*(-\omega_{sc})H_{bb}(-\omega_p) =$ (129,130)
$\left[e^{-j\theta_0}e^{j\theta_1\omega_{sc}}e^{-j\frac{1}{2}\theta_2\omega_{sc}^2}[\overline{H}_{sc}e^{j\chi_{sc}}-H_{\Delta_{sc}}e^{j\varsigma_{sc}}]\right]^* e^{-j\theta_0}e^{j\theta_1\omega_p}$
$e^{-j\frac{1}{2}\theta_2\omega_p^2}[\overline{H}_p e^{-j\chi_p}-H_{\Delta_p}e^{-j\varsigma_p}] = e^{-j\theta_1(\omega_{sc}-\omega_p)}$
$e^{j\frac{1}{2}\theta_2(\omega_{sc}^2-\omega_p^2)}\underbrace{[\overline{H}_{sc}e^{j\chi_{sc}}-H_{\Delta_{sc}}e^{j\varsigma_{sc}}][\overline{H}_p e^{j\chi_p}+H_{\Delta_p}e^{j\varsigma_p}]}_{H_{bb}^{OF*}(-\omega_{sc})H_{bb}^{OF}(-\omega_p)}$ And then evaluate the values of the Hermitian part $He\{H_{bb}(\omega_{sc})H_{bb}^*(\omega_p)\}=H_{bb}(\omega_{sc})H_{bb}^*(\omega_p)+H_{bb}^*$
$(-\omega_{sc})H_{bb}(-\omega_p)$ (131)

to determine whether or not it fades out and what the Signal to Noise Ratio (SNR) of the detection gain coefficient (123) is.

Real-Valued (or Linear Phase) Optical Filter

However, the analysis may be made more tractable, as in the typical case the electrical spectral support is a small fraction of the bandwidth of the optical filter. Thus let us further assume that the optical filter baseband equivalent representation around the optical carrier either has linear phase (a more general assumption on the phase frequency response of the optical filter would not lead to substantially different results). Now, given a linear phase OF, then we may factor its linear phase complex exponent out, to yield a real-valued residual filter). Thus, let us further assume without loss of generality, that $\chi_{sc}=\zeta_{sc}=\chi_p=\zeta_p=0$, i.e., the optical filter is real-valued. In this case the expressions (128) and (130) simplify to $$H_{bb}(\omega_{sc})H_{bb}^*(\omega_p) = e^{-j\theta_0}e^{-j\theta_1\omega_{sc}} \quad (132)$$

$$e^{-j\frac{1}{2}\theta_2\omega_{sc}^2}[\overline{H}_{sc} + H_{\Delta_{sc}}]e^{j\theta_0}e^{j\theta_1\omega_p}e^{j\frac{1}{2}\theta_2\omega_p^2}[\overline{H}_p + H_{\Delta_p}] =$$

$$e^{-j\theta_1(\omega_{sc}-\omega_p)}e^{-j\frac{1}{2}\theta_2(\omega_{sc}^2-\omega_p^2)}\underbrace{[\overline{H}_{sc} + H_{\Delta_{sc}}][\overline{H}_p + H_{\Delta_p}]}_{H_{bb}^{OF}(\omega_{sc})H_{bb}^{OF*}(\omega_p)}$$

and $$H_{bb}^*(-\omega_{sc})H_{bb}(-\omega_p) = \quad (133)$$

$$\left[e^{-j\theta_0}e^{j\theta_1\omega_{sc}}e^{-j\frac{1}{2}\theta_2\omega_{sc}^2}[\overline{H}_{sc} - H_{\Delta_{sc}}]\right]^* e^{-j\theta_0}e^{j\theta_1\omega_p}$$

$$e^{-j\frac{1}{2}\theta_2\omega_p^2}[\overline{H}_p - H_{\Delta_p}] =$$

$$e^{-j\theta_1(\omega_{sc}-\omega_p)}e^{j\frac{1}{2}\theta_2(\omega_{sc}^2-\omega_p^2)}\underbrace{[\overline{H}_{sc} - H_{\Delta_{sc}}][\overline{H}_p - H_{\Delta_p}]}_{H_{bb}^{OF*}(-\omega_{sc})H_{bb}^{OF}(-\omega_p)}$$

Substituting into the gain coefficient (132) then yields $$\tilde{g}(\omega_{sc}, \omega_p) = p_o He\{H_{bb}(\omega_{sc})H_{bb}^*(\omega_p)\} = \quad (134)$$

$$\frac{p_o}{2}[H_{bb}(\omega_{sc})H_{bb}^*(\omega_p) + H_{bb}^*(-\omega_{sc})H_{bb}(-\omega_p)] =$$

$$\frac{p_o}{2}e^{-j\theta_1(\omega_{sc}-\omega_p)}\left\{e^{-j\frac{1}{2}\theta_2(\omega_{sc}^2-\omega_p^2)}[\overline{H}_{sc} + H_{\Delta_{sc}}][\overline{H}_p + H_{\Delta_p}] + \right.$$

$$\left. e^{j\frac{1}{2}\theta_2(\omega_{sc}^2-\omega_p^2)}[\overline{H}_{sc} - H_{\Delta_{sc}}][\overline{H}_p - H_{\Delta_p}]\right\}$$

Substituting the parameterizations of the amplitude responses of the optical filter at the pilot and subcarrier frequencies in terms of two angular parameters, $\kappa_{sc}, \kappa_p$ $$\overline{H}_{sc}=\cos\kappa_{sc}, H_{\Delta_{sc}}\sin\kappa_{sc}, \overline{H}_p=\cos\kappa_p, H_{\Delta_p}=\sin\kappa_p \quad (135)$$

we have $$[\overline{H}_{sc}+H_{\Delta_{sc}}][\overline{H}_p+H_{\Delta_p}]=(\cos\kappa_{sc}+\sin\kappa_{sc})(\cos\kappa_p+\sin\kappa_p)=\cos(\kappa_p-\kappa_{sc})+\sin(\kappa_p+\kappa_{sc})$$

$$[\overline{H}_{sc}-H_{\Delta_{sc}}][\overline{H}_p-H_{\Delta_p}]=(\cos\kappa_{sc}-\sin\kappa_{sc})(\cos\kappa_p-\sin\kappa_p)=\cos(\kappa_p-\kappa_{sc})+\sin(\kappa_p+\kappa_{sc}) \quad (136)$$

Substituting these expressions into (134) yields $$\tilde{g}(\omega_{sc}, \omega_p) \propto \quad (137)$$

$$\frac{p_o}{2}e^{-j\theta_1(\omega_{sc}-\omega_p)}\left\{e^{-j\frac{1}{2}\theta_2(\omega_{sc}^2-\omega_p^2)}[\cos(\kappa_p-\kappa_{sc})+\sin(\kappa_p+\kappa_{sc})] + \right.$$

$$\left. e^{j\frac{1}{2}\theta_2(\omega_{sc}^2-\omega_p^2)}[\cos(\kappa_p-\kappa_{sc})-\sin(\kappa_p+\kappa_{sc})]\right\} =$$

$$\frac{p_o}{2}e^{-j\theta_1(\omega_{sc}-\omega_p)}\left\{\cos(\kappa_p-\kappa_{sc})\left[e^{-j\frac{1}{2}\theta_2(\omega_{sc}^2-\omega_p^2)} + e^{j\frac{1}{2}\theta_2(\omega_{sc}^2-\omega_p^2)}\right] - \right.$$

$$\sin(\kappa_p+\kappa_{sc})\left[e^{j\frac{1}{2}\theta_2(\omega_{sc}^2-\omega_p^2)} - e^{-j\frac{1}{2}\theta_2(\omega_{sc}^2-\omega_p^2)}\right]\right\} =$$

$$p_o e^{-j\theta_1(\omega_{sc}-\omega_p)}\left\{\cos(\kappa_p-\kappa_{sc})\cos\left[\frac{1}{2}\theta_2(\omega_{sc}^2-\omega_p^2)\right] - \right.$$

$$\left. j\sin(\kappa_p+\kappa_{sc})\sin\left[\frac{1}{2}\theta_2(\omega_{sc}^2-\omega_p^2)\right]\right\}$$

The squared modulus of the gain coefficient is readily evaluated:

$$|\tilde{g}(\omega_{sc}\cdot\omega_p)|^2 \propto p_0^2\{\cos^2(\kappa_p-\kappa_{sc})\cos^2[\frac{1}{2}\theta_2(\omega_{sc}^2-\omega_p^2)] + \sin^2(\kappa_p+\kappa_{sc})\sin^2[\frac{1}{2}\theta_2(\omega_{sc}^2-\omega_p^2)]\}=p_0^2\{\cos^2(\kappa_p-\kappa_{sc})\cos^2[\frac{1}{2}\theta_2(\omega_{sc}^2-\omega_p^2)]+\sin^2(\kappa_p+\kappa_{sc})\{1-\cos^2[\frac{1}{2}\theta_2(\omega_{sc}^2-\omega_p^2)]\}\}=p_0^2\{\sin^2(\kappa_p+\kappa_{sc})+\cos^2[\frac{1}{2}\theta_2(\omega_{sc}^2-\omega_p^2)][\cos^2(\kappa_p-\kappa_{sc})-\sin^2(\kappa_p+\kappa_{sc})]\} \quad (139)$$

or finally $$|\tilde{g}(\omega_{sc}\cdot\omega_p)|^2 \propto \frac{1}{2}p_0^2\{1-\cos(2\kappa_p+2\kappa_{sc})+\cos^2[\frac{1}{2}\theta_2(\omega_{sc}^2-\omega_p^2)][\cos(2\kappa_p-2\kappa_{sc})+\cos(2\kappa_p+2\kappa_{sc})]\}=p_0^2\{\frac{1}{2}\sin^2(\kappa_p+\kappa_{sc})+\cos^2[\frac{1}{2}\theta_2(\omega_{sc}^2-\omega_p^2)]\frac{1}{2}[\cos(2\kappa_p-2\kappa_{sc})+\cos(2\kappa_p+2\kappa_{sc})]\} \quad (139)$$

Let us inspect some special cases:

We recall that $\kappa_{DSB}=0$, $\kappa_{SSB}=\pm\pi/4$ (for $0<|\kappa|<\pi/4$ we have VSB).

Starting with DSB pilot and DSB message, we substitute $\kappa_p=0=\kappa_{sc}$ into (139), yielding $$|\tilde{g}(\omega_{sc}, \omega_p)|^2_{\substack{DSB\ pilot \\ DSB\ message}} \propto \quad (140)$$

$$\frac{1}{2}p_0^2\left\{1-\cos(0)+\cos^2\left[\frac{1}{2}\theta_2(\omega_{sc}^2-\omega_p^2)\right][\cos(0)+\cos(0)]\right\} =$$

$$p_0^2\cos^2\left[\frac{1}{2}\theta_2(\omega_{sc}^2-\omega_p^2)\right]$$

We note the presence in the last expression of the (square of the) CD fading factor (54) repeated here:

$$\text{CDfadingFactorE2}=\cos[\phi_{CD}(\omega_{sc})-\phi_{CD}(\omega_p)]=\cos[\frac{1}{2}\theta_2(\omega_{sc}^2-\omega_p^2)] \quad (141)$$

The absolute value of the detection gain, $$|\tilde{g}(\omega_{sc}, \omega_p)|^2_{\substack{DSB\ pilot \\ DSB\ message}}$$

is then proportional to $p_0$ and to the CD fading factor. The result שגיאה! מקור ההפניה לא נמצא. is then consistent with our prior result (53) for detection in the E2 embodiment, repeated here:

$$\hat{\underline{b}}'(t) \propto \{\tilde{F}(t)e^{-j\omega_{IF}t}\}_{LPF} \propto p_o \cos[\phi_{CD}(\omega_{sc})-\phi_{CD}(\omega_p)]$$

$$\hat{\underline{b}}'(t) \quad (142)$$

Asymmetric Optical Modulation

As already stated above in the E1+asymmetric filtering discussion, but also applicable here to E1+asymmetric filtering, an interesting point that the asymmetric filtering (the generation of VSB or SSB) need not be physically performed with an actual optical filter. Even in the absence of optical filtering, we may still generate VSB or SSB with an IQ modulator. In this case the generally asymmetric filter denoted $H_{bb}^{OF}(\omega)$ is a virtual filter, representing a fictitious DSB input optical signal being filtered to generate a VSB or SSB optical signal, just like the one actually generated by the IQ modulator. These cases may be referred to as asymmetric optical modulation. In this context, useful special cases to consider are either SSB-signal and DSB pilot or DSB-signal and SSB pilot, as may be generated via electro-optical modulation means as described in embodiments E3-E6 below. In these cases, one of the two sidebands of either the original DSB signal or the DSB pilot of E2 are completely suppressed. More generally we may consider VSB-signal and VSB-pilot, wherein one of the two sidebands of either the original DSB signal or the DSB pilot of E2 are partially suppressed. All these cases are amenable to being modelled by the asymmetric filtering model above (although no optical filter need be actually deployed).

SSB-Signal and DSB Pilot or DSB-Signal and SSB Pilot

The SSB-signal and DSB-pilot case is modelled as $\kappa_{sc}=\pm\pi/4$, $\kappa_p=0$. The DSB-signal and SSB-pilot case is similarly modelled as $\kappa_{sc}=0$, $\kappa_p=\pm\pi/4$. substitution of either of these two pairs into (139), yields $$|\tilde{g}(\omega_{sc},\omega_p)|^2 \propto \qquad (143)$$

$$\frac{1}{2}p_0^2\left\{1-\cos\left(\pm\frac{\pi}{2}\right)+\cos^2\left[\frac{1}{2}\theta_2(\omega_{sc}^2-\omega_p^2)\right]\left[\cos\left(\mp\frac{\pi}{2}\right)+\cos\left(\pm\frac{\pi}{2}\right)\right]\right\}$$

reducing to SSB signal and DSB pilot or DSB signal and SSB pilot:

$$|\tilde{g}(\omega_{sc},\omega_p)|^2 \propto \tfrac{1}{2}p_0^2. \qquad (144)$$

Thus, it suffices to have one of the two (either signal or pilot) be SSB while the other be DSB, in order to completely mitigate CD induced impairment for any values of the signal and pilot frequencies (still subject to the frequency-flat approximation for the message passbands).

SSB-Signal and SSB Pilot

Let us now consider the case that both the signal and the pilot are ideally SSB:

$$\kappa_{sc}=\pm\frac{\pi}{4},\ \kappa_p=\pm\frac{\pi}{4},$$

but let us take the + signs together and the − signs together as the ± determine whether we have upper-sideband or lower-sideband SSB, and we are interested in having both signal and pilot be of the same kind, either both upper-sideband SSB or lower-sideband SSB.

In this case $$2\kappa_p+2\kappa_{sc}=\pm\frac{\pi}{2},\ 2\kappa_p-2\kappa_{sc}=0,$$

thus $$|\tilde{g}(\omega_{sc},\omega_p)|^2 \propto \qquad (145)$$

$$\frac{1}{2}p_0^2\left\{1-\underbrace{\cos(\pm\pi)}_{-1}+\cos^2\left[\frac{1}{2}\theta_2(\omega_{sc}^2-\omega_p^2)\right]\underbrace{[\cos(0)+\cos(\pm\pi)]}_{0}\right\}=$$

$$\frac{1}{2}p_0^2\cdot 2=p_0^2=2\kappa_p+2\kappa_{sc}=\pm\frac{\pi}{2},\ 2\kappa_p-2\kappa_{sc}=0$$

Near-DSB and Near-SSB

Let us consider various near-DSB and near-SSB cases, in the sense that the values $\kappa_{sc},\kappa_p$ are close to those of the four special cases already treated above, namely (DSB-Signal-and-Pilot, SSB-Signal and DSB Pilot, DSB-Signal and SSB-Pilot, SSB-Signal and Pilot), but are not quite at the nominal values for those special cases. Thus we represent the parameters $\kappa_{sc},\kappa_p$ in terms of small deviations away from the nominal values. The rationale is that we would like to establish that small deviations just cause small degradation of performance, while larger deviations "gracefully" degrade performance.

The first case we consider is near DSB signal and pilot: In this case $\kappa_{sc}=\delta\kappa_{sc}\ll 1$, $\kappa_p=\delta\kappa_p\ll 1$ (e.g. this may model a system as in E2 with nominally DSB signal and DSB pilot but with slight asymmetric optical filtering. We now have (since $2\delta\kappa_p\pm 2\delta\kappa_{sc}\ll 1$):

$$|\tilde{g}(\omega_{sc},\omega_p)|^2 \propto \frac{1}{2}p_0^2\left\{\underbrace{1-\cos(2\delta\kappa_p+2\delta\kappa_{sc})}_{\approx 0}+\cos^2\left[\frac{1}{2}\theta_2(\omega_{sc}^2-\omega_p^2)\right]\right. \qquad (146)$$

$$\left.\underbrace{[\cos(2\delta\kappa_p-2\delta\kappa_{sc})+\cos(2\delta\kappa_p-2\delta\kappa_{sc})]}_{\approx 1}\right\}$$

Thus the squared coefficient is quite close to the perfect-DSB result $\tfrac{1}{2}p_0^2\cos^2[\tfrac{1}{2}\theta_2(\omega_{sc}^2-\omega_p^2)]$.

Except for a very small loss of SNR there is no other effect.

Now consider near-SSB-signal and near-DSB-pilot:

$$\kappa_{sc}=\pm\frac{\pi}{4}+\delta\kappa_{sc},$$

$\kappa_p=\delta\kappa_p$. Now, we have $$2\kappa_p+2\kappa_{sc}=2\delta\kappa_p+2\delta\kappa_{sc}\pm\frac{\pi}{2},\ 2\kappa_p-2\kappa_{sc}=2\delta\kappa_p-2\delta\kappa_{sc}\mp\frac{\pi}{2} \qquad (147)$$

$$\cos(2\kappa_p+2\kappa_{sc})=\mp\sin(2\delta\kappa_p+2\delta\kappa_{sc}),$$

$$\cos(2\kappa_p-2\kappa_{sc})=\pm\sin(2\delta\kappa_p-2\delta\kappa_{sc})$$

the substitution of which into (139) yields:

$$|\tilde{g}(\omega_{sc},\omega_p)|^2 \propto \frac{1}{2}p_0^2\left\{\underbrace{1\mp\sin(2\delta\kappa_p+2\delta\kappa_{sc})}_{\approx 1}+\cos^2\left[\frac{1}{2}\theta_2(\omega_{sc}^2-\omega_p^2)\right]\right. \qquad (148)$$

$$\left.\underbrace{[\pm\sin(2\delta\kappa_p+2\delta\kappa_{sc})\mp\sin(2\delta\kappa_p+2\delta\kappa_{sc})]}_{\approx 0}\right\}$$

Thus, dependence on the CD term $\cos^2[\tfrac{1}{2}\theta_2(\omega_{sc}^2-\omega_p^2)]$ is nearly suppressed, while the remaining coefficient is roughly $\tfrac{1}{2}p_0^2$, close to the ideal DSB signal and pilot case.

The case of near-DSB-signal and near-SSB-pilot behaves akin to the one of near-SSB-signal and near-DSB-pilot which was just treated above, thus we skip the nearly identical derivation. Now consider near SSB-signal and pilot:

$$\kappa_{sc} = \pm\frac{\pi}{4} + \delta\kappa_{sc}, \kappa_p = \pm\frac{\pi}{4} + \delta\kappa_p$$

In this case that both the signal and the pilot are nearly SSB: But, as in the ideal analysis, let us take the + signs together and the − signs together as the ± determine whether we have upper-sideband or lower-sideband SSB, and we are interested in having both signal and pilot be of the same kind, either both upper-sideband SSB or lower-sideband SSB.

In this case $$2\kappa_p + 2\kappa_{sc} = \pm\frac{\pi}{2} + \delta\kappa_{sc} + \delta\kappa_p, 2\kappa_p - 2\kappa_{sc} = \delta\kappa_p - \delta\kappa_{sc},$$

thus $$|\tilde{g}(\omega_{sc}, \omega_p)|^2 \propto p_0^2 \left\{ \frac{1}{2}\underbrace{\left[1 - \cos(\pm\pi + \delta\kappa_{sc} + \delta\kappa_p)\right]}_{\approx 1} + \cos^2\underbrace{\left[\frac{1}{2}\theta_2(\omega_{sc}^2 - \omega_p^2)\right]}_{\approx 0}\frac{1}{2}[\cos(\delta\kappa_p - \delta\kappa_{sc}) + \cos(\pm\pi)] \right\} \approx p_0^2 \quad (149)$$

Thus, for small deviations the near-SSB signal-and-pilot system experiences a small graceful degradation with respect to an ideal near-SSB one.

VSB Transition from DSB to SSB

Inspecting (139) again, let us consider that the system starts in DSB for both the signal and the pilot, and the asymmetry is increased, moving via VSB states towards perfect SSB for the pilot, signal or both. Thus the two angular parameters $\kappa_p, \kappa_{sc}$ are monotonically increased from zero.

$$|\tilde{g}(\omega_{sc}\cdot\omega_p)|^2 \propto \frac{1}{2}p_0^2\{1-\cos(2\kappa_p+2\kappa_{sc})+\cos^2[\frac{1}{2}\theta_2(\omega_{sc}^2-\omega_p^2)][\cos(2\kappa_p-2\kappa_{sc})+\cos(2\kappa_p+2\kappa_{sc})]\} = p_0^2\{\frac{1}{2}\sin^2(\kappa_p+\kappa_{sc})+\cos^2[\frac{1}{2}\theta_2(\omega_{sc}^2-\omega_p^2)]\frac{1}{2}[\cos(2\kappa-2\kappa_{sc})+\cos(2\kappa_p+2\kappa_{sc})]\} \quad (150)$$

In general, increase of either one of $\kappa_p, \kappa_{sc}$ or both up from zero increases the coefficient up from zero towards 2, while the coefficient $[\cos(2\kappa_p-2\kappa_{sc})+\cos(2\kappa_p+2\kappa_{sc})]$ generally decreases down from unity, thus reducing the detrimental impact of the squared CD fading factor, $\cos^2[\frac{1}{2}\theta_2+(\omega_{sc}^2-\omega_p^2)]$, as the difference between $\omega_{sc}, \omega_p$ increases in absolute value.

$$|\tilde{g}(\omega_{sc}\cdot\omega_p)|^2 \propto p_0^2\{\frac{1}{2}\sin^2(\kappa_p+\kappa_{sc})+\cos^2[\frac{1}{2}\theta_2(\omega_{sc}^2-\omega_p^2)]\frac{1}{2}[\cos(2\kappa_p-2\kappa_{sc})+\cos(2\kappa_p+2\kappa_{sc})]\} \quad (151)$$

Overview of E3-E6 Embodiments

Perspective on the Asymmetric Optical Filtering Model

To place in perspective the significance of the asymmetric optical filtering analysis above, the embodiment E2 analyzed above, was shown to be robust even in the wake of asymmetric optical filtering or imperfect DSB generation for either the signal or the pilot or both. On the contrary small asymmetric optical of the pilot DSB may even slightly improve CD tolerance. This suggests that it is worth applying asymmetric optical filtering intentionally to improve CD tolerance even further. Thus, In case the impact of chromatic dispersion at the subcarrier frequency is quite pronounced, we may elect to intentionally apply asymmetric filtering. The literature [13] indicated that SSB format is robust to chromatic dispersion, but our analysis in the last section, shows that in the specific case of bandpass RF optical transport (of interest in this patent application), the SSB need not be perfect. Thus, a key conclusion of ours, motivating the embodiments E3-E6 to follow is that we may just use VSB for the pilot and/or bandpass message, namely allow some residual unsuppressed upper or lower sideband, and still have the system function quite well. Therefore, even partial suppression of one of the sidebands (i.e. a VSB configuration) suffices to make the system more robust to CD (relative to the DSB system of E2) even for large subcarrier frequency values, whereat an optical DSB system without any pilot or one such as in E1 or E2 with pilot(s) at the optical carrier or symmetrical around the optical carrier would be in deep fading.

We reiterate that intentional SSB or VSB optical modulation along with optical pilots side-tones or message sidebands on the two sides of the optical carrier, which are asymmetric around the optical carrier may be viewed as mathematically equivalent to having applied actual optical filtering. Thus, all our mathematical insights in our model of asymmetric optical filtering derived above apply even when there is no actual optical filtering applied but we rather introduce intentional asymmetry of the spectra of optical pilots side-tones or message sidebands on the two sides of the optical carrier, by means of electro-optic modulation, as disclosed in the new embodiments E3-E6 below. The detailed mathematical model in the last section provides the motivation and the theory of operation why embodiments E3-E6 to follow are advantageous to achieve improved CD tolerance.

To recap, the main motivation for the embodiments to follow is to generate either spectrally asymmetric (around the optical carrier) pilot tones or spectrally asymmetric message sidebands, or both, makes optical transport systems for bandpass electrical signals with improved tolerance to the CD impairment.

E1 is especially effective when the RF signal to be optically transported is bandpass with subcarrier frequency that is relatively low (of the order of several GHz). In such case optically filtering one of the sidebands requires an optical signal having a very small width (sharp optical filtering) which is difficult to implement.

It is better to generate the optical SSB (as well as the optical carrier pilot) by means of an E-O IQ modulator—even when the optical SSB is not achieved and using optical VSB might do well providing a relatively large amount of CD tolerance.

In fact we also disclose a similar technique, of intentional optical filtering, albeit applied not to the E1 embodiment as initial optical signal to be asymmetrically filtered, but the optical filtering may be applied to our E2 embodiment. Thus, in this embodiment we propose to insert an optical filter following the transmitter disclosed in E2, such that the optical filtering be asymmetric.

In the remainder of this application we disclose our embodiments E3-E6, based on generating asymmetric optical spectra for the bandpass signal to be transported and/or for the optical pilots, by means of an IQ electro-optic modulator plus additional electronic means. Thus, the various embodiments of the optical Tx generate spectrally asymmetric (around the optical carrier) optical pilots (generated by means of suitable RF tones) and/or asymmetric message sidebands. These embodiments attain enhanced tolerance of the CD impairment, beyond that of E2, which was already shown to be relatively tolerant to CD (more tolerant than E1 in turn).

Due to the usage of suitable pilot tones, a high purity of SSB (VSB approaching SSB in the sense one of the upper or lower sidebands is very low relative to the other) is not required. The combination of either nearly-SSB pilot tone or nearly-SSB bandpass signal or both, or even the generation of some reasonable VSB spectral asymmetry is sufficient in order to mitigate the effects of dispersion more efficiently than in embodiment E2 (which featured DSB signals and spectra).

A second feature of our invention, compared with prior art using asymmetric optical filtering, is that the disclosed Tx structure, based on the IQ modulator, the RF pilots and additional electronic means, provides a robust and much simpler implementation of asymmetric optical filtering than the potential usage of an asymmetric optical filter that would be too coarse for the fine spectral structure of many cellular fronthaul or other radio over fiber applications.

Review of the Electro-Optic IQ Modulator (E-O IQ MOD)-building block in embodiments E3-E6 As already mentioned, the embodiments E3-E6 are based on an E-O IQ MOD rather than on an optical amplitude modulator (such as the MZM). Here we briefly review the basics of this optical modulation means.

An IQ modulator may be realized as two MZM amplitude modulators (or more generally two nearly linear E-O amplitude modulators) nested in parallel, with 90-degree relative phase in one of the two paths relative to the other (quadrature combining). Functionally, an ideally linear E-O IQ modulator realizes, in the complex envelope domain, the operation $$m(t) = a_c e^{j\phi(t)} d^I(t) + j a_c e^{j\phi(t)} d^Q(t) = a_c e^{j\phi(t)} [d^I(t) + j d^Q(t)] \quad (152)$$

by summing up two nearly linear amplitude modulators, referred to as "children" E-O modulators, optically fed in parallel by the same laser CW signal with complex envelope $a_c e^{j\phi(t)}$ and electrically fed by the respective RF real-valued drive voltages $d^I(t), d^Q(t)$.

The two children E-O modulator outputs are ideally additively combined in quadrature, i.e. with complex weights of equal amplitude and with phases which are 90 degrees apart, e.g. with weights 1, j, generating the output signal of the overall E-O IQ modulator.

It remains to specify the two I and Q driving signals, $d^I(t), d^Q(t)$ for the IQ modulator featuring in the three embodiments—how these signals are derived from the bandpass signal s(t) to be transmitted and certain pilot tones. The are embodiments, E3-E6 differ in the specifics of how $d^I(t), d^Q(t)$ are generated, in a module referred to as IQ driver, which is a 1×2 electrical module the input to which is the message signal to be transported as input, while its two outputs are the two IQ drive signals $d^I(t), d_Q(t)$ to be applied to the respective I and Q electrodes of the E-O IQ MOD (the differential drive voltages of each of the two "children" MZMs).

The electrical analog and/or digital structures for the IQ driver differ among the various embodiments.

We are now ready to detail the embodiments E3-E6.

E3 Embodiment—SSB Signal+DC Bias (Pilot at the Optical Carrier)

This embodiment (see FIG. 6 for its spectral plots) essentially generates asymmetric signal (message)-induced spectra around the optical carrier: almost-ideal-SSB or VSB optical modulation of the message signal, generated by means of analog or digital Hilbert filtering or by means of digital complex one-sided modulation prior to DAC, while it utilizes an optical pilot tone at of the optical carrier frequency, thus akin to E1 in terms of its generation of optical carrier pilot by means DC bias—but notice that in E1 the message induced sidebands around the optical carrier are—DSB symmetric around the optical carrier, whereas here the message sidebands are asymmetric—SSB or VSB.

We present three flavors of this embodiment (FIGS. 7-10): sub-embodiments E3.a and E3.d1, E3.d2, E3.d3. In sub-embodiment E3.a (FIG. 7) the IQ drive signals are analogy generated, whereas in the two sub-embodiments E3.d1, E3.d2, E3.d3) (FIGS. 8-10) the IQ drive signals are digitally generated.

In all these sub-embodiments the Tx essentially comprises an E-O IQ MOD while the Rx is a direct detection one, essentially photodiode followed by electrical amplification. However, at the Tx side, the various sub-embodiments differ in the structure of their IQ driver.

In all three sub-embodiments, the optical pilot resides at the optical carrier frequency, generated by means of a superposed DC bias (applied either in the analog or digital domain) or less preferably by having the CW optical source be split and have a parallel optical path to be combined with the IQ MOD useful optical output, as this option may generate excess optical splitting and combining losses and may also cause ripple due to chirping effects.

Thus, prefer generating the optical pilot at the optical carrier frequency by applying DC bias(es) in the IQ driver superposed onto the I and Q information signals in order to detune the children MZMs of the IQ MOD away from the quiescent operating point of zero-voltage-zero-light.

E3.a Analog Sub-Embodiment

Figure 7:
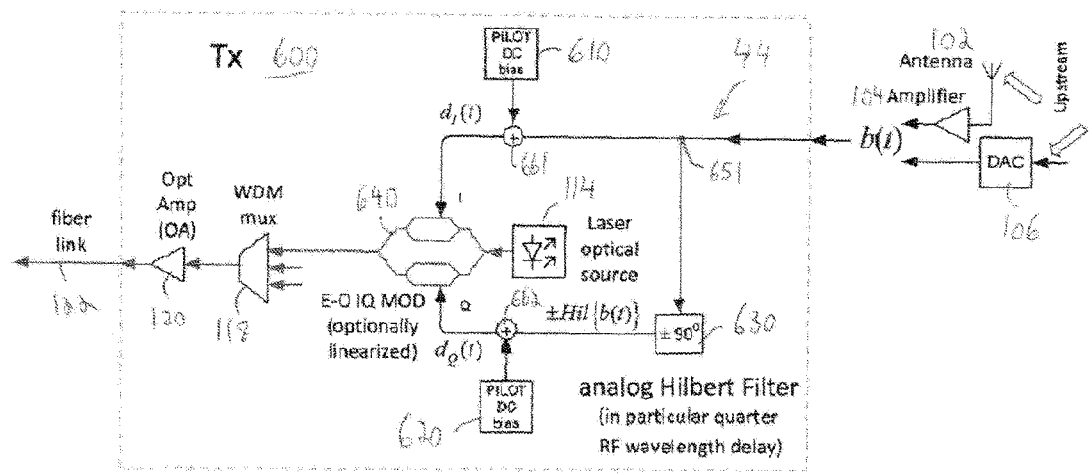
FIG. 7 illustrates an example of a system.
Figure 7:
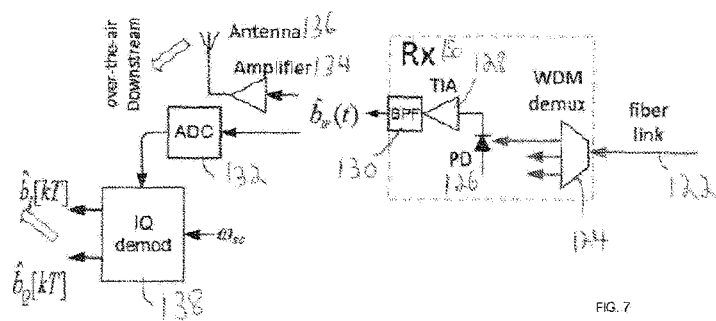

Here the IQ driver features an analog realization, as depicted in FIG. 7. This sub-embodiment is then suitable for example in the upstream direction of a cellular system or in any radio-over-fiber system wherein the RF input bandpass message to be transported is available in analog form. In such applications, our transport link Tx will be typically collocated with the RRH and is fed from the receive antenna picking up the upstream wireless transmission of the air-interface. The antenna output is just electronically pre-amplified as shown in FIG. 7 and the received RF bandpass "message" is directly applied to the IQ driver module (without any IF frequency downconversion).

We re-iterate that the above is just a concrete example, as all our embodiments assume an input RF input bandpass message, its source being immaterial—in this example the source happens to be an RF receiving antenna in the remote radio head in the upstream cellular or wireless LAN transport application.

In contrast, in a downstream cellular network, we would be typically provided a baseband IQ signal to be optically transported (a pair of IQ components, representing a complex envelope) which we digitally pre-process as follows: We upconvert the IQ signal in the digital to generate a passband digital signal, b[kT] which is then passed through a DAC in order to generate the analog bandpass signal b(t) which is then input into the E3.a analog IQ driver. At the optical Rx in the RRH, the direct-detection process in the photo-diode and its subsequent amplification in the TIA generates an RF signal which may be applied "as is" to a power amplifier of a transmit antenna.

We now describe the internal structure of the IQ driver for sub-embodiment E3.a. The analog RF bandpass input is split to two paths and one path is passed through an analog Hilbert Transform.

The other split analog input, as well as the output of the analog Hilbert transform are respectively superposed with a pair of DC biases, thus forming two drive signal outputs $d_I(t), d_Q(t)$ of the IQ driver, which are applied to the IQ modulator I and Q electrodes. We may also make provision for reversing the polarity of the Hilbert transform (multiplying by −1) prior to its injection into the Q electrode of the E-O IQ MOD. This sign reversal ideally reverts between upper sideband SSB and lower sideband SSB (or more generally, in the case of VSB it reflects the two sidebands through the carrier, interchanging their amplitudes).

Note that since the analog RF bandpass input is relatively narrowband (typically W<<w in the applications of interest) then the implementation of the analog Hilbert filter may be may be simplified: The analog Hilbert filter may be realized as a delay by a quarter wavelength at the sub-carrier frequency Imperfection is such simplified Hilbert filter (a quarter wavelength at the subcarrier frequency is not precisely a quarter wavelength at other in-band frequencies of the bandpass signal, b(t)) may cause just small gracious degradation, as uncovered in the analysis.

As for the injection of the pilot at the optical carrier frequency, by means of DC biases superposed onto the Hilbert pair of RF inputs, it is possible to forgo application of DC bias to one of the I or the Q arms (apply DC bias to just one of the two arms but not to the other) and the system will still function, in principle. However, since the application of DC bias causes some reduction in dynamic range it may be worth symmetrically having both I and Q MZM paths split the load of detuning the MZM modulator.

Theory of Operation of E3.a

If the Hilbert transform were perfect, then the IQ combination of the desired bandpass signal $d_I(t)=b(t)$ to be transported and its Hilbert transform, $d_Q(t) = Hil\{d_I(t)\} = Hil\{b(t)\}$ would form the complex envelope $$d_I(t)+jd_Q(t)=d_I(t)+jHil\{d_I(t)\} \propto d_I^a(t)=b^a(t). \quad (153)$$

where the superscript $^a$ denotes an analytic transformation, i.e. suppressing the negative frequencies of a signal. It is well-known that such complex signal, with its real and imaginary parts related by a Hilbert transform, is an analytic signal, i.e. a signal with positive frequencies spectral content only. Now, from the theory of optical IQ modulation, it follows that $d_I(t)+jd_Q(t)$ is the complex envelope of the optical output of the E-O IQ MOD when the input is a CW optical signal. Thus, the IQ driver disclosed above, working in conjunction with the IQ modulator, causes the complex envelope of the optical output contains just positive frequencies, implying that after optical IQ modulation the signal sub-band to the left of the optical carrier has been suppressed, i.e., we have ideally generated upper sideband SSB.

Similarly, if the sign of the Hilbert transform is flipped, we then have $$d_I(t)-jd_Q(t)=d_I(t)-jHil\{d_I(t)\} \propto d_I^{aa}(t) \quad (154)$$

where the $^{aa}$ superscript denotes an anti-analytic signal, defined here as a signal with positive frequencies spectral content only. This implies that after optical IQ modulation the signal sub-band to the right of the optical carrier has been suppressed, i.e., we have ideal generated lower sideband SSB.

To the extent that the analog Hilbert filter is imprecise (or alternatively, the IQ modulator features amplitude IQ imbalance, i.e. slightly different electro-optic gains on its I and Q paths) then the SSB generation is not perfect—the sub-band that was to be totally suppressed is not, amounting to VSB generation, weighted to have one sideband higher than its mirror image around the optical carrier.

Fortunately, from our detailed mathematical model of asymmetric optical filtering, it follows that operating with imperfectly suppressed sideband, i.e. in near-SSB mode but with some residual VSB, just causes small gracious degradation of the CD tolerance. This indicates that our E3 embodiment is very robust (as are also embodiments E4-E6).

As for the bias (used to generate an optical pilot at the optical carrier) we prefer to apply DC biases to both modulators and in amounts (due to the IQ action, the overall phase of the generated optical carrier then has stronger amplitude by a factor of $\sqrt{2}$, and is shifted by ±45° relative to the case that the bias is applied just two one of the I or Q electrodes (but this phase-shift in the phase angle $\phi_p$ is inconsequential to detection, as the optical Rx post-processing employs carrier recovery). Indeed, when equal DC biases are applied to the I and Q paths then the generated optical carrier complex envelope, from the carrier contributions of both children modulators of the IQ MOD is $a_c+ja_c=a_c\sqrt{2}e^{j\pi/4}$. In contrast, if the DC bias is applied to just the I or just the Q path, then we get $a_c$, $ja_c$ respectively.

E3.d1 Digital Sub-Embodiment

In this digital sub-embodiment as well as in the next one (E3.d2), we essentially generate, in the digital domain, sampled versions of the analog signals as in E3.a, then use a pair of DACs to generate the analog IQ drive signals $d_I(t), d_Q(t)$ applied to the E-O IQ MOD electrodes. Thus, the IQ driver is realized in E3d.1 and E3d.2 by mixed signal technology, comprising digital signal processing followed by two DACs.

In these digital embodiments, in fact in all digital embodiments wherein the IQ drive signals $d_I(t), d_Q(t)$ into the E-O IQ MOD are generated by a pair of DACs, the DACs are typically preceded by a linearizer (LNZ) block (compensating for the nonlinearity of the children MZMs of the IQ MOD), thus we just mark the cascade of LNZ+DAC as one block, with the tacit understanding that in simpler implementations, the LNZ module may be missing. When present, the predistortion LNZ may be implemented in its simplest form by a lookup table applying an inverse mapping to that nonlinearly generated in the IQ modulator I and Q children E-O amplitude modulators. E.g., when the IQ modulator is based on a pair of MZMs in parallel, the nonlinear distortion of each MZM is described by a sine voltage to field mapping with appropriate scaling of its argument, thus the lookup table implementing the equalizer represents a properly scaled arcsine function. More sophisticated Volterra function based linearizers (compensating for nonlinear memory) may be used [1]. These comments apply to E3d.1 and E3d.2 as well as to all digital sub-embodiments to follow.

Figure 8:
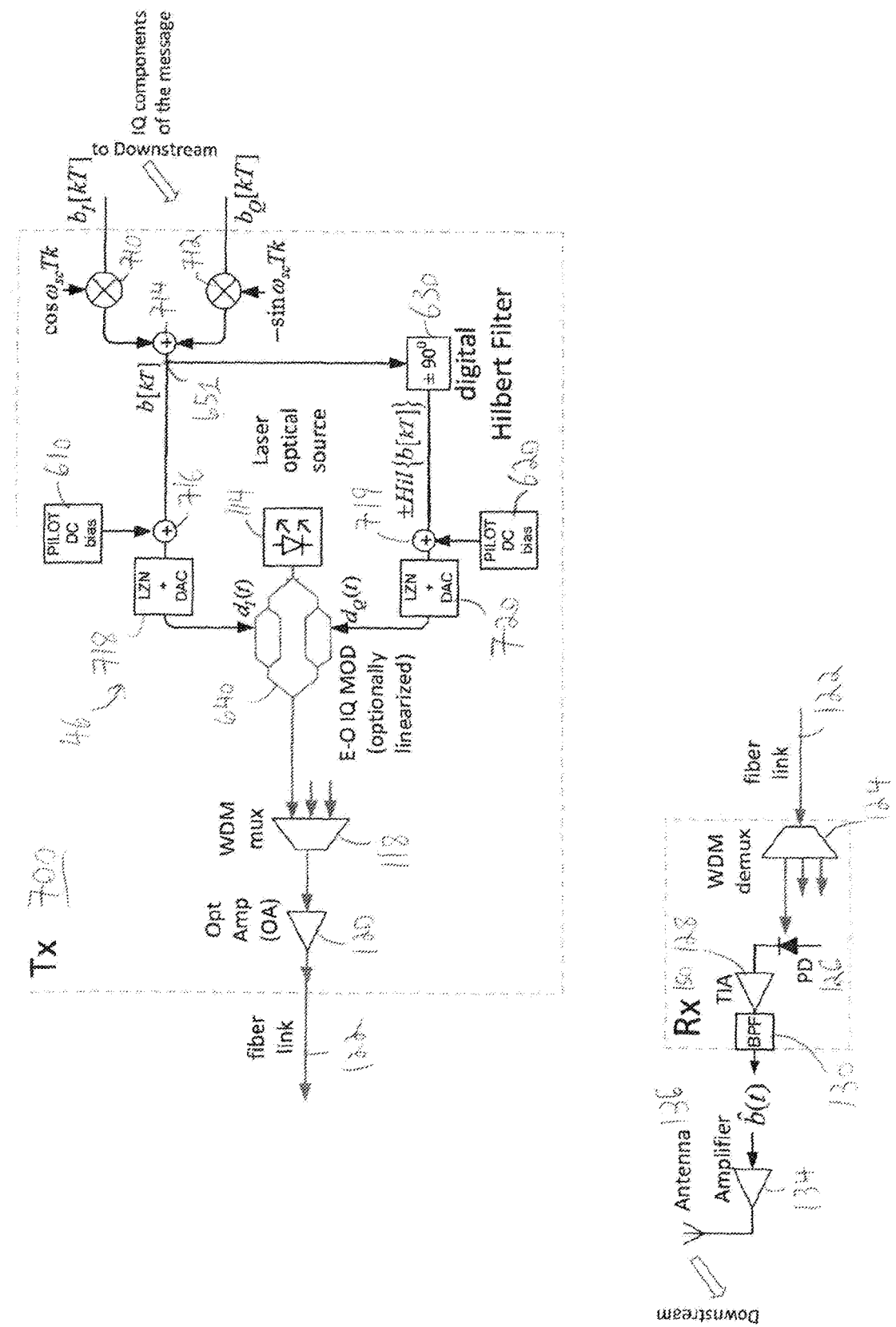
FIG. 8 illustrates an example of a system.

FIG. 8 describes the embodiment E3.d1 based on splitting the digital bandpass signal to be transported to a pair of signals, with a digital Hilbert filter applied on one path, followed by adding in digital DC biases, followed by a pair of LNZ+DACs.

In turn, the digital bandpass signal to be transported may be generated, in digital implementations, starting from the pair of IQ inputs $b_I[kT], b_Q[kT]$ (here T is the sampling period and k is a discrete-time integer index) as provided by the digital information source (together conceptually forming the complex envelope $\underline{b}[kT]=b_I[kT]+jb_Q[kT]$ of the bandpass message) $b[kT]=\sqrt{2}\mathrm{Re}\{\underline{b}[kT]e^{j\omega_{sc}Tk}\}$ to be transmitted) by digitally modulating (multiplying) the I input $b_I[kT]$ by a cosine tone while the Q input $b_I[kT]$ is modulated by a sine tone, as shown in the figure, forming the bandpass signal $b[kT]=b_I[kT]\cos(\omega_{sc}Tk)-b_Q[kT]\sin(\omega_{sc}Tk)=$
$\sqrt{2}\mathrm{Re}\{\underline{b}[kT]e^{j\omega_{sc}Tk}\}.$ (155)

It is this digital bandpass signal that is applied to the I electrode of the E-O IQ mod, while its Hilbert transform is applied to Q electrode of the E-O IQ mod (while also adding in constant bias(es) to one or both arms). Thus the concise description of this sub-embodiment is as follows:

The I and Q input components $b_I[kT],b_Q[kT]$ into our Tx are used to form the discrete-time bandpass message $b[kT]$ as in (155). The Hilbert transform of $d_I[kT]=b[kT]$, namely Hil$\{b[kT]\}$ is generated and is superposed with a DC bias (though the DC bias may also be applied in the analog domain rather than in the domain) forming the total drive signal $d$, (t) applied to the Q electrode of the optical IQ modulator.

The realization digital Hilbert filter was not specified above but there are well known implementations of Hilbert transform digital filters in the literature. However, since the message signal to be Hilbert-transformed is a bandpass one, we may take advantage of a simple implementation that is available in this case, motivating the E3.d2, E3.d3 embodiments (FIG. 9,10) detailed next.

E3.d2, E3.d3 Digital Sub-Embodiments

Figure 9:
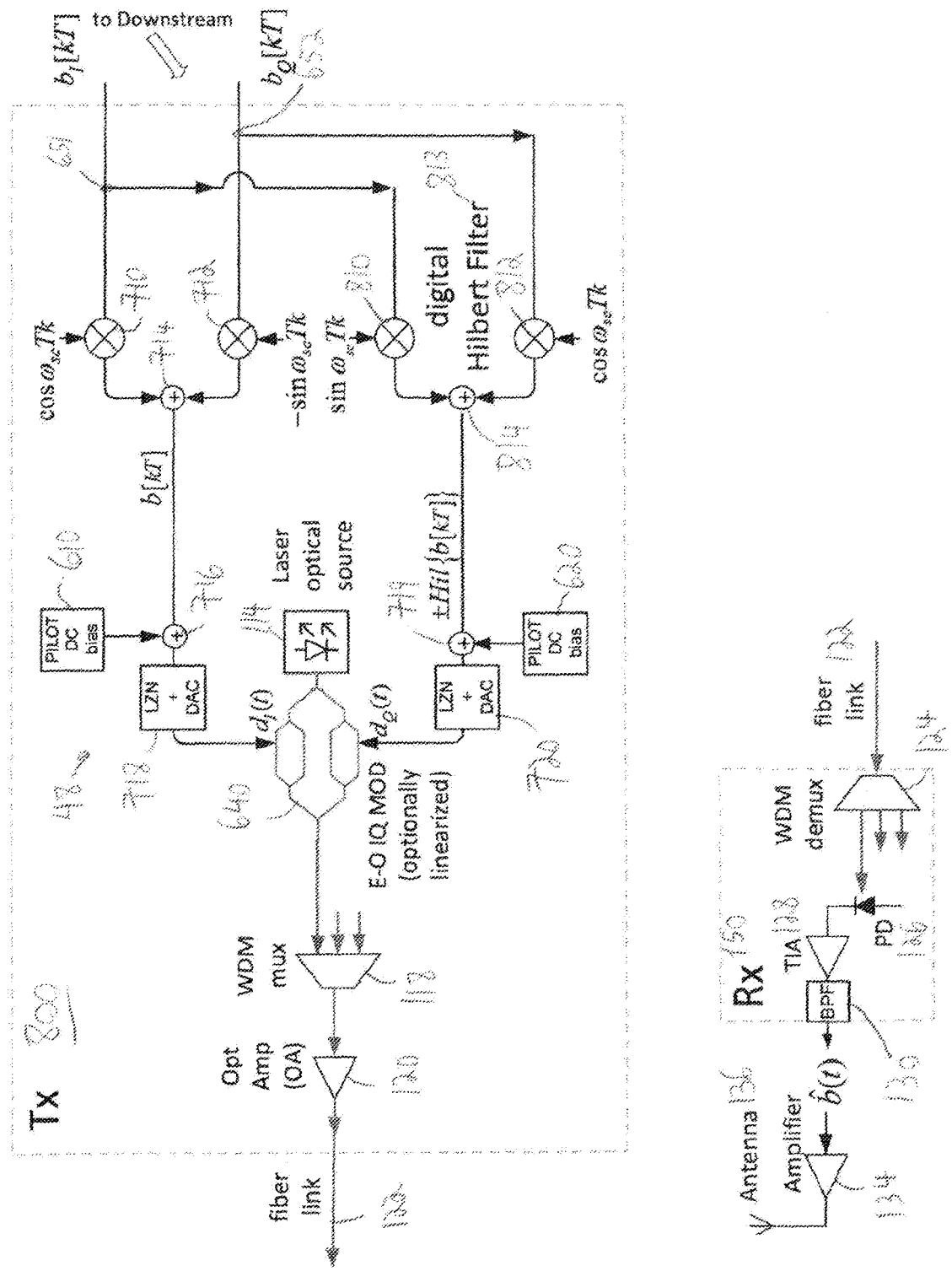
FIG. 9 illustrates an example of a system.
Figure 10:
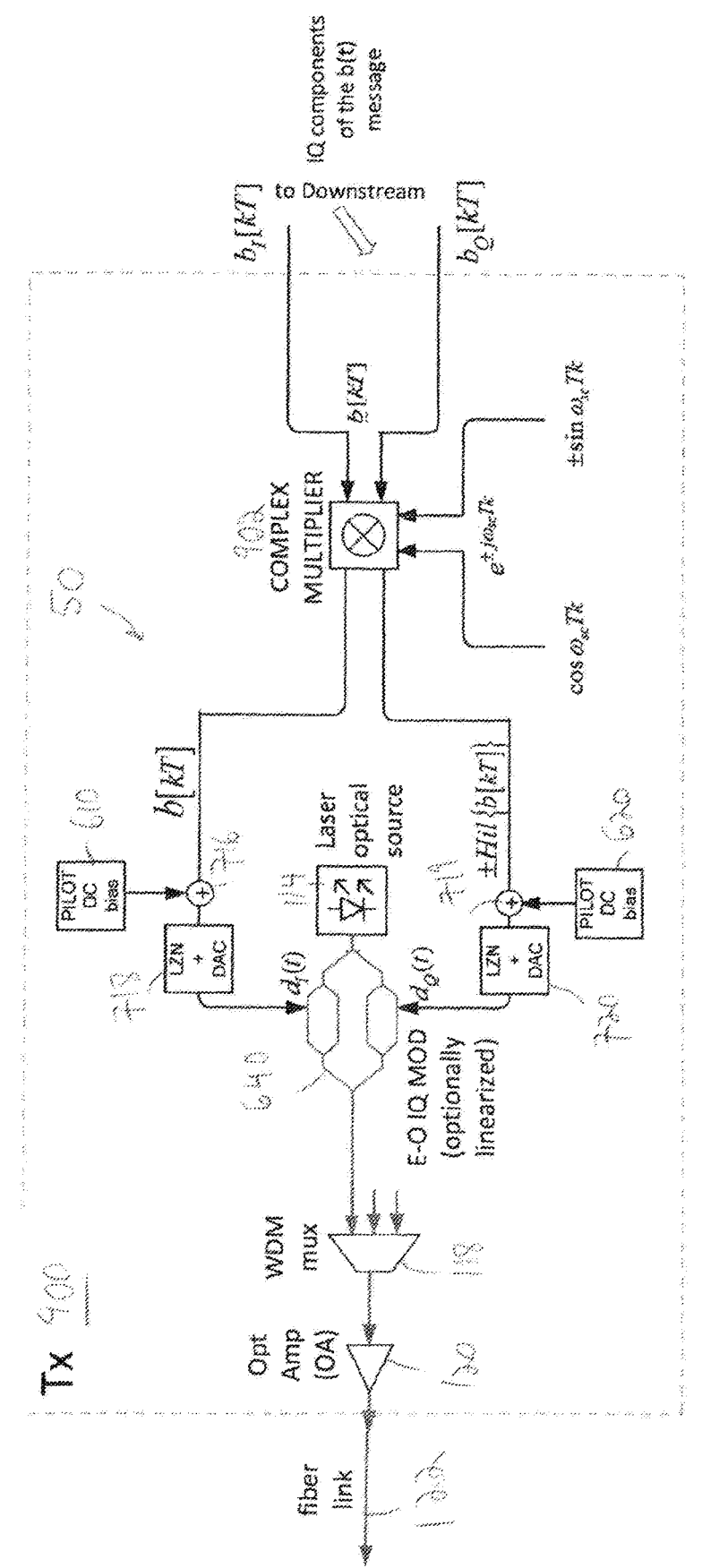
FIG. 10 illustrates an example of a system.
Figure 10:
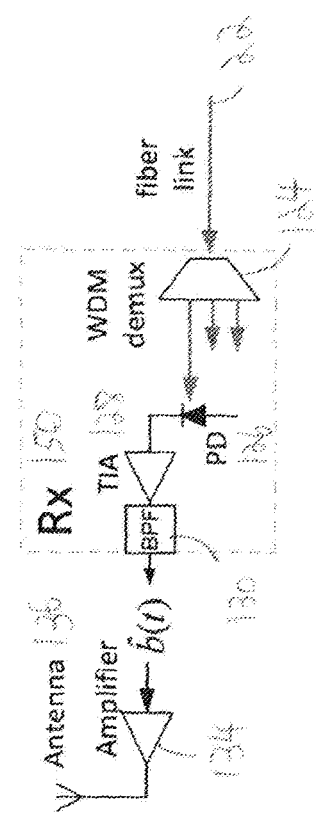

These sub-embodiments, the preferred digital ones for E3, are depicted in FIGS. 9,10). The main concept is that the Hilbert transform Hil$\{b[kT]\}$ may be generated similarly to the generation of $b[kT]$ as per (155), out of the pair of digital I and Q inputs representing the IQ components of the bandpass signal to be transported $b_I[kT],b_Q[kT]$, as provided by the digital information source.

E.g., this is useful for optical transport of downstream cellular signals from base-stations or from a cloud-radio-area network to remote radio heads—in this downstream optical transport case the signal to be transmitted would be initially specified by its I and Q baseband components, i.e., its complex envelope.

The known result for the Hilbert transform of the bandpass signal (155) is $Hil\{b[kT]\}=b_I[kT]\sin(\omega_{sc}Tk)+b_Q[kT]\cos(\omega_{sc}Tk)=$
$\sqrt{2}\mathrm{Im}\{\underline{b}[kT]e^{j\omega_{sc}Tk}\}$ (156)

which stems from the linearity of the Hilbert transform applied to (155) and the fact that $Hil\{\cos(\omega_{sc}Tk)\}=\sin(\omega_{sc}Tk)$ and $Hil\{\sin(\omega_{sc}Tk)\}=$
$-\cos(\omega_{sc}Tk).$ (157)

In the E3d.3 sub-embodiment the Hilbert pair is equivalently realized by means a complex multiplier. The implementation of the overall IQ driver is depicted in FIG. 10, just based on a single complex multiplier, taking the "wire pair" $b_I[kT],b_Q[kT]$ as its first input of the complex multiplier (abstractly represented as $b_I[kT]+jb_Q[kT]$ though we just have two wires) while the "wire pair" $\cos(\omega_{sc}Tk)$, $\sin(\omega_{sc}Tk)$ is taken as the second input $(\cos(\omega_{sc}Tk)\pm j\sin(\omega_{sc}Tk)=e^{j\omega_{sc}Tk})$ of the complex multiplier. The output "wire pair" of the complex multiplier is given by $(b_I[kT]+jb_Q[kT])$ $(\cos(\omega_{sc}Tk)+j\sin(\omega_{sc}Tk))=\{b_I[kT]\cos(\omega_{sc}Tk)-b_Q[kT]\sin(\omega_{sc}Tk)\}+j\{b_I[kT]\sin(\omega_{sc}Tk)+b_Q[kT]\cos(\omega_{sc}Tk)\}$ Its real and imaginary parts represent a pair of output wires of the complex multipliers. Onto these two wires are superposed DC biases and the resulting signals are passed to the pair of LNZ+DACs, to generate the drive signals $d_I(t)$, $d_Q(t)$ for the I and Q electrodes of the IQ MOD Another detail of the implementation is that in order generate lower-sideband SSB we may flip the sign of the sine function, using the wire-pair $\cos(\omega_{sc}Tk),\pm\sin(\omega_{sc}Tk)$, where the sign of the sine determines whether upper-sideband or lower-sideband SSB is generated An alternative view why such IQ driver system generates optical SSB when used in conjunction with an E-O IQ MOD is by noting that the first wire pair carries the complex input $b_I[kT]+jb_Q[kT]=\underline{b}[kT]$ while the second wire pair carries the complex input $\cos(\omega_{sc}Tk)\pm j\sin(\omega_{sc}Tk)=e^{\pm j\omega_{sc}Tk}$, thus the complex multiplier essentially generates the product of these two complex sequences, $\underline{b}[kT]e^{\pm j\omega_{sc}Tk}$ which is a one-sided spectrum having either just positive frequencies or just negative frequencies depending on the sign. But the complex signal $\underline{b}[kT]e^{\pm j\omega_{sc}Tk}$ after LNZ+DAC analog interpolation, represents the pair of the signals carried by the two output wires of the IQ driver (apart from the DC biases). It follows that this is the complex envelope of the optical output signal of the modulator but having a one-sided complex envelope implies that the signal has no spectral content either under or above the carrier frequency, i.e., it is ideally an optical SSB signal.

This concludes the description of the various sub-embodiments of E3. We emphasize that the high tolerance of the system to imperfect SSB (i.e., having VSB with some residual sideband on one side of the optical carrier). It follows that imperfections of the Hilbert transform generation and other imbalance along the path (e.g. IQ modulator and IQ driver amplitude imbalances of the IQ paths) will just marginally degrade the improved CD tolerance.

E4 Embodiment—DSB Signal (or VSB)+SSB Pilot
(Quadrature RF Pilots)

This embodiment may be concisely referred, in the spirit of asymmetric optical filtering model derived above, as "DSB signal, SSB pilot". It uses I and Q RF pilot tones in quadrature to generate a nominally (i.e., ideally) SSB optical pilot, offset from the optical carrier on one side i.e. an optical tone at $\omega_{sc}+\omega_p$ or at $\omega_{sc}-\omega_p$. In practice there may be a residual optical pilot at the mirror frequency offset, i.e., we generate a VSB pair of optical tones rather than a single offset SSB optical tone, but the presence of the mirror image residual pilot just causes gracefully small performance degradation, slightly reducing the CD tolerance as per the analysis of asymmetric optical filtering carried out above. I To generate the nominal SSB pilot (in practice a near-SSB or VSB pilot) we also use here an E-O IQ MOD, driven by RF signals $d_I(t),d_Q(t)$ generated by an IQ driver module which may have analog or digital (or rather mixed signal) alternative implementations, detailed in the various sub-embodiments.

In all sub-embodiments of E4, the signals $d_I(t),d_Q(t)$ contain respective RF pilot tones which are in quadrature, i.e. 90 degrees apart. The various sub-embodiments differ by the MZM(s) to which the bandpass message $b(t)$ to be transported is applied. There are three options: The bandpass message $b(t)$ may be applied to either the I-MZM (i.e., to its $d_I(t)$ drive signal) or to the Q-MZM (i.e., to its $d_Q(t)$ drive signal) or to both the I-MZM and the Q-MZM signal, which improves the electro-optic modulation efficiency generating a stronger (by a factor of $\sqrt{2}$ in amplitude) message originating bandpass signal, albeit rotated by ±45° due to the IQ action, relative to the case that the bias is applied just two one of the I or Q electrodes (but notice that this phase-shift in the phase angle $\phi_p$ is inconsequential as the optical Rx post-processing employs carrier recovery).

E4.a1, E4.a2, E4.a3 Analog Sub-Embodiments of DSB Signal+SSB Pilot

Motivated by the spectral plots of FIG. 11, FIGS. 12-14 depict three analog sub-embodiments. Such analog implementation would be suitable in a cellular network application in the upstream direction, when the analog message b(t) to be transported, fed into the E4 Tx, originates from a receiving antenna in analog form, but such application is not the only one, but is presented as one example. In other radio over fiber or wireless LAN applications, the analog bandpass message to be transported may originate from any source, including from a DAC which may be used to drive the E4 Tx systems.

In all three "analog" sub-embodiments E4.a1, E4.a2, E4.a3, the drive signals $d_I(t), d_Q(t)$ contain the respective pilot components $\sqrt{2}p_o \cos(\omega_p t + \phi_p), \pm \sqrt{2}p_o \sin(\omega_p t + \phi_p)$, i.e., the optical SSB pilot, which is the hallmark of this embodiment is generated by quadrature RF pilots added onto the I and Q paths. The ± sign ahead the sine component determines whether nominal upper-sideband or lower-sideband SSB is generated after optical IQ modulation. This implies that the complex envelope $\underline{m}(t) \propto d_I(t) + jd_Q(t)$ of the modulated optical signal at the E-O IQ MOD output always contains in these embodiments an additive term $$\sqrt{2}p_o \cos(\omega_p t + \phi_p) \pm j\sqrt{2}p_o \sin(\omega_p t + \phi_p) = \sqrt{2}p_o e^{\pm j\omega_p t} \quad (158)$$

which is the complex envelope corresponding to a one-sided pilot at optical frequency $\omega_c \pm \omega_p$ (i.e., an upper-sideband or lower-sideband SSB pilot, in contrast to the DSB pilot tone used in embodiment E2).

The three embodiments E4.a1, E4.a2, E4.a3 may be specified as:

$E4a.1$: $[d_I(t), d_Q(t)] = [b(t) + \sqrt{2}p_o \cos(\omega_p t + \phi_p), \pm \sqrt{2}p_o \sin(\omega_p t + \phi_p)]$ $E4a.2$: $[d_I(t), d_Q(t)] = [\sqrt{2}p_o \cos(\omega_p t + \phi_p), \pm b(t) \pm \sqrt{2}p_o \sin(\omega_p t + \phi_p)]$ $E4a.3$: $[d_I(t), d_Q(t)] = [b(t) + \sqrt{2}p_o \cos(\omega_p t + \phi_p), \pm b(t) \pm \sqrt{2}p_o \sin(\omega_p t + \phi_p)]$ correspondingly, the complex envelope $\underline{m}(t) \propto d_I(t) + jd_Q(t)$ is given by $E4a.1$: $\underline{m}(t) \propto [b(t) + \sqrt{2}p_o \cos(\omega_p t + \phi_p)] \pm j\sqrt{2}p_o \sin(\omega_p t + \phi_p) = b(t) + \sqrt{2}p_o e^{\pm j\omega_p t}$ $E4a.2$: $\underline{m}(t) \propto \sqrt{2}p_o \cos(\omega_p t + \phi_p) \pm j[b(t) \pm \sqrt{2}p_o \sin(\omega_p t + \phi_p)] = \pm jb(t) + \sqrt{2}p_o e^{\pm j\omega_p t}$ $E4a.3$: $\underline{m}(t) \propto b(t) + \sqrt{2}p_o \cos(\omega_p t + \phi_p) \pm j[\pm b(t) \pm \sqrt{2}p_o \sin(\omega_p t + \phi_p)] = \sqrt{2}b(t)e^{\pm j\pi/4} + \sqrt{2}p_o e^{\pm j\omega_p t} \quad (160)$ Such complex envelopes of the E-O IQ MOD clearly comprise a DSB signal and SSB optical carrier. In embodiment E4a.3 (the last formula of שגיאה! מקור ההפניה לא נמצא.) we get a stronger signal component (by 3 dB optical), thus this embodiment is preferred as it makes better use of the IQ modulator optical power, utilizing both the I and Q MZMs to generate useful modulated message.

E4.d1, E4.d2, E4.d3 Digital Sub-Embodiments of DSB Signal+SSB Pilot

Figure 15:
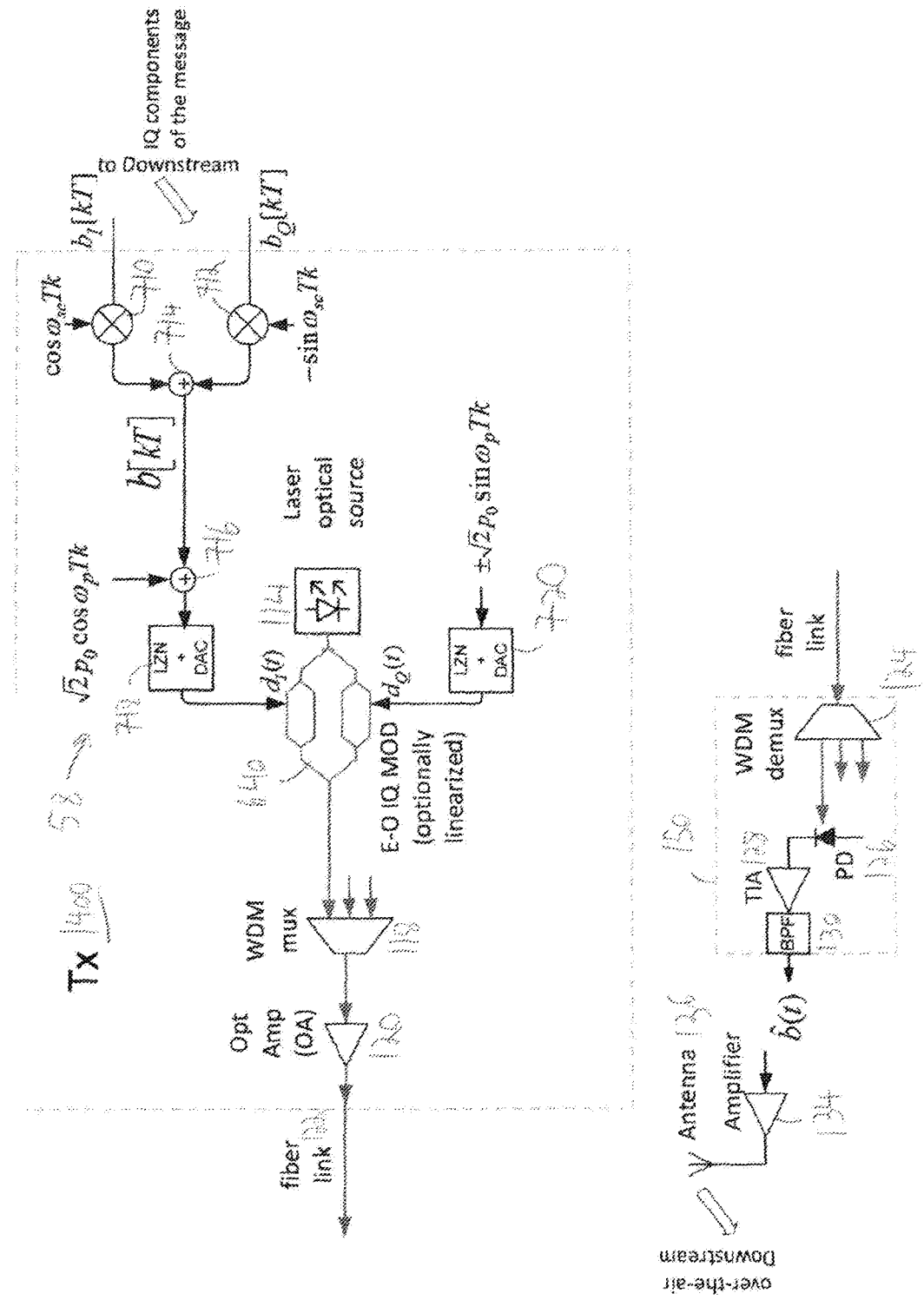
FIG. 15 illustrates an example of a system.
Figure 16:
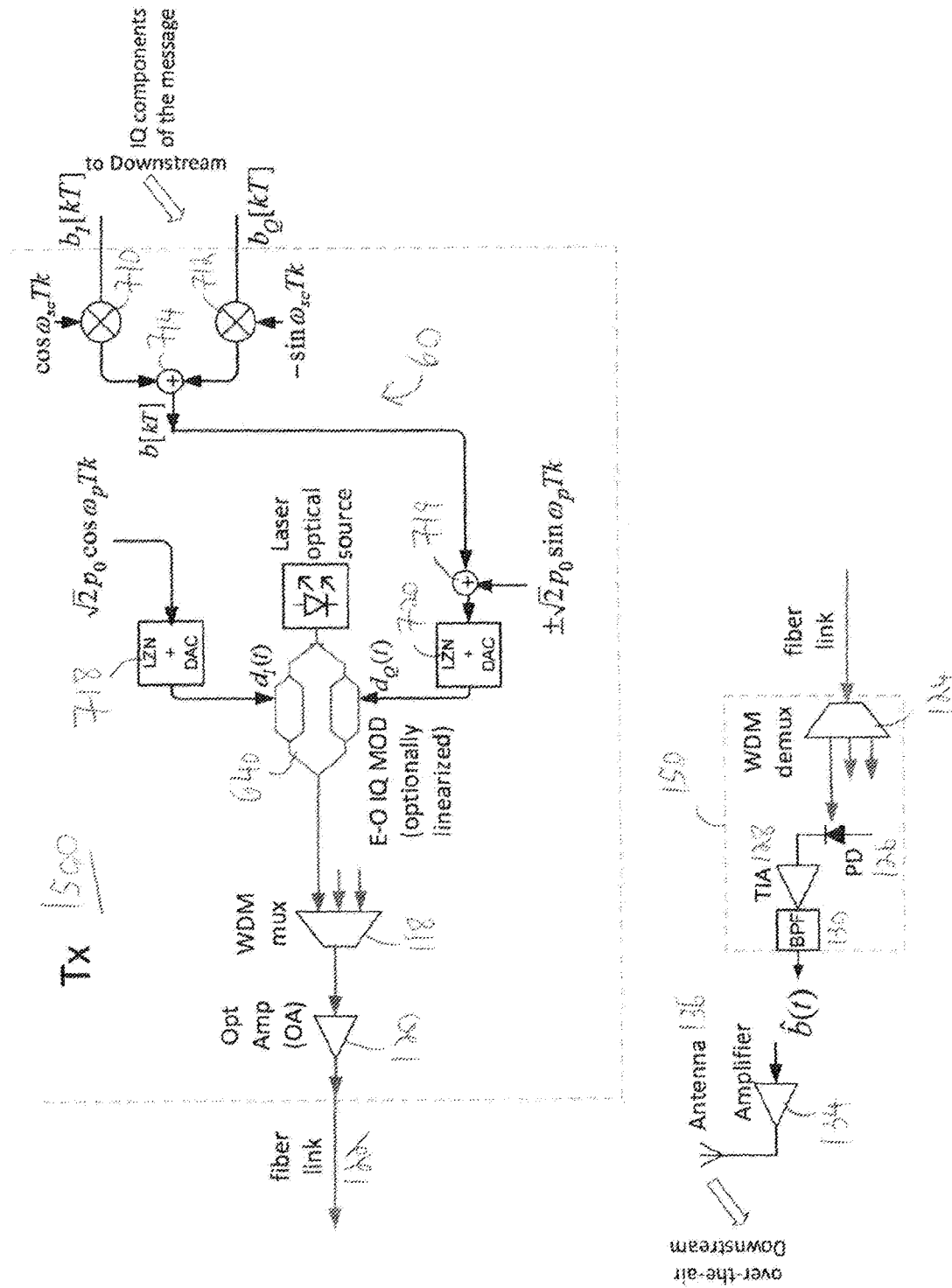
FIG. 16 illustrates an example of a system.
Figure 17:
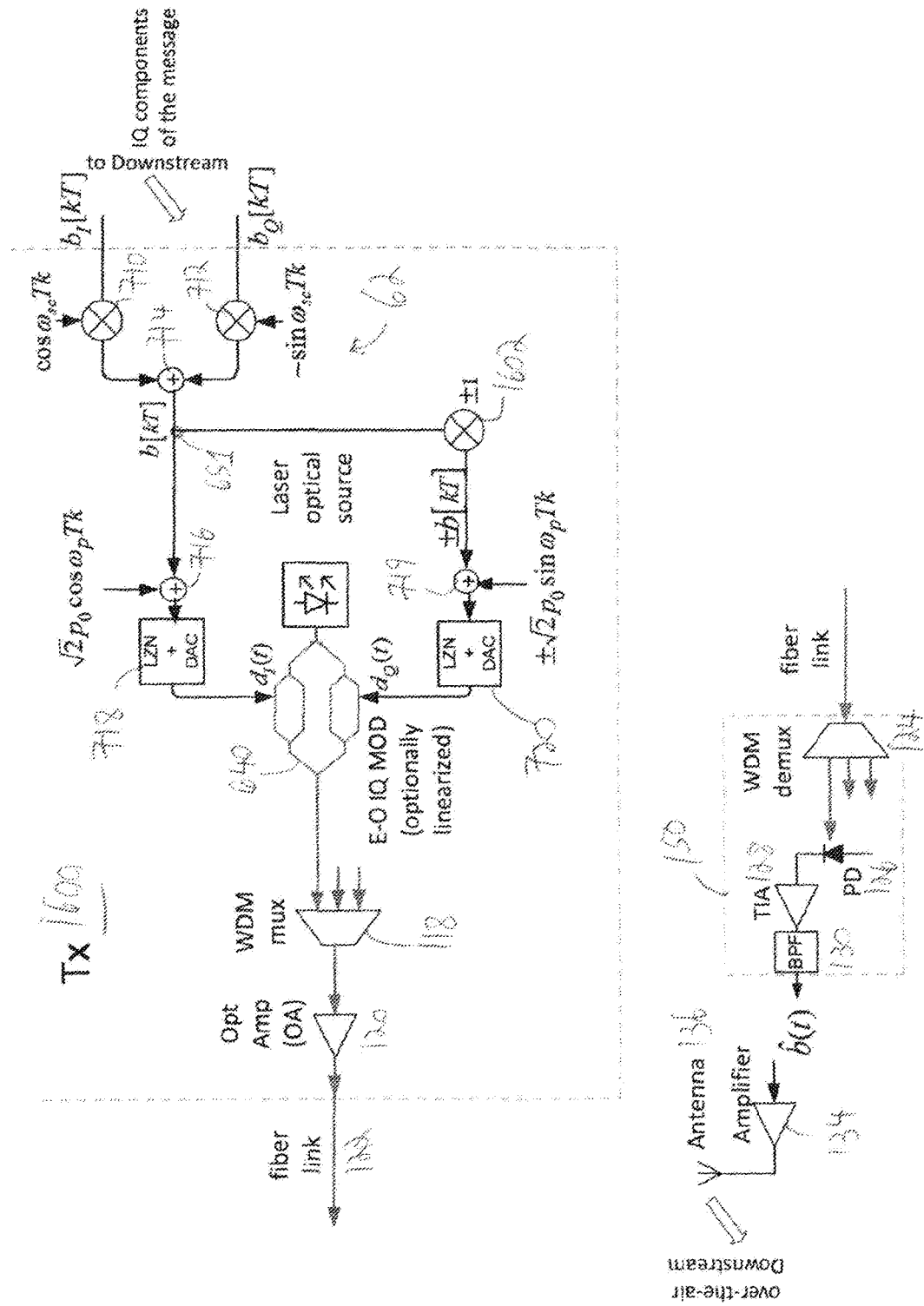
FIG. 17 illustrates an example of a system.

These three sub-embodiments (FIGS. 15-17) are most suitable when the bandpass signal to be transmitted is specified in the digital domain by its I and Q baseband components, $b_I[kT], b_Q[kT]$, i.e., by its complex envelope, $\underline{b}[kT]$. E.g., this is typically the case for optical transport of downstream cellular signals from base-stations or from a cloud-radio-area network to remote radio heads. The signal flow is similar to that the corresponding E4.a1, E4.a2, E4.a3 sub-embodiments, albeit in the digital domain. The optical Tx again features an IQ modulator, driven by an IQ driver producing the drive signals $d_I(t), d_Q(t)$ by means of a pair of LNZ+DACs. These two drive signals additively contain the respective pilot components and at least one of which contains the bandpass signal b(t) to be transported (in superposition with the pilot(s)). Equations ההפניה לא נמצא שגיאה! מקור.. describe the optical analog domain, however the generation of $d_I(t), d_Q(t)$ essentially occurs in these sub-embodiments the digital domain, wherein $d_I[kT], d_Q[kT]$ are generated as shown in FIGS. 15-17. First, the bandpass signal b[kT] is generated out of the IQ components of the message $b_I[kT], b_Q[kT]$, as per(155) repeated here:

$$b[kT] = b_I[kT]\cos(\omega_{sc}Tk) - b_Q[kT]\sin(\omega_{sc}Tk) = \sqrt{2}\text{Re}\{\underline{b}[kT]e^{j\omega_{sc}Tk}\} \quad (161)$$

Then this bandpass discrete time message signal to be transported is applied to either the I path (in E4d.1) or the Q path (in E4d.2) or to both paths (in E4d.3) leading to the IQ modulator electrodes via the LNZ+DACs. But prior to application to the LNZ+DACs, the discrete-time pilot tone components in quadrature are additively injected. Thus, $E4d.1$: $[d_I[kT], d_Q[kT]] = [b[kT] + \sqrt{2}p_o \cos(\omega_p Tk + \phi_p), \pm \sqrt{2}p_o \sin(\omega_p Tk + \phi_p)]$ $E4d.2$: $[d_I[kT], d_Q[kT]] = [\sqrt{2}p_o \cos(\omega_p Tk + \phi_p), b[kT] \pm \sqrt{2}p_o \sin(\omega_p Tk + \phi_p)]$ $E4d.3$: $[d_I[kT], d_Q[kT]] = [b[kT] + \sqrt{2}p_o \cos(\omega_p Tk + \phi_p), b[kT] \pm \sqrt{2}p_o \sin(\omega_p Tk + \phi_p)] \quad (162)$ E5—Embodiment SSB Signal+DSB Pilot In this embodiment, motivated by the spectral plot of FIG. 18, the signal is nominally an SSB one (practically VSB signal generation, i.e., imperfect SSB may suffice, incurring just small degradation of CD tolerance and SNR) whereas the sinusoidal pilot tone nominally generates optical DSB. Essentially, the nearly SSB signal is generated just like in embodiment E3, the only difference being the generation of the pilot, which was a DC bias in E3, whereas now, in E5, it is a sinusoidal tone just like in E4, additively applied either to the I-MZM or to the Q-MZM or to both (to generate a DSB pilot tone in one or both of the children MZMs of the IQ MOD).

We also have here analog (FIGS. 19-21) and digital (FIGS. 22-24) sub-embodiments as detailed next. These embodiments borrow elements of E3 (for the signal) namely usage of the Hilbert transform or of complex one-sided modulation, while the pilot tone is injected just like in E4.

E5.a1, E5.a2, E5.a3 Analog Sub-Embodiments of SSB Signal, DSB Pilot

Figure 19:
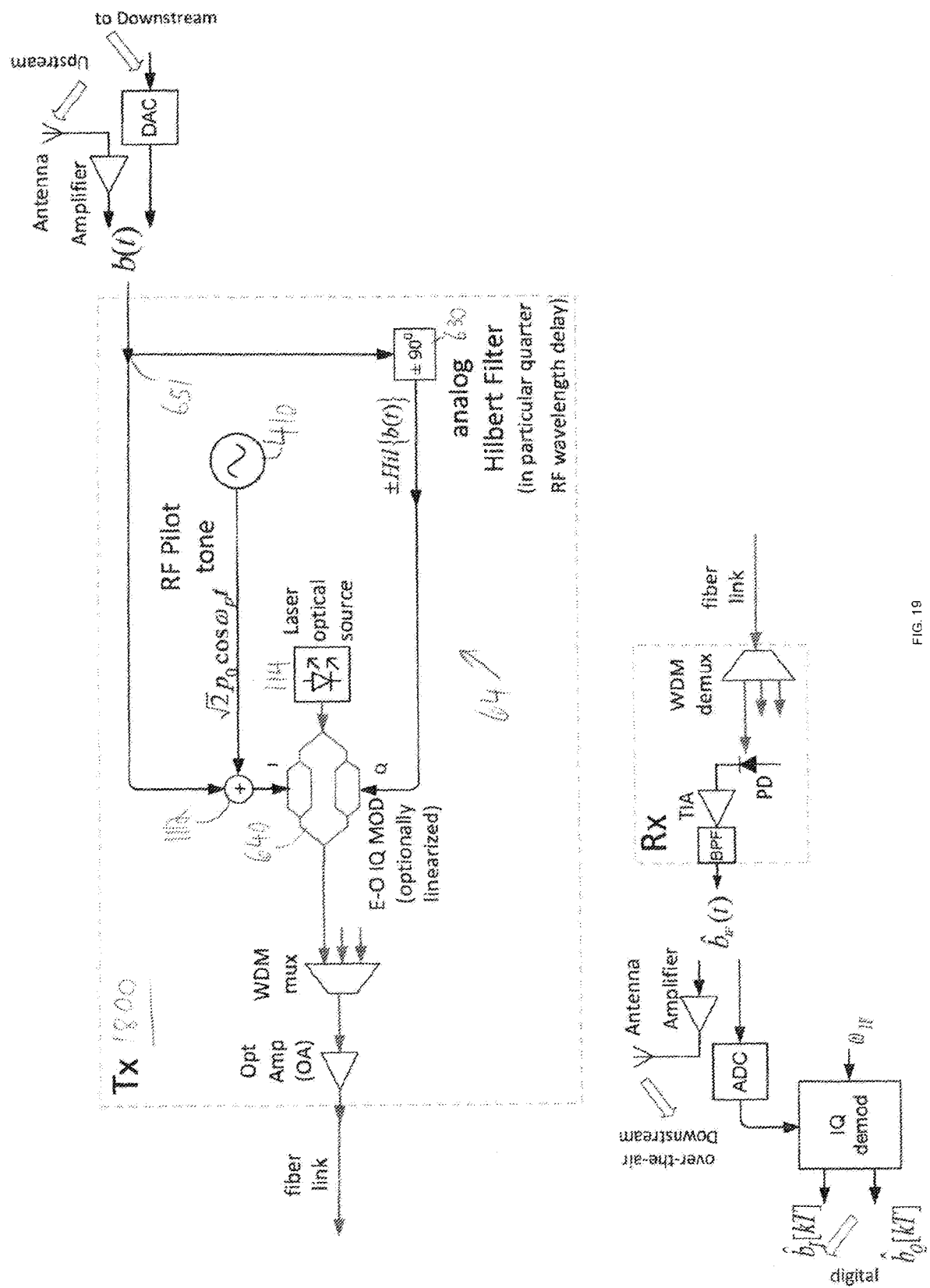
FIG. 19 illustrates an example of a system.
Figure 20:
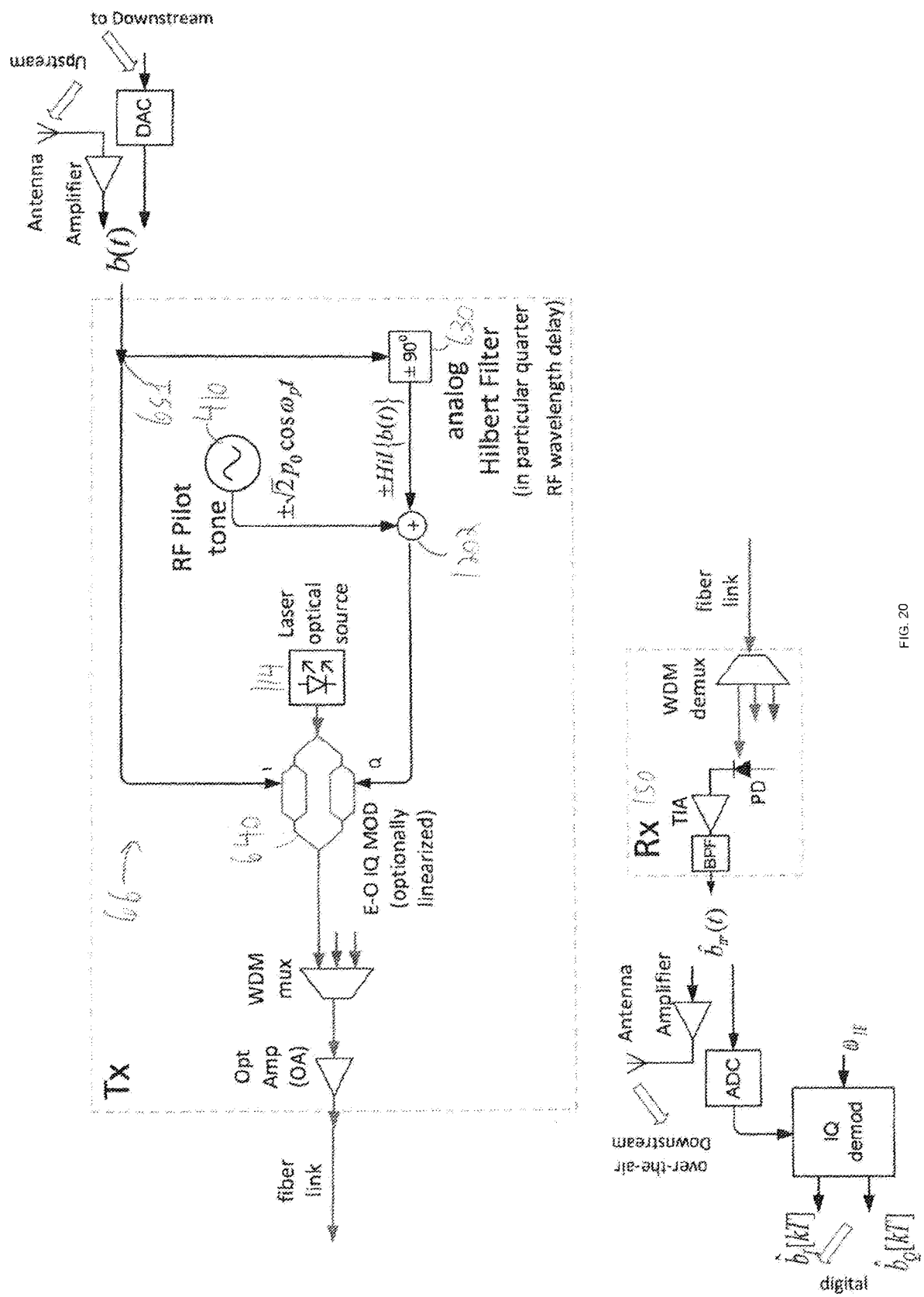
FIG. 20 illustrates an example of a system.
Figure 21:
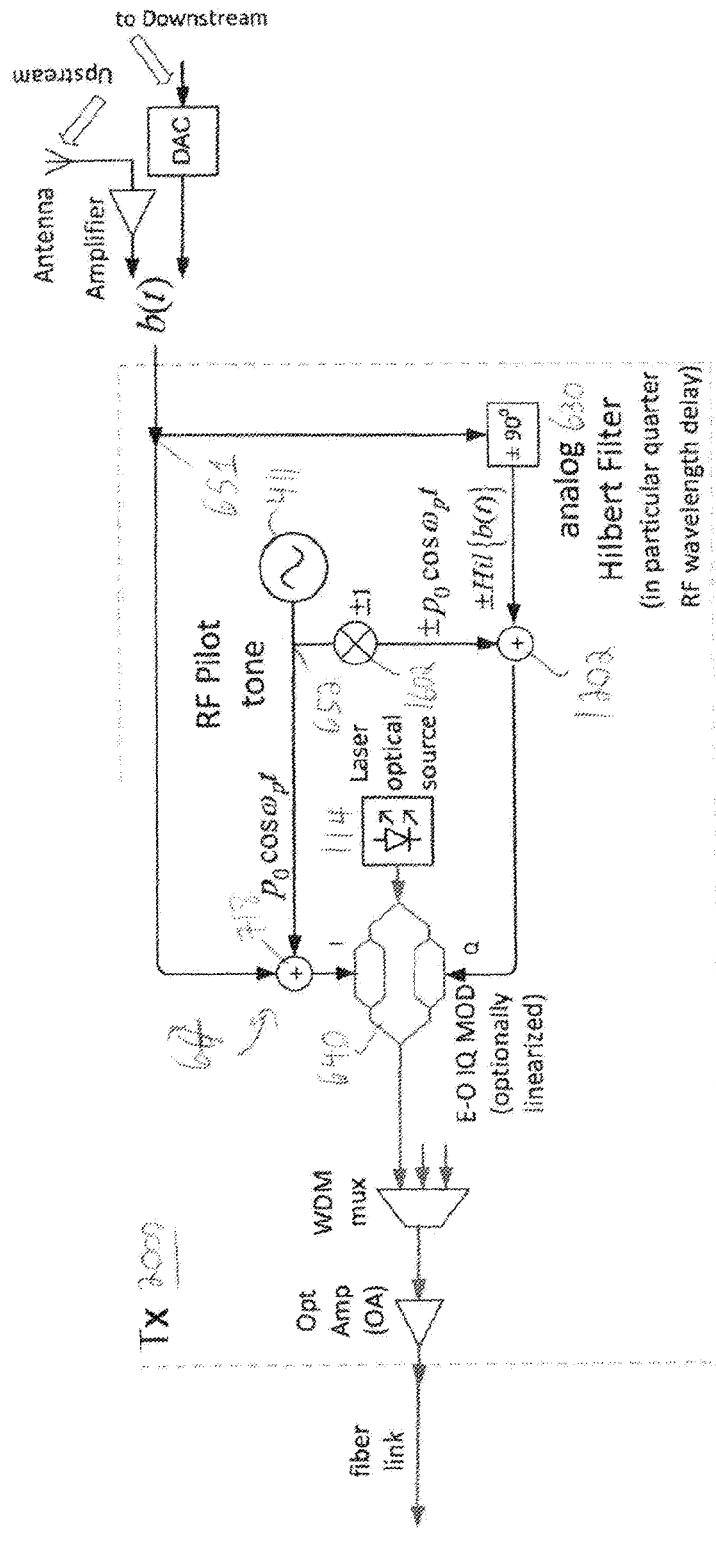
FIG. 21 illustrates an example of a system.
Figure 21:
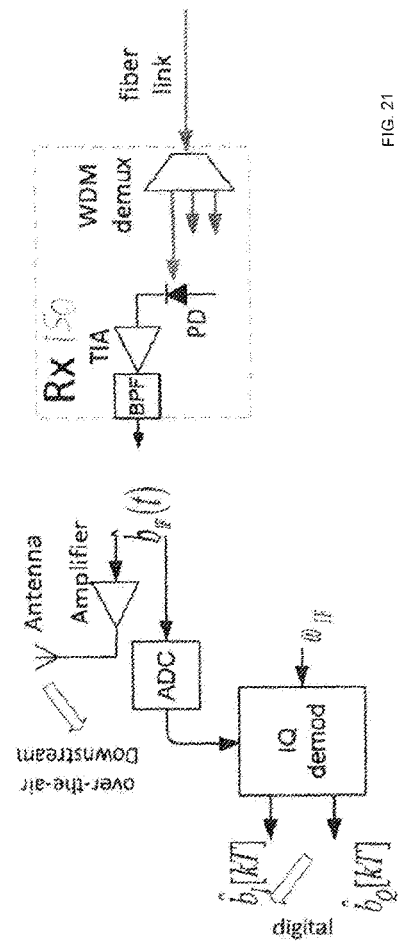

FIGS. 19-21 depict these three analog sub-embodiments. Such analog implementation would be suitable in a cellular network application in the upstream direction, wherein the analog signal to be transported originates from a receiving antenna, but this application is incorporated in the figure just by way of example. In other radio over fiber applications, the analog bandpass message to be transported may originate from any source, including from a DAC.

In all three cases, one or both of drive signals $d_I(t), d_Q(t)$ contain the respective pilot components $\sqrt{2}p_o \cos(\omega_p t + \phi_p), \pm \sqrt{2}p_o \cos(\omega_p t + \phi_p)$ (one of the I or Q paths may contain no pilot tone, but in case both pilot tones are applied to the respective I and Q paths they would be here either in phase or in anti-phase this is in contrast to SSB pilot implementations when the I and Q paths have pilot tones in quadrature, cosine and sine). This implies that the complex envelope $\underline{m}(t) \propto d_I(t) + j d_Q(t)$ of the modulated optical signal at the E-O IQ MOD output always contains a real-valued sinusoidal additive term (its phase and amplitude may be different, depending on the various sub-cases). Thus, the optical complex envelope corresponding to an equal amplitude spectral lines at optical frequency $\omega_c \pm \omega_p$ (i.e., DSB pilot).

The three embodiments E5.a1, E5.a2, E5.a3 may be specified as:

$$E5a.1:[d_I(t),d_Q(t)]=[b(t)+\sqrt{2}p_o \cos(\omega_p t + \phi_p), \pm Hil\{b(t)\}]$$

$$E5a.2:[d_I(t),d_Q(t)]=[b(t),\pm Hil\{b(t)\}\sqrt{2}p_o \cos(\omega_p t + \phi_p)]$$

$$E5a.3:[d_I(t),d_Q(t)]=[b(t)+\sqrt{2}p_o \cos(\omega_p t + \phi_p), \pm Hil\{b(t)\}\pm\sqrt{2}p_o \cos(\omega_p t + \phi_p)] \quad (163)$$

The corresponding complex envelope of the E-O IQ MOD clearly comprises an SSB signal and DSB optical carrier. The advantage of applying the pilot tone to both I and Q paths is that a stronger signal (by 3 dB) is obtained.

E5.d1, E5.d2, E5.d3 Digital Sub-Embodiments of SSB Signal, DSB Pilot

Figure 22:
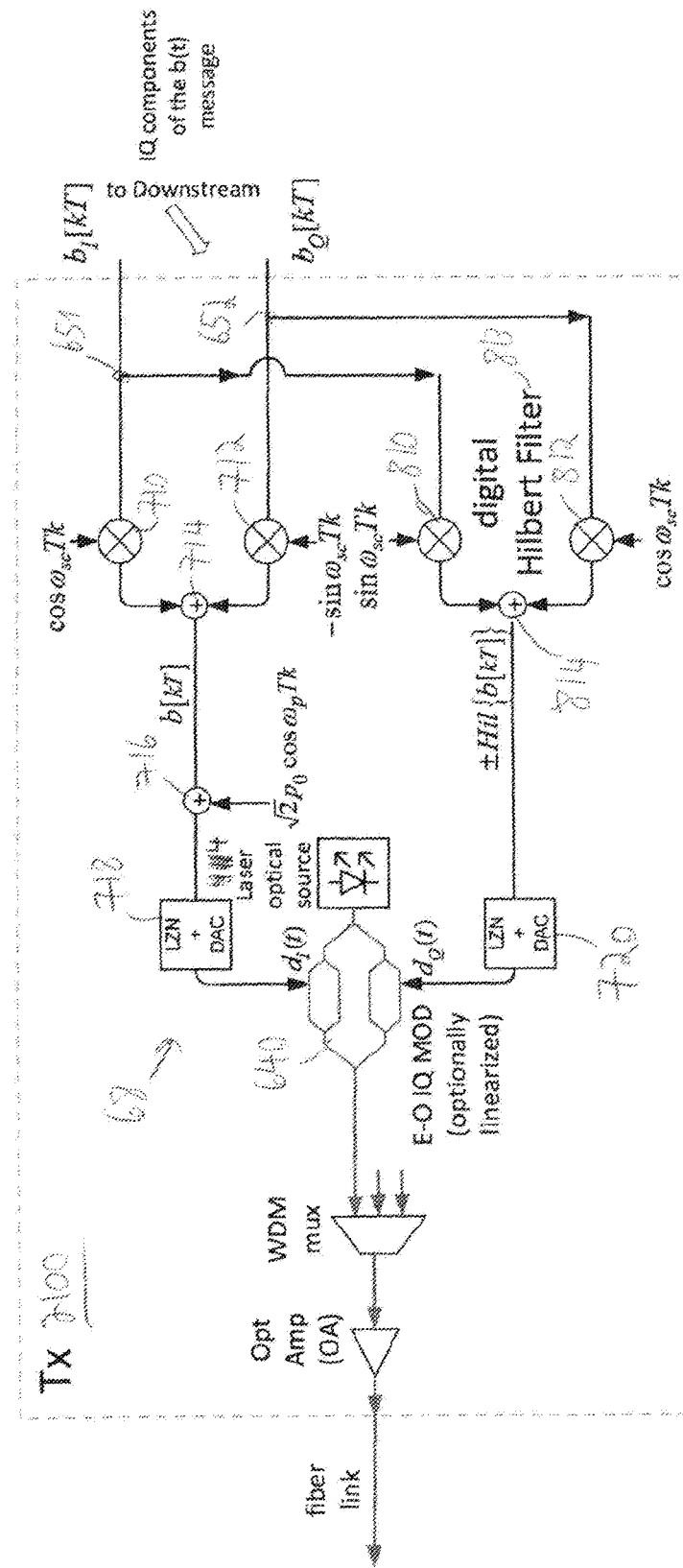
FIG. 22 illustrates an example of a system.
Figure 23:
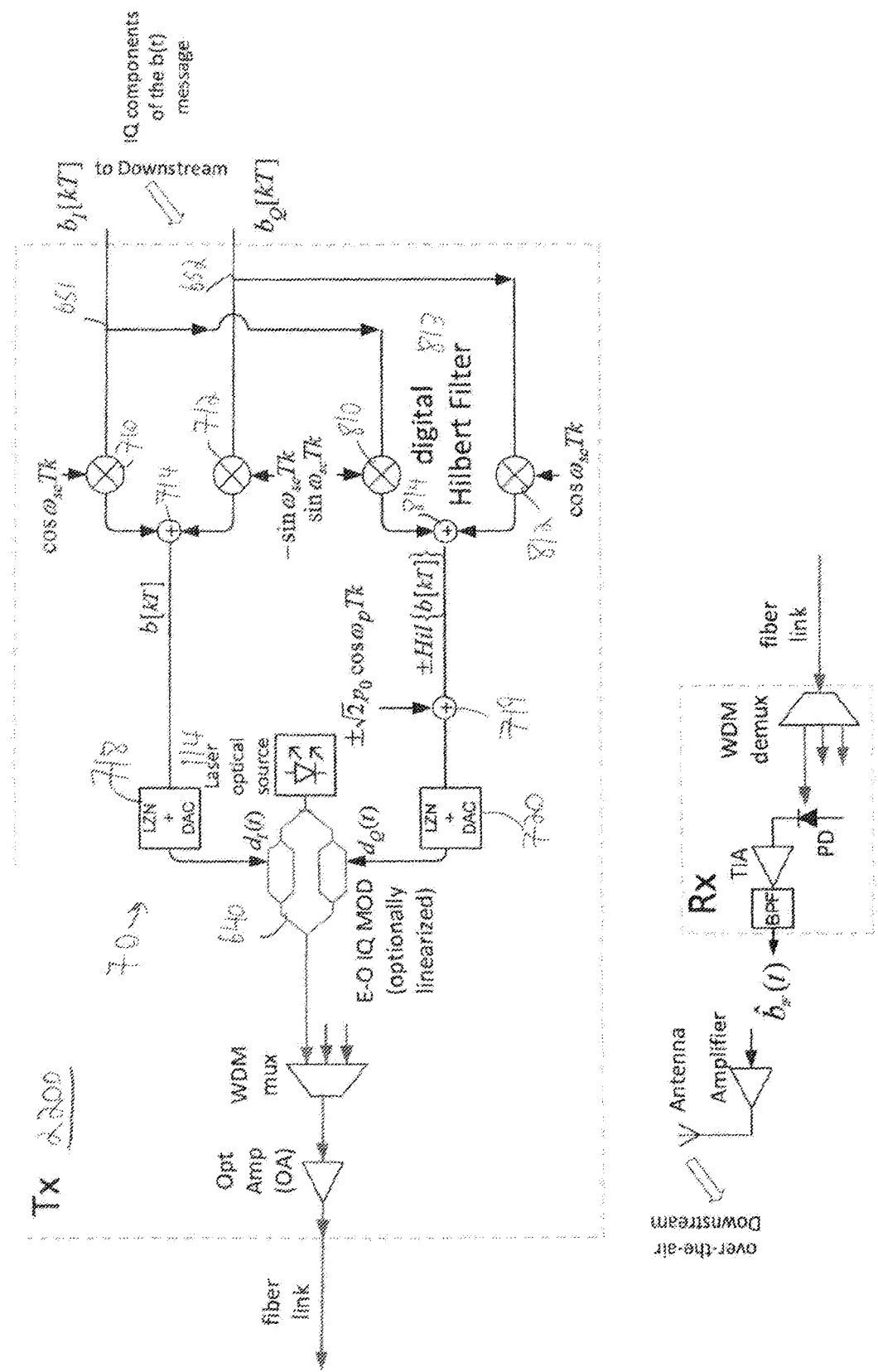
FIG. 23 illustrates an example of a system.
Figure 24:
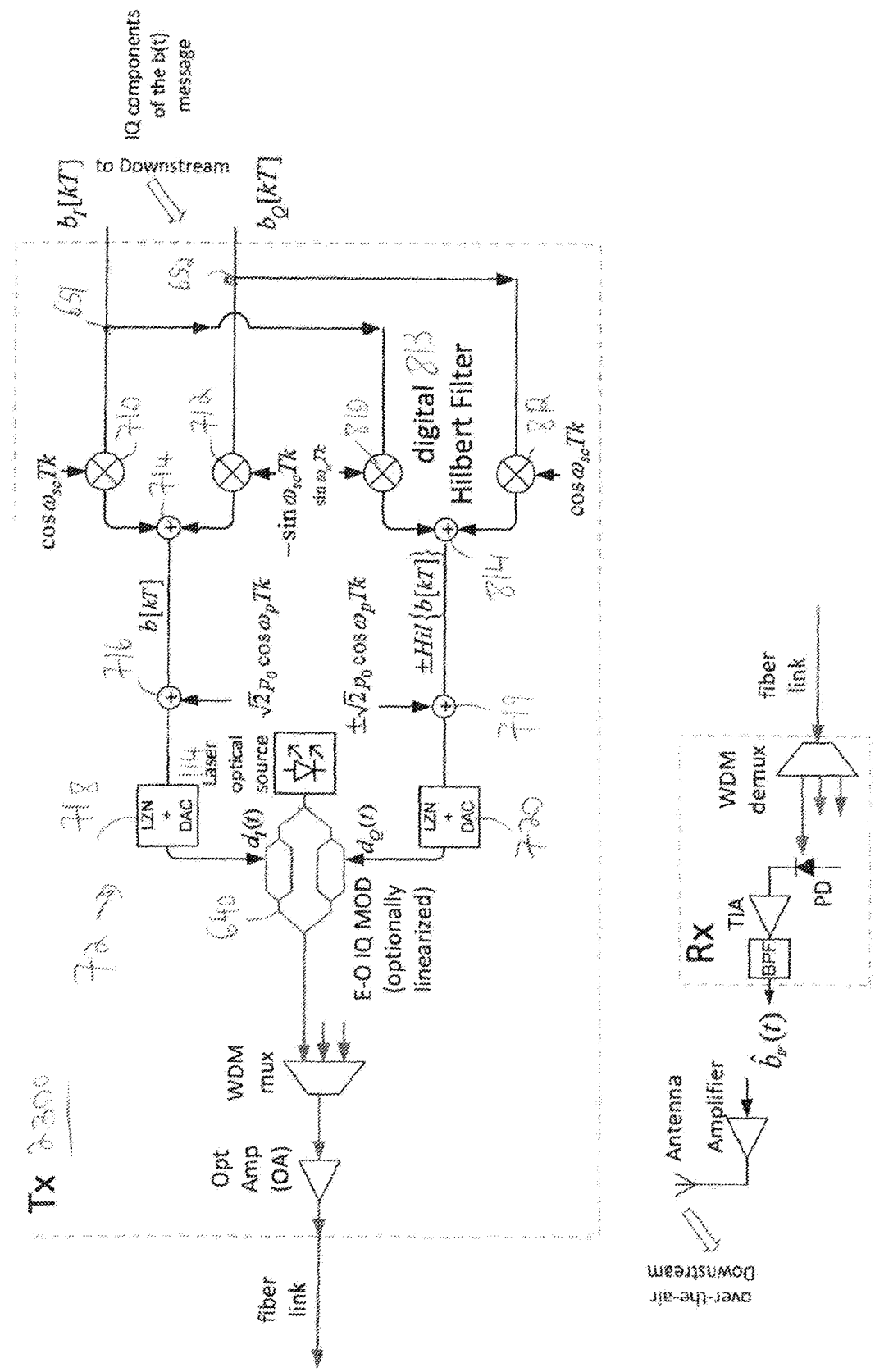
FIG. 24 illustrates an example of a system.

These embodiments are most suitable when the bandpass signal to be transmitted is specified in the digital domain by its I and Q baseband components, $b_I[kT], b_Q[kT]$, i.e., by its complex envelope, $\underline{b}[kT]$. E.g., this is typically the case for optical transport of downstream cellular signals from base-stations or from a cloud-radio-area network to remote radio heads. The signal flow is similar to that the corresponding E5.a1, E5.a2, E5.a3 sub-embodiments, albeit in the digital rather than the analog domain. The optical Tx again features an IQ modulator, driven by an IQ driver producing the drive signals $d_I(t), d_Q(t)$, the last stage of the IQ driver being a pair of LNZ+DACs. These two drive signals additively contain the respective pilot components and at least one of them additively contains the bandpass signal b(t) to be transported. Equations שגיאה! מקור ההפניה לא נמצא. apply in the analog optical domain, however their generation of $d_I(t), d_Q(t)$ essentially occurs in the digital domain, wherein $d_I[kT], d_Q[kT]$ is generated as shown in FIGS. 22-24. First, the bandpass signal $b[kT]$ is generated out of the IQ components of the message $b_I[kT], b_Q[kT]$, as per (155), repeated here:

$$b[kT]=b_I[kT]\cos(\omega_{sc}Tk)-b_Q[kT]\sin(\omega_{sc}Tk)=\sqrt{2}Re\{\underline{b}[kT]e^{j\omega_{sc}Tk}\} \quad (164)$$

The Hilbert transform of the bandpass signal (155) or (164) may be generated by means of a digital Hilbert filter, in sub-embodiment E5.d1, E5.d2, E5.d3. Alternatively in E5.d.4, E5.d.5, E5.d.6 it is digitally generated as in (156), repeated here:

$$Hil\{b[kT]\}=b_I[kT]\sin(\omega_{sc}Tk)+b_Q[kT]\cos(\omega_{sc}Tk)=\sqrt{2}Im\{\underline{b}[kT]e^{j\omega_{sc}Tk}\} \quad (165)$$

But these are the equations of implementing the following complex multiplier by means of four real multiplications (the last two equations are the real and imaginary parts of the following complex multiplication equation):

$$b[kT]+jHil\{\underline{b}[kT]\}=\{\cos(\omega_{sc}Tk)+j\sin(\omega_{sc}Tk)\}\{b_I[kT]+jb_Q[kT]\} \quad (166)$$

Note that we do not have to use four real multipliers to implement the complex multiplication an implementation based on three multipliers also exists.

Now that the Hilbert pair $b[kT], Hil\{b[kT]\}$ has been generated, we add in the pilots, for which we have three options: either add pilot just to the I path (embodiments E5d.1, E5d.4) or just to the Q path (embodiments E5d.2, E5d.5) or add pilots (in phase or 180 degrees out of phase) to both the I and the Q paths (embodiments E5d.3, E5d.6).

Another classification of these six sub-embodiments is according to how the Hilbert pair is implemented, be it by a Hilbert digital filter in sub-embodiments E5d.1, E5d.2, E5d.3 or by means of complex multiplication in sub-embodiments E5d.4, E5d.5, E5d.6 (the complex multiplication is not shown in explicit figures, just embodiments E5d.1, E5d.2, E5d.3 are shown in FIGS. 22-24).

The bandpass discrete time message signal to be transported and its Hilbert transform are respectively applied to the I and Q paths leading to the IQ modulator electrodes via the LNZ+DACs. But prior to application to the LNZ+DACs, discrete-time pilot tone component(s) are additively injected, as follows:

$$E5d.1,E5d.4: [d_I[kT],d_Q[kT]]=[b[kT]+\sqrt{2}p_o \cos(\omega_p Tk + \phi_p), \pm Hil\{b[kT]\}]$$

$$E5d.2,E5d.5: [d_I[kT],d_Q[kT]]=[b[kT],\pm Hil\{b(t)\}\pm\sqrt{2}p_o \cos(\omega_p Tk + \phi_p)]$$

$$E5d.3,E5d.6: [d_I[kT],d_Q[kT]]=[b[kT]+\sqrt{2}p_o \cos(\omega_p Tk + \phi_p), \pm Hil\{[kT]\}\pm\sqrt{2}p_o \cos(\omega_p Tk + \phi_p)] \quad (167)$$

E6 Embodiment: Signal and Pilot are Both SSB (or VSB)

Figure 25:
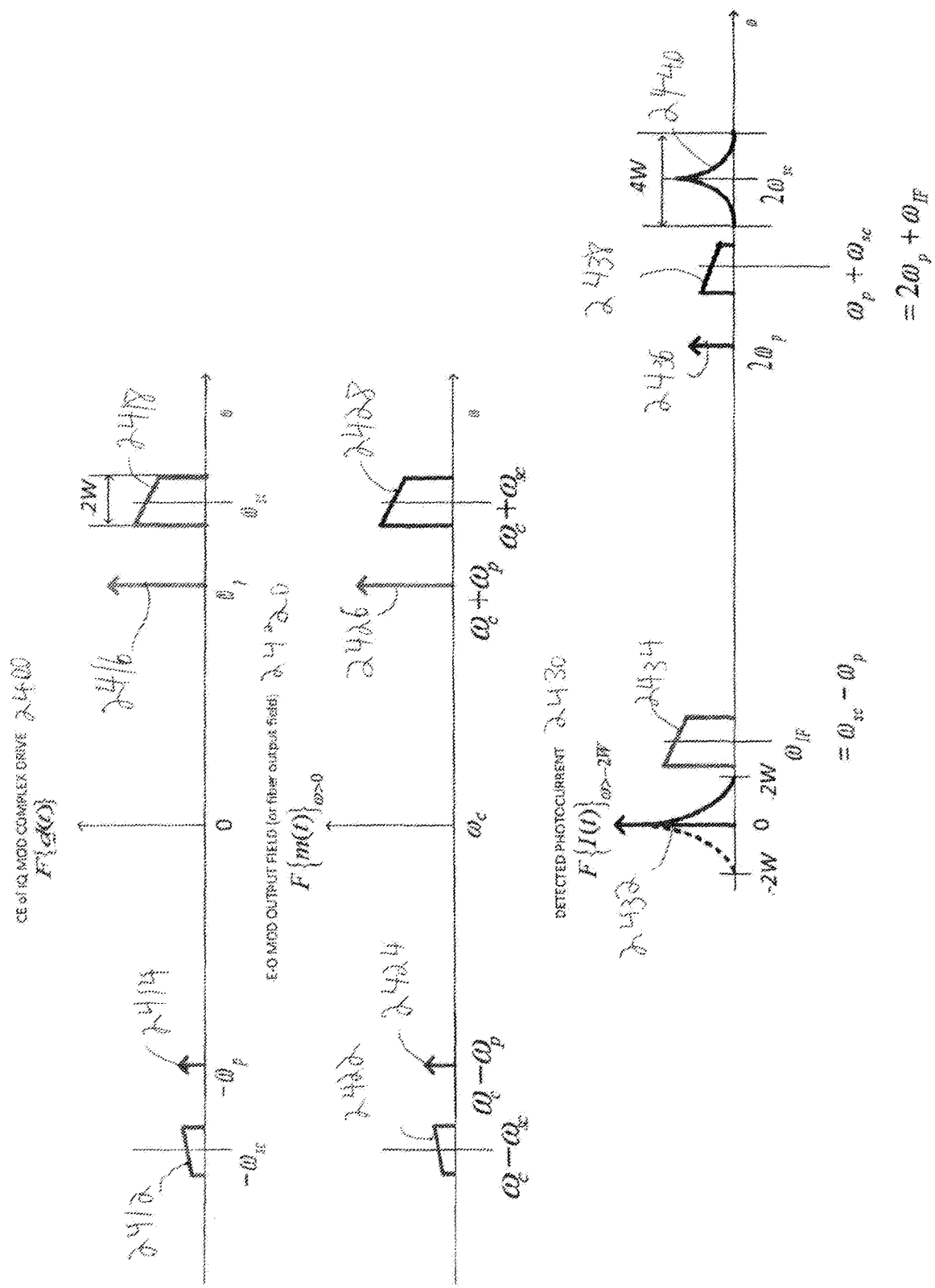
FIG. 25 illustrates examples of various signals.

In this embodiment, motivated by the spectral plot of FIG. 25, the signal is nominally an SSB one and so is the sinusoidal pilot tone nominally SSB (practically VSB signal and pilot generation may suffice, incurring just a small degradation of CD tolerance performance). In a sense, this embodiment combines the SSB signal of embodiment E5 with the SSB pilot of embodiment E4.

This embodiment has the potential to be most robust to the CD impairment, as we have seen that the IQ detection gain is the highest for this embodiment (though the noise generation mechanisms must also be considered for a fair comparison of performance).

E6.a Analog Sub-Embodiment of SSB Signal+SSB Pilot

Starting with the analog sub-embodiment (FIG. 26), we have $$E6a: [d_I(t),d_Q(t)]=[b(t)+\sqrt{2}p_o \cos(\omega_p t + \phi_p), \pm Hil\{b(t)\} \pm \sqrt{2}p_o \sin(\omega_p t + \phi_p)] \quad (168)$$

Thus, in the I and Q drive signals we have a Hilbert pair derived from the bandpass message to form optical SSB for the signal. The optical SSB pilot, is generated by quadrature RF pilots added onto the I and Q paths. The corresponding complex envelope $d_I(t)+jd_Q(t)$ of the E-O IQ MOD optical output clearly comprises an SSB signal as well as an SSB optical carrier:

$$\underline{m}(t) \propto d_I(t)+jd_Q(t)=[b(t)+\sqrt{2}p_o\cos(\omega_p t+\phi_p)]+j[\pm$$
$$Hil\{b(t)\}\pm\sqrt{2}p_o\sin(\omega_p t+\phi_p)] \propto [b(t)\pm jHil\{b(t)\}]+$$
$$[\sqrt{2}p_o\cos(\omega_p t+\phi_p)\pm j\sqrt{2}p_o\sin(\omega_p t+\phi_p)]=$$
$$[b(t)\pm jHil\{b(t)\}]+\sqrt{2}p_o e^{\pm j(\omega_p t+\phi_p)} \qquad (169)$$

We must make sure that the signs of the Hilbert transform and the quadrature RF pilots are such that the dominant sideband of the signal and the pilot are on the same side of the carrier (else severe detected signal fading occurs). In the expression above, we must take the + signs and the − signs simultaneously.

We note that the pilot is clearly an SSB one, either upper sideband SSB (for the + sign) or lower sideband SSB (for the − sign). As for the term $b(t)\pm jHil\{b(t)\}$, for the plus sign we have $\underline{m}(t) \propto b(t)+jHil\{b(t)\} \propto b^a(t)$, i.e. the complex envelope is an analytic signal (just positive frequency content) implying that we have non-zero modulation spectrum just to the right of the optical carrier along the frequency axis (upper sideband SSB for the message).

For the minus sign applied to the Hilbert transform, we have $\underline{m}(t) \propto b(t)-jHil\{b(t)\} \propto b^{aa}(t)$, i.e. the complex envelope becomes an anti-analytic signal (defined as having just negative frequency content) implying that we have non-zero modulation spectrum just to the left of the optical carrier along the frequency axis (lower sideband SSB for the message).

As in the prior analog embodiments, we may use in analog linearization (LNZ) modules on the I and Q paths (which we view as being built-in into the IQ modulator children MZMs, hence not shown).

E6.d1, E6.d2 Digital Sub-Embodiments

Again these two embodiments (FIGS. 27,28) combine elements of E4 (SSB pilot generation) and of embodiment E5 (SSB signal generation), digitally implementing the analog signal processing of E6.a.

Both these sub-embodiments are equivalent (as the complex multiplier produces the bandpass signal and its Hilbert transform) essentially implementing $$[d_I[kT],d_Q=[kT]]=[b[kT]+\sqrt{2}p_o\cos(\omega_p Tk+\phi_p),\pm$$
$$Hil\{b[kT]\}\pm\sqrt{2}p_o\sin(\omega_p Tk+\phi_p)] \qquad (170)$$

The difference between E6.d1 and E6.d2 is in the method of generation of the Hilbert pair $b[kT],Hil\{b[kT]\}$. In E6.d1 (FIG. 27) the Hilbert transform $Hil\{b[kT]\}$ is generated by means of a Hilbert digital filter acting onto $b[kT]$. In turn, the bandpass signal $b[kT]$ is generated as per (155), by IQ modulation of the IQ components $b_I[kT],b_Q[kT]$ which are considered the input signals into the IQ driver (e.g. in an optical transport system in the downstream cellular direction, from a digital base-station or cloud radio area network to antennas in remote radio heads):

$$b[kT]=b_I[kT]\cos(\omega_{sc}Tk)-b_Q[kT]\sin(\omega_{sc}Tk)=$$
$$\sqrt{2}\text{Re}\{\underline{b}[kT]e^{j\omega_{sc}Tk}\}. \qquad (171)$$

In E6.d2 (FIG. 28) the method of generating $b[kT],Hil\{b[kT]\}$ is by means of complex multiplication, just as in the E5 digital sub-embodiments. This amounts to an alternative method of generating $Hil\{b[kT]\}$ by means of two real multiplications, acting on the IQ components as in (156), repeated here:

$$Hil\{b[kT]\}=b_I[kT]\sin(\omega_{sc}Tk)+b_Q[kT]\cos(\omega_{sc}Tk)=$$
$$\sqrt{2}\text{Im}\{\underline{b}[kT]e^{j\omega_{sc}Tk}\} \qquad (172)$$

But the last two equations just implement the following complex multiplier by means of four real multiplications (the last two equations are the real and imaginary parts of the following complex multiplication equation):

$$b[kT]+jHil\{b[kT]\}=\{\cos(\omega_{sc}Tk)+j\sin(\omega_{sc}Tk)\}\{b_I[kT]+jb_I[kT]\} \qquad (173)$$

Note that we do not have to use four real multipliers to implement the complex multiplication an implementation based on three multipliers also exists. This pertains to all digital embodiments using a complex multiplier to generate SSB signal.

E7—Embodiment Coherent Receiver Emulating Self-Coherent Detection

Motivation and Overview

The motivation for this embodiment is to improve the sensitivity of self-coherent detection, in particular improve the optical Rx sensitivity optical transport systems used for bandpass electrical signals. As explained in the background, in conventional coherent detection the local oscillator (LO) is injected at the Rx, whereas in self-coherent detection the LO is generated as a pilot tone at the Tx (in fact the pilot tones in embodiments E1-E6 play the role of LO), co-propagates along the fiber along with the modulated message and finally the mixing between the desired message and the LO occurs at the Rx.

An impairment of self-coherent detection stems from the fact that the LO-pilot injected at the Tx undergoes attenuation and picks up noise in its process of propagation from Tx and Rx. The attenuated noisy received LO-pilot degrades self-coherent detection with respect to a reference conventional coherent system in which a clean high-power LO is injected at the Rx.

Our E7 embodiment addresses this problem of loss of sensitivity in self-coherent detection while retaining the self-coherent advantages. In particular our E7 embodiment may be viewed as a combination of coherent and self-coherent detection. On one-hand, from coherent detection it borrows the sensitivity advantage due to mixing gain with LO injected at the Rx. On the other hand, it shares the robustness of self-coherent detection to phase noise due to the pilot injected at the Tx, as highlighted in our analysis, whereby the presence of the same phase noise factor on both the signal and the pilots which traveled the same path and originated from the same optical source has the common phase factors cancelling out in the process of quadratic detection in the Rx (another way to see this is to notice that the conjugate product cross term generated between the received modulated message and the received pilot has the common phase of the message and the LO cancel out since the phase of the conjugate product is the difference of the two phases).

There are four sub-embodiments disclosed in the E7, classified as follows the analog E7.a1, E7.a2, E7.a3 and digital E7.d1, E7d2, corresponding to E7.a2 and E7.a3, respectively. In E7.a1 we do not use any pre-filtering. The rest of the sub-embodiments are distinguished by using pre-filtered squarers in E7.a2 and E7.d1 while using asymmetrically pre-filtered mixers/multipliers in E7.a3 and E7.d2 (the meaning of the "pre-filtering" terminology is going to soon become apparent).

Sub-Embodiment E7.a1 Based on PD-Emulator

The principle of operation of this first sub-embodiment is best understood by first introducing the simplest analog sub-embodiment E7.a1 (FIG. 29), the key element of which is a PD-emulator block designed according to the principles of this invention to mimic the operation of a photo-diode (PD) by means of a coherent hybrid plus electronic squarers (quadratic law devices) connected to the output ports Ix, Qx, Iy, Qy of the hybrid, followed by summing up the four squarer outputs to yield the overall output, S(t), of the PD-emulator. This composite module turns out to act just like a PD+TIA front-end in terms of its end-to-end signal behavior, in that its output voltage, S(t), is proportional to the total incident optical power at its input.

To recap, the PD-emulator is an opto-electronic subsystem with a single fiber input and a single electronic output which provides an estimate of the instantaneous optical power (intensity) incident at the fiber input port of the emulator. The advantage of using the PD-emulator rather than a conventional PD in order to detect the intensity waveform, is that the PD-emulator effective photo-detection occurs with improved sensitivity (improved SNR) with respect to that of a conventional PD, due to the boosting effect of the LO-mixing-gain, which overcomes the thermal noise of a conventional PD+TIA optical receiver front end.

To put the PD-emulator to use in self-coherent systems, let us assume that the corresponding Tx is taken as any of the Tx structures of E1-E6 (or equivalent transmitters for self-coherent detection generating pilot tones plus desired message-carrying spectral bands). Then, inspecting the optical direct-detection optical Rx in the corresponding figures, the Rx front-end consists of a conventional PD+TIA, followed by a bandpass filter (BPF). We may think of the PD-emulator module disclosed here in E7.a1 as a replacement for the PD+TIA. Thus, the E7.a1 Rx embodiment consists of a PD-emulator followed by a self-coherent electronic receiver back-end, essentially comprising same bandpass filter as used to extract the transmitted message information in our embodiments E1-E6.

Then, following the bandpass filter (which BPF is referred to as the post-filter, as we soon introduce pre-filters inside the PD-emulator), we may inject the output message emerging out of the post-filter into an analog communication means such as a downstream antenna or pass the output message into an IQ demodulator+ADC.

Let us detail now the squarer device (there are four of them inside the PD-emulator in our E7 Rx).

This is an ideally memoryless module implementing the quadratic-law transfer characteristic $q(t)=i^2(t)$ from its input $i(t)$ to its output $q(t)$. It is possible to realize a squarer by analog circuits akin to those of a balanced mixer. In fact a balanced mixer with its two inputs short-circuited may function in principle as a squarer, but beware that the mixer is optimized to have one of its inputs used as "LO" i.e., be narrowband, whereas in our application we would need an electronic multiplier with both its inputs being broadband and short-circuited to apply the same electronic input to both. Other implementation exist in prior art for electronic multipliers, which may be suitable for squarers, e.g. Gilbert cells. We shall postulate here that broadband electronic analog squarers are available.

In order that the E7 sub-embodiments function properly, it is essential to lock the LO to a definite spectral location, e.g. at the optical carrier (other spectral positions for the LO are possible). This is achieved by means of an optical phase-locked-loop (PLL), which is known art. The optical PLL operation is facilitated by having the spectrum relatively sparse and by having optical pilot tones appear in the received optical spectrum (as they have been injected at the Tx side). The received optical pilot tones beat with the optical LO injected at the receiver and generate RF frequencies which may be used to effect feedback in the PLL in order to shift the frequency of the tunable LO laser to the desired frequency and control its phase, both for acquisition (acquiring lock) and for tracking (maintain lock). If necessary the pilot tone frequencies injected at the Tx may be augmented by a residual pilot tone generated in the optical Tx right at the optical carrier (by applying some DC bias in addition to any existing pilot tones) in order to facilitate frequency locking of the LO. Thus, the optical PLL for locking the optical LO frequency relative to the received optical signal spectral profile is a necessary element of the E7 embodiment.

Sub-embodiment E7.a2: PD emulator comprising squarers with electronic pre-filtering Back to the PD emulator, another optional element in it, which benefits the overall system performance, is to have some electronic linear pre-filtering on the four paths between the four output ports of the hybrid and the four electronic squarer modules. In principle, the PD-emulator may operate without such electronic pre-filtering (just as in E7.a1 in FIG. 29), provided that the bandwidth and accuracy of the analog squarers is adequate. However, using pre-filtering in the PD-emulator (see sub-embodiment E7.a2 in FIG. 30), yields a beneficial effect of reducing the bandwidth of the signals input into the analog squarers, relieving the bandwidth requirement of these squaring components, making them less complex and more accurate.

A PD-emulator with pre-filtering ahead of its squarers (FIG. 29) attains more useful functionality than a conventional PD does (this in addition to the beneficial SNR boosting effect of the PD-emulator, that was already mentioned) in the respect that electronic pre-filtering following the coherent hybrid outputs (identically applied on all four coherent hybrid paths) is mathematically equivalent to having a fine optical filter virtually placed ahead of the photodiode optical input (with passband determined by the filter frequency response and the optical LO frequency). Thus, the electronically pre-filtered PD-emulator amounts to a conventional PD, albeit preceded by an ultra-fine tunable optical filter (whereas the sub-embodiment of E7.a1 with no pre-filtering just amounts to a conventional PD). But please note that all embodiments (whether or not pre-filtering is used) enjoy a sensitivity gain with respect to a conventional direct-detection receiver used with the E1-E6 transmitters, Mathematically, low-pass (base-band) equivalent response of the equivalent optical filter (with respect to the LO optical frequency, $\omega_{LO}$), just equals the frequency response, $H_{pre\text{-}filter}(\omega)$, of the actual electronic filter. Thus, let the optical filter frequency response be $H_{opt\text{-}equiv}(\omega)$, then its low-pass response is $H_{opt\text{-}equiv}(\omega+\omega_{LO})$ (it is just $H_{opt\text{-}equiv}(\omega)$ left-shifted by $\omega$, i.e. expressed in terms of the frequency deviation around the LO) and we have the following relations between the electronic pre-filter and the virtual optical filter:

$$H_{opt\text{-}equiv}(\omega+\omega_{LO})=H_{pre\text{-}filter}(\omega) \Leftrightarrow H_{opt\text{-}equiv}(\omega)=H_{pre\text{-}filter}(\omega-\omega_{LO}). \qquad (174)$$

By shifting the LO frequency, we may scan the spectral positioning of the optical equivalent filter (while its shape is fixed determined but the shape of the electronic pre-filter).

Such virtual optical filter, which is sharp in its frequency response and is tunable in the optical frequency domain, simply by tuning the LO frequency, is useful in picking up desired spectral features, while suppressing unwanted optical domain spectral components (in fact such effective optical filtering is the advantage of a conventional coherent Rx as well, which is not incidental as both the conventional coherent Rx and the PD-emulator are based on a coherent hybrid—but here it is combined with the novel PD-emulation effect). E.g., if the self-coherent optical Tx is of the E4, E5 or E6 type (corresponding to the spectra shown in FIGS. 11,18,25 then we may aim the equivalent optical filter to pick up the upper band of the optical DSB or SSB (or VSB) signal, namely the spectral range [$\omega_c+\omega_{sc}-W,\omega_c+\omega_{sc}+W$] to the right of the optical carrier as well as the lower band [$\omega_c-\omega_{sc}-W,\omega_c-\omega_{sc}+W$] but suppress all other components in the optical spectrum. One possible spectral placement of the LO and corresponding design for the electronic filter to achieve this (though not the only one) is to have the optical PLL make LO frequency coincide with the transmitted optical carrier, $\omega_{LO}=\omega_c$ and design the electronic pre-filter to have a passband [$-\omega_{sc}-W,\omega_{sc}+W$]∪[$\omega_{sc}-W,\omega_{sc}+W$], to pick up the message-modulated sidebands of optical DSB or SSB (or VSB), as generated in our E4-E6 Tx embodiments above.

Figure 31:
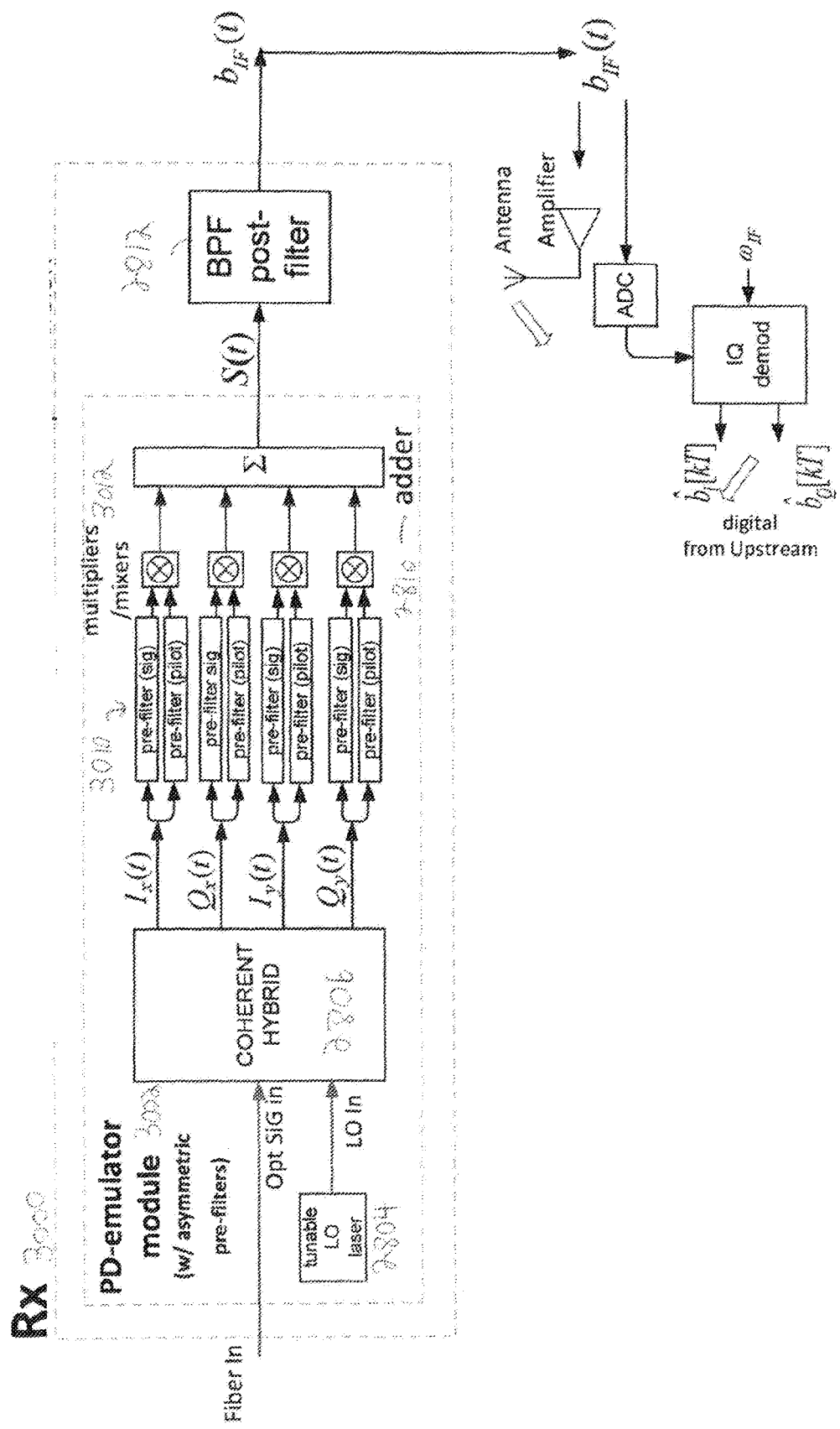
FIG. 31 illustrates an example of a receiver of the system.

Sub-Embodiment E7.a3: PD Emulator Comprising Mixers with Electronic Pre-Filtering To recap, the benefits of electronic pre-filtering in the PD-emulator are manifested both as the capability to perform virtual filtering in the optical domain and as bandwidth reduction for the squaring operation. But we may go even further, replacing the pre-filtered squarer by an even more useful and robust device, generalizing the squarer an asymmetrically filtered multiplier. To develop this concept in stages, let us first note that we may replace a squarer by a multiplier fed by the same signal at both its inputs (as evidently $q(t)=i^2(t)=i(t)\cdot i(t)$), thus just short-circuiting the two input leads of a multiplier yields a squarer. A related concept is to replace the pre-filtered squaring module by a doubly-pre-filtered multiplier as shown in FIG. 31. As long as the pre-filters on the two input ports of the doubly-pre-filtered multiplier are identical, then this is evidently equivalent to the pre-filtered squarer. The next step is to consider an extension concept based on using different pre-filters on the two arms of the doubly-filtered multiplier, finally yielding the asymmetrically pre-filtered multiplier yielding FIG. 31, which is no longer equivalent to a pre-filtered squarer is nevertheless useful for our purposes, as this module may have the advantage of further reducing the bandwidth of the RF signals incident upon the multiplier and making the multiplier more robust and also reducing noise.

Figure 11:
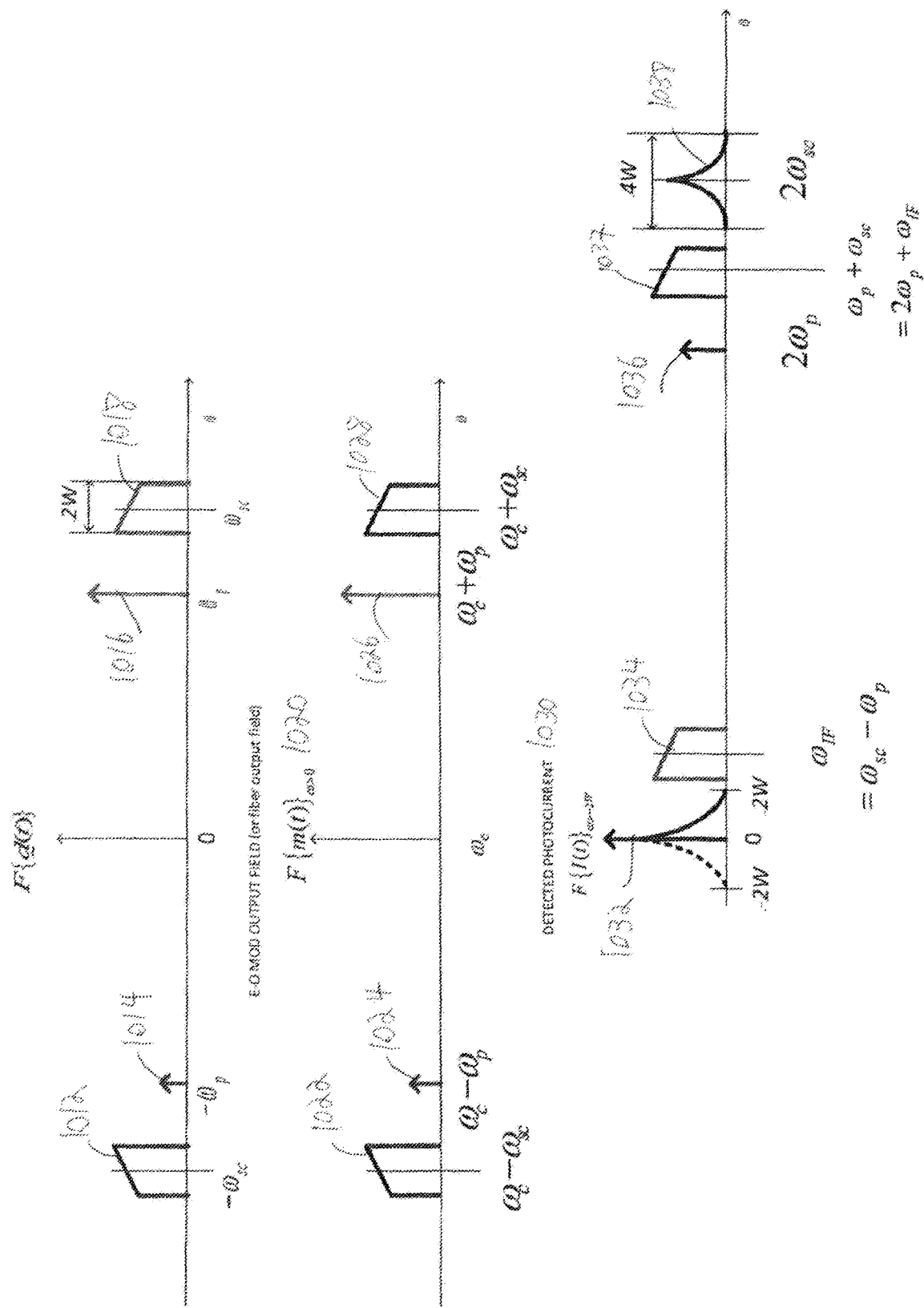
FIG. 11 illustrates examples of various signals.
Figure 18:
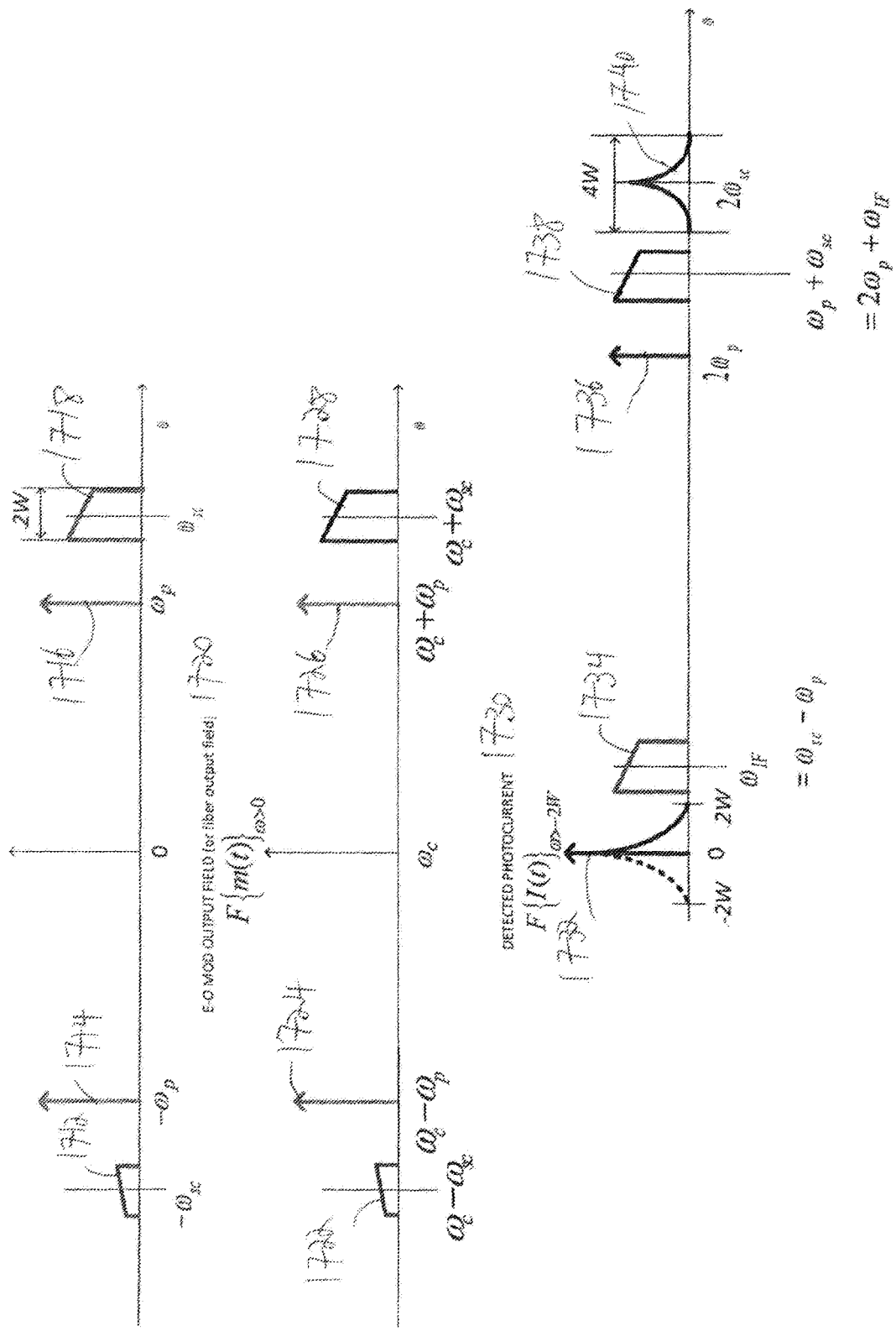
FIG. 18 illustrates examples of various signals.

In sub-embodiment E7.a3, suited to sub-embodiments E4-E6 of the Tx, (corresponding to the spectra shown in FIGS. 11,18,25) let us assume that the LO has been locked at the optical carrier frequency $\omega_{LO}=\omega_c$, then the electrical spectrum after the coherent hybrid appears as in the respective top figures of FIGS. 11,18,25, i.e. we have pilots at $\pm\omega_p$ and signal bands at $$[-\omega_{sc}-W,-\omega_{sc}+W]\cup[\omega_{sc}-W,\omega_{sc}+W]. \quad (175)$$

Now let the upper pre-filter, connected to the upper port of each multiplier, be designed to have passband [$\omega_{sc}-W,\omega_{sc}+W$] (at the positive frequencies) and transition band of spectral extent smaller than $\omega_{IF}=\omega_{sc}-\omega_p$, such that it passes through the message-induced received signal bands שגיאה! מקור ההפניה לא נמצא. with little distortion while it blocks the pilots. This pre-filter is marked "(sig)".

Let the lower pre-filter on each multiplier be designed as a distinct filter different than the (sig) filter. This filter is designed to have passband [$\omega_{sc}-\varepsilon,\omega_{sc}+\varepsilon$] with $\varepsilon<\omega_{sc}-\omega_p$ and transition band faster than $\omega_{IF}$, such that the signal bands fall in its stop-band. This pre-filter is marked "(pilot)".

It follows that the two input ports of each multiplier now carry the useful signal bands [$-\omega_{sc}-W,\omega_{sc}+W$]∪[$\omega_{sc}-W,\omega_{sc}+W$] and the pilot spectral lines $\pm\omega_p$, respectively.

Each multiplier just mixes the signal component of its upper port with the pilot component of its lower port. In this case, as the lower port is a narrowband tone, the multiplier may be realized as a balanced mixer with the pilot being input into its nominal LO port, taking advantage of the nominal use of balanced mixers (with a broadband input and an LO input).

The four balanced mixer outputs are then just summed up (sub-embodiment E7.a3 in FIG. 31) to yield the desired bandpass message estimate $b_{IF}(t)$ with center frequency $\omega_{IF}=\omega_{sc}-\omega_p$ and with the same complex envelope $b(t)$ as the original bandpass message signal $b(t)$ that was transmitted.

Post-filtering of the $b_{IF}(t)$ signal is finally applied to the electrical output of the PD-emulator (i.e., onto the signal $S(t)$) in order to isolate the desired signal $b_{IF}(t)$ out of other unwanted spectral components and in order to reject out of band noise. This post-filtering has frequency response coinciding with that used in the Rx of each of embodiments E1-E7, each one according to the respective Tx scheme used.

Finally, let us note that a single asymmetrically pre-filtered multiplier is not sufficient to detect the message this way, all four of multipliers or squarers must be connected to the optical hybrid output at their inputs and summed up at their outputs. Indeed, a single asymmetrically pre-filtered amplifier will generate an output signal in a particular single quadrature and single polarization, which will randomly fluctuate in power and occasionally fade away (experience outage) due to the random variations of optical phase and polarization in the fiber link, which cause random partition of optical power between the two polarization (x and y) components and the two quadratures (I and Q). Thus, the usage of all four output ports of provides polarization and phase (IQ) diversity if all the power is collected at all four electrical ports.

Another key advantage we re-iterate re comparison of our E7 Rx systems with conventional coherent detection is that coherent detection is very sensitive to the phase of the LO which is independent of that of the incoming optical signal thus coherent detection requires complex phase recovery sub-systems to partially mitigate the phase noise of the LO impairment, as well frequency recovery sub-systems to cancel and track offset and drift of the LO frequency with respect to that of the incoming optical signal. In contrast, in our E7 Rx system there is no dependence on the phase and frequency of the LO, thus the carrier and phase recovery systems may be eliminated.

As another sub-embodiment (not shown in the figures), if it can be ensured that the incoming polarization always be received in a certain state, say the x polarization, e.g. by means of a fast polarization controller which continuously rotates the random incoming polarization to always point along a fixed spatial transverse axis, say the x axis, then we may use just the Ix and Qx ports of the coherent hybrid (and the half of the hybrid related to the y-polarization may be eliminated), placing pre-filtered multipliers or squarers on just these two ports and summing up their two outputs to generate the signal $S(t)$.

Sub-Embodiment E7.d Description

Figure 32:
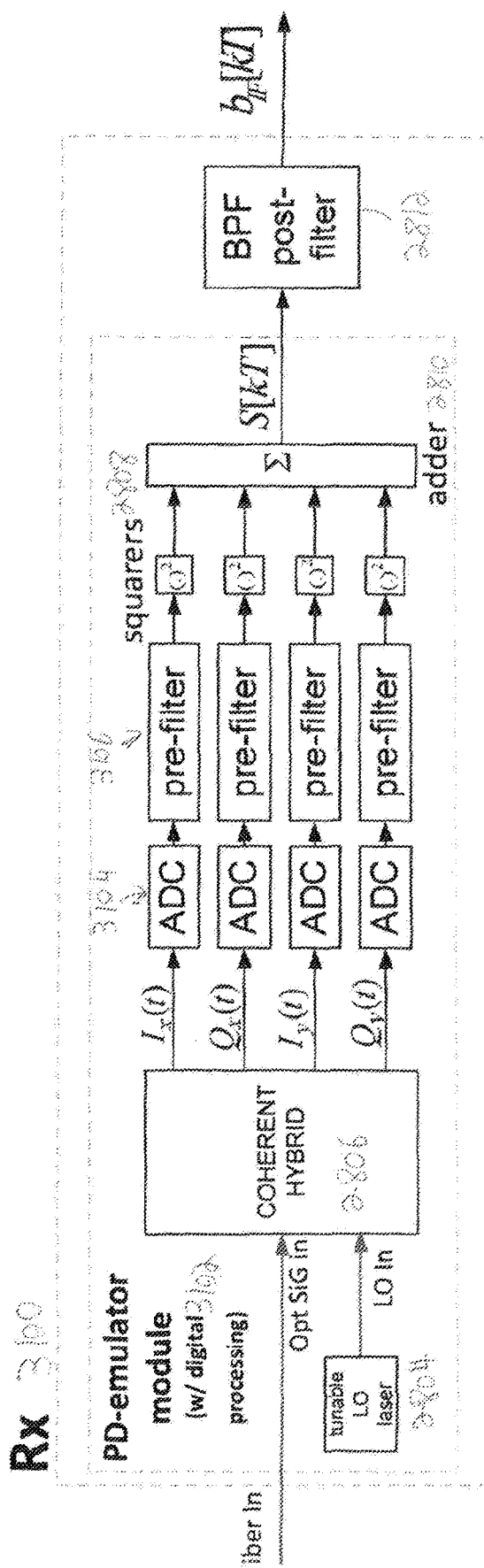
FIG. 32 illustrates an example of a receiver of the system.

One issue with the analog E7a1-3 sub-embodiments above is that we nominally assumed an ideal optical coherent hybrid and identical pre-filters in each the four paths leading to the squarers (or to the multipliers). Deviations from this assumption are likely to cause IQ-imbalance as well as xy-imbalance. Moreover, the analog squarers, multipliers or mixers, may be slightly different and/or non-ideal. Such nonidealities and IQ/xy imbalance impairments may be at least partially be mitigated in a digital implementation of the equivalent functions (FIG. 32).

The four output analog ports of the optical hybrid, $I_x(t)$, $Q_x(t)$, $I_y(t)$, $Q_y(t)$ are followed by four analog-to-digital converters (ADC) which digitize the signal with a sufficient number of effective bits for the desired accuracy, yielding quantized versions of the sampled signals $I_x[kT]$, $Q_x[kT]$, $I_y[kT]$, $Q_y[kT]$. Then the following operations are performed in the discrete-time domain: pre-filtering, squaring or multiplication, post-filtering, all in digital form though equivalent to their analog counterparts. Thus these digital operations may be more accurate than upon being equivalently performed in the analog domain (though in the digital domain subject to quantization noise that has been added in the ADC process).

It is also possible to work out a digital implementation corresponding to the analog sub-embodiment of E7.a3, namely using multipliers with asymmetric pre-filtering, but it is quite evident how to map E7.a3 into such digital sub-embodiment, precisely the way E7.a2 was mapped into E7.d: by inserting ADCs on each of the coherent hybrid outputs. Therefore such digital implementation is not explicitly shown in a separate figure of its own.

Mathematical Model of the Principle of Operation

We now develop a detailed mathematical model justifying the principle of operation of the E7 embodiments above. We assume analog representations of all signals as in the analog sub-embodiments (the extension to digital sampled systems is a trivial extension).

The coherent hybrid is a key building block of the PD-emulator used in all E7 sub-embodiments. Briefly reviewing what a coherent hybrid is and how works, this is a module with a fiber input and four electrical outputs, labelled here Ix, Qx, Iy, Qy, performing the following optical to electronic conversion mappings. Let the optical vector transverse field incident at the fiber input of the hybrid (the first element in the PD-emulator) be given by $$\underline{r}(t) = \underline{r}_x(t)\hat{x}_{Rx} + \underline{r}_y(t)\hat{y}_{Rx} = [r_x^I(t) + jr_x^Q(t)]\hat{x}_{Rx} + [r_y^I(t) + jr_y^Q(t)]\hat{y}_{Rx} \quad (176)$$

where $\hat{x}_{Rx}, \hat{y}_{Rx}$ are the two orthogonal transverse unit vectors corresponding to the polarization beam-splitter orientation of the hybrid. Signal estimates for these the four real-valued waveforms $r_x^I(t), r_x^Q(t), r_y^I(t), r_y^Q(t)$ (the I and Q components of each of the x and y polarizations) are generated at the four Ix, Qx, Iy, Qy analog electronic ports of the hybrid as follows:

$$I_x(t) = \text{Re}\{\underline{r}_x(t)\underline{L}^*\}, Q_x(t) = \text{Im}\{\underline{r}_x(t)\underline{L}^*\}, I_y(t) = \text{Re}\{\underline{r}_y(t)\underline{L}^*\}, Q_y(t) = \text{Im}\{\underline{r}_y(t)\underline{L}^*\} \quad (177)$$

This functionally describes what the hybrid does. Its internal structure to achieve this functionality is known, but we mention briefly that the hybrid separates the two polarization components by means of a polarization beam-splitter then mixes the two polarization components with two respective local oscillators optical signals derived from the same laser with 90 degrees phase difference, with respective complex envelopes and $-j\underline{L}(t)$ with $\underline{L}(t) = [L + L_{RIN}(t)]e^{j\Phi_{LO}(t)} \cong Le^{j\Phi_{LO}(t)} \equiv \underline{L}$ where $\Phi_{LO}(t)$ is the LO laser phase noise and $L_{RIN}(t)$ is the LO laser Relative Intensity Noise (RIN) contribution, assumed small here, thus we model the LO as a complex constant, $\underline{L} = Le^{j\Phi_{LO}(t)}$. In more detail, the hybrid generates the four electrical output signals שגיאה! מקור ההפניה לא נמצא. $I_x(t), Q_x(t), I_y(t), Q_y(t)$ as differences between the photocurrents of four pairs of PDs (in turn given by field squared expressions) as follows:

$$I_x(t) \propto |\underline{r}_x(t) + \underline{L}|^2 \propto \text{Re}\{\underline{r}_x(t)\underline{L}^*\}, Q_x(t) \propto |\underline{r}_x(t) + \underline{L}|^2 - \underline{r}_x(t) - j|\underline{L}|^2 \propto \text{Im}\{\underline{r}_x(t)\underline{L}^*\}$$

$$I_y(t) \propto |\underline{r}_y(t) + \underline{L}|^2 \propto \text{Re}\{\underline{r}_y(t)\underline{L}^*\}, Q_y(t) \propto |\underline{r}_y(t) + \underline{L}|^2 - \underline{r}_y(t) - j|\underline{L}|^2 \propto \text{Im}\{\underline{r}_y(t)\underline{L}^*\} \quad (178)$$

Forming complex numbers out of the real and imaginary parts of eqs. שגיאה! מקור ההפניה לא נמצא. yields:

$$\hat{\underline{r}}_x(t) = I_x(t) + jQ_x(t) = \underline{r}_x(t)\underline{L}^*, \hat{\underline{r}}_y(t) + jQ_y(t) = \underline{r}_y(t)\underline{L}^* \quad (179)$$

Thus, $\hat{\underline{r}}_x(t)$ is an estimate for $\underline{r}_x(t)$, being equal to $\underline{r}_x(t)$ up to a complex multiplicative factor, i.e. a change of scale and some phase shift (and some noise), and similarly, $\hat{\underline{r}}_y(t)$ is an estimate for $\underline{r}_y(t)$.

Figure 29:
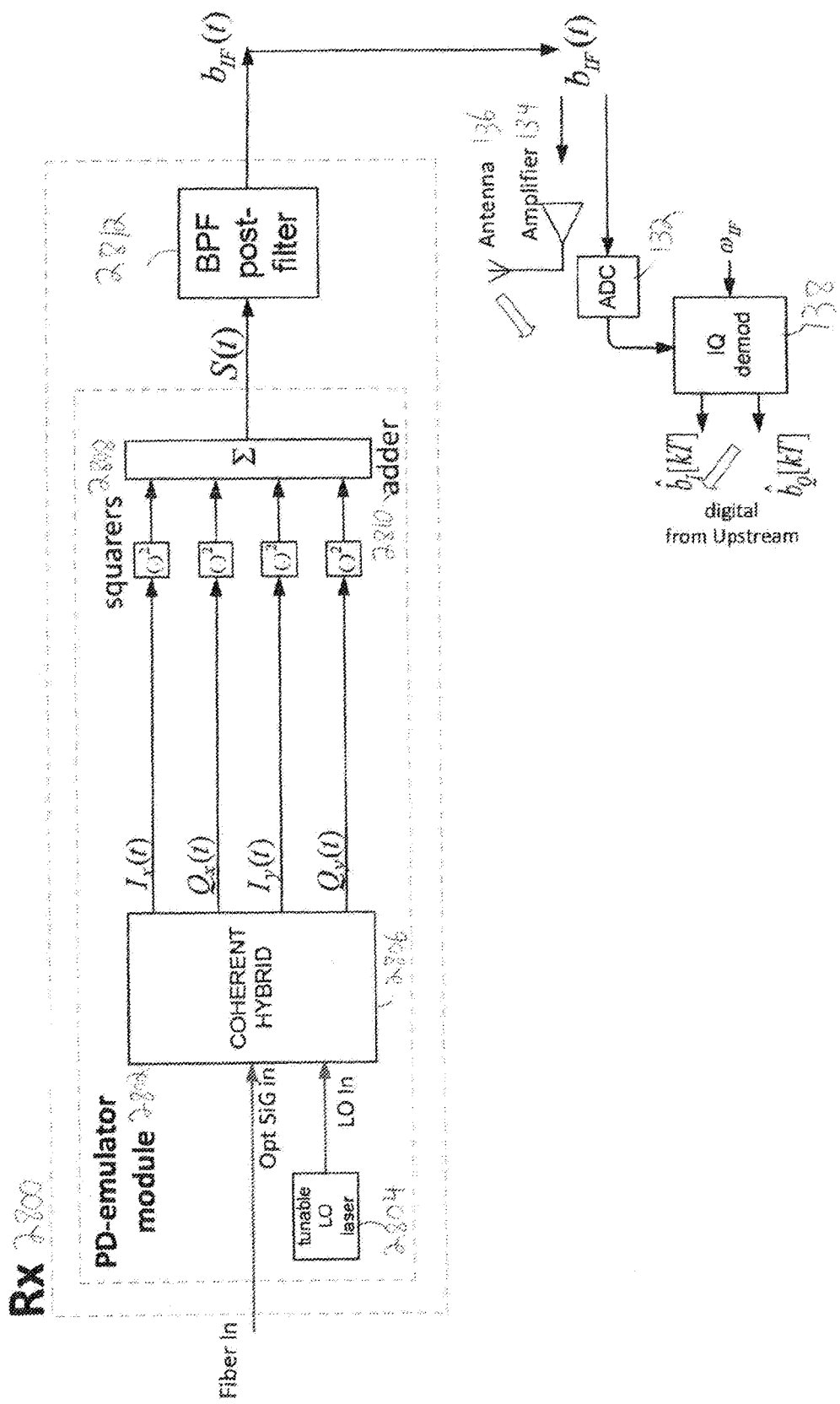
FIG. 29 illustrates an example of a receiver of the system.

The block diagram of FIG. 29 indicates that the four hybrid outputs are squared and summed up (after some optional electronic filtering, but let us initially assume there is no filtering), yielding in effect the squared norm of the vector $[I_x(t), Q_x(t), I_y(t), Q_y(t)]$ of the four coherent hybrid outputs. This output, denoted $S(t) = I_x^2(t) + Q_x^2(t) + I_y^2(t) + Q_y^2(t)$, is readily evaluated, by noting that from (179) it follows that $$I_x^2(t) + Q_x^2(t) = |I_x(t) + jQ_x(t)|^2 = |\hat{\underline{r}}_x(t)|^2, I_y^2(t) + Q_y^2(t) = |I_y(t) + jQ_y(t)|^2 = |\hat{\underline{r}}_y(t)|^2 \quad (180)$$

therefore, the sum-of-squares output equals:

$$S(t) = I_x^2(t) + Q_x^2(t) + I_y^2(t) + Q_y^2(t) = |\hat{\underline{r}}_x(t)|^2 + |\hat{\underline{r}}_y(t)|^2 = |\underline{r}_x(t)|^2|\underline{L}^*|^2 = |\underline{r}_y(t)|^2|\underline{L}^*|^2 = |\underline{L}|^2 \{|\underline{r}_x(t)|^2 + |\underline{r}_y(t)|^2\} = L^2\{|\underline{r}_x(t)|^2 + |\underline{r}_y(t)|^2\} = L^2|\underline{r}(t)|^2 \quad (181)$$

Remarkably the phase factor $e^{j\Phi_{LO}(t)}$ of the LO drops out. Therefore $S(t)$ is independent of the LO phase noise (and its frequency offset or drift). The signal $S(t)$, obtained by summing the four squarer outputs, provides an estimate of the total power (norm squared of the field vector) of the incident optical field, $$S(t) = I_x^2(t) + Q_x^2(t) + I_y^2(t) + Q_y^2(t) \propto P_r(t) = |\underline{r}(t)|^2 = |\underline{r}_x(t)|^2 + |\underline{r}_y(t)|^2 \quad (182)$$

Now, a conventional photo-receiver front-end (PD+TIA) generates, in the absence of noise (as also assumed in the derivation of S(t) above) the output voltage $$v_{PD+TIA}(t) = Z\rho\{|\underline{r}_x(t)|^2 + |\underline{r}_y(t)|^2\} = Z\rho|\underline{r}(t)|^2 = Z\rho P_r(t) \quad (183)$$

where Z is the TIA trans-impedance gain in Ohm units and $\rho$ is the PD responsivity in [Amp/Watt] units (in fact there are similar responsivity and other electronic gain factors in the PD-emulator but they are not relevant).

But once noise is accounted for, a significant difference between the PD+TIA noisy response and the PD-emulator noisy response becomes evident. In a conventional Rx front-end (PD+TIA), the thermal noise $i_{th-noise}(t)$ is effectively added right in the photocurrent prior to the trans-impedance gain, hence undergoes amplification by the trans-impedance gain:

$$v_{PD+TIA}^{noisy}(t)Z[\rho\{|\underline{r}_x(t)|^2+|\underline{r}_y(t)|_2\}+i_{th-noise}(t)]=$$
$$Z\rho|\underline{r}(t)|^2+Zi_{th-noise}(t) \qquad (184)$$

In contrast, in the process of coherent detection, the fields incident upon the eight internal photodiodes of the coherent hybrid is $\underline{r}_x(t)\pm\underline{L}$, $\underline{r}^y(t)\pm\underline{L}$ (see (178)). It is these signal+LO fields that are squared in the eight PD, the squares representing the incident optical intensities, such that the expanded squares contain the useful terms $\text{Re}\{\underline{r}_x(t)\underline{L}^*\}$, $\text{Im}\{\underline{r}_x(t)\underline{L}^*\}$, $\text{Re}\{\underline{r}_y(t)\underline{L}^*\}$, $\text{Im}\{\underline{r}_y(t)\underline{L}^*\}$. It is only subsequent to the squaring that the thermal noise current is added in each photodiode, followed by a TIA, such that:

$$v_{I_x}^{noisy}(t)=Z[\rho 4\text{Re}\{\underline{r}_x(t)\underline{L}^*\}+i'_{th-noise}(t)]ZRe\{\underline{r}_x(t)4$$
$$\underline{L}^*\}+Zi_{th-noise}'(t) \qquad (185)$$

with similar expressions for the noisy voltages at the remaining three outputs of the hybrid (note that here $i_{th-noise}'(t)$ has twice the variance than the noise current $i_{th-noise}(t)$ of, as $i_{th-noise}'(t)$ is the difference of independent current noise sources in two different photodiodes of each pair also there is a factor of 4 generated in the operations (178), which factor was absorbed in the proportionality constants (178) but is highlighted in the last equation). The key point evident in is that the LO gain factor $\underline{L}^*$ is applied prior to adding in the thermal noise. This provides a significant improvement in SNR relative to the thermal noise source, motivating the usage of the Rx in embodiment E7 as a more sensitive one than the self-coherent detection receivers disclosed in E1-E6.

It now remains to explain why the coherent hybrid, followed by four identical pre-filters, followed by the squarers, followed by a summer, also performs a useful function. It turns out that function consists of equivalent bandpass filtering of the incident field in the optical domain (in the vicinity of the LO frequency) followed by an absolute squaring operation on the total optically filtered vector field, i.e. detection of the instantaneous power of the total optically filtered vector field (where the virtual equivalent optical filter is given, as per, by $H_{opt-equiv}(\omega)=H_{pre-filter}(\omega-\omega_{LO})$) Thus, equivalently, the E7 Rx, which comprises the hybrid and electronic pre-filters on each path ahead of the squarers which are being summed up, is equivalent to a fictitious system consisting of an optical filter $H_{opt-equiv}=H_{pre-filter}(\omega)=H_{pre-filter}(\omega-\omega_{LO})$ followed by the coherent hybrid with its four outputs directly feeding the four squarers which are summed up (thus, prefiltering was moved back from the electronic to the optical domain). Remarkably, this is equivalent to a system consisting of the virtual optical filter followed by a noiseless optical amplitude gain equal to the LO amplitude followed by a conventional photodiode. Thus, as seen from these equivalences, the Rx system of E7, based on the PD-emulator, actually consisting of an optical hybrid, pre-filter, squarers and an adder, performs the useful function of providing LO-mixing gain (by a factor L), effectively in the optical domain, prior to equivalent photo-detection, which measures the instantaneous optical power of the incident field.

The last effect we wish to model is the propagation from the optical Tx to the two output ports of the polarization beam-splitter in the optical hybrid. Our end-to-end optical link does not engage in polarization multiplexing but rather in polarization diversity. Considering embodiments E1-E7 of the Tx, the modulated optical signal m(t) with complex envelope $\underline{m}(t)$ (with respect to the carrier frequency, $\omega_c$, is actually the magnitude of a linearly polarized vector field launched in a particular polarization (determined by the laser and E-O MOD orientations) which will be denoted by the unit vector $\hat{x}_{Tx}$ while its perpendicular unit vector in the transverse plane will be denoted by $\hat{y}_{Tx}$. In the transverse coordinate systems $\hat{x}_{Tx}$, $\hat{y}_{Tx}$ the modulated field launched into the fiber is written as $$\underline{m}(t)=\underline{m}(t)\hat{x}_{Tx}=\underline{m}(t)\hat{x}_{Tx}+0\hat{y}_{Tx}, \qquad (186)$$

i.e., it corresponds to an input Jones column vector $[\underline{m}(t),0]^T$ input into the fiber, which vector propagates all the way to the output, undergoing a polarization transformation, modelled as a 2×2 Jones matrix. We have already expressed the polarization at the fiber link output as in לא נמצא מקור ההפניה! שגיאה, in the coordinate system $\hat{x}_{Rx},\hat{y}_{Rx}$ tied to the principal axes of the polarization beam-splitter incorporated in the coherent hybrid, $$\underline{r}(t)=\underline{r}_x(t)\hat{x}_{Rx}+$$
$$\underline{r}_y(t)\hat{y}_{Rx}=[r_x^I(t)+jr_x^Q(t)]\hat{x}_{Rx}+[r_y^I(t)+jr_y^Q(t)]\hat{y}_{Rx} \qquad (187)$$

Let J be the Jones matrix mapping the input vector $\underline{m}(t)$ (expressed in coordinate system $\hat{x}_{Tx},\hat{y}_{Tx}$) into the output vector $\underline{r}(t)$ (expressed in coordinate system $\hat{x}_{Rx},\hat{y}_{Rx}$):

$$\begin{bmatrix}\underline{r}_x(t)\\\underline{r}_y(t)\end{bmatrix}=\underline{r}(t)=J\underline{m}(t)=\begin{bmatrix}J_{xx}&J_{xy}\\J_{yx}&J_{yy}\end{bmatrix}\begin{bmatrix}\underline{m}(t)\\0\end{bmatrix}=\begin{bmatrix}J_{xx}\underline{m}(t)\\J_{yx}\underline{m}(t)\end{bmatrix} \qquad (188)$$

Thus, both complex polarization components are proportional to the modulated transmitted field (with different gains which tend to be complementary):

$$\underline{r}_x(t)=J_{xx}\underline{m}(t), \underline{r}_y(t)=J_{yx}\underline{m}(t) \qquad (189)$$

As the PD-emulator system generates an estimate of the total power of the vector incident field (just like a conventional PD does, in embodiments E1-E6, albeit with different gain and SNR) then the output (182) of the PD-emulator yields the following upon substituting (189) in:

$$S(t)=I_x^2(t)+Q_x^2(t)+I_x^2(t)+Q_x^2(t)\propto P_c(t)=|\underline{r}(t)|^2=$$
$$|\underline{r}_x(t)|^2+|\underline{r}_y(t)|^2=|J_{xx}\underline{m}(t)|^2+$$
$$|J_{yx}\underline{m}(t)|^2=[|J_{xx}|^2+|J_{yx}|^2]|\underline{m}(t)|^2 \qquad (190)$$

Thus, $S(t)\propto|\underline{m}(t)|^2$ i.e. the system measures the modulated scalar field up to a constant which depends on the optical attenuation and somewhat depends on the Jones matrix (if the Jones matrix is unitary up to a constant, i.e. there is no polarization dependent loss in the system, then $|J_{xx}|^2+|J_{yx}|^2=$const.). This analysis ignores the chromatic dispersion, but its effect may be obtained by replacing $\underline{m}(t)$ in (190) by the expression $\underline{r}(t)$ which we derived from the optical link propagation which in effect assumed a scalar dispersive optical channel. Thus, we obtain the result $S(t)\propto|\underline{r}(t)|^2$ where $\underline{r}(t)$ is the scalar-propagated version of the input $\underline{m}(t)$. This result for the PD-emulator based Rx is then indistinguishable from that obtained by using a scalar optical dispersive channel and a conventional PD.

FIG. 1 illustrates a prior art system that include a transmit unit 12, a receive unit 14 that are linked by a fiber link.

A passband signal b(t) modulates (by a Mach Zander modulator 18) an optical carrier signal from laser optical source 16 to provide an output signal that may be fed to fiber or may be multiplexed by WDM multiplexer 20 with other optical signals (modulated by other passband signals) to provide a multiplex that is amplified by amplifier 22 and fed to fiber link. The receive unit 14 includes a de-multiplexer 23, multiple photodiodes (PD) {such as PD 26} that may be followed by amplifier 14. FIGS. 2, 5, 7-10, 12-17, 19-24 and 26-29 illustrates electro-optic systems that include a transmit unit (140, 400, 1300, 1400, 1500, 1600, 1800, 1900, 2000, 2100, 2200, 2300, 2500, 2600, 2700 and 2800) respectively and/or a receive unit 150. The receive unit 150 may be replaced by any of the receive units (2800, 2900, 3000 and 3100) of any one of FIGS. 29, 30, 31 and 32.

Any of the transmit units may be fed by upstream or downstream elements such as a sequence of an antenna 102 and amplifier 104, such as DAC 106, and the like.

Any of the receive units may feed upstream or downstream elements such as a sequence of amplifier 134 and antenna 102, such as ADC 132, IQ demodulator and the like.

A detailed analysis of these systems is provided in any of the pages above.

Any of the transmit units may include:

An input port that is configured to receive a bandpass signal that conveys information; wherein the bandpass signal is a radio frequency (RF) signal.

An optical carrier source (such as laser optical source 114) that is configured to generate an optical carrier signal having an optical carrier frequency.

At least one electrical bias circuit (such as 110, 410, 610, 620, 718, 720) that is configured to generate at least one electrical bias signal. It should be noted that in various figures (for brevity of explanation) the bias circuit is not shown—and instead the bias signal is shown.

An electro-optic modulation circuit (may include a modulator such as Mach-Zander modulator 116, IQ modulator 640, and may also include a linearizer) may be linear at the optical field. This linearity may be a prefect linearity but may tolerate some non-substantial non-linearities. Thus—the electro-optic modulation circuit may be substantially linear or almost linear. Non-substantial linearity may include a deviation from linearity by 1, 5, 10, 15, 20 percent, and the like. Yet for another example—An E-O modulator may be considered substantially linear if the level of non-linearly induced intermodulation distortion of its transfer characteristic contributes to tolerable degradation (say ~1-2 dB) to the total Signal To Noise and Interference ratio (SNIR), relative to the SNIR due to all other sources except for the nonlinear response (e.g. random noise sources). The precise level of non-linearity-induced that is considered tolerable is application-dependent.

A manipulator (40, 42, 44, 46, 48, 50, 52, 54, 56, 58, 60, 62, 64, 66, 68, 70, 72, 74, 76 and 78) that is configured to (i) receive the at least one electrical bias signal and the bandpass signal (or signals that are driven from the bandpass signal), and (ii) generate, based on the at least one electrical bias signal and the bandpass signal, at least one modulating signal (such as a single modulating signal, two modulation signals and even more).

The electro-optic modulation circuit may be configured to modulate the optical carrier by the at least one modulating signal to provide an output optical signal that comprises at least one optical pilot tone and at least one optical sideband that conveys the information.

FIGS. 8, 9, 10, 15, 16, 17, 22, 23, 24, 27 and 28 illustrate combinations of linearizers and digital to analog converters (boxes "LZN+DAC" 718 and 710). The linearizers are optional.

Figure 2:
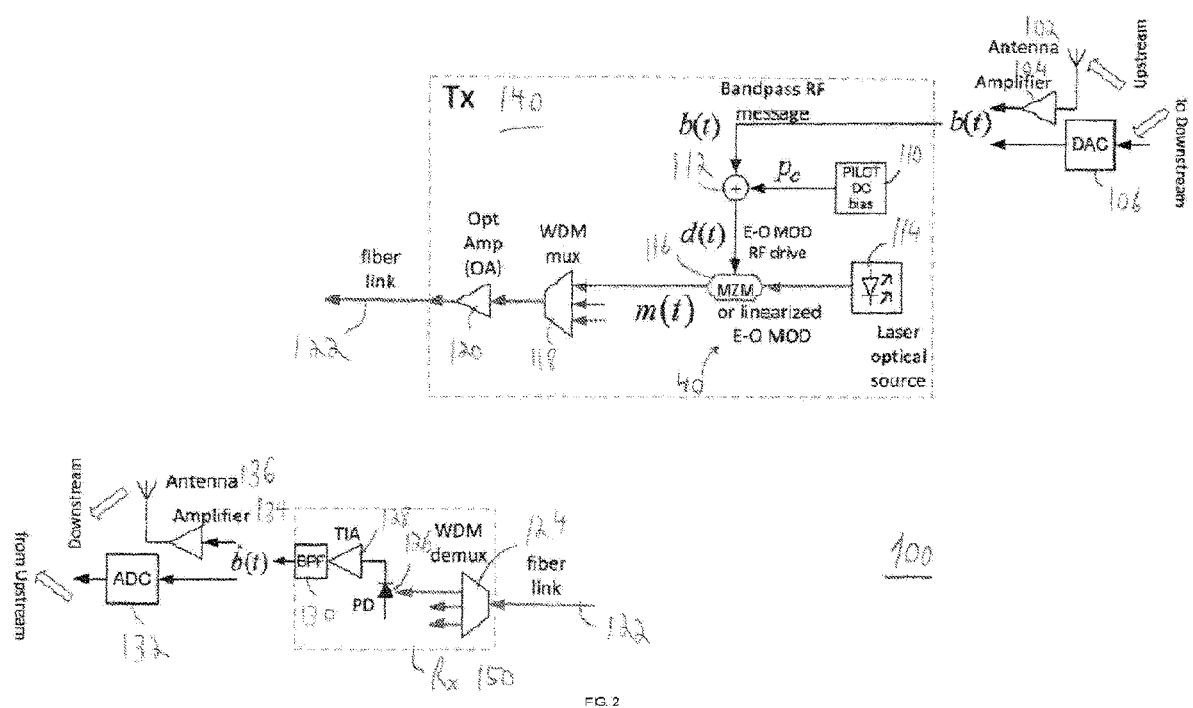
FIG. 2 illustrates an example of a system.
Figure 5:
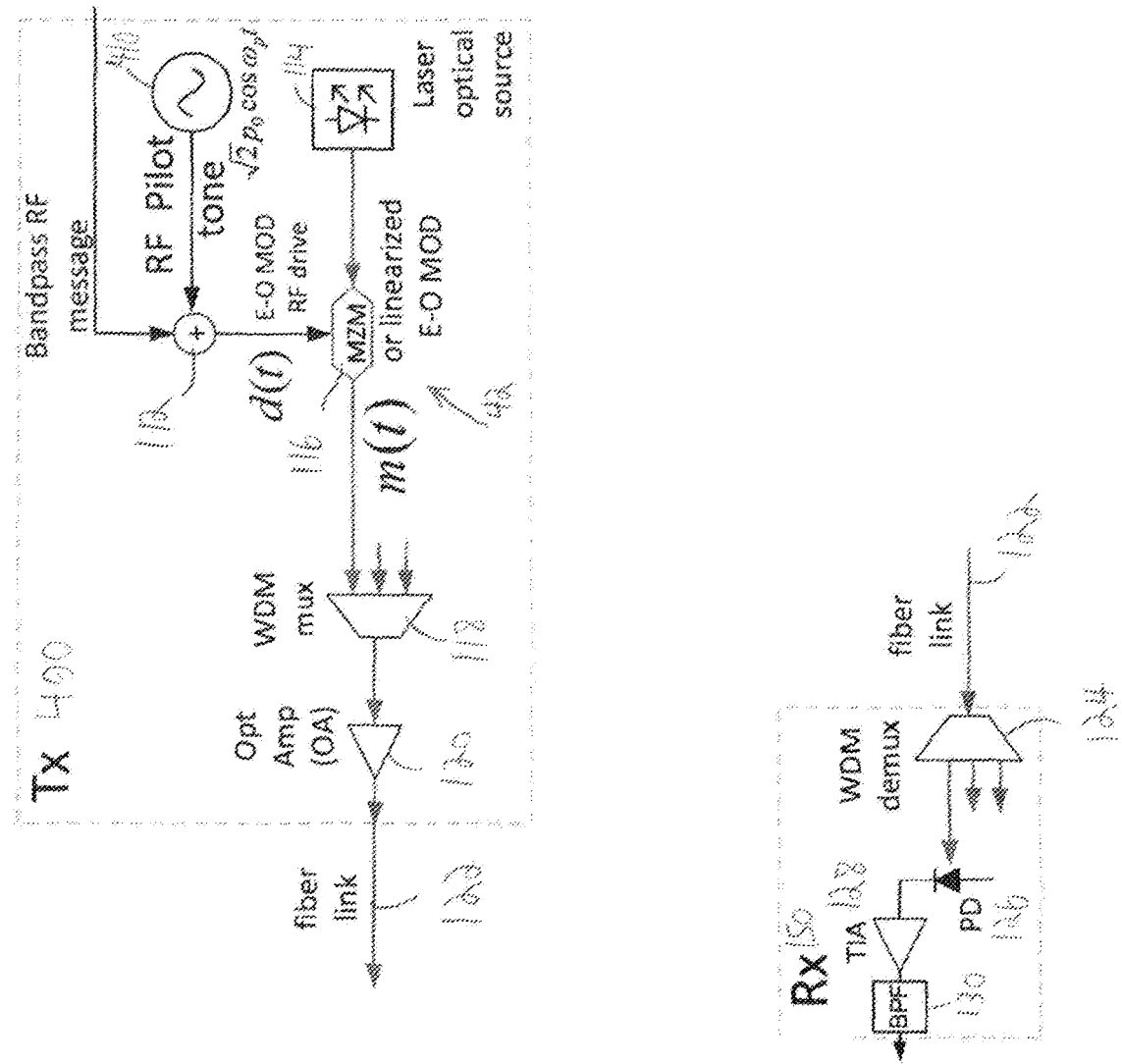
FIG. 5 illustrates an example of a system.

FIGS. 2 and 5 illustrate an electro-optical modulation circuits that includes a Mach-Zander modulator while FIGS. 7-10, 12-17, 19-24 and 26-28 illustrate electro-optical modulation circuits that include an IQ modulator that modulates an optical carrier signal using a first modulation and a second modulation signals that may be fed to I and Q inputs of the IQ modulator. Any other linear (in the optical field) optical modulator may be used.

FIGS. 7, 8, 9, 10 illustrates two DC bias circuits. It should be noted that in any of these figures only one of these DC bias circuits may be provided.

When multiple electrical bias circuits are shown then the bias signals provided by multiple bias circuit may be the same or may differ from each other (for example by intensity). Some bias signals may equal each other while other bias signals may differ from each other.

An electrical bias circuit and a splitter that splits the bias signal from the electrical bias circuit may be replaced by multiple different electrical bias circuits that may output different or the same bias signals.

Any signal that is expressed by a value that starts with ± may be of positive or negative value.

A sinusoidal signal has the form sin(x) and a cosinusoidal signal has the form of cos(x).

FIG. 2 illustrates a system that includes a transmit unit 140, a receive unit 150 that are linked by a fiber link. The fiber link may include one or multiple fiber links, and may include other optical and/or hybrid components such as amplifiers, repeaters, filters and the like.

The receive unit 150 includes a de-multiplexer 124, multiple photodiodes (PD) {such as PD 126} that may be followed by at least one of (i) amplifier 128 and band pass filter BPF 130 and (ii) analog to digital converter 132.

The transmit unit 140 may receive passband signal b(t) that is fed to manipulator 40. Manipulator 40 includes an adder 112 that adds to the passband signal pilot DC bias signals (from electrical bias circuit 110) to generate a modulating signal that modulates (by a Mach Zander modulator 116) an optical carrier signal from laser optical source 114 to provide an output signal. This output signal may be the optical output signal of the transmit unit. In FIGS. 2, 5, 7-10, 12-17, 19-24 and 26-29 the transmit unit operated in WDM and includes a WDM multiplexer 118 for multiplexing multiple output signals from multiple instances of manipulators, optical carrier sources, electrical bias circuits and electro-optic modulation circuits (the different instances may be fed by various bandpass signals). The WDM multiplexer 118 may be followed by an amplifier 120 that is coupled to a fiber link.

FIG. 3 illustrates (a) the spectrum 210 of signals (bandpass signals 212 and 216, DC pilot signals 214) at the input of the Mach Zander modulator, (b) the spectrum 220 of signals at the output of the Mach Zander modulator optical pilot tone 224, and optical sidebands 222 and 226 that convey the information, and (c) the spectrum 230 of the diode photocurrent illustrating signals 232, 234 and 236. Signal 234 conveys information.

FIG. 4 illustrates signals related to the system of FIG. 5.

FIG. 4 illustrates (a) the spectrum 310 of signals (bandpass signals 312 and 316, sinusoidal pilot signals 314 and 318) at the input of the Mach Zander modulator, (b) the spectrum 230 of signals at the output of the Mach Zander modulator optical pilot tones 324 and 326, and optical sidebands 322 and 326 that convey the information, and (c) the spectrum 230 of the diode photocurrent illustrating signals 233, 334, 335, 336 and 338. Either one of signals 334 and 336 conveys information.

FIG. 5 illustrates a system in which the manipulator 42 of the transmit unit 400 is fed by an electrical bias circuit 410 that outputs a sinusoidal signal instead of the DC pilot signal.

Figure 6:
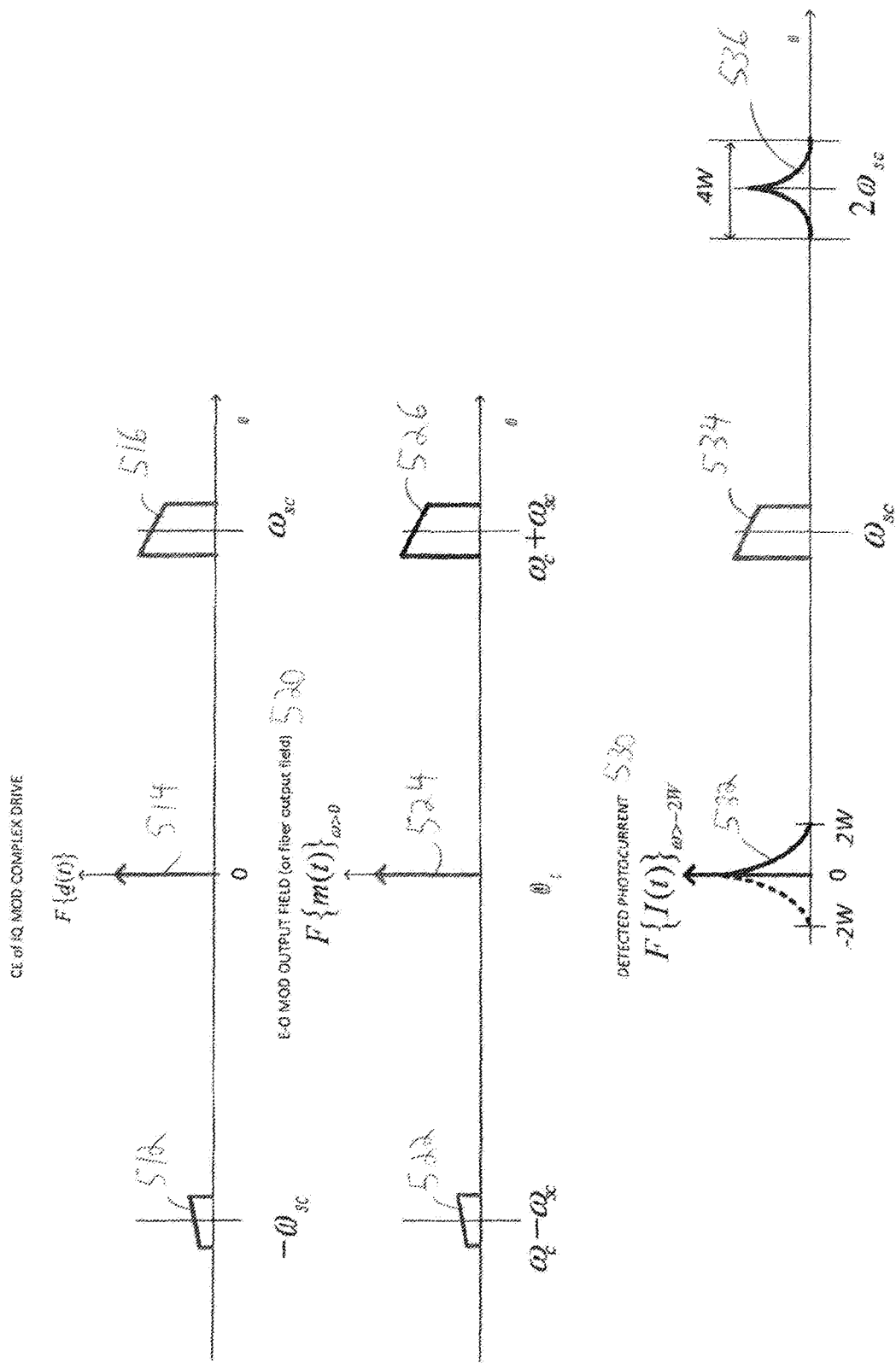
FIG. 6 illustrates examples of various signals.

FIG. 6 illustrates signals related to the system of FIGS. 7-10. FIG. 6 illustrates an optical output signal that has an asymmetrical spectrum about the optical carrier frequency. FIG. 6 illustrates (a) the spectrum 510 of signals (bandpass signal 512 that is weaker than bandpass signal 516, DC pilot signal 514) at the input of the IQ modulator, (b) the spectrum 530 of signals at the output of the IQ modulator optical pilot tone 524, optical sidebands 522 and 526 that convey the information optical sideband 522 is much weaker than optical sideband 526, and (c) the spectrum 530 of the diode photocurrent illustrating signals 532, 534 and 536. Signal 534 conveys information.

FIG. 7 illustrates a system in which the manipulator 44 of the transmit unit 600 may include (a) splitter 651 that is configured to split the bandpass signal to the first signal and to the second signal, (b) analog Hilbert filter 630 that is configured to apply a Hilbert transform on the second signal to provide a Hilbert-transformed signal, (c) one or more electrical bias circuits (610 and 620) that may add DC bias signals (using adders 661 and 662 respectively) to the first signal and/or the Hilbert-transformed signal to provide first and second modulating signals that are fed to I and Q ports of the IQ modulator 640. The IQ modulator modulates the optical carrier signal by the first and second modulating signals to output an output optical signal that has an asymmetric spectrum round the optical carrier frequency.

FIG. 8 illustrates a system in which the manipulator 46 of the transmit unit 700 receives an in-phase signal and a quadrature signal. The manipulator 46 includes (i) a reconstruction circuit that is configured to reconstruct a complex signal from the in-phase signal and the quadrature signal; (ii) a splitter 651 for splitting the complex signal to a first signal and a second signal; (iii) a digital Hilbert filter 630 that is configured to apply a Hilbert transform on the second signal to provide a Hilbert-transformed signal; (iv) at least one bias circuit (610, 620) that is configured to add (using adders 716 and 719) at least one direct current (DC) bias signal to at least one of the first signal and the Hilbert-transformed signal; (v) at least one digital to analog converter (such as DAC 718 and 720) that is configured to generate a first modulating signal and a second modulating signal by digital to analog conversion of a biased or an unbiased first signal, and a biased or unbiased Hilbert transformed signal to provide a first modulating signal and a second modulating signal.

In FIG. 8 the reconstruction circuit includes a first mixer 710 for mixing the in-phase signal with a sinusoidal signal, a second mixer 712 for mixing the quadrature signal with a sinusoidal signal; and adder 714 for adding output signals of the first and second mixers to provide the complex signal.

FIG. 9 illustrates a system in which the manipulator 48 of the transmit unit 800 receives an in-phase signal and a quadrature signal.

Manipulator 48 includes (i) a splitter (651, 652) that is configured to split the in-phase signal to a first in-phase signal and a second in-phase signal; and split the quadrature signal to a first quadrature signal and a second quadrature signal; (ii) a reconstruction circuit (includes mixers 710, 712 and adder) that is configured to reconstruct a complex signal from the first in-phase signal and the first quadrature signal; a digital Hilbert filter (includes mixers 810 and 812) that is followed by an adder 814, wherein the digital Hilbert filter is configured to apply a Hilbert transform on the second in-phase signal and on the second quadrature signal to provide signals that are added by the adder to provide a Hilbert-transformed signal; (iii) at least one bias circuit (610 and 620, followed by adders 716 and 719) that is configured to add at least one direct current (DC) bias signal to at least one of the complex signal and the Hilbert-transformed signal; (iv) at least one digital to analog converter (718 and 720) that is configured to generate a first modulating signal and a second modulating signal by digital to analog conversion of a biased or an unbiased complex signal, and a biased or unbiased Hilbert-transformed signal to provide a first modulating signal and a second modulating signal.

FIG. 10 illustrates a system in which the manipulator 50 of the transmit unit 900 receives an in-phase signal and a quadrature signal.

Manipulator 50 includes (i) a complex multiplexer 902 that is fed by the in-phase signal, the quadrature signal and a complex digital signal and is configured to output a complex signal and a Hilbert-transformed signal, (ii) at least one bias circuit (610, 620 and adders 716 and 719) that is configured to add at least one direct current (DC) bias signal to at least one of the complex signal and the Hilbert-transformed signal; (iii) at least one digital to analog converter (718 and 720) that is configured to generate a first modulating signal and a second modulating signal by digital to analog conversion of a biased or an unbiased complex signal, and a biased or unbiased Hilbert-transformed signal to provide a first modulating signal and a second modulating signal.

FIG. 11 illustrates signals related to the system of FIGS. 12-17. FIG. 11 illustrates an optical output signal that has an asymmetrical spectrum about the optical carrier frequency. FIG. 11 illustrates (a) the spectrum 1010 of signals (bandpass signals 1012 and 1018, sinusoidal signal 1014 that is weaker than sinusoidal signal 1016) at the input of the IQ modulator, (b) the spectrum 1030 of signals at the output of the IQ modulator optical pilot tone 1024 that is weaker than optical pilot tone 1026, optical sidebands 1022 and 1028 that convey the information are or of substantially the same amplitude, and (c) the spectrum 1030 of the diode photocurrent illustrating signals 1032, 1034 and 1036. Signals 1034 and 1037 convey information.

Figure 12:
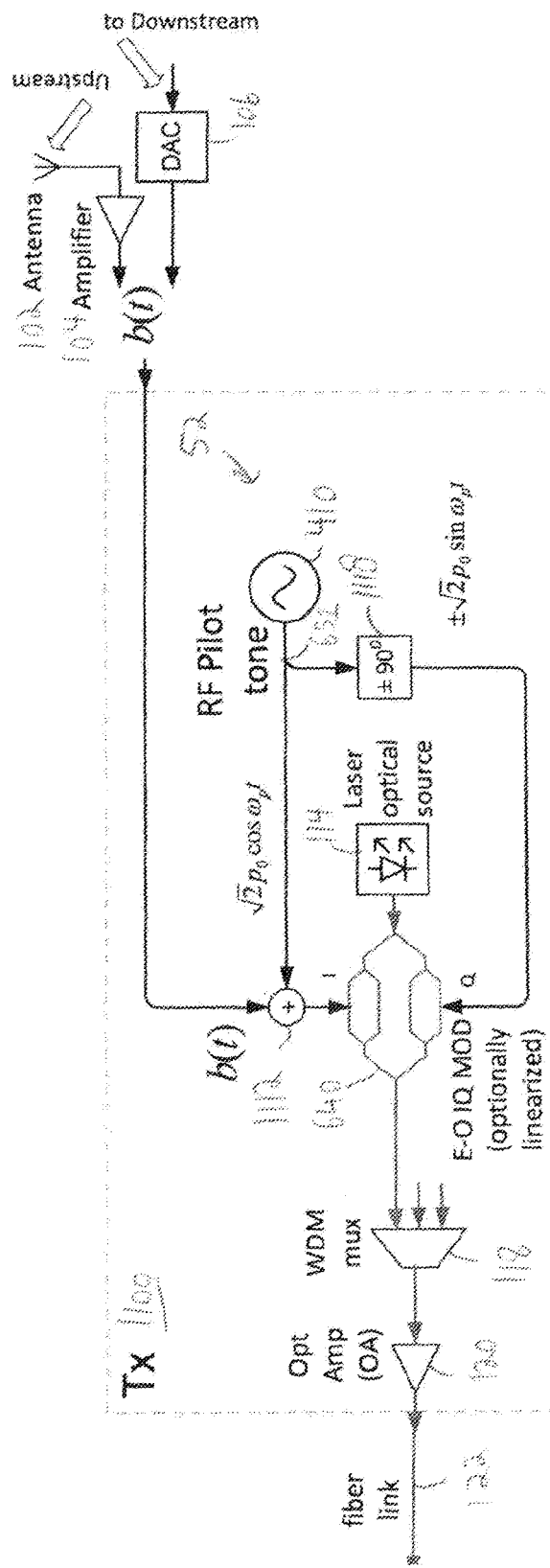
FIG. 12 illustrates an example of a system.
Figure 12:
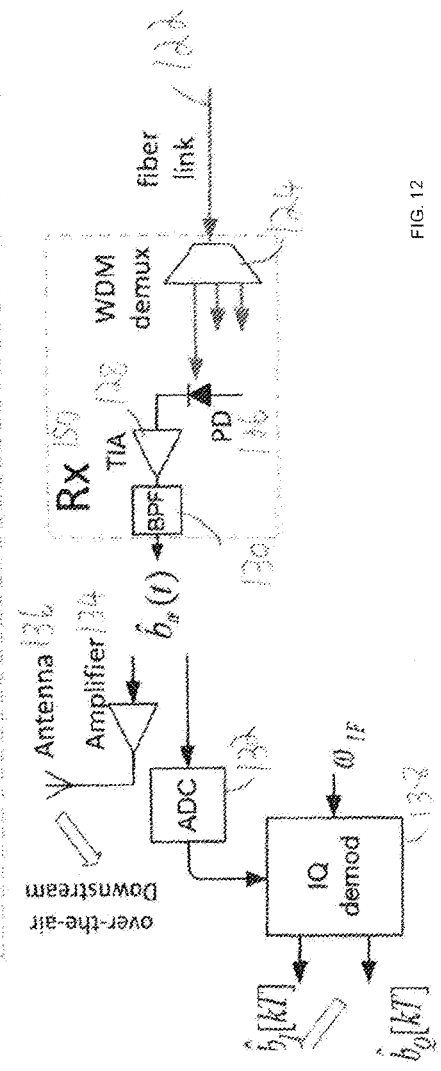
Figure 13:
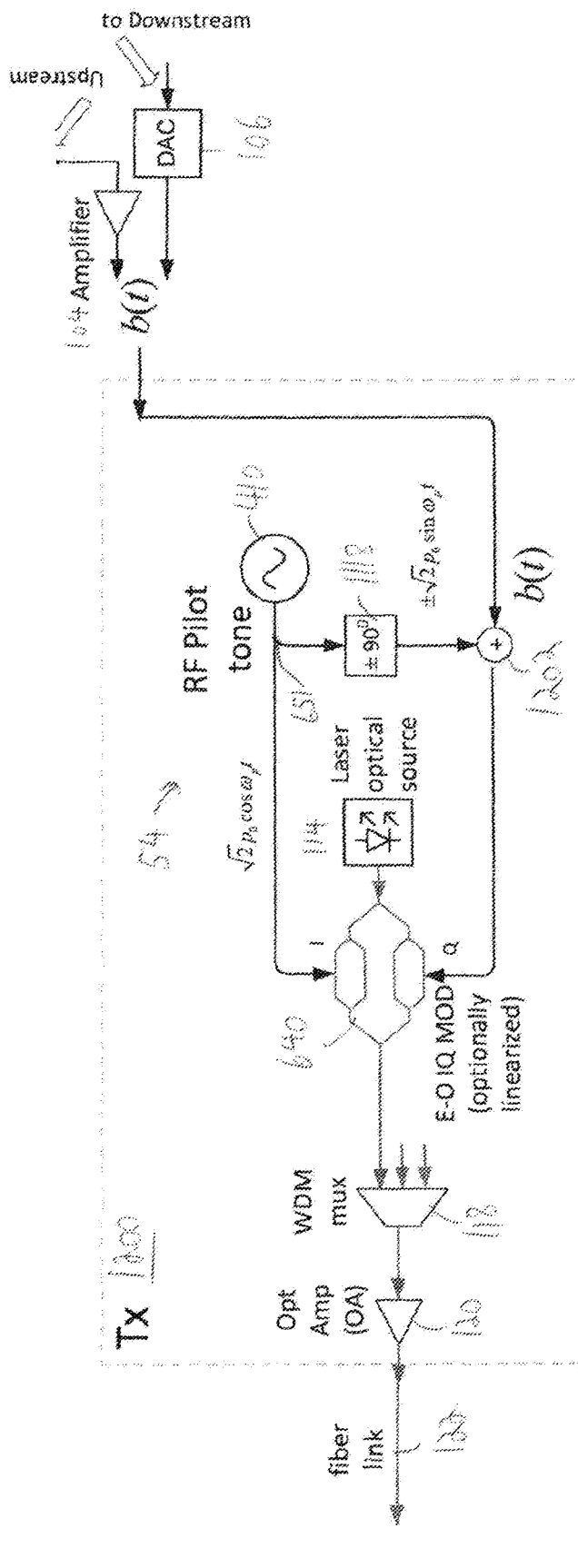
FIG. 13 illustrates an example of a system.
Figure 13:
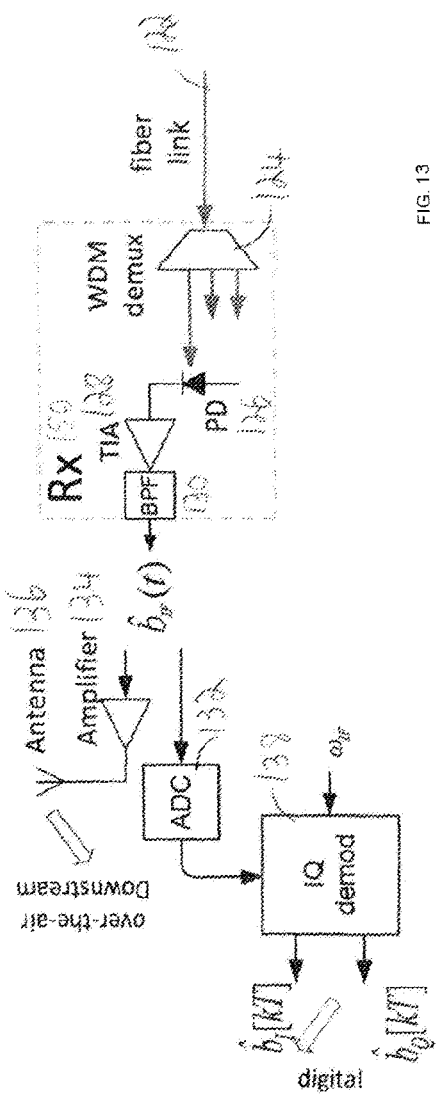

FIG. 12 illustrates a system that has a manipulator 52 of a transmit unit 1100. Manipulator 52 includes (i) one electrical bias circuit 410 that is configured to generate a sinusoidal signal; (ii) splitter 651 that is configured to split the sinusoidal signal to a first sinusoidal signal and a second sinusoidal signal; (iii) adder 1112 for adding the bandpass signal to the first sinusoidal signal to provide a first modulating signal; (iv) phase shifter 1118 for introducing a phase shift in the second sinusoidal signal to provide a second modulating signal. FIG. 13 illustrates a system that has a manipulator 54 of a transmit unit 1200.

Manipulator 54 includes (i) one electrical bias circuit 410 that is configured to generate a sinusoidal signal; (ii) splitter 651 that is configured to split the sinusoidal signal to a first sinusoidal signal and a second sinusoidal signal, the first sinusoidal signal is a first modulating signal; (iii) phase shifter 1118 that is configured to introduce a phase shift in the second sinusoidal signal to provide a phase-shifted signal; (iv) adder 1202 for adding the phase-shifted signal to the bandpass signal to provide a second modulating signal.

Figure 14:
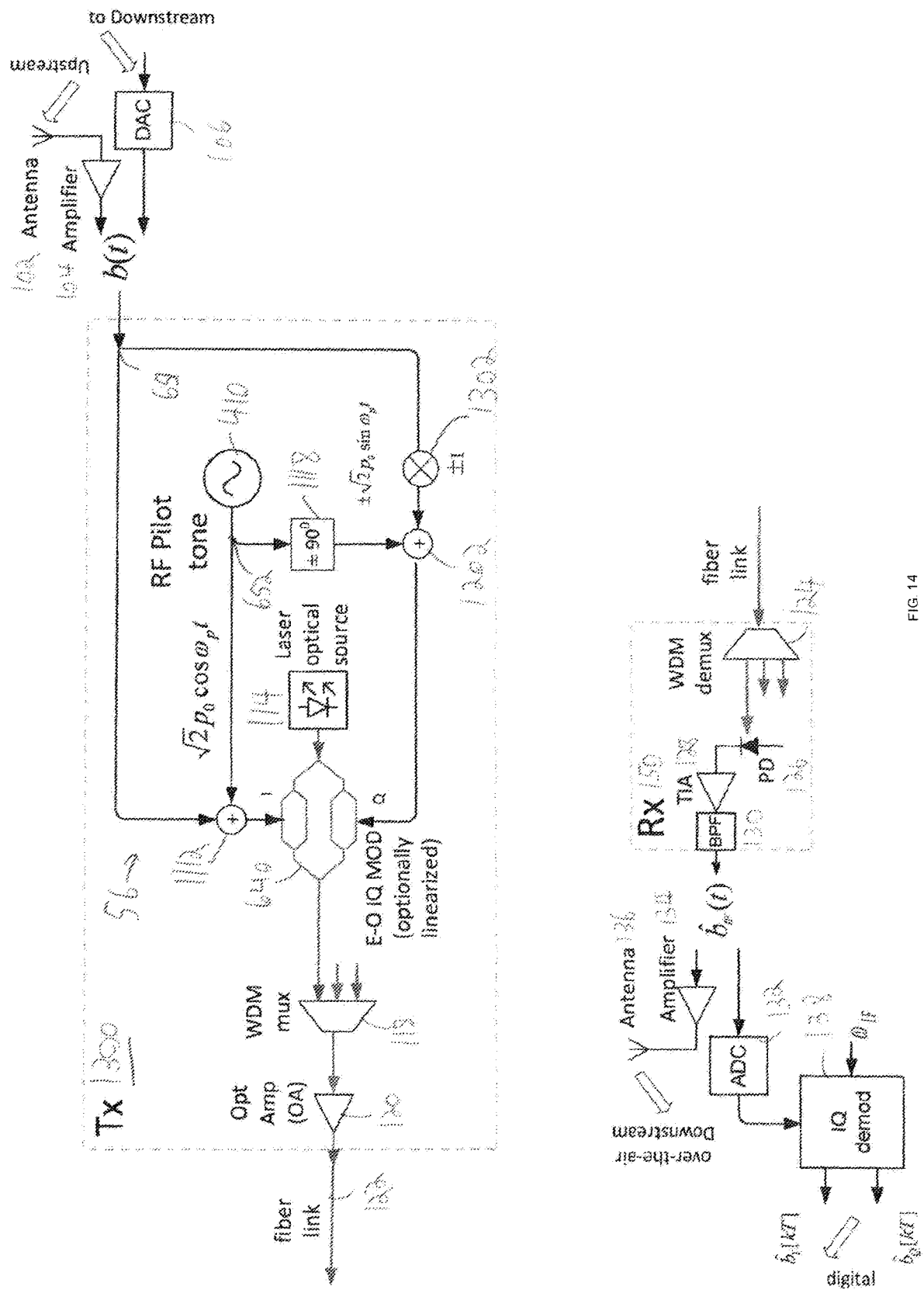
FIG. 14 illustrates an example of a system.

FIG. 14 illustrates a system that has a manipulator 56 of a transmit unit 1300. Manipulator 56 includes (i) one electrical bias circuit 410 that is configured to generate a sinusoidal signal; (ii) first splitter 651 that is configured to split the sinusoidal signal to a first sinusoidal signal and a second sinusoidal signal; (iii) second splitter 652 that is configured to split the bandpass signal to a first signal and a second signal; (iv) phase shifter 1118 that is configured to introduce a phase shift in the second sinusoidal signal to provide a phase-shifted signal; (v) first adder 1112 for adding the first signal to the first sinusoidal signal to provide a first modulating signal; (vi) second adder 1202 for adding the phase-shifted signal to the second signal (or a signal that is an opposite to the second signal) to provide a second modulating signal.

FIG. 14 also shows a multiplier 1302 for multiplying the second signal by one or by minus one (thereby generating a signal that is opposite to the second signal) before reaching adder 1202.

FIG. 15 illustrates a system that has a manipulator 58 of a transmit unit 1400.

Manipulator 58 includes (i) a reconstruction circuit (including mixers 710 and 712 and adder 714) that is configured to reconstruct a complex signal from the in-phase signal and a quadrature signal; (ii) an adder 716 for adding to the complex signal a sinusoidal signal to provide an adder output signal; (iii) at least one digital to analog converter (718, 720) that is configured to generate a first modulating signal and a second modulating signal by digital to analog conversion of the adder output signal and of a sinusoidal signal to provide a first modulating signal and a second modulating signal.

FIG. 16 illustrates a system that has a manipulator 60 of a transmit unit 1500.

Manipulator 60 includes (i) reconstruction circuit (includes components 710, 712 and 714) that is configured to reconstruct a complex signal from the in-phase signal and a quadrature signal; (ii) an adder 719 for adding to the complex signal a sinusoidal signal to provide an adder output signal; (iii) at least one digital to analog converter (718, 720) that is configured to generate a first modulating signal and a second modulating signal by digital to analog conversion of the adder output signal and of a sinusoidal signal to provide a first modulating signal and a second modulating signal.

FIG. 17 illustrates a system that has a manipulator 62 of a transmit unit 1600.

Manipulator 62 includes (i) a reconstruction circuit (components 710, 712 and 714) that is configured to reconstruct a complex signal from the in-phase signal and a quadrature signal; (ii) a splitter 651 for splitting the complex signal to a first signal and a second signal; (iii) a first adder 716 for adding the first signal to a sinusoidal signal to provide a first adder output signal; (iv) a second adder 719 for adding the second signal (or a signal that is opposite to the second signal see multiplier 1602) to a sinusoidal signal to provide a second adder output signal; (v) at least one digital to analog converter (718, 720) that is configured to generate a first modulating signal and a second modulating signal by digital to analog conversion of the first adder output signal and the second adder output signal to provide a first modulating signal and a second modulating signal.

FIG. 18 illustrates signals related to the system of FIGS. 19-24. FIG. 18 illustrates an optical output signal that has an asymmetrical spectrum about the optical carrier frequency.

FIG. 18 illustrates (a) the spectrum 1710 of signals (bandpass signal 1712 that is much weaker than baseband signal 1718, sinusoidal signals 1714 and 1716) at the input of the IQ modulator, (b) the spectrum 1730 of signals at the output of the IQ modulator optical pilot tones 1724 and 1726 that are substantially of the same intensity, optical sideband 1722 that is weaker than optical sideband 1728 both convey the information, and (c) the spectrum 1730 of the diode photocurrent illustrating signals 1732, 1734, 1736, 1738 and 1740. Signals 1734 and 1738 convey information.

FIG. 19 illustrates a system that has a manipulator 64 of a transmit unit 1800. Manipulator 64 includes (i) splitter 651 that is configured to split the bandpass signal to a first signal and a second signal; (ii) electrical bias circuit 410 for providing a cosinusoidal signal, (iii) analog Hilbert filter 630 that is configured to apply a Hilbert transform on the second signal to provide a second modulating signal; (iv) first adder 1112 for adding the first signal to the sinusoidal signal to provide a first modulating signal.

FIG. 20 illustrates a system that has a manipulator 66 of a transmit unit.

Manipulator 66 includes (i) electrical bias circuit 410 that is configured to generate a sinusoidal signal; (ii) splitter 651 that is configured to split the bandpass signal to a first signal and a second signal, the first signal is a first modulating signal; (iii) analog Hilbert filter 630 that is configured to apply a Hilbert transform on the second signal to provide a Hilbert-transformed signals; (iv) adder 1202 for adding the Hilbert-transformed signal to the sinusoidal signal to provide a second modulating signal.

FIG. 21 illustrates a system that has a manipulator 67 of a transmit unit 2000.

Manipulator 67 includes (i) electrical bias circuit 410 that is configured to generate a sinusoidal signal; (ii) first splitter 651 that is configured to split the bandpass signal to a first signal and a second signal; (iii) second splitter 652 that is configured to split the sinusoidal signal to a first sinusoidal signal and a second sinusoidal signal; (iv) analog Hilbert filter 630 that is configured to apply a Hilbert transform on the second signal to provide a Hilbert-transformed signal; (v) first adder 718 for adding the first signal and the first sinusoidal signal to provide a first modulating signal; (vi) second adder 1202 for adding the Hilbert-transformed signal to the second sinusoidal signal (or a signal that is opposite to the second sinusoidal signal see multiplier 1602) to provide a second modulating signal.

FIGS. 22-24 illustrate systems that have manipulators 68, 70 and 72 respectively of transmit units 2100, 2200 and 2300 respectively.

Each one of manipulators 68, 70 and 72 includes (i) electrical bias circuit 410 that is configured to generate a sinusoidal signal; (ii) a splitter (651 and 652) that is configured to (i) split the in-phase signal to a first in-phase signal and a second in-phase signal; and (ii) split the quadrature signal to a first quadrature signal and a second quadrature signal; (iii) a reconstruction circuit (mixers 710 and 712, and adder 714) that is configured to reconstruct a complex signal from the first in-phase signal and the first quadrature signal; (iv) digital Hilbert filter 812 (includes components 810, 812 and 814) that is configured to apply a Hilbert transform on the second in-phase signal and on the second quadrature signal to provide a Hilbert-transformed signal; (v) at least one bias circuit that is configured to add a sinusoidal signal to the complex signal to provide a complex biased signal, and add a sinusoidal signal to the Hilbert-transformed signal to provide a biased Hilbert-transformed signal; (vi) at least one digital to analog converter (718, 720) that is configured to generate a first modulating signal and a second modulating signal by digital to analog conversion of the biased complex signal, and the biased Hilbert-transformed signal.

FIGS. 22 and 23 illustrate a single bias circuit while FIG. 24 illustrates two bias circuits.

In FIG. 22 adder 716 adds a sinusoidal signal (bias signal) to the complex signal, while the Hilbert-transformed signal is unbiased. In FIG. 23 adder 719 adds a sinusoidal signal (bias signal) to the Hilbert-transformed signal, while the complex signal is unbiased. In FIG. 24 adder 716 adds a sinusoidal signal (bias signal) to the complex signal, and adder 719 adds a sinusoidal signal (bias signal) to the Hilbert-transformed signal.

Figure 26:
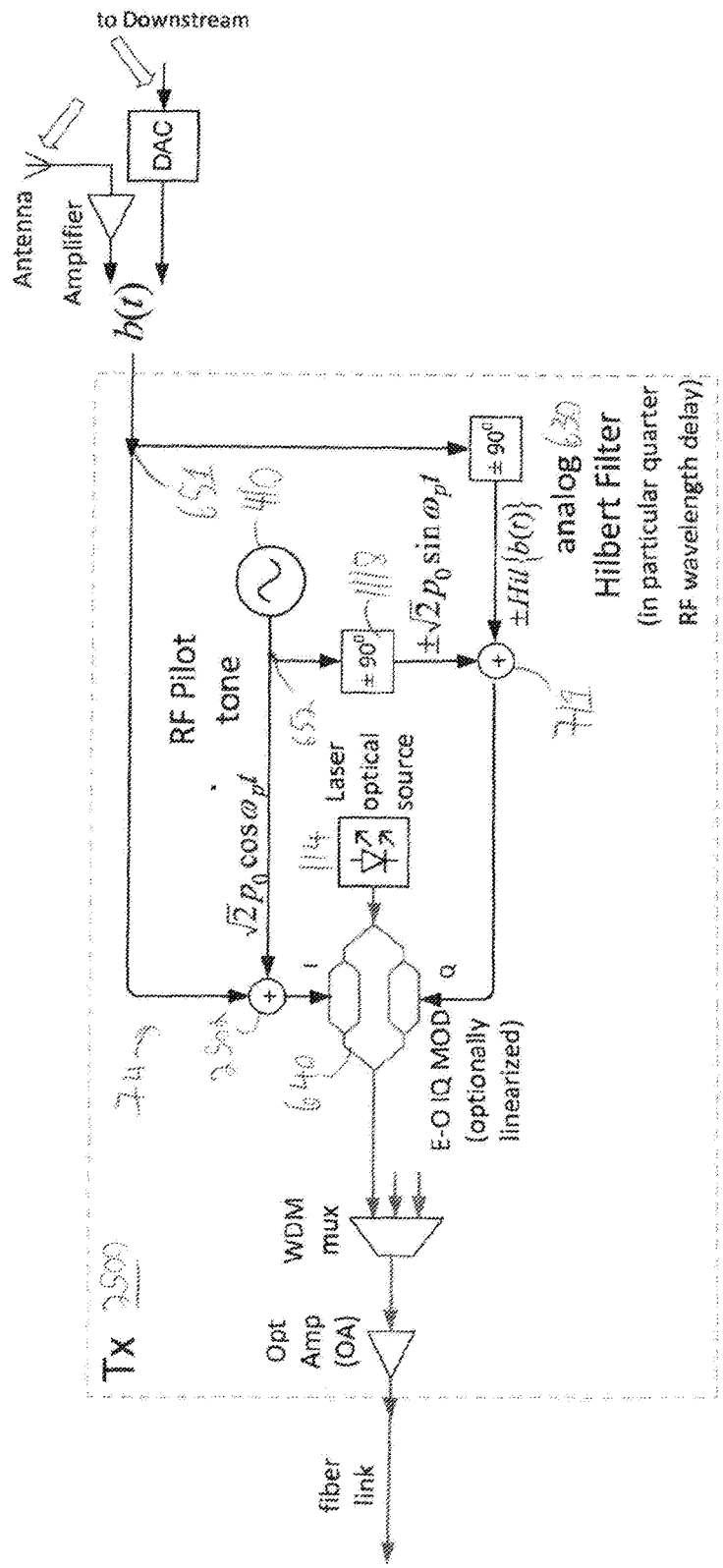
FIG. 26 illustrates an example of a system.
Figure 26:
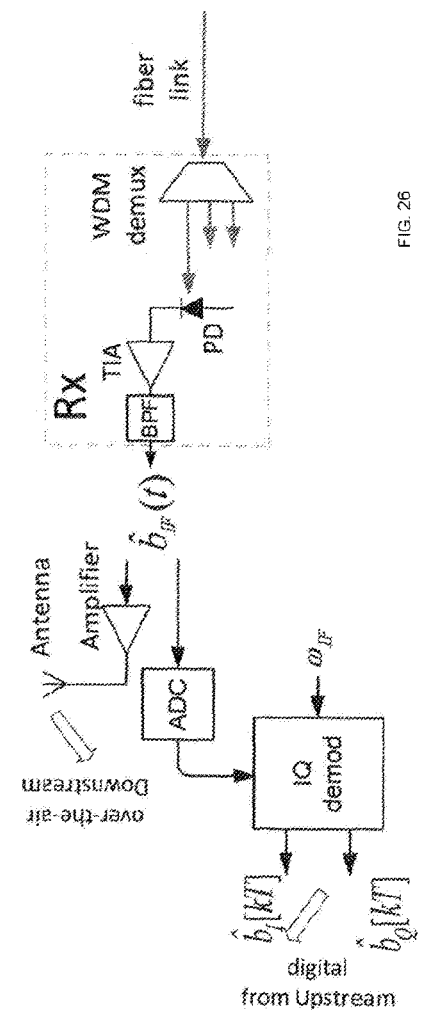
Figure 27:
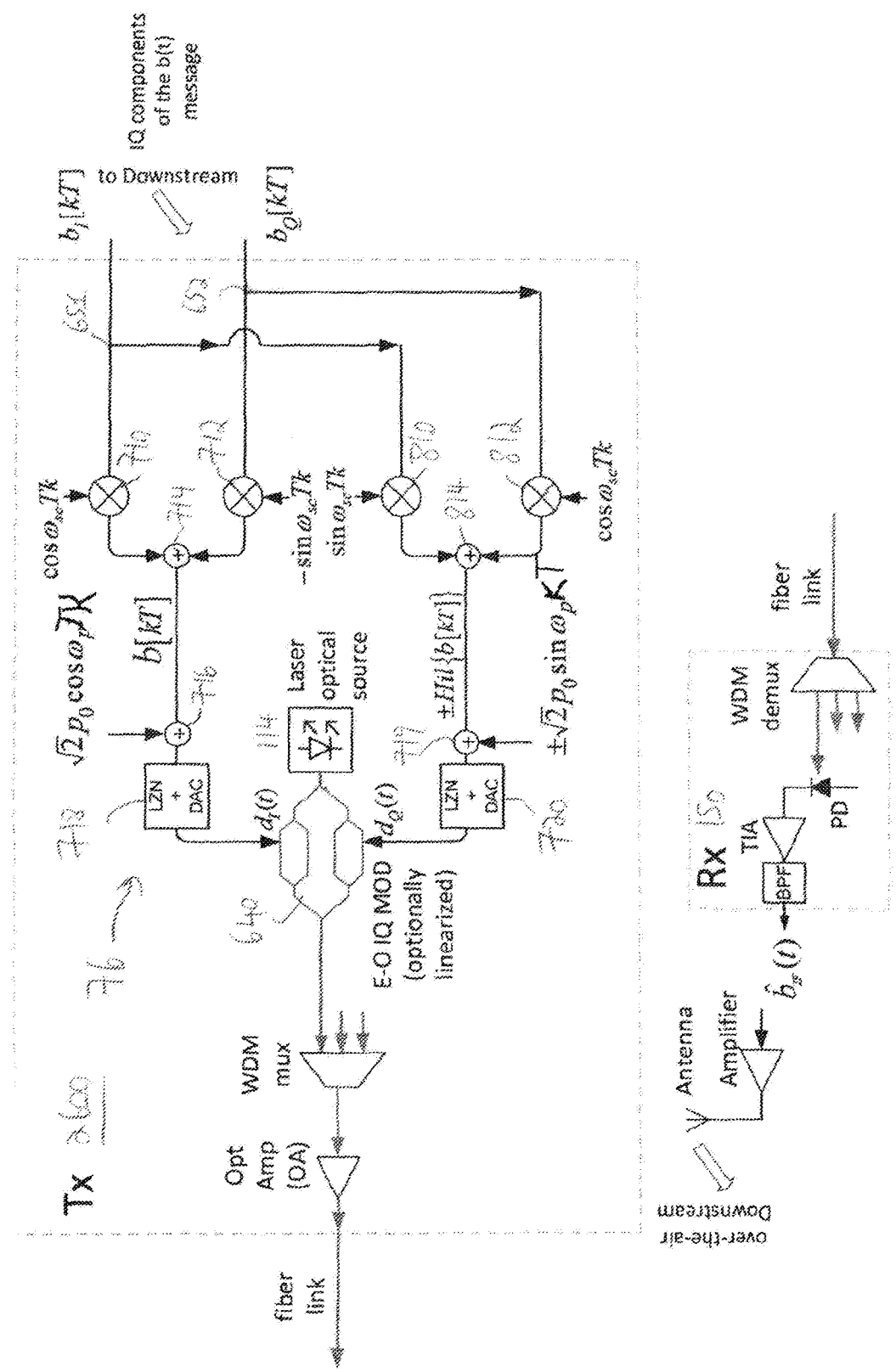
FIG. 27 illustrates an example of a system.
Figure 28:
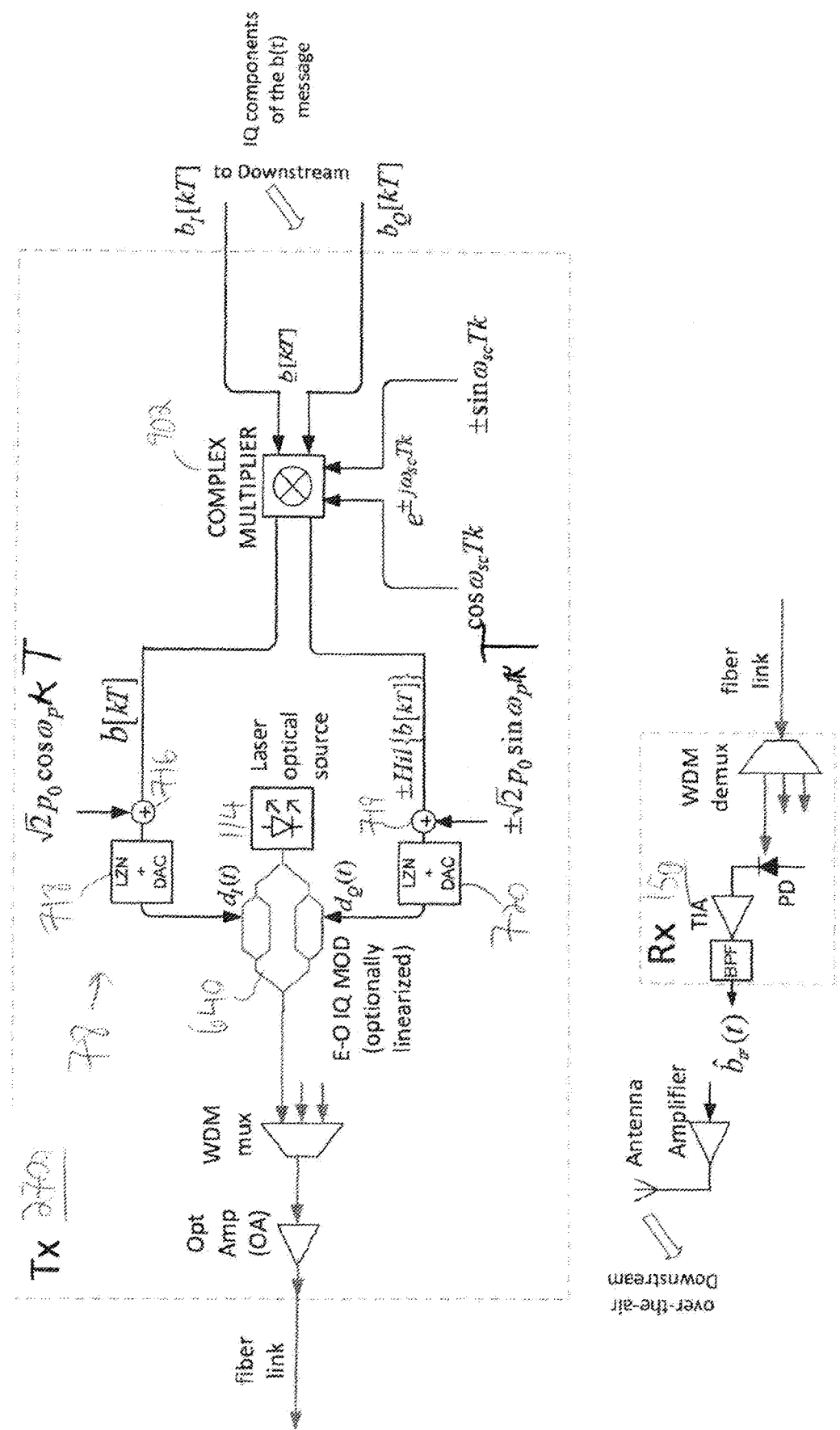
FIG. 28 illustrates an example of a system.

FIG. 25 illustrates signals related to the system of FIGS. 26-28. FIG. 25 illustrates an optical output signal that has an asymmetrical spectrum about the optical carrier frequency. FIG. 25 illustrates (a) the spectrum 2410 of signals (bandpass signal 2412 that is much weaker than baseband signal 2418, sinusoidal signal 2414 that is much weaker than sinusoidal signal 2416) at the input of the IQ modulator, (b) the spectrum 2430 of signals at the output of the IQ modulator—optical pilot tone 2424 that is much weaker optical pilot tone 2426, optical sideband 2422 that is weaker than optical sideband 2428—both convey the information, and (c) the spectrum 2430 of the diode photocurrent illustrating signals 2432, 2434, 2436, 2438 and 2440. Signals 2434 and 2438 convey information.

FIG. 26 illustrates a system that has a manipulator 74 of a transmit unit 2500.

Manipulator 74 includes (i) electrical bias circuit 410 that is configured to generate a sinusoidal signal; (ii) first splitter 651 that is configured to split the bandpass signal to a first signal and a second signal; (iii) second splitter 652 that is configured to split the sinusoidal signal to a first sinusoidal signal and a second sinusoidal signal; (iv) analog Hilbert filter 630 that is configured to apply a Hilbert transform on the second signal to provide a Hilbert-transformed signal; (v) first adder 2502 for adding the first signal and the first sinusoidal signal to provide a first modulating signal; (vi) a phase shifter that is configured to introduce a phase shift in the second sinusoidal signal to provide a sinusoidal signal; (v) second adder 719 for adding the Hilbert-transformed signal (or a signal that is opposite to the Hilbert-transformed signal) to the sinusoidal signal to provide a second modulating signal.

FIG. 27 illustrates a system in which the manipulator 76 of the transmit unit 2600 receives an in-phase signal and a quadrature signal.

Manipulator 76 includes (i) a splitter (651, 652) that is configured to split the in-phase signal to a first in-phase signal and a second in-phase signal; and split the quadrature signal to a first quadrature signal and a second quadrature signal; (ii) a reconstruction circuit (includes mixers 710, 712 and adder) that is configured to reconstruct a complex signal from the first in-phase signal and the first quadrature signal; a digital Hilbert filter (includes mixers 810 and 812) that is followed by an adder 814, wherein the digital Hilbert filter is configured to apply a Hilbert transform on the second in-phase signal and on the second quadrature signal to provide signals that are added by the adder to provide a Hilbert-transformed signal; (iii) at least one bias circuit (represented by sinusoidal signal and adder 716, and by sinusoidal signal and adder 719) that is configured to add the sinusoidal signal to the complex signal and to add the sinusoidal signal to the Hilbert-transformed signal; (iv) at least one digital to analog converter (718 and 720) that is configured to generate a first modulating signal and a second modulating signal by digital to analog conversion of a biased or an unbiased complex signal, and a biased or unbiased Hilbert-transformed signal to provide a first modulating signal and a second modulating signal.

FIG. 28 illustrates a system in which the manipulator 78 of the transmit unit 2700 receives an in-phase signal and a quadrature signal.

Manipulator 78 may include (i) a complex multiplexer 902 that is fed by the in-phase signal, the quadrature signal and a complex digital signal and is configured to output a complex signal and a Hilbert-transformed signal; (ii) at least one bias circuit that is configured to add (by adder 716) a sinusoidal signal to the complex signal to provide a complex biased signal, and add (by adder 719) a sinusoidal signal to the Hilbert-transformed signal to provide a biased Hilbert-transformed signal; (iii) at least one digital to analog converter (718, 720) that is configured to generate a first modulating signal and a second modulating signal by digital to analog conversion of the biased complex signal, and the biased Hilbert-transformed signal.

FIGS. 29-32 illustrate various example of the receiver unit of the electro-optical systems. Any one of the receiver units may be coupled to any of the mentioned above transmit units.

Any receiver unit illustrates in any of the figures (except FIG. 1) may be configured to receive a representation of the output optical signal and to generate a reconstructed bandpass signal that represents the bandpass signal. The received may include direct detection circuit for converting the representation of the output optical signal to an electronic signal.

In figures that preceded FIG. 29 the direct detection circuit is a photodiode. A de-multiplexer may output multiple optical signals to multiple photodiodes usually one photodiode per optical signal.

In FIGS. 29-32 the direct detection circuit includes a coherent hybrid circuit 2806 that is configured to (a) receive the representation of the output optical signal and a local oscillator signal, and to (b) process the representation of the output optical signal and output (i) a first polarization in-phase component of the representation of the output optical signal Ix(t), (ii) a second polarization in-phase component of the representation of the output optical signal Iy(t), (iii) a first polarization quadrature component of the representation of the output optical signal Qx(t), and (iv) a second polarization quadrature component of the representation of the output optical signal Qy(t).

In FIG. 29 the coherent hybrid circuit 2806 belongs to a photodiode emulator module 2802 of receiver unit 2800. The coherent hybrid circuit 2806 is followed by at least one squerer (in FIG. 29 there is a single squarer per signal overall four squerers 2808 that are configured to calculate a square of each one of the (i) first polarization in-phase component of the representation of the output optical signal, (ii) second polarization in-phase component of the representation of the output optical signal, (iii) first polarization quadrature component of the representation of the output optical signal, and (iv) second polarization quadrature component of the representation of the output optical signal.

The squarers are followed by a single adder 2810 that adds the output of the four squarers to provide a signal that is band pass filtered (by BPF post-filter 2812) to provide the reconstructed bandpass signal.

Figure 30:
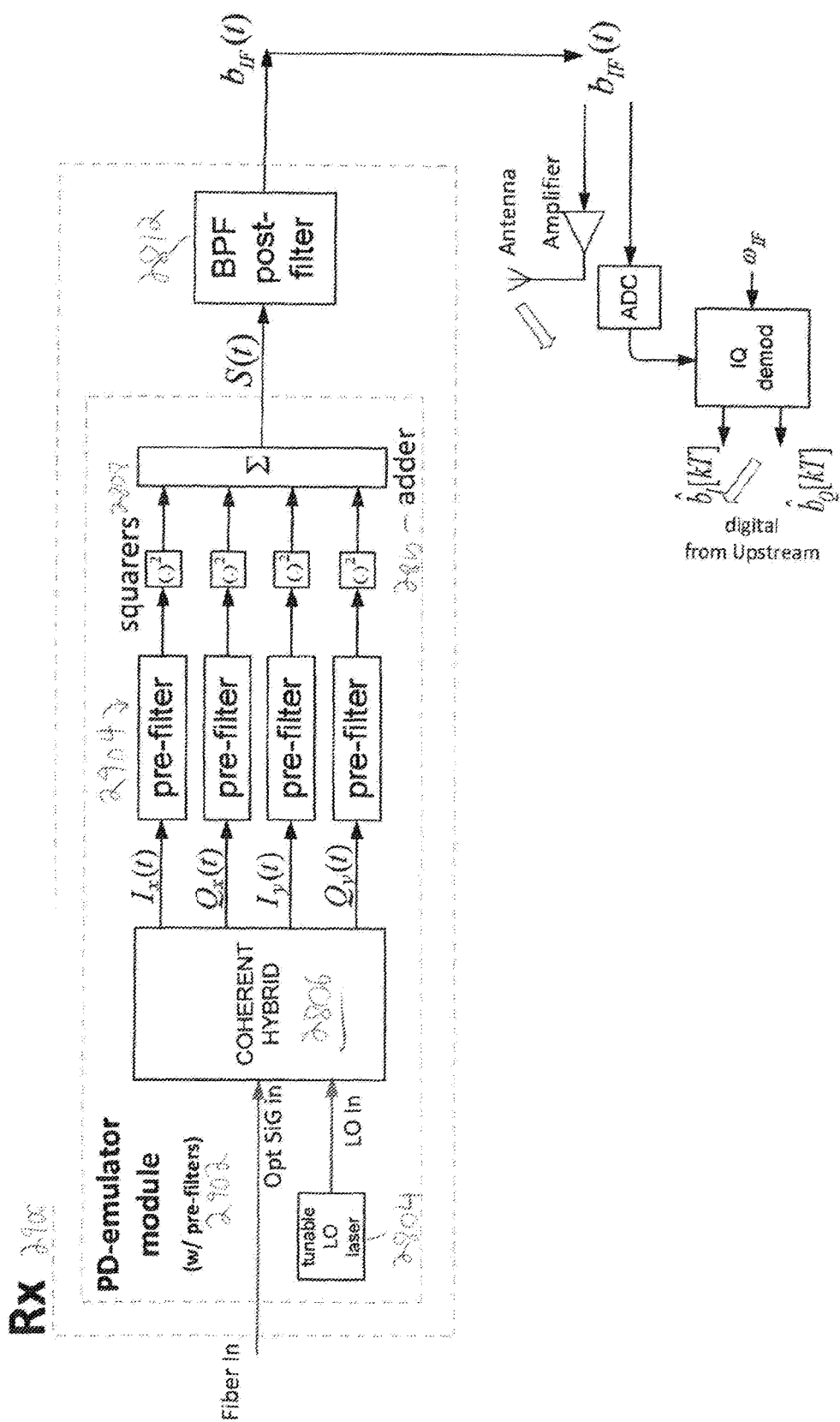
FIG. 30 illustrates an example of a receiver of the system.

In FIG. 30 the coherent hybrid circuit 2806 belongs to a photodiode emulator module 2902 of receiver unit 2900.

The coherent hybrid circuit 2806 is followed by at least one pre-filter (in FIG. 30 there is a single per-filter per signal—overall four pre-filters 2904).

The pre-filters are followed by at least one squerer (in FIG. 29 there is a single squarer per signal—overall four squerers 2808).

The squarers are followed by a single adder 2810 that in turn is followed by BPF post-filter 2812.

In FIG. 31 the coherent hybrid circuit 2806 belongs to a photodiode emulator module 3002 of receiver unit 3000.

In FIG. 31 the pre-filters of FIG. 30 are replaced by at least one filter (in FIG. 31 there are eight pre-filters 3010 four pre-filters (pre-filter(pilot) for pre-filtering the pilot optical tones and four pre-filters (pre-filter sig) for filtering the bandpass messages. These pre-filters are configured to extract each one of the (i) first polarization in-phase component of an optical pilot tone of the representation of the output optical signal, (ii) second polarization in-phase component of the optical pilot tone the of representation of the output optical signal, (iii) first polarization quadrature component of the optical pilot tone of the representation of the output optical signal, (iv) second polarization quadrature component of the optical pilot tone of the representation of the output optical signal, (v) first polarization in-phase component of an optical sideband that conveys the information of the representation of the output optical signal, (vi) second polarization in-phase component of the optical sideband that conveys the information the of representation of the output optical signal, (vii) first polarization quadrature component of the optical sideband that conveys the information of the representation of the output optical signal, (viii) second polarization quadrature component of the optical sideband that conveys the information of the representation of the output optical signal.

The eight pre-filters are followed by at least one multiplier (such as four multipliers or mixers 3012) that are configured to multiply (i) the first polarization in-phase component of an optical pilot tone of the representation of the output optical signal by the first polarization in-phase component of an optical sideband that conveys the information of the representation of the output optical signal, (ii) multiply the second polarization in-phase component of the optical pilot tone the of representation of the output optical signal by the second polarization in-phase component of the optical sideband that conveys the information the of representation of the output optical signal, (iii) multiply the first polarization quadrature component of the optical pilot tone of the representation of the output optical signal by the first polarization quadrature component of the optical sideband that conveys the information of the representation of the output optical signal, and (iv) multiply the second polarization quadrature component of the optical pilot tone of the representation of the output optical signal by the second polarization quadrature component of the optical sideband that conveys the information of the representation of the output optical signal.

The multipliers (or mixers) are followed by adder 2810 and BPS post-filter 2812.

In FIG. 32 the coherent hybrid circuit 2806 belongs to a photodiode emulator module 3102 of receiver unit 3100.

The photodiode emulator module 3102 differs from photodiode emulator module 2902 of FIG. 30 by including analog to digital converters ADC 3104 after the coherent hybrid circuit 2806—and performing the pre-filtering, squaring, adding and post filtering in the digital domain.

In any one of FIGS. 29-32 a pre-filter is a filter that preceded the multiplication (or squaring) and adding operations. A post-filter is a filter that follows the multiplication (or squaring) and adding operations.

Figure 33:
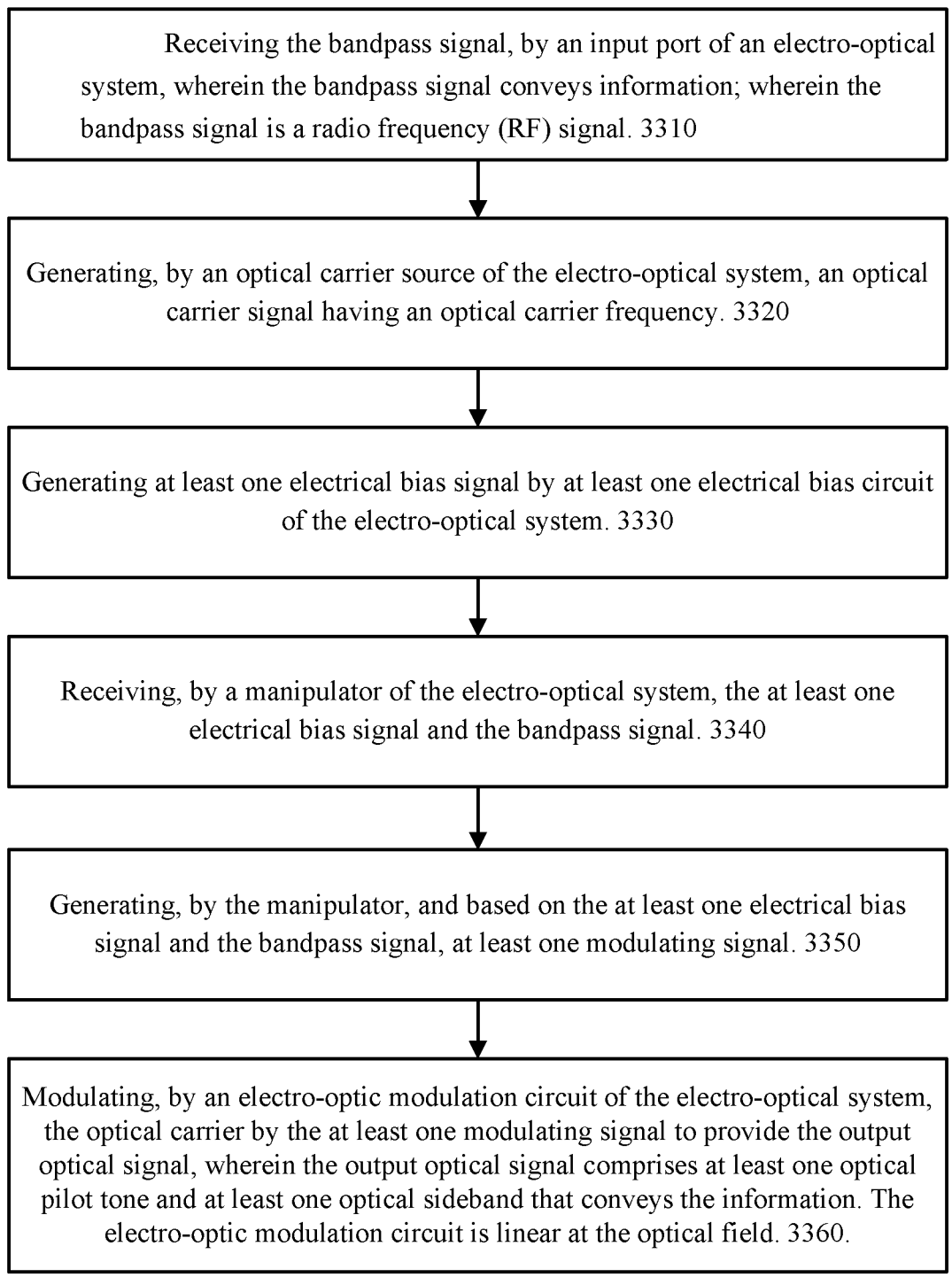
FIG. 33 illustrates an example of a method.

FIG. 33 illustrates method 3300.

Method 300 may include using any system illustrate din any of the mentioned above figures.

Method 3300 may include receiving the bandpass filter by an electro-optic system and converting the bandpass signal to the output optical signals by an electro-optical system according to any of the previous figures (except the prior art system of FIG. 1).

Method 3300 may include the following steps:

Receiving the bandpass signal, by an input port of an electro-optical system, wherein the bandpass signal conveys information; wherein the bandpass signal is a radio frequency (RF) signal. 3310

Generating, by an optical carrier source of the electro-optical system, an optical carrier signal having an optical carrier frequency. 3320

Generating at least one electrical bias signal by at least one electrical bias circuit of the electro-optical system. 3330

Receiving, by a manipulator of the electro-optical system, the at least one electrical bias signal and the bandpass signal. 3340

Generating, by the manipulator, and based on the at least one electrical bias signal and the bandpass signal, at least one modulating signal. 3350

Modulating, by an electro-optic modulation circuit of the electro-optical system, the optical carrier by the at least one modulating signal to provide the output optical signal, wherein the output optical signal comprises at least one optical pilot tone and at least one optical sideband that conveys the information. The electro-optic modulation circuit is linear at the optical field. 3360.

Method 3300 may be executed by any of the systems illustrates in the specification and/or drawings. Any reference to a system, module, component that s configured to perform an operation should be regarded as applying to a method that includes that operation.

Any combination of any system and/or unit of any one of FIGS. 2-23 may be provided.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. An electro-optic system, the electro-optic system comprises:
    an input port that is configured to receive a bandpass signal that conveys information; wherein the bandpass signal is a radio frequency (RF) signal;
    an optical carrier source that is configured to generate an optical carrier signal having an optical carrier frequency;
    at least one electrical bias circuit that is configured to generate at least one electrical bias signal;
    an electro-optic modulation circuit that is linear at the optical field;
    a manipulator that is configured to (a) receive the at least one electrical bias signal and the bandpass signal, (b) generate, based on the at least one electrical bias signal and the bandpass signal, at least one modulating signal;
    wherein the electro-optic modulation circuit is configured to modulate the optical carrier by the at least one modulating signal to provide an output optical signal that comprises at least one optical pilot tone and at least one optical sideband that conveys the information; and
    wherein the bandpass signal is an analog radio frequency bandpass signal, wherein the manipulator comprises (a) a splitter for splitting the bandpass signal to a first signal and a second signal; (b) an analog Hilbert filter that is configured to apply a Hilbert transform on the second signal to provide a Hilbert-transformed signal; (c) at least one bias circuit that is configured to add at least one direct current (DC) bias signal to at least one of the first signal and the Hilbert-transformed signal thereby providing a first modulating signal and a second modulating signal: wherein the electro-optical modulator is configured to modulate the optical carrier by the first and second modulating signals to provide an output optical signal that has an asymmetric spectrum round the optical carrier frequency.

2. The electro-optic system according to claim 1 wherein the at least one electrical bias circuit is configured to generate a direct current (DC) electrical bias signal.

3. The electro-optic system according to claim 1 wherein the bandpass signal is an analog radio frequency bandpass signal.

4. The electro-optic system according to claim 1 wherein the at least one electrical bias circuit is configured to generate a sinusoidal signal.

5. The electro-optic system according to claim 1 wherein the manipulator is configured to (a) generate a first modulating signal in response to the bandpass signal, (b) generate a second modulating signal in response to a Hilbert-transformed signal.

6. The electro-optic system according to claim 5 wherein the manipulator is configured to (a) generate the first modulating signal in response to the bandpass signal and to a first direct current (DC) bias signal, and (b) generate the second modulating signal in response to a Hilbert-transformed signal.

7. The electro-optic system according to claim 5 wherein the manipulator is configured to (a) generate the first modulating signal in response to the bandpass signal and to a first sinusoidal bias signal, and (b) generate the second modulating signal in response to a Hilbert-transformed signal and to a second sinusoidal bias signal.

8. The electro-optic system according to claim 1 wherein the electro-optical modulator is configured to receive the at least one modulating signal and to output an output optical signal that has an asymmetric spectrum round the optical carrier frequency.

9. The electro-optic system according to claim 8 wherein the at least one modulating signal comprises a first modulating signal and a second modulating signal.

10. The electro-optic system according to claim 1 wherein the electro-optical modulator is configured modulate the optical carrier by the at least one modulating signal to output a vestigial sideband modulated output optical signal.

11. The electro-optic system according to claim 1 further comprising a receiver that is configured to receive a representation of the output optical signal and to generate a reconstructed bandpass signal that represents the bandpass signal; wherein the received comprises a direct detection circuit for converting the representation of the output optical signal to an electronic signal.

12. The electro-optic system according to claim 11 wherein the direct detection circuit comprises a coherent hybrid circuit that is configured to (a) receive the representation of the output optical signal and a local oscillator signal, and to (b) process the representation of the output optical signal and output (i) a first polarization in-phase component of the representation of the output optical signal, (ii) a second polarization in-phase component of the representation of the output optical signal, (iii) a first polarization quadrature component of the representation of the output optical signal, and (iv) a second polarization quadrature component of the representation of the output optical signal.

13. An electro-optic system, the electro-optic system comprises:
an input port that is configured to receive a bandpass signal that conveys information: wherein the bandpass signal is a radio frequency (RF) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal:
wherein the electro-optic modulation circuit is configured to modulate the optical carrier signal by the at least one modulating signal to provide an output optical signal that comprises at least one optical pilot tone and at least one optical sideband that conveys the information;
wherein the bandpass signal is a digital bandpass signal that comprises an in-phase signal and a quadrature signal;
wherein the manipulator comprises at least one digital to analog converter that is configured to generate a first modulating signal and a second modulating signal by digital to analog conversion of a biased or an unbiased first signal, and a biased or unbiased Hilbert transformed signal to provide a first modulating signal and a second modulating signal; and
wherein the electro-optical modulator is configured to modulate the optical carrier by the first and second modulating signals to provide an output optical signal that has an asymmetric spectrum round the optical carrier frequency
wherein one of the following is true;
(a) the manipulator further comprises:
a reconstruction circuit that is configured to reconstruct a complex signal from the in-phase signal and a quadrature signal;
a splitter for splitting the complex signal to a first signal and a second signal;
a digital Hibert filter that is configured to apply a Hilbert transform on the second signal to provide a Hilbert-transformed signal;
at least one bias circuit that is configured to add at least one direct current (DC) bias signal to at least one of the first signal and the Hilbert-transformed signal;
(b) the manipulator further comprises
a complex multiplexer that is fed by the in-phase signal, the quadrature signal and a complex digital signal and is configured to output a complex signal and a Hilbert-transformed signal; and
at least one bias circuit that is configured to add at least one direct current (DC) bias signal to at least one of the complex signal and the Hilbert-transformed signal.

14. The electro-optic system according to claim 1, comprising at least one digital linearizer that is configured to compensate for a non-linearity of the electro-optical modulator.

15. A electro-optic system, the electro-optic system comprises:
an input port that is configured to receive a bandpass signal that conveys information; wherein the bandpass signal is a radio frequency (RF) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal;
wherein the electro-optic modulation circuit is configured to modulate the optical carrier by the at least one modulating signal to provide an output optical signal that comprises at least one optical pilot tone and at least one a sideband that conveys the information;
wherein the bandpass signal is a digital bandpass signal that comprises an in-phase signal and a quadrature signal;
wherein the manipulator comprises:
a splitter that is configured to (i) split the in-phase signal to a first in-phase signal and a second in-phase signal; and (ii) split the quadrature signal to a first quadrature signal and a second quadrature signal;

a reconstruction circuit that is configured to reconstruct a complex signal from the first in-phase signal and the first quadrature signal;
a digital Hilbert filter that is followed by an adder, wherein the digital Hilbert filter is configured to apply a Hilbert transform on the second in-phase signal and on the second quadrature signal to provide signals that are added by the adder to provide a Hilbert-transformed signal;
at least one bias circuit that is configured to perform one of the following: (a) add at least one direct current (DC) bias signal to at least one of the complex signal and the Hilbert-transformed signal, and (b) add at least one cosinusoidal bias signal to the at least one of the complex signal and the Hilbert-transformed signal;
at least one digital to analog converter that is configured to generate a first modulating signal and a second modulating signal by digital to analog conversion of a biased or an unbiased complex signal, and a biased or unbiased Hilbert-transformed signal to provide a first modulating signal and a second modulating signal; and
wherein the electro-optical modulator is configured to modulate the optical carrier by the first and second modulating signals to provide an output optical signal that has an asymmetric spectrum round the optical carrier frequency.

16. An electro-optic system, the electro-optic system comprises:
an input port that is configured to receive a bandpass signal that conveys information: wherein the bandpass signal is a radio frequency (RF) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal:
wherein the electro-optic modulation circuit is configured to modulate the optical carrier by the at least one modulating signal to provide an output optical signal that comprises at least one optical pilot tone and at least one optical sideband that conveys the information:
wherein the at least one electrical bias circuit is configured to generate a sinusoidal signal;
wherein the electro-optical modulator is an in-phase quadrature (IQ) modulator that is configured to modulate the optical carrier with the first and second modulating signals;
wherein the modulator comprises a splitter that is configured to split the sinusoidal signal to a first sinusoidal signal and a second sinusoidal signal, an adder and a phase shifter;
wherein one of the following is true;
(a) the adder is for adding the bandpass signal to the first sinusoidal signal to provide a first modulating signal; a phase shifter for introducing a phase shift in the second sinusoidal signal to provide a second modulating signal;

(b) the first sinusoidal signal is a first modulating signal, the phase shifter is configured to introduce a phase shift in the second sinusoidal signal to provide a phase-shifted signal, and the adder is for adding the phase-shifted signal to the bandpass signal to provide the second modulating signal.

17. An electro-tic system the electro-tic system comprises:
an input port that is configured to receive a bandpass signal that conveys information: wherein the bandpass signal is a radio frequency (RF) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal:
wherein the electro-optic modulation circuit is configured to modulate the optical carrier by the at least one modulating signal to provide an output optical signal that comprises at least one optical pilot tone and at least one optical sideband that conveys the information:
wherein the bandpass signal is a digital bandpass signal that comprises an in-phase signal and a quadrature signal;
wherein the manipulator comprises a reconstruction circuit that is configured to reconstruct a complex signal from the in-phase signal and a quadrature signal,
and at least one digital to analog converter;
wherein the electro-optical modulator is configured to modulate the optical carrier by the first and second modulating signals to provide an output optical signal that has an asymmetric spectrum round the optical carrier frequency;
wherein one of the following is true;
(a) the manipulator further comprises an adder for adding to the complex signal a sinusoidal signal to provide an adder output signal; wherein the at least one digital to analog converter is configured to generate a first modulating signal and a second modulating signal by digital to analog conversion of the adder output signal and of a cosinusoidal signal to provide a first modulating signal and a second modulating signal; and
(b) the manipulator further comprises a splitter for splitting the complex signal to a first signal and a second signal; a first adder for adding the first signal to the cosinusoidal signal to provide a first adder output signal; a second adder for adding a signal that is opposite to the second signal to a sinusoidal signal to provide a second adder output signal wherein the at least one digital to analog converter is configured to generate the first modulating signal and the second modulating signal by digital to analog conversion of the first adder output signal and the second adder output signal to provide the first modulating signal and the second modulating signal.

18. An electro-optic system, the electro-optic system comprises:
an input port that is configured to receive a bandpass signal that conveys information; wherein the bandpass signal is a radio frequency (R) signal;

an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal at least one modulating signal:
wherein the electro-optic modulation circuit is configured to modulate the optical carrier by the at least one modulating signal to provide an output optical signal that comprises at least one optical pilot tone and at least one optical sideband that conveys the information:
wherein the at least one electrical bias circuit is configured to generate a cosinusoidal signal; wherein the modulator comprises a first splitter, a second splitter an analog Hilbert filter, a first adder and a second adder: wherein the electro-optical modulator is an in-phase quadrature (IQ) modulator that is configured to modulate the optical carrier with the first and second modulating signals;
wherein one of the following is true:
(a): the first splitter is configured to split the bandpass signal to a first signal and a second signal; the second splitter that is configured to split the cosinusoidal signal to a first cosinusoidal signal and a second cosinusoidal signal; the analog Hilbert filter that is configured to apply a Hilbert transform on the second signal to provide a Hilbert-transformed signal; the first adder is for adding the first signal and the first cosinusoidal signal to provide a first modulating signal; the second adder is for adding the Hilbert-transformed signal to second cosinusoidal signal to provide a second modulating signal;
(b) the first splitter is configured to split the cosinusoidal signal to a first cosinusoidal signal and a second cosinusoidal signal; the second splitter is configured to split the bandpass signal to the first signal and the second signal; the analog Hilbert filter is configured to apply the Hilbert transform on the second signal to provide a filbert-transformed signal; the phase shifter is configured to introduce a phase shift in the second cosinusoidal signal to provide a sinusoidal signal; the first adder is for adding the first signal to the first cosinusoidal signal to provide the first modulating signal; and the second adder is for adding the sinusoidal signal to Hilbert-transformed signal to provide the second modulating signal.

19. An electro-optic system, the electro-optic system comprises:
an input port that is configured to receive a bandpass signal that conveys information: wherein the bandpass signal is a radio frequency (R) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal:
wherein the electro-optic modulation circuit is configured to modulate the optical carrier by the at least one modulating signal to provide an output optical signal that comprises at least one optical pilot tone and at least one optical sideband that conveys the information:
wherein the bandpass signal is a digital bandpass signal that comprises an in-phase signal and a quadrature signal;
wherein the manipulator comprises:
a splitter that is configured to (i) split the in-phase signal to a first in-phase signal and a second in-phase signal; and (ii) split the quadrature signal to a first quadrature signal and a second quadrature signal;
a reconstruction circuit that is configured to reconstruct a complex signal from the first in-phase signal and the first quadrature signal;
a digital Hilbert filter that is followed by an adder, wherein the digital Hilbert filter is configured to apply a Hilbert transform on the second in-phase signal and on the second quadrature signal to provide signals that are added by the adder to provide a Hilbert-transformed signal;
at least one bias circuit that is configured to add at least one cosinusoidal bias signal to at least one of the complex signal and the Hilbert-transformed signal;
at least one digital to analog converter that is configured to generate a first modulating signal and a second modulating signal by digital to analog conversion of a biased or an unbiased complex signal, and a biased or unbiased Hilbert-transformed signal to provide a first modulating signal and a second modulating signal; and
wherein the electro-optical modulator is configured to modulate the optical carrier by the first and second modulating signals to provide an output optical signal that has an asymmetric spectrum round the optical carrier frequency.

20. An electro-optic system, the electro-optic system comprises:
an input port that is configured to receive a bandpass signal that conveys information: wherein the bandpass signal is a radio frequency (R) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal:
wherein the electro-optic modulation circuit is configured to modulate the optical carrier by the at least one modulating signal to provide an output optical signal that comprises at least one optical pilot tone and at least one optical sideband that conveys the information:
wherein the bandpass signal is a digital bandpass signal that comprises an in-phase signal and a quadrature signal;

wherein one of the following is true:
(a) the manipulator comprises: a splitter that is configured to (i) split the in-phase signal to a first in-phase signal and a second in-phase signal; and (ii) split the quadrature signal to a first quadrature signal and a second quadrature signal; a reconstruction circuit that is configured to reconstruct a complex signal from the first in-phase signal and the first quadrature signal: a digital Hilbert filter that is followed by an adder, wherein the digital Hilbert filter is configured to apply a Hilbert transform on the second in-phase signal and on the second quadrature signal to provide signals that are added by the adder to provide a Hilbert-transformed signal;
(b) the manipulator comprises a complex multiplexer that is fed by the in-phase signal, the quadrature signal and a complex digital signal and is configured to output a complex signal and a Hilbert-transformed signal;
and
wherein the manipulator further comprises at least one bias circuit that is configured to add a cosinusoidal signal to the complex signal to provide a complex biased signal, and add a sinusoidal signal to the Hilbert-transformed signal to provide a biased filbert-transformed signal and at least one digital to analog converter that is configured to generate a first modulating signal and a second modulating signal by digital to analog conversion of the biased complex signal, and the biased Hilbert-transformed signal;
wherein the electro-optical modulator is configured to modulate the optical carrier by the first and second modulating signals to provide an output optical signal that has an asymmetric spectrum round the optical carrier frequency.

21. An electro-optic system, the electro-optic system comprises:
an input port that is configured to receive a bandpass signal that conveys information: wherein the bandpass signal is a radio frequency (R) signal;
an optical carrier source that is configured to generate an optical carrier signal having an optical carrier frequency;
at least one electrical bias circuit that is configured to generate at least one electrical bias signal;
an electro-optic modulation circuit that is linear at the optical field;
a manipulator that is configured to (a) receive the at least one electrical bias signal and the bandpass signal, (b) generate, based on the at least one electrical bias signal and the bandpass signal, at least one modulating signal:
wherein the electro-optic modulation circuit is configured to modulate the optical carrier by the at least one modulating signal to provide an output optical signal that comprises at least one optical pilot tone and at least one optical sideband that conveys the information:
wherein the bandpass signal is a digital bandpass signal that comprises an in-phase signal and a quadrature signal; wherein the manipulator comprises: a complex multiplexer that is fed by the in-phase signal, the quadrature signal and a complex digital signal and is configured to output a complex signal and a Hilbert-transformed signal; at least one bias circuit that is configured to add a cosinusoidal signal to the complex signal to provide a complex biased signal, and add a sinusoidal signal to the Hilbert-transformed signal to provide a biased Hilbert-transformed signal; at least one digital to analog converter that is configured to generate a first modulating signal and a second modulating signal by digital to analog conversion of the biased complex signal, and the biased Hilbert-transformed signal; and wherein the electro-optical modulator is configured to modulate the optical carrier by the first and second modulating signals to provide an output optical signal that has an asymmetric spectrum round the optical carrier frequency.

* * * * *